US008963903B2

(12) United States Patent
Sakamoto et al.

(10) Patent No.: US 8,963,903 B2
(45) **Date of Patent: *Feb. 24, 2015**

(54) IMAGE DISPLAY DEVICE HAVING MEMORY PROPERTY

(75) Inventors: Michiaki Sakamoto, Kanagawa (JP); Koji Shigemura, Kanagawa (JP); Setsuo Kaneko, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 245 days.

This patent is subject to a terminal disclaimer.

(21) Appl. No.: 13/442,451

(22) Filed: Apr. 9, 2012

(65) Prior Publication Data

US 2012/0256893 A1 Oct. 11, 2012

(30) Foreign Application Priority Data

Apr. 7, 2011 (JP) ................................ 2011-085849

(51) Int. Cl.
*G09G 3/20* (2006.01)
*G06F 3/038* (2013.01)
*G09G 5/00* (2006.01)
(Continued)

(52) U.S. Cl.
CPC .............. *G09G 3/344* (2013.01); *G09G 3/2003* (2013.01); *G09G 3/2081* (2013.01); *G09G 5/02* (2013.01); *G09G 2300/0452* (2013.01); *G09G 2310/06* (2013.01); *G09G 2310/061* (2013.01); *G09G 2320/0247* (2013.01)
USPC .......................................................... 345/208

(58) Field of Classification Search
CPC ...................................................... G02F 1/167
See application file for complete search history.

(56) References Cited

U.S. PATENT DOCUMENTS

| | | | | |
|---|---|---|---|---|
| 2008/0117165 | A1* | 5/2008 | Machida et al. | 345/107 |
| 2008/0303780 | A1* | 12/2008 | Sprague et al. | 345/107 |
| 2010/0020384 | A1* | 1/2010 | Machida et al. | 359/296 |

FOREIGN PATENT DOCUMENTS

| | | |
|---|---|---|
| JP | 2002-116734 A | 4/2002 |
| JP | 2004-102055 A | 4/2004 |

(Continued)

OTHER PUBLICATIONS

European Search Report, dated Feb. 15, 2013, issued by the European Patent Office in counterpart European Application No. 12163599.9.

(Continued)

*Primary Examiner* — Kent Chang
*Assistant Examiner* — Nathan Brittingham
(74) *Attorney, Agent, or Firm* — Sughrue Mion, PLLC

(57) ABSTRACT

An image display device is provided which suppresses discomfort “flickering” in a process of renewing a screen to realize multiple gray level displaying including an intermediate color. Electrophoretic particles are made up of n-kinds of charged particles C1, . . . , Ck, . . . , Cn having colors different from one another and threshold voltages to initiate an electrophoresis. Each of charged particles C1, . . . , Ck, . . . , Cn satisfies a relationship characteristic of threshold value voltage of charged particles> . . . >threshold value voltage of charged particle Ck> . . . >threshold value voltage of charged particle Cn. A voltage applying unit, at time of renewing a screen, renews a screen to a next screen having a desired density by a transition of a relative color density of each charged particle to a relative color density of a corresponding intermediate state in order of charged particle C1> . . . >Ck, . . . , Cn for a voltage driving waveform of each charged particle.

16 Claims, 31 Drawing Sheets

(51) Int. Cl.
*G09G 3/34* (2006.01)
*G09G 5/02* (2006.01)

(56) References Cited

FOREIGN PATENT DOCUMENTS

| | | | |
|---|---|---|---|
| JP | 2006-503321 | A | 1/2006 |
| JP | 4049202 | B1 | 2/2008 |
| JP | 2009-047737 | A | 3/2009 |
| JP | 4385438 | B2 | 12/2009 |
| JP | 2010-181477 | A | 8/2010 |
| WO | 2011/033914 | A1 | 3/2011 |

OTHER PUBLICATIONS

Japanese Office Action for Japanese Patent Application No. 2011-085849 mailed on Nov. 25, 2014.

* cited by examiner (C,M,Y)=(0,0,0.5)

(C,M,Y)=(0.5,0,0.5)

(C,M,Y)=(1,0,0.5)

| W | | | I-1 | | | I-2 | | | N | | |
|---|---|---|---|---|---|---|---|---|---|---|---|
| C | M | Y | C | M | Y | C | M | Y | C | M | Y |
| 0 | 0 | 0 | 0.5 | 0.5 | 0.5 | 1 | 1 | 0.5 | 0.5 | 1.0 | 0.5 |

【Intermediate Transition State】

| | C | M | Y |
|---|---|---|---|
| W | 0 | 0 | 0 |
| I1-1 | 0 | 0 | 0 |
| I1-2 | 0.25 | 0.25 | 0 |
| I1-3 | 0 | 0.25 | 0 |
| I2-1 | 0 | 0.25 | 0 |
| I2-2 | 0.25 | 0.5 | 0 |
| I2-3 | 0 | 0.5 | 0 |
| I3-1 | 0 | 0.5 | 0 |
| I3-2 | 0.25 | 0.75 | 0 |
| I3-3 | 0 | 0.75 | 0 |
| I4-1 | 0 | 0.75 | 0 |
| I4-2 | 0.25 | 1 | 0 |
| N | 0 | 1 | 0 |

| | C | M | Y |
|---|---|---|---|
| W | 0 | 0 | 0 |
| IA1-3 | 0.25 | 0.5 | 0.25 |
| IB1-3 | 0 | 0.5 | 0.25 |
| IA2-3 | 0.25 | 1 | 0.5 |
| N | 0 | 1 | 0.5 |

*T1 ;Basic Waveform Applying Period*
*T2 ;Corrected Waveform Applying Period*

| | C | M | Y |
|---|---|---|---|
| CUR | 1 | 0 | 0 |
| I1 | 0.75 | 0 | 0.25 |
| I1' | 0.5 | 0 | 0.25 |
| I2 | 0.5 | 0 | 0.5 |
| I2' | 0.25 | 0 | 0.5 |
| I3 | 0.25 | 0 | 0.75 |
| I3' | 0 | 0 | 0.75 |
| N | 0 | 0 | 1 |

IMAGE DISPLAY DEVICE HAVING MEMORY PROPERTY

INCORPORATION BY REFERENCE

This application is based upon and claims the benefit of priority from Japanese Patent Application No. 2011-085849, filed on Apr. 7, 2011, the disclosure of which is incorporated herein in its entirely by reference.

BACKGROUND OF THE INVENTION

1. Field of the Invention

The present invention relates to an image display device having a memory property and to be driven according to an electrophoretic display method and more particularly to the image display device having the memory property that can be suitably used for electronic paper display such as electronic books, electronic newspaper and the like.

2. Description of the Related Art

As a display device capable of doing a deed of "reading" without a stress, an electronic paper display device referred to as an electronic book, electronic newspaper and the like is now under development. Since it is necessary that that the electronic paper display of this kind is thin, light weight, hard to crack, and low in power consumption, its construction by using a display element having a memory property is desirable.

As a display element to be used in a device having a memory property, conventionally, an electrophoretic display element or cholesteric liquid crystal or the like is known, however, in recent years, electrophoretic display elements of two or more kinds are attracting attention. In this specification, the electrophoretic display element conceptually contains a device such as a quick-response liquid powder element that can achieve displaying by causing electrically charged particles to move.

First as related arts, an electrophoretic display device of the type that displays white and black colors by active matrix driving method is described. The electrophoretic display device is so configured that a TFT (Thin Film Transistor) glass substrate, electrophoretic display element film, and facing substrate are stacked in layers in this order. On the TFT glass substrate, TFTs arranged in a matrix manner, a pixel electrode connected to each TFT, gate lines driving TFTs, and data lines are mounted.

The electrophoretic display device is configured in a manner in which micro capsules being about 40 μm in size spread in a polymer binder. A solvent is injected into an inner portion of each of the micro capsules and, in the solvent, two kinds of positively and negatively charged nano-particles, that is, a white pigment made up of negatively charged titanium dioxide particles and a black pigment made up of positively charged carbon particles are hermetically confined within a dispersed and floated state. Moreover, on the facing substrate, a facing electrode (also called a common electrode) to provide a reference potential is formed.

The electrophoretic display device is operated by applying a voltage corresponding to pixel data between the pixel electrode and facing electrode and by moving the white and black pigments up and down. That is, when a positive voltage is applied to the pixel electrode while the positively charged black pigment is attracted by the facing electrode and, therefore, by using the facing electrode side as its display, black is displayed on the screen.

Further, when a negative voltage is applied to the pixel electrode, the positively charged black pigment are attracted by the pixel electrode while the negatively charged white pigment are attracted by the facing electrode and, as a result, white is displayed on the screen.

Next, when an image display is to be changed from white to black, a positive signal voltage is applied to the pixel electrode and, when the image display is changed from black to white, a negative signal voltage is applied to the pixel electrode, and when a current image display is to be maintained, that is, the white display or the black display is maintained, due to a memory property, 0V is applied. Thus, by comparing the current screen (previous screen) with a next screen (screen to be renewed), a signal to be applied is determined.

Moreover, an electrophoretic display device that can display colors in order of a unit pixel without losing a color feeling in white and black as in the case of paper and without using a color filter is being developed. For example, in Patent Reference 1 (Japanese Patent No. 4049202), an electrophoretic color display device is disclosed which is made up of an electrophoretic layer containing electrophoretic particles of the same polarity having these colors each being different from one another (for example, cyan (C), magenta (M), and yellow (Y) and having a white (W) supporting body to support the electrophoretic particles.

Each of the electrophoretic particles providing the three colors has a threshold value voltage to initiate an electrophoresis (electrophoresis initiating voltage) set so as to be different from one another. In the color electrophoretic display device disclosed in the Patent Reference 1, by utilizing a difference in the threshold voltage (absolute value) and by controlling a voltage to be applied to each electrophoretic particle, one cell can display cyan (C), magenta (M), and yellow (Y) in addition to white (W) and black (K), and second color and third color of these CMY colors.

Further, another color electrophoretic display device is disclosed in Patent Reference 2 (Japanese Patent No. 4385438) which uses an electrophoretic display device film on which various micro capsules spread in a layer state. A black first charged particle having charge of a first polarity, second charged particles R, G, B in red (R), green (G), and blue (B) colors having charge of a second polarity, and liquid dispersion medium to disperse these particles in a manner in which an electrophoresis can occur are enclosed hermetically in the above micro capsules.

Here, the second charged particles R, G, B have charged amounts different from one another and each particle has a threshold value voltage to initiate an electrophoresis being different from one another and is hermetically enclosed in a separate microcapsule being different from one another.

In the color electrophoretic display device disclosed in Patent Reference 2, by using a difference in a threshold value voltage (absolute value), a voltage to be applied to each electrophoretic particle is controlled and, therefore, each cell, without a color filter as in the case of the Patent Reference 1, can display second and third colors of RGB.

In the Patent Reference 3 (Japanese Patent Application Laid-open No. 2009-47737), a color electrophoretic display element is disclosed which uses electrophoretic particles having not only 3 colors including cyan (C), magenta (M) and yellow (Y) but also a color of black (K), 4 colors in total.

Thus, according to technologies disclosed in the Patent Reference 1, 2, and 3, the color display is made possible by three threshold values provided by each of the charged particles C, M, Y (or R, G, B). Display operations of the color electrophoretic display device disclosed in the Patent Reference 1 is described by referring to FIGS. 32 and 33. The threshold value voltages Vth(c), Vth(m), and Vth(y) for respectively each of charged particles C, M, Y are set so as to satisfy the relationship of $|Vth(c)|<|Vth(m)|<|Vth(y)|$. Each of applied voltages V1, V2, and V3 is set so as to satisfy the relationship of $|Vth(c)|<|V3|<|Vth(m)|$, $|Vth(m)|<|V2|<|Vth(y)|$, $|Vth(y)|<|V1|$.

FIGS. 32 and 33 show hysteresis curves of charged particles C, M, and Y, representing a relation between a threshold voltage and a relative color density. Moreover, in FIGS. 32 and 33, for simplification, so that a gradient of each hysteresis Y, nY, M, nM, C and nC is constant, the time required for movement of Y, M, C from a rear to a display surface is set to be different from one another.

In FIG. 32, an initial (previous) screen is supposed to be white (W). While white (W) is being displayed, if V3 (=10V) is applied, a cyan color electrophoretic particle C moves to a display surface side and, therefore, cyan (C) is displayed on a next screen. While white (W) is being displayed, if V2 (=15V) is applied, cyan (C) and magenta (M) color electrophoretic particles move to a display surface side, blue (B) is displayed.

While white is being displayed, if V1 (=30V) is applied, cyan (C), magenta (M), and yellow (Y) color electrophoretic particles C, M, and Y move to the display surface side and, as a result, black (K) is displayed. While white (W) is being displayed, if a negative voltage is applied, no color particle exists and white (W) is still being displayed.

Next, a previous screen is made black (K). While black is being displayed, if −V3 (=−10V) is applied, a cyan color electrophoretic particle C moves to a rear substrate side and the magenta (M) and yellow (Y) electrophoretic particles M and Y are left and, therefore, red (R) is displayed on a next screen.

While black is being displayed, if −V2 (=−15V) is applied, cyan and magenta color electrophoretic particles C and M move to the rear substrate side and yellow electrophoretic particle Y is left on the display surface side and, as a result, yellow (Y) is displayed. While black is being displayed, if −V1 (=−30V) is applied, cyan (C), magenta (M) and yellow (Y) color electrophoretic particles C, M, Y move to a rear substrate side and white (W) is displayed.

In order to display a magenta (M) color, as shown in FIG. 33, while white is being displayed, V2 (=15V) is applied to move the cyan (C) and magenta (M) color electrophoretic particles C and M to the display surface side and an intermediate transition state having a blue (B) color is allowed to occur.

While a state is in the intermediate transition state, −V3 (=−10V) is applied to move the cyan (C) color electrophoretic particle C to the rear side and, then, magenta (M) is displayed (see Table 12). Moreover, in order to display a green (G) color, as shown in FIG. 32, while black is being displayed, −V2 (=−15V) is applied to move cyan (C) and magenta (M) electrophoretic particles C and M to the rear side and an intermediate transition state having a yellow (Y) color is allowed to occur. While a state is being in the intermediate transition state, V3 (=10V) is applied to move the cyan (C) color electrophoretic particle C to the display surface side to display a green (G) color (see Table 12).

Thus, when a previous screen is in a white (W) state, as shown in Table 12, the state of a primary color to which a direct transition is possible is cyan (C), blue (B), and black (K). Similarly, as shown in Table 12, through black intermediate transition I, red (R) or yellow (Y) is displayed. Through blue (B) intermediate transition state I, magenta (M) is displayed and through black (K) and yellow (Y) intermediate transition state I, II, green (G) is displayed (see Table 12).

TABLE 12

| Previous Screen | Intermediate Transition I | Intermediate Transition II | Renewed Screen |
|---|---|---|---|
| W | — | — | W |
| W | — | — | K |
| W | — | — | C |
| W | B | | M |
| W | K | | Y |
| W | K | | R |
| W | K | Y | G |
| W | — | — | B |

As described above, in the electrophoretic display device disclosed in the Patent Reference I which uses a difference in a threshold voltage, from a ground state, primary colors being red (R), green (G), blue (B), cyan (C), magenta (M), yellow (Y), white (W) and black (K) can be displayed.

This is true for the electrophoretic display device disclosed in the Patent Reference 2 to 3, however, the display devices described in the Patent References have defects that, at time of renewal from a previous screen to a next screen, the renewal is realized through an intermediate transition of one or more primary colors (relative color density being 1) and, as a result, discomfort "flickering" caused by great and rapid changes in luminance and color density during the renewal processes.

Additionally, displaying of given display color La*b* including an intermediate and/or gray level displaying using three colors charged particles C, M, Y on a same pixel electrode is very complicate and this problem is not yet solved by the technologies in the Patent Reference 1 to 3.

SUMMARY OF THE INVENTION

In view of the above, it is an object of the present invention to provide an image display device having a memory property capable of suppressing discomfort "flickering" occurring during the process of renewing a screen and of displaying multiple gray scales including not only each of single colors (R, G, B, C, M, Y, W, and K) but also an intermediate color by using a simple configuration.

According to a first aspect of the present invention, there is provided an image display device having a memory property including a display section having a first substrate in which pixel electrodes are formed, a second substrate in which a facing electrode is formed, and an electrophoretic layer interposed between the first substrate and second substrate and containing electrophoretic particles in a manner to allow an electrophoresis in the electrophoretic layer and a voltage applying unit to sequentially apply, at time of screen renewal, a plurality of and specified voltage driving waveforms to the electrophoretic particles existing between the pixel electrodes and facing electrode to renew a display state of the display section from a previous screen, through a single or a plurality of intermediate transitions, to a next screen, wherein the electrophoretic particles include n-kinds ("n" is a natural number being 2 or more) of charged particles C1, . . . , Ck, . . . , Cn (k=n−1, however, when n=2, Ck is deleted) having colors being different from each other and threshold voltage to initiate an electrophoresis being different from each other and each of charged particles C1, . . . , Ck, . . . , Cn satisfies a relationship characteristic of threshold voltage of the charged particle C1> . . . >threshold voltage of the charged particle Ck> . . . >threshold voltage of the charged particle Cn, wherein the voltage applying unit, by changing, at time of screen renewal, for each of the voltage driving waveforms to be applied, a relative color density of each charged particle to a relative color density in a corresponding intermediate transition state, in order of the charged particles C1→ . . . , →Ck→, . . . , →Cn, finally renews a screen to a next screen having a desired density (if no reverse order occurs, a simultaneous transition of a given or a plurality of kinds of charged particles is possible to the intermediate transition state or a final display state).

According to a second aspect of the present invention, there is provided an image display device having a memory property including a first substance in which pixel electrodes are formed, a second substrate in which a facing electrode is formed, and an electrophoretic layer interposed between the first substrate and the second substrate allowing an electrophoresis of electrophoretic particles; a voltage applying unit to apply, at time of renewing a screen, a predetermined voltage waveform to the electrophoretic particles between the pixel electrode and the facing electrode to change a display state of the display section from a previous screen to a next screen; wherein the electrophoretic particle comprises n-kinds ("n" is a natural number being 2 or more) of charged particles C1, . . . , Ck, . . . , Cn (k=n−1), however, when n=2, Ck is deleted) having colors being different from each other and threshold voltage to initiate an electrophoresis being different from each other and wherein each of charged particles C1, . . . , Ck, . . . , Cn satisfies characteristics of relationship of a threshold value voltage of charged particle C1> . . . >threshold voltage of charged particle Ck> . . . >threshold value voltage of charged particle Cn, wherein, when a relative color density of charged particle C1 on a screen to be removed is R1 ($0 \le R1 \le 1$), . . . , a relative color density of charged particle Ck is Rk ($0 \le Rk \le 1$), . . . , and a relative color density of charged particle Cn is Rn ($0 \le Rn \le 1$), the voltage applying unit, by applying the predetermined voltage driving waveform, determines the relative color density of the charged particle C1 to be R1, by applying |first voltage|(>threshold value voltage of charged particle C1) and/or 0V, and by referring to the relative color density of the charged particle C1 on the previous screen, . . . , then, the relative color density of the charged particle Ck to be Rk, by applying |k-th voltage|(>threshold value voltage of charged particle Ck) and/or 0V, and by referring the relative color density of the charged particle Ck on the previous screen, . . . and, finally, the relative color density of the charged particle Ck is determined as Rn and, by applying |n-th voltage| (>threshold value voltage of charged particle Cn) and/or 0V, and by referring to the relative color density of the charged particle Cn on the previous screen, (if the color is not reversed, the relative color density of a given plurality of charged particles can be simultaneously determined), renewal of a screen to a next screen having a desired relative color density is realized.

According to a third aspect of the present invention, there is provided an image display device having a memory property including a display section comprising a first substrate in which pixel electrodes are formed, a second substrate in which a facing electrode is formed, and an electrophoretic layer interposed between the first substrate and the second substrate and having an electrophoretic particle allowing an electrophoresis and a voltage applying unit, at time of renewing a screen, to apply a voltage driving waveform to the electrophoretic particle between the pixel electrode and the facing electrode to cause a transition of display state of the display section from a previous screen, through an intermediate transition state, to a next screen, wherein the electrophoretic particle includes two kinds of charged particles C1 and C2 having colors being different from each other and threshold value voltages being different from each other and wherein the threshold value voltage of the charged particle C1 is set so as to be higher than that of the charged particle C2 and wherein the voltage applying unit, at time of renewing a screen, by first resetting a previous screen and then applying a predetermined voltage driving voltage, determines a relative color density in order of the charged particle C1→C2, (if the order is not reversed, the relative color density of charged particles C1 and C2 can be simultaneously determined) to renew a previous screen to a next screen having a desired density.

Thus, with above configurations of the present invention, displaying not only each of single color (R, G, B, C, M, Y, W, K) but also given color including intermediate colors and middle tone colors can be realized by simplified configurations. As a result, discomfort flickering during processes of renewing screen can be suppressed.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various exemplary embodiments with reference to the accompanying drawings.

The configurations of the invention is achieved by configuring each voltage driving waveform period so as to have a first sub-frame group period as a first voltage applying period (|first voltage|>threshold value of charged particle C1) to apply a |first voltage| and/or 0V during a specified number of sub-frames for the electrophoresis of charged particles C1, . . . , Ck, . . . , Cn in the thicker layer direction in an electrophoretic layer in a predetermined distance, . . . , then a k-th sub-frame group period as a k-th voltage applying period (threshold voltage of charged Ck−1>|k-th voltage|>threshold of charged particle Ck; k-th voltage applying period>k-th−1 voltage applying period) to apply a |k-th voltage| and/or 0V during a specified number of sub-frames for the electrophoresis of charged particles Ck, . . . , Cn in a thicker layer direction in an electrophoretic layer in a predetermined distance, . . . , an n-th sub-frame group period as an n-th voltage applying period (threshold voltage of charge particle Cn−1>|k-th voltage|>threshold voltage of charged particle Cn; n-th voltage applying period>n-th−1 voltage applying period) to finally apply a |n-th voltage| and/or 0V during a specified number of sub-frames for the electrophoresis of only charged particles Cn in a thicker layer direction by a specified distance.

Reference Example

Figure 1:
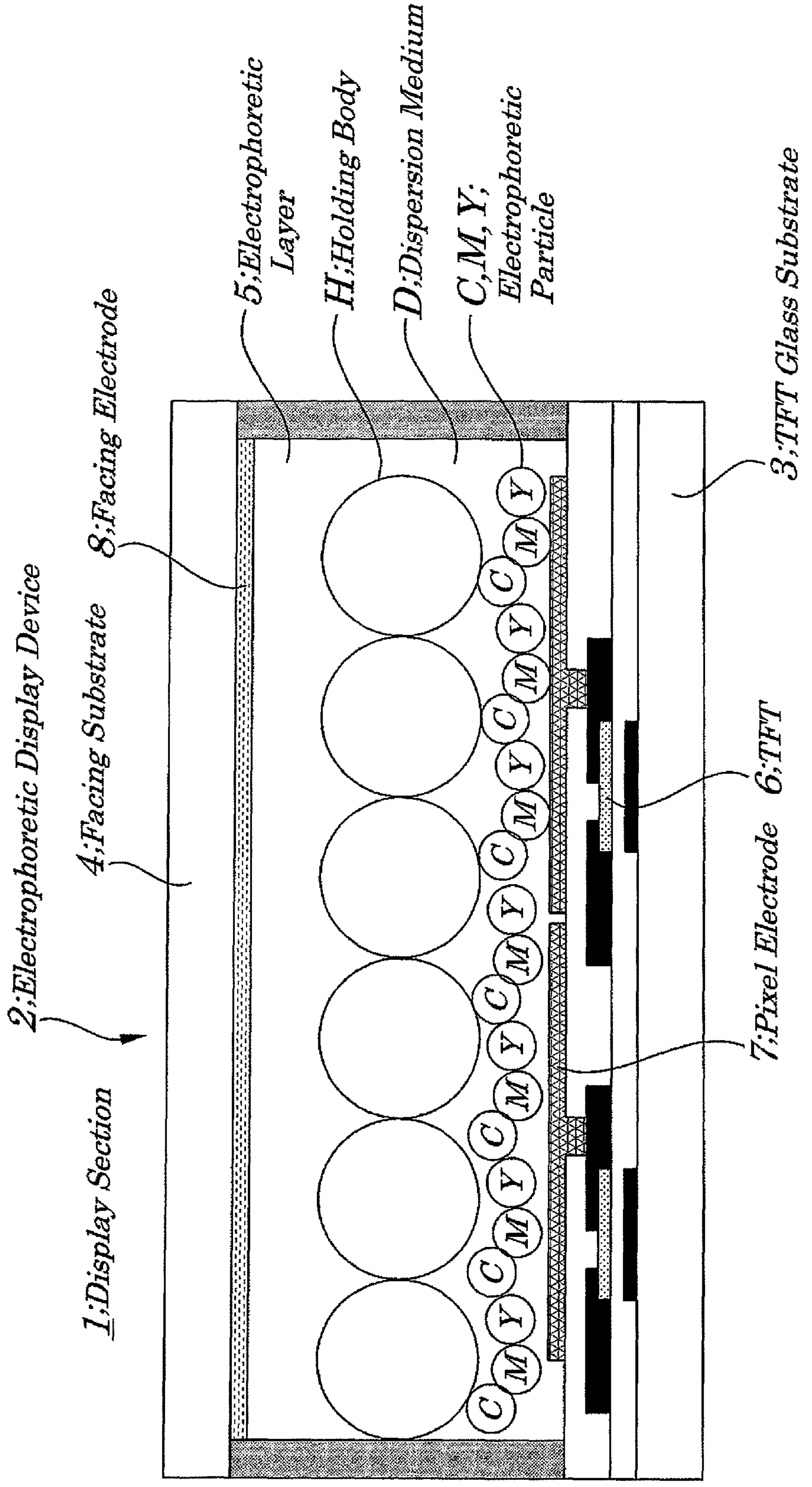
FIG. 1 is a partial cross-sectional diagram conceptionally showing configurations of a display section making up an electrode paper display device according to a first exemplary embodiment of the present invention.

First, by referring to drawings, an embodiment of the invention of a previous application of the applicant of the present invention is described. FIG. 1 is a partial cross-sectional view conceptionally showing configurations of a displaying section of an electronic paper display device (image display device) serving as a Reference example of the present invention.

The display section 1 is made up of an electrophoretic display device (element) 2 having a memory property to perform color display by an active-matrix driving method and the electrophoretic display device 2 includes a TFT glass substrate 3, a facing substrate 4, and an electrophoretic layer 5 hermetically sealed between the TFT glass substrate 3 and the facing substrate.

On the TFT glass substrate 3, many TFTs 6 acting as switching elements arranged in a matrix manner, a pixel electrode 7 connecting to each of the TFTs 6, gate lines (not shown), and data lines (not shown).

The electrophoretic layer 5 so formed as to have about 10 to about 100 μm is filled with a dispersion medium D, electrophoretic particles C, M, and Y being respectively cyan (C), magenta (M), and yellow (Y) in color which are nano-particles dispersed in the dispersion medium and with a white supporting body H. which supports electrophoretic particles (same in the embodiments herein), having particle diameters of about 10 μm to about 100 μm. Moreover, the electrophoretic layer 5, in this example, has a layer thickness of about 10 μm to about 100 μm.

The electrophoretic particles C, M, and Y each having one of three colors are charged to have a same polarity (in the reference example, positive polarity) in a state being discharged in the dispersion medium D, however, a set value for a charged amount is different among the C, M, and Y and, therefore, each of the C, M, and Y is separated from a surface of the supporting body H and, in the dispersion medium, an absolute value of a threshold voltage for initiating an electrophoresis (electrophoresis initiating voltage) is different from one another. It is preferred that the size of the supporting body H is huge when compared with the electrophoretic particles C, M, and Y and the C, M, Y are charged to have opposite polarities.

Moreover, on the facing substrate 4, a facing electrode 8 to provide a reference potential is formed and a COM voltage is applied which determines the reference potential of the electrophoretic display device 2. In the color electrophoretic display device, a voltage corresponding to pixel data is applied between the pixel electrode 7 and facing electrode 8 and the electrophoretic particles C, M, Y (hereinafter, called "charged particles") are moved from the TFT glass substrate 3 side to the facing substrate 4 side or from the facing substrate 4 side to the TFT glass substrate 3 side. In this reference example, a surface on the side of the facing electrode 8 is used as a display surface (same in the following embodiments).

Figure 2:
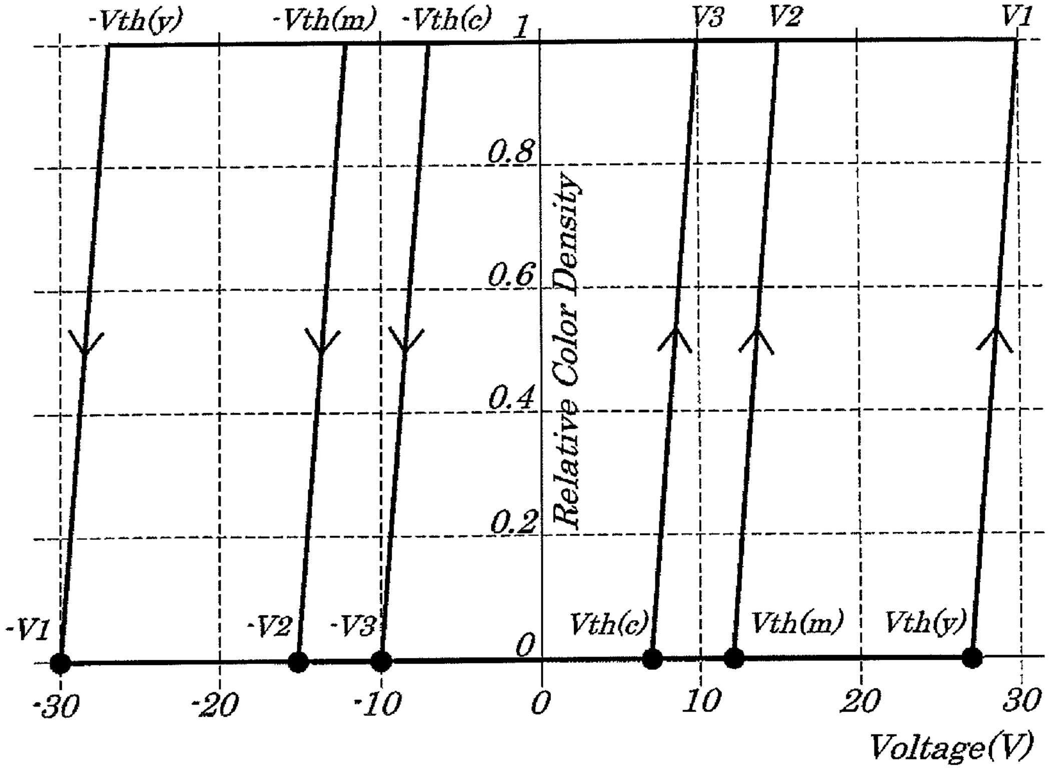
FIG. 2 is a diagram explaining a color display principle of an electrophoretic display device making up the display section according to the first exemplary embodiment.
Figure 3A:
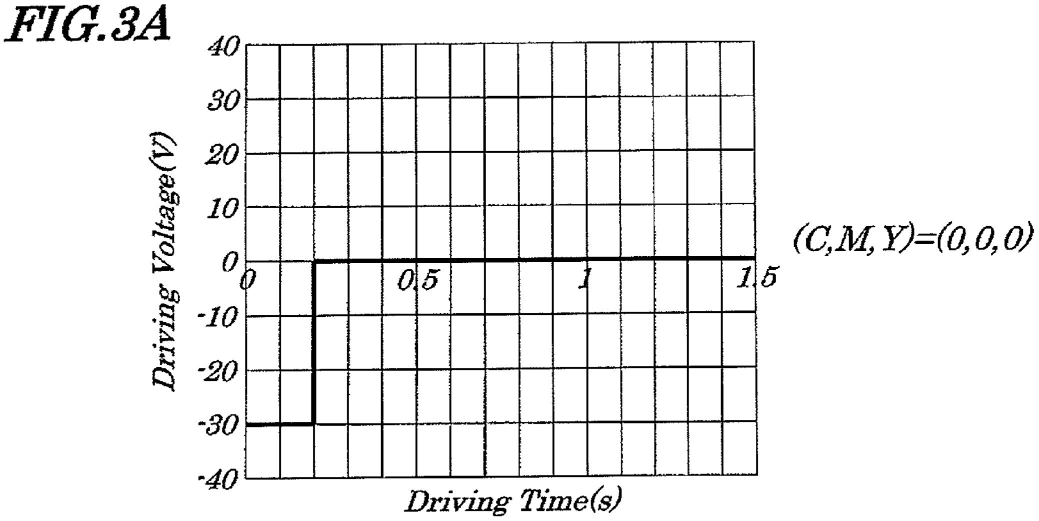
FIGS. 3A, 3B and 3C are diagrams explaining a reference example of the present invention and in detail explaining a driving voltage waveform to be applied to the display section at time of displaying of an intermediate color and a gray level.
Figure 3B:
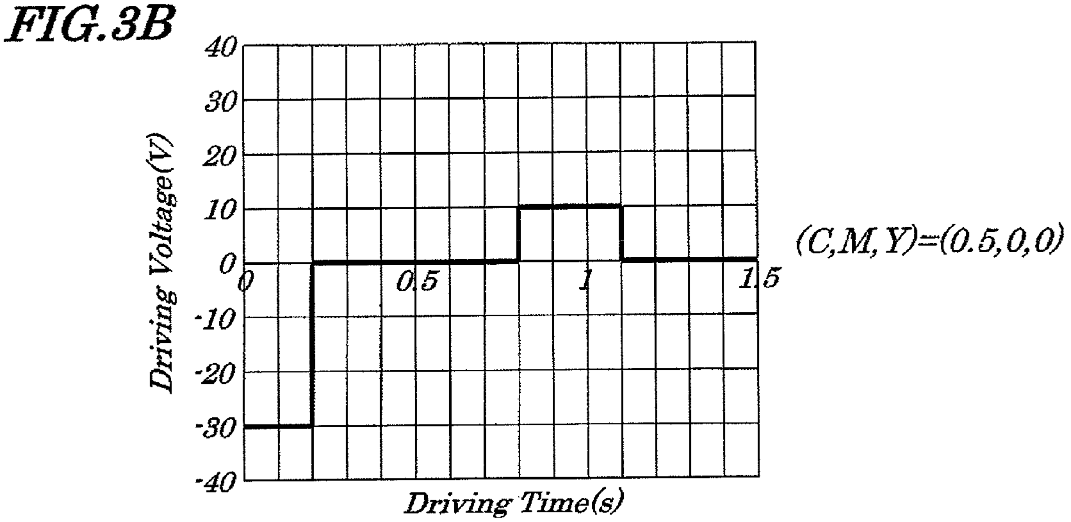
Figure 3C:
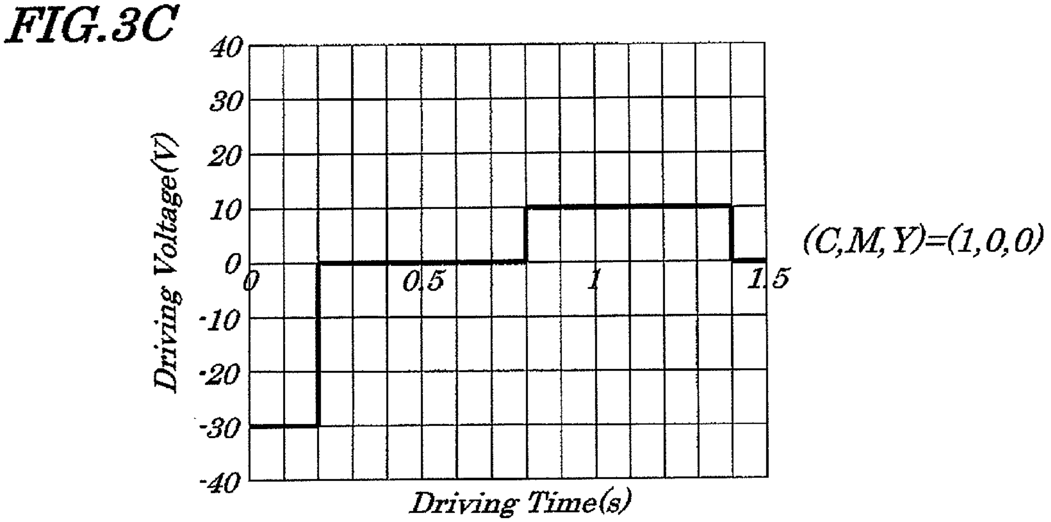
Figure 4A:
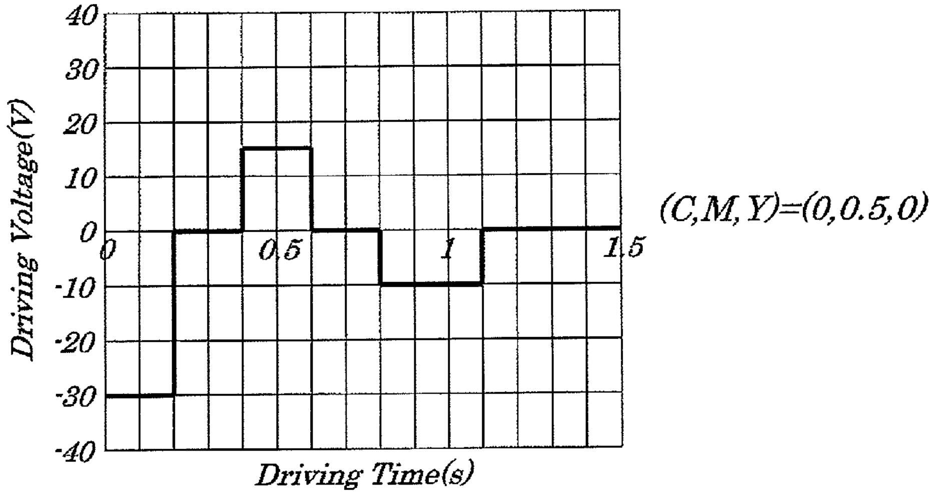
FIGS. 4A, 4B and 4C are diagrams showing a driving voltage waveform to be applied to the display section.
Figure 4B:
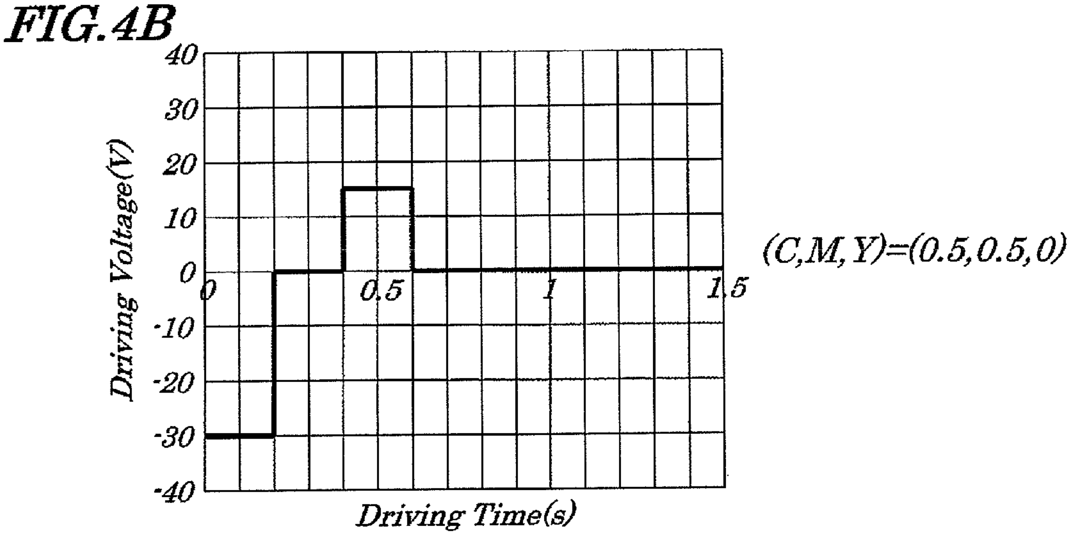
Figure 4C:
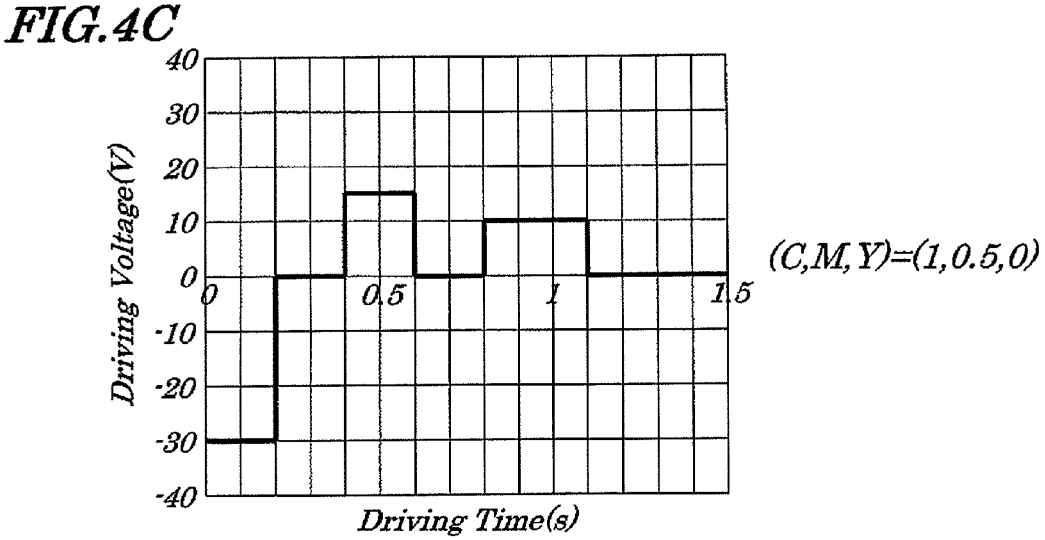
Figure 5A:
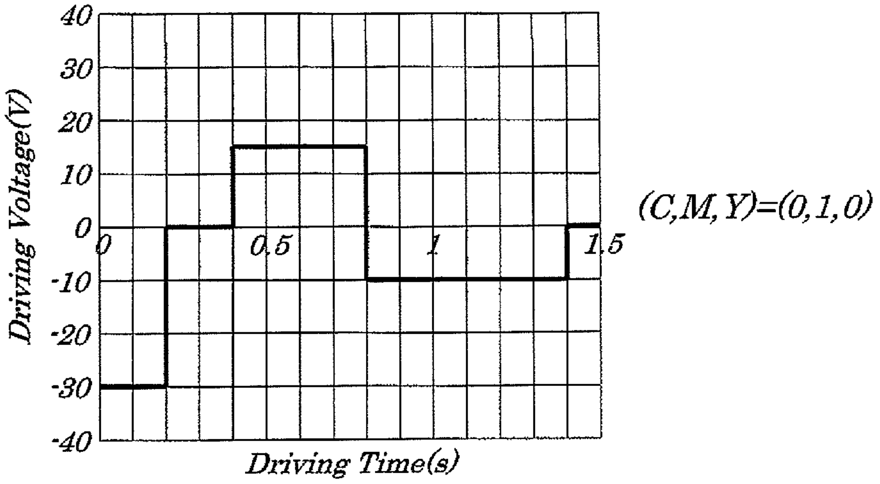
FIGS. 5A, 5B and 5C are diagrams showing a driving voltage waveform to be applied to the display section.
Figure 5B:
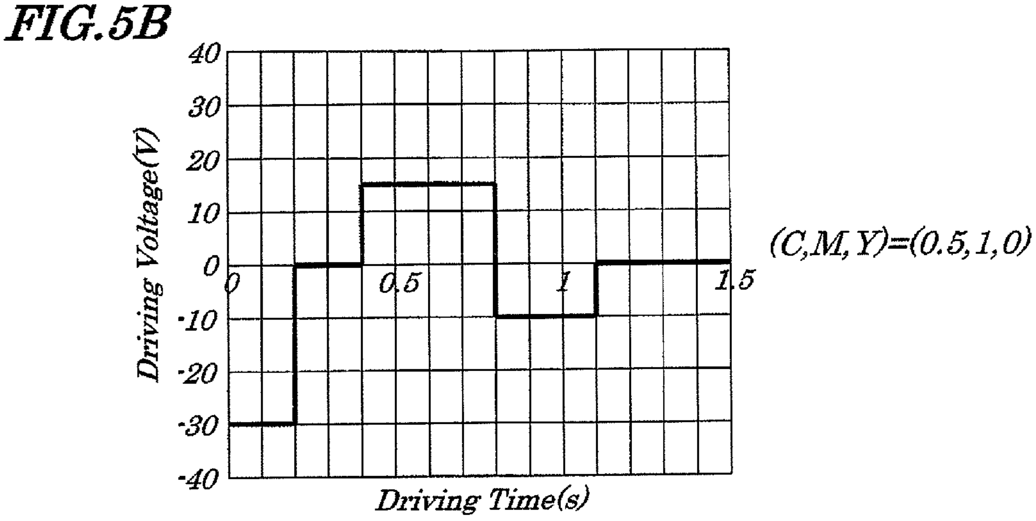
Figure 5C:
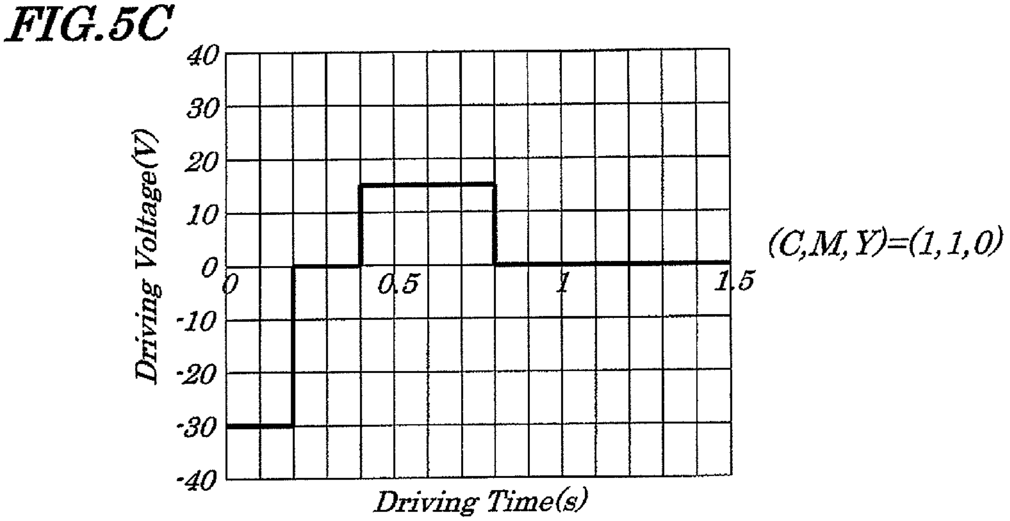
Figure 6A:
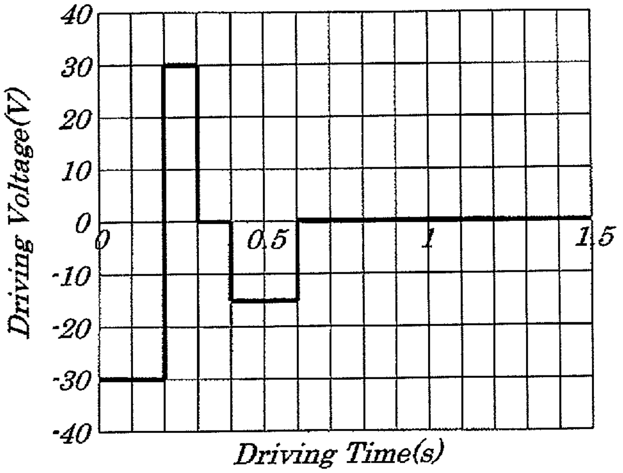
FIGS. 6A, 6B and 6C are diagrams showing a driving voltage waveform to be applied to the display section.
Figure 6B:
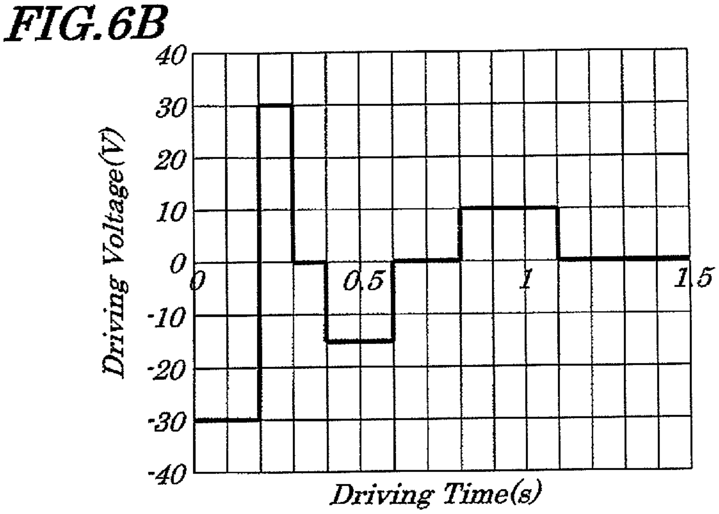
Figure 6C:
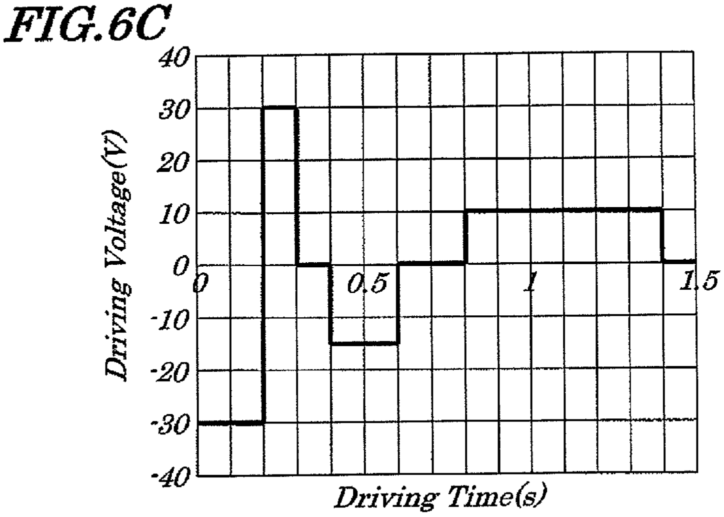
Figure 7A:
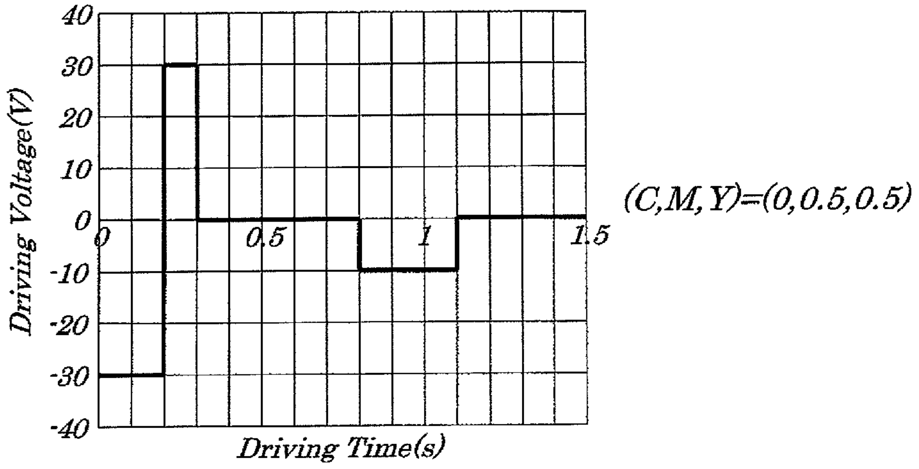
FIGS. 7A, 7B and 7C are diagrams showing a driving voltage waveform to be applied to the display section.
Figure 7B:
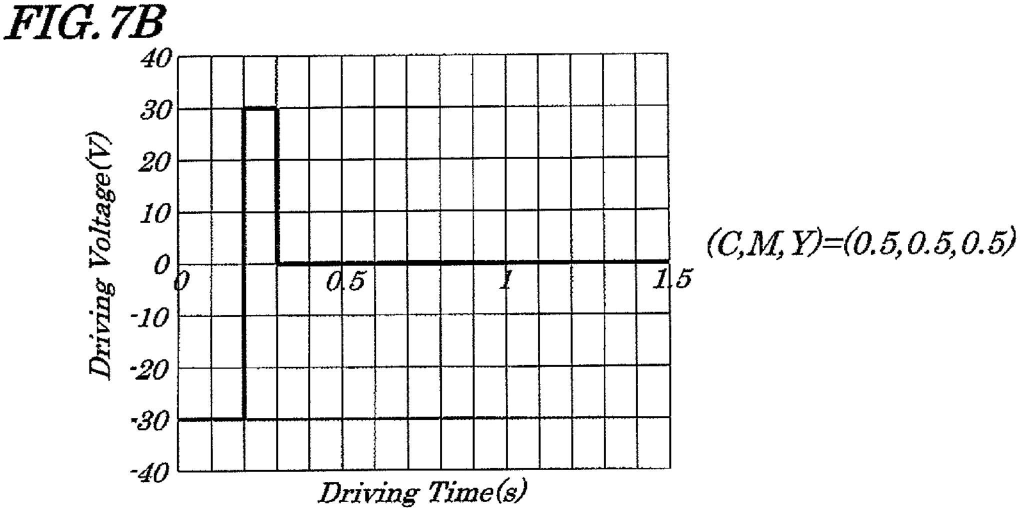
Figure 7C:
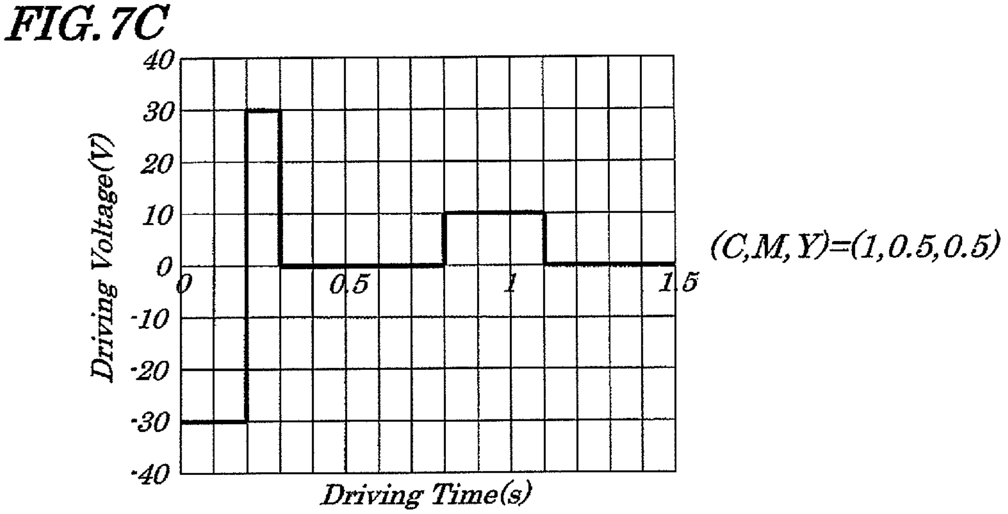
Figure 8A:
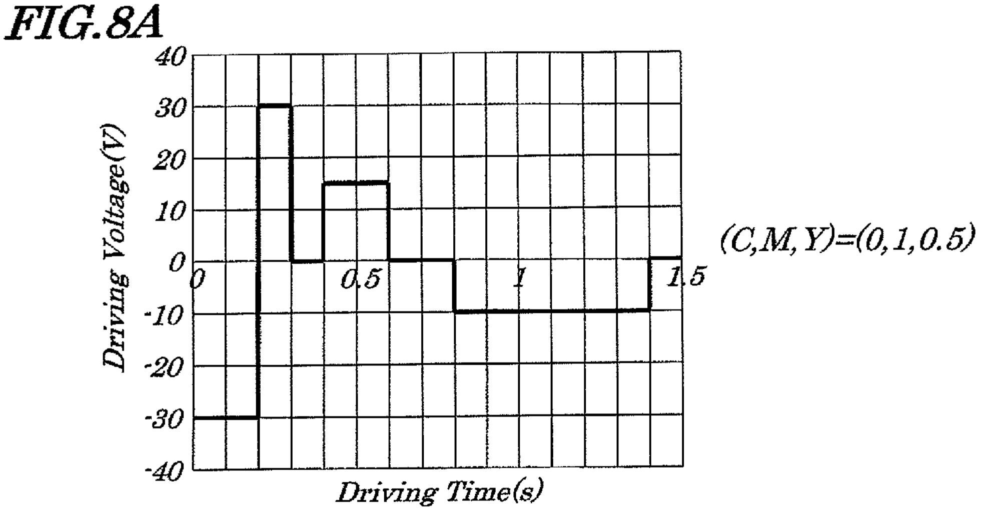
FIGS. 8A, 8B and 8C are diagrams showing a driving voltage waveform to be applied to the display section.
Figure 8B:
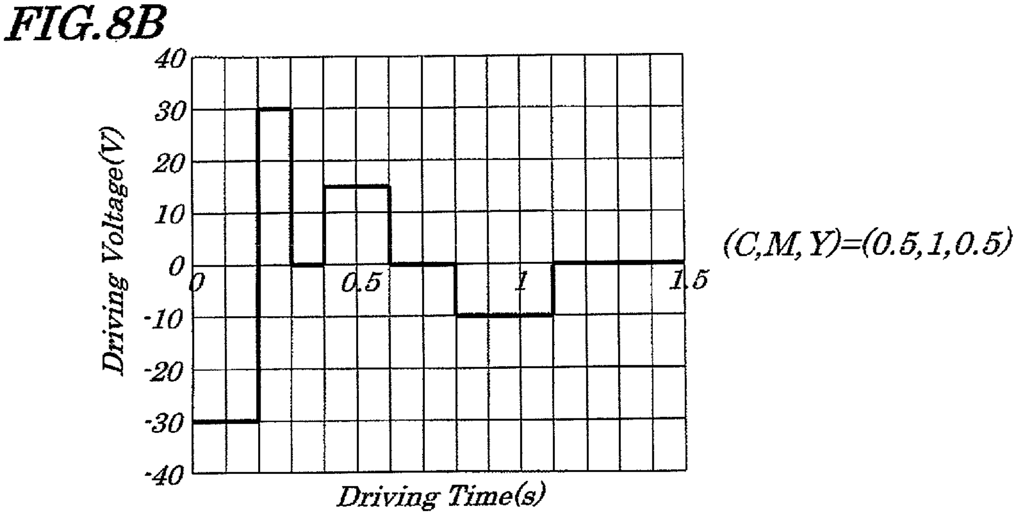
Figure 8C:
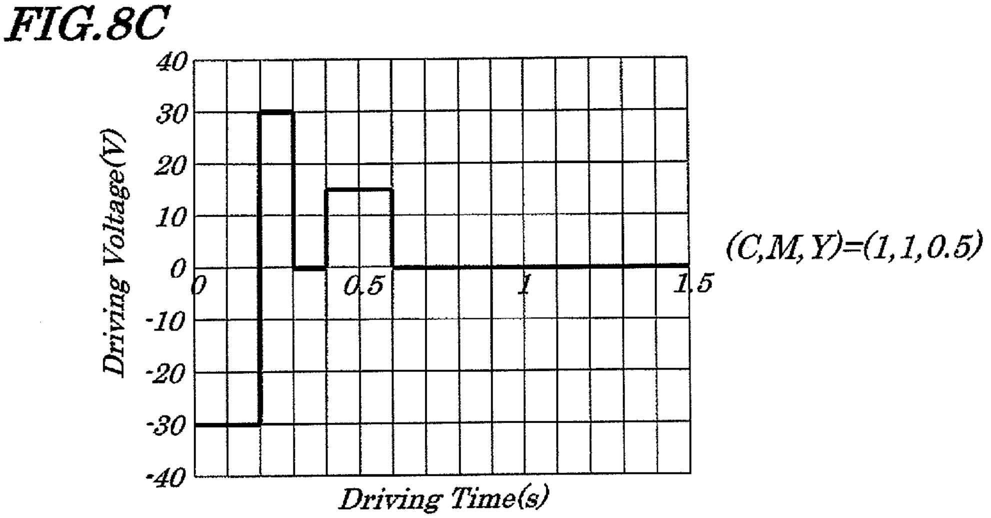
Figure 9A:
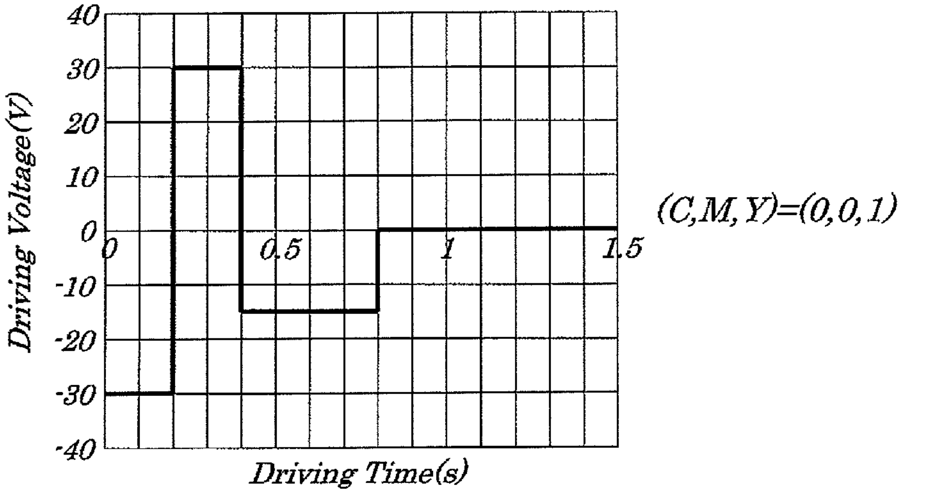
FIGS. 9A, 9B and 9C are diagrams showing a driving voltage waveform to be applied to the display section.
Figure 9B:
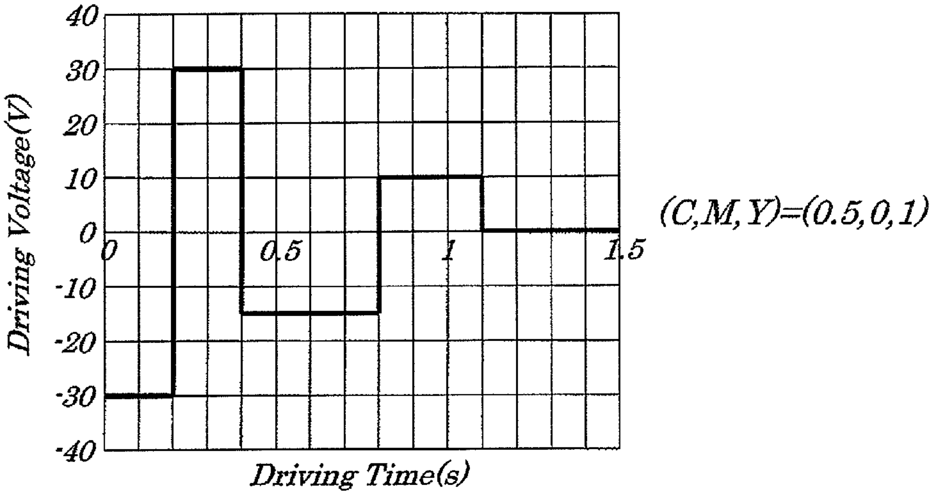
Figure 9C:
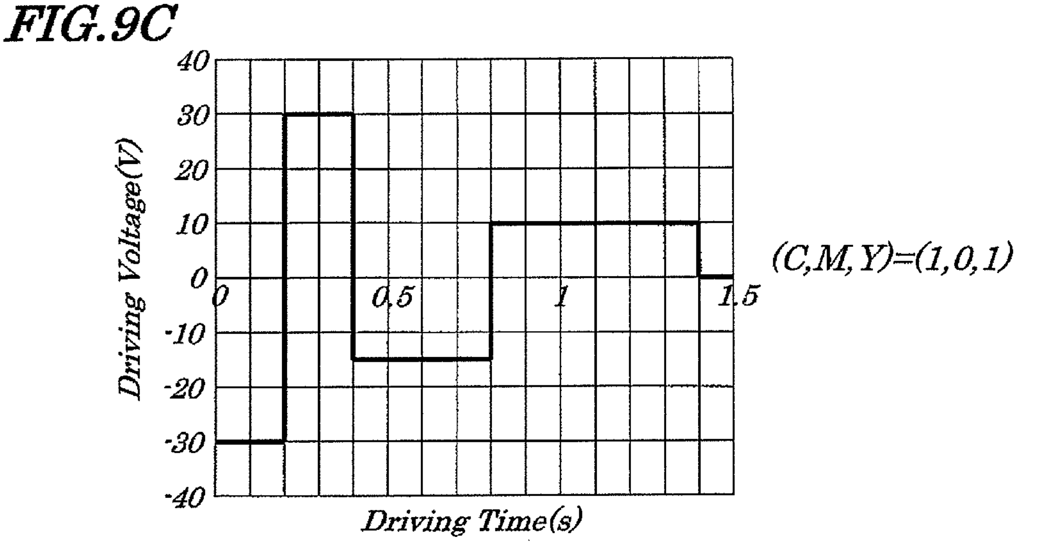
Figure 10A:
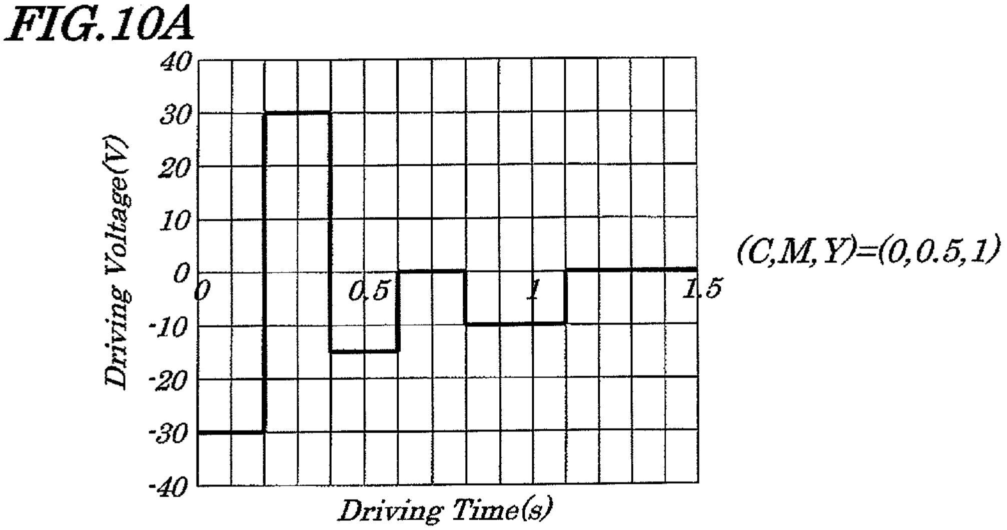
FIGS. 10A, 10B and 10C are diagrams showing a driving voltage waveform to be applied to the display section.
Figure 10B:
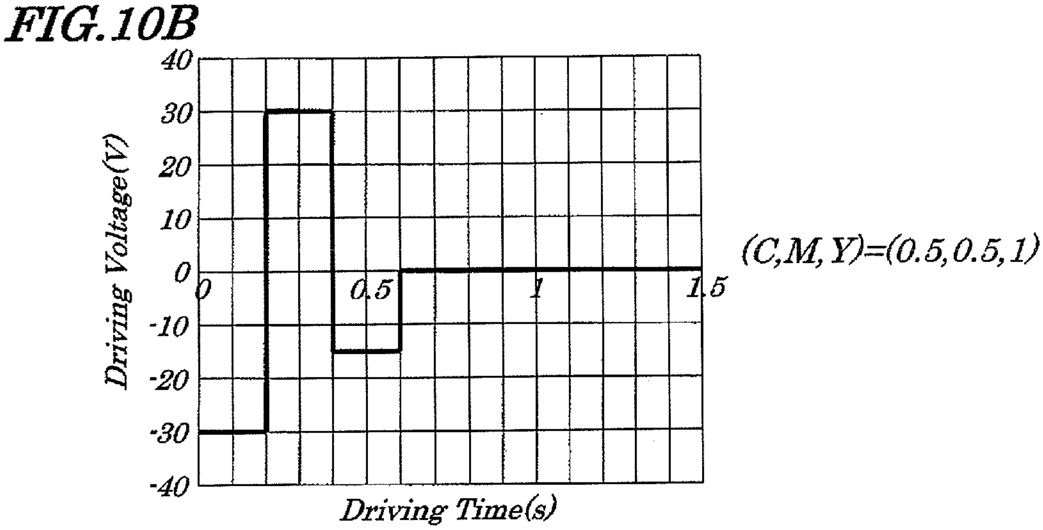
Figure 10C:
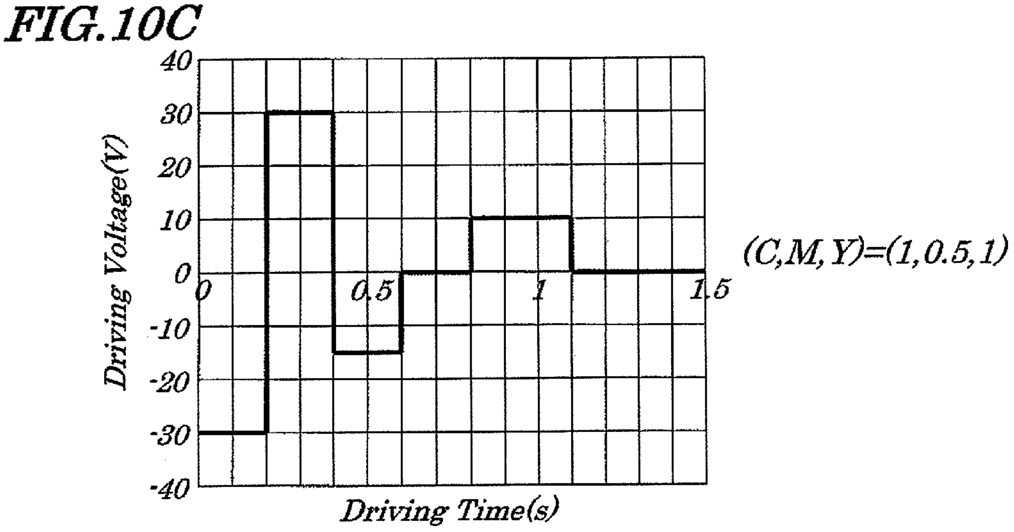
Figure 11A:
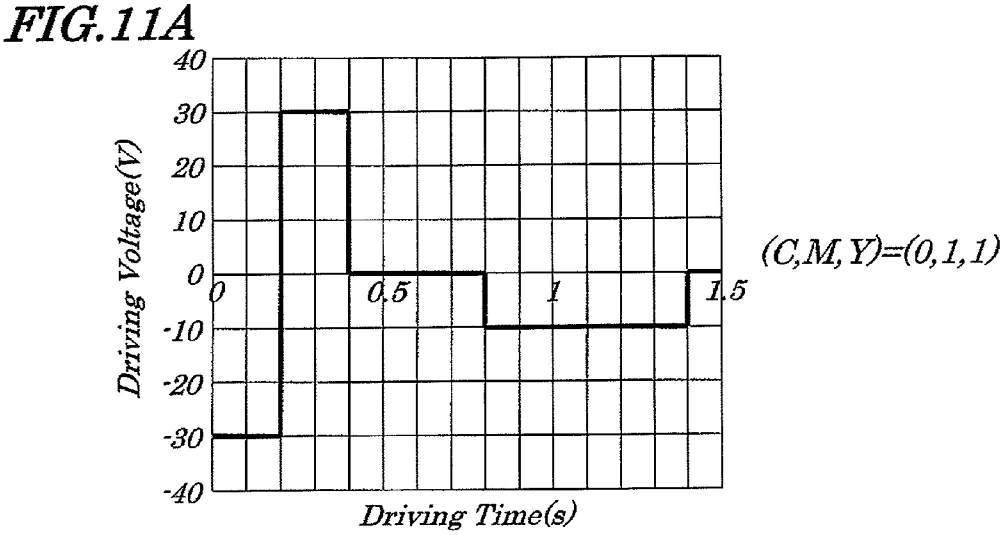
FIGS. 11A, 11B and 11C are diagrams showing a driving voltage waveform to be applied to the display section.
Figure 11B:
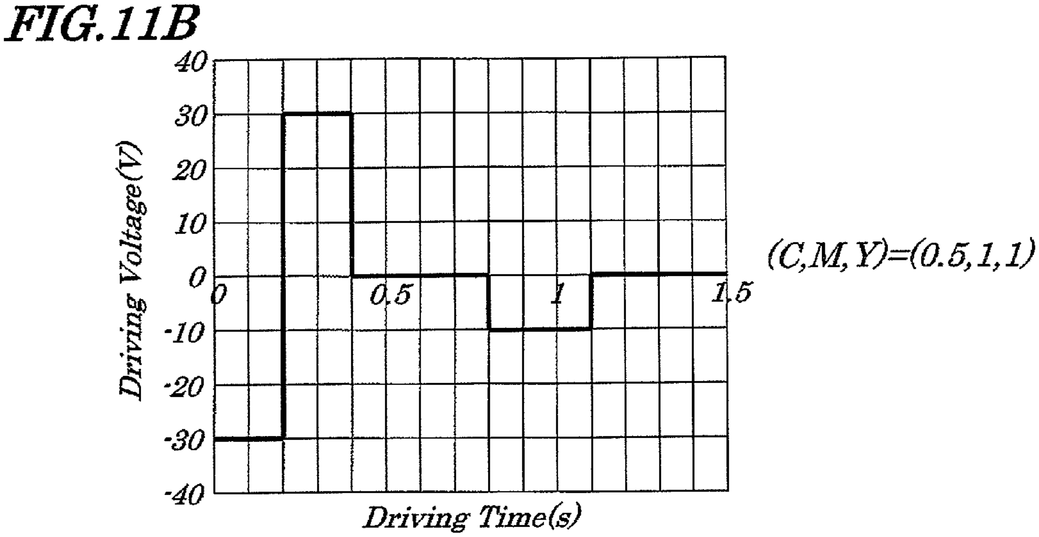
Figure 11C:
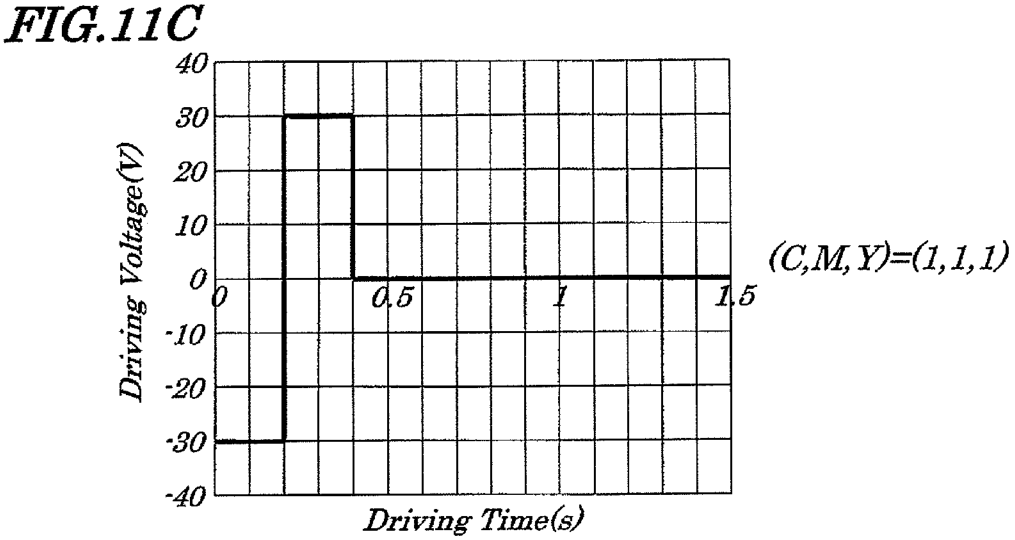

Next, by referring to FIGS. 1 and 2, principles for color display of the electrophoretic display device 2 according to the Reference example are described. In the Reference example, the threshold voltages Vth(c), Vth(m), and Vth(y) of three kinds of electrophoretic particles C, M, and Y are set so as to satisfy the relationship of |Vth(c)|<|Vth(m)|<|Vth(y)|.

Moreover, voltages (hereinafter, applying voltage) V1, V2, and V3 to be supplied between the pixel electrode 7 and facing electrode 8 are set so as to satisfy the relation of |Vth(c)|<|V3|<|Vth(m)|, |Vth(m)|<|V2|<|Vth(y)|, |Vth(y)|<|V1|.

Here, the threshold voltage denotes a voltage (electrophoretic initiating voltage) at which a corresponding particle starts to be activated when an absolute value of the applying voltage is not less than an absolute value of a threshold voltage.

As understood from FIG. 2, behaviors of the electrophoretic particle C are explained. When a voltage becomes not lower than the threshold voltage Vth(c), the electrophoretic particle C moves from the TFT glass substrate 3 side to the facing substrate 4 side and the display density of a cyan color becomes higher and its density reaches a saturated density before a voltage reaches the voltage Vth(m).

In this state, if a negative voltage is applied and the voltage becomes not higher than the threshold voltage −Vth(c), the electrophoretic particle C moves from the facing substrate 4 side to the TFT glass substrate 3 side and display density of the cyan color becomes lower than the cyan color display density becomes minimum before the voltage reaches the voltage −Vth(m).

Similarly, in the case of the electrophoretic particle M, when the voltage becomes higher than the threshold voltage Vth(m) (or becomes lower than the voltage −Vth (m), the display density increases (or decreases) and, in the case of the electrophoretic particle Y, when the voltage becomes higher than the threshold voltage Vth(y) (or becomes lower than the voltage −Vth(y), an increase (or decrease) in the display density occurs.

Next, a TFT driving method for the color electrophoretic display device (element) according to the Reference example is described below. In the TFT driving of the electrophoretic display device 2, as in the case of a liquid crystal display device, by applying a gate signal to gate lines for shift-operation for every line and data line signal are written into a pixel electrode through the TFT of the switching element.

The time required for completion of writing in all lines is defined as one frame and during the one frame, scanning is performed at, for example, 60 Hz (16.6 msec period). Generally, in the liquid crystal display device, an entire image is switched within one frame. Meanwhile, response time of the electrophoretic display device is slow when compared with the liquid crystal and, during a plurality of sub-frame periods is called a "sub-frame period" and the period of screen renewing made up of a plurality of sub-frame period is called a "screen renewing period") unless a voltage continues to be applied, the screen cannot be renewed.

Therefore, in the electrophoretic display device, the Pulse Width Modulation (PWM) method is employed by which a specified voltage continues to be applied during the plurality of sub-frame periods. Then, applying a predetermined constant voltage V1 (V2 or V3) during a specified number of sub-frames, gray level display is performed. In the description below, in order to represent given display colors (for example. La*b* system, XYZ system, or RGB system), conversion to relative color density of CMY system like the color of the three electrophoretic particles C, M, and Y is made.

Driving Operations

<Case of One Time Application of Driving Waveform>

In the Reference example, in order to realize displaying of a previous display state "CURRENT" (hereinafter, a "previous screen" or a "current screen") and displaying of a state of "NEXT" (hereinafter a "next screen" or "renewed screen") appearing after the renewal of images, by passing through intermediate transition state WK→I-1→I-2 described later, systematic and simple driving method for displaying including intermediate color and gray level can be achieved. By driving during a plurality of sub-frames, a specified image is renewed.

The driving period over a plurality of sub-frames includes a reset period for transition to a white or black displaying ground state, a first sub-frame group period (first voltage applying period) for applying voltages V1, 0, or −V1[V], a second sub-frame group period (second voltage applying period) for applying voltages V2, 0, or −V2[V], and a third sub-frame group period (third voltage applying period) for applying voltages V3, 0, or −V3[V]. The period including the first to third voltage applying periods is called a "set period".

More specifically, when display information of a pixel of an image to be displayed (next screen NEXT to be renewed) is represented by Rc, Rm, and Ry each being a relative color density (C, M, Y) of each of charged particles C, M, and Y, (1) the first sub-frame group period is a period for transition from a white (W) or black (K) displaying ground state to a first intermediate transition state I-1 during which the relative color density of the charged particle Y becomes Ry;

(2) the second sub-frame group period is a period for transition from the first intermediate transition state I-1 to a second intermediate state I-2 during which the relative color density becomes Rm; and (3) the third sub-frame group period is a period for transition from the second intermediate state I-2 to a final state NEXT.

Here, in the relative color density Rx (x=c, m, y), the x takes numerals 0 to 1. The Rx=0 represents a state where there are not any X particle (any of charged particles C, M, and Y) on a surface and the state Rx=1 represents a state where all X particles have moved to the surface.

Therefore, the state (C, M, Y)=(0, 0, 0) represents that a white (W) is displayed and the state (C, M, Y)=(1, 1, 1) represents that a black (K) is displayed. Table 1 shows driving voltage data in which each gray level of the CMY three colors is 3. For simplification, a charged amount Q for the charged particles is set to be |Qc|>|Qm|>|Qy|. The condition for the threshold voltage at which a particle starts to move is |Vth(c)|<|Vth(m)|<|Vth(y)|, the reason for which is that, by making a weight and size of each particle be different from one another, mobility for the same applied voltages is set to be the same for the charged particles C, M, and Y.

As shown in Table 1, the driving voltage |V1| is set to be 30V for the first sub-frame group period and 15V for the second sub-frame group period and 10V for the third sub-frame group period (it is not necessary to say that a given voltage of the driving voltage can be set).

Moreover, the time Δt required for each of the charged particles C, M, and Y to move from a rear surface to a display surface, in the case of a threshold voltage or more, is in reverse proportion to an applied voltage V and a relation of V×Δt=constant.

In the Reference example, the time required for a charged particle C to move from a rear to a surface (or from a surface to the rear) to a surface is 0.2 sec when the driving voltage |V|=30V, 0.4 sec when the voltage |V|=15V, and 0.6 sec when the voltage |V|=10V. The time required for a charged particle M to move from a rear to a surface (or from a surface to the rear) is 0.2 sec when the driving voltage |V|=30V, 0.4 sec when the voltage |V|=15V.

The time required for a charged particle Y to move from a rear to a surface (or from a surface to the rear) is 0.2 sec when the driving voltage |V|=30V. By taking these into consideration, in the Reference example, 1 sub-frame period is set to be 100 msec and a screen renewing period is made up of 14 sub-frames (2 sub-frames for a reset voltage applying period, 2 sub-frames for the first sub-frame group period, 4 sub-frames for the second sub-frame group period, and 6 sub-frames for the third sub-frame group period).

Additionally, if a next screen is a still image, when an end terminal 0V applying sub-frame is included, the screen renewing period is made up of 15 sub-frames.

TABLE 1

| Targetted Renewing Screen Display | | | Reset Period: Applied Voltage | | Reset Period: Ground State | | | First Sub-frame Group: Applied Voltage | | First Sub-frame Group: Intermediate TransitionI-1 | | | Second Sub-frame Group: Applied Voltage | | | | Second Sub-frame Group: Intermediate TransitionI-2 | | |
|---|---|---|---|---|---|---|---|---|---|---|---|---|---|---|---|---|---|---|---|
| C | M | Y | Ra | Rb | C | M | Y | 1a | 1b | C | M | Y | 2a | 2b | 2c | 2d | C | M | Y |
| 0 | 0 | 0 | −30 | −30 | 0 | 0 | 0 | 0 | 0 | 0 | 0 | 0 | 0 | 0 | 0 | 0 | 0 | 0 | 0 |
| 0.5 | 0 | 0 | −30 | −30 | 0 | 0 | 0 | 0 | 0 | 0 | 0 | 0 | 0 | 0 | 0 | 0 | 0 | 0 | 0 |
| 1 | 0 | 0 | −30 | −30 | 0 | 0 | 0 | 0 | 0 | 0 | 0 | 0 | 0 | 0 | 0 | 0 | 0 | 0 | 0 |
| 0 | 0.5 | 0 | −30 | −30 | 0 | 0 | 0 | 0 | 0 | 0 | 0 | 0 | 15 | 15 | 0 | 0 | 0.5 | 0.5 | 0 |
| 0.5 | 0.5 | 0 | −30 | −30 | 0 | 0 | 0 | 0 | 0 | 0 | 0 | 0 | 15 | 15 | 0 | 0 | 0.5 | 0.5 | 0 |
| 1 | 0.5 | 0 | −30 | −30 | 0 | 0 | 0 | 0 | 0 | 0 | 0 | 0 | 15 | 15 | 0 | 0 | 0.5 | 0.5 | 0 |
| 0 | 1 | 0 | −30 | −30 | 0 | 0 | 0 | 0 | 0 | 0 | 0 | 0 | 15 | 15 | 15 | 15 | 1 | 1 | 0 |
| 0.5 | 1 | 0 | −30 | −30 | 0 | 0 | 0 | 0 | 0 | 0 | 0 | 0 | 15 | 15 | 15 | 15 | 1 | 1 | 0 |
| 1 | 1 | 0 | −30 | −30 | 0 | 0 | 0 | 0 | 0 | 0 | 0 | 0 | 15 | 15 | 15 | 15 | 1 | 1 | 0 |
| 0 | 0 | 0.5 | −30 | −30 | 0 | 0 | 0 | 30 | 0 | 0.5 | 0.5 | 0.5 | −15 | −15 | 0 | 0 | 0 | 0 | 0.5 |
| 0.5 | 0 | 0.5 | −30 | −30 | 0 | 0 | 0 | 30 | 0 | 0.5 | 0.5 | 0.5 | −15 | −15 | 0 | 0 | 0 | 0 | 0.5 |
| 1 | 0 | 0.5 | −30 | −30 | 0 | 0 | 0 | 30 | 0 | 0.5 | 0.5 | 0.5 | −15 | −15 | 0 | 0 | 0 | 0 | 0.5 |
| 0 | 0.5 | 0.5 | −30 | −30 | 0 | 0 | 0 | 30 | 0 | 0.5 | 0.5 | 0.5 | 0 | 0 | 0 | 0 | 0.5 | 0.5 | 0.5 |
| 0.5 | 0.5 | 0.5 | −30 | −30 | 0 | 0 | 0 | 30 | 0 | 0.5 | 0.5 | 0.5 | 0 | 0 | 0 | 0 | 0.5 | 0.5 | 0.5 |
| 1 | 0.5 | 0.5 | −30 | −30 | 0 | 0 | 0 | 30 | 0 | 0.5 | 0.5 | 0.5 | 0 | 0 | 0 | 0 | 0.5 | 0.5 | 0.5 |
| 0 | 1 | 0.5 | −30 | −30 | 0 | 0 | 0 | 30 | 0 | 0.5 | 0.5 | 0.5 | 15 | 15 | 0 | 0 | 1 | 1 | 0.5 |
| 0.5 | 1 | 0.5 | −30 | −30 | 0 | 0 | 0 | 30 | 0 | 0.5 | 0.5 | 0.5 | 15 | 15 | 0 | 0 | 1 | 1 | 0.5 |
| 1 | 1 | 0.5 | −30 | −30 | 0 | 0 | 0 | 30 | 0 | 0.5 | 0.5 | 0.5 | 15 | 15 | 0 | 0 | 1 | 1 | 0.5 |
| 0 | 0 | 1 | −30 | −30 | 0 | 0 | 0 | 30 | 30 | 1 | 1 | 1 | −15 | −15 | −15 | −15 | 0 | 0 | 1 |
| 0.5 | 0 | 1 | −30 | −30 | 0 | 0 | 0 | 30 | 30 | 1 | 1 | 1 | −15 | −15 | −15 | −15 | 0 | 0 | 1 |
| 1 | 0 | 1 | −30 | −30 | 0 | 0 | 0 | 30 | 30 | 1 | 1 | 1 | −15 | −15 | −15 | −15 | 0 | 0 | 1 |
| 0 | 0.5 | 1 | −30 | −30 | 0 | 0 | 0 | 30 | 30 | 1 | 1 | 1 | −15 | −15 | 0 | 0 | 0.5 | 0.5 | 1 |
| 0.5 | 0.5 | 1 | −30 | −30 | 0 | 0 | 0 | 30 | 30 | 1 | 1 | 1 | −15 | −15 | 0 | 0 | 0.5 | 0.5 | 1 |
| 1 | 0.5 | 1 | −30 | −30 | 0 | 0 | 0 | 30 | 30 | 1 | 1 | 1 | −15 | −15 | 0 | 0 | 0.5 | 0.5 | 1 |
| 0 | 1 | 1 | −30 | −30 | 0 | 0 | 0 | 30 | 30 | 1 | 1 | 1 | 0 | 0 | 0 | 0 | 1 | 1 | 1 |
| 0.5 | 1 | 1 | −30 | −30 | 0 | 0 | 0 | 30 | 30 | 1 | 1 | 1 | 0 | 0 | 0 | 0 | 1 | 1 | 1 |
| 1 | 1 | 1 | −30 | −30 | 0 | 0 | 0 | 30 | 30 | 1 | 1 | 1 | 0 | 0 | 0 | 0 | 1 | 1 | 1 |

| Targetted Renewing Screen Display | | | Third Sub-frame Group: Applied Voltage | | | | | | Third Sub-frame Group: Renewed Screen Display N | | |
|---|---|---|---|---|---|---|---|---|---|---|---|
| C | M | Y | 3a | 3b | 3c | 3d | 3e | 3f | C | M | Y |
| 0 | 0 | 0 | 0 | 0 | 0 | 0 | 0 | 0 | 0 | 0 | 0 |
| 0.5 | 0 | 0 | 10 | 10 | 10 | 0 | 0 | 0 | 0.5 | 0 | 0 |
| 1 | 0 | 0 | 10 | 10 | 10 | 10 | 10 | 10 | 1 | 0 | 0 |
| 0 | 0.5 | 0 | −10 | −10 | −10 | 0 | 0 | 0 | 0 | 0.5 | 0 |
| 0.5 | 0.5 | 0 | 0 | 0 | 0 | 0 | 0 | 0 | 0.5 | 0.5 | 0 |
| 1 | 0.5 | 0 | 10 | 10 | 10 | 0 | 0 | 0 | 1 | 0.5 | 0 |
| 0 | 1 | 0 | −10 | −10 | −10 | −10 | −10 | −10 | 0 | 1 | 0 |
| 0.5 | 1 | 0 | −10 | −10 | −10 | 0 | 0 | 0 | 0.5 | 1 | 0 |
| 1 | 1 | 0 | 0 | 0 | 0 | 0 | 0 | 0 | 1 | 1 | 0 |
| 0 | 0 | 0.5 | 0 | 0 | 0 | 0 | 0 | 0 | 0 | 0 | 0.5 |
| 0.5 | 0 | 0.5 | 10 | 10 | 10 | 0 | 0 | 0 | 0.5 | 0 | 0.5 |
| 1 | 0 | 0.5 | 10 | 10 | 10 | 10 | 10 | 10 | 1 | 0 | 0.5 |
| 0 | 0.5 | 0.5 | −10 | −10 | −10 | 0 | 0 | 0 | 0 | 0.5 | 0.5 |
| 0.5 | 0.5 | 0.5 | 0 | 0 | 0 | 0 | 0 | 0 | 0.5 | 0.5 | 0.5 |
| 1 | 0.5 | 0.5 | 10 | 10 | 10 | 0 | 0 | 0 | 1 | 0.5 | 0.5 |
| 0 | 1 | 0.5 | −10 | −10 | −10 | −10 | −10 | −10 | 0 | 1 | 0.5 |
| 0.5 | 1 | 0.5 | −10 | −10 | −10 | 0 | 0 | 0 | 0.5 | 1 | 0.5 |
| 1 | 1 | 0.5 | 0 | 0 | 0 | 0 | 0 | 0 | 1 | 1 | 0.5 |
| 0 | 0 | 1 | 0 | 0 | 0 | 0 | 0 | 0 | 0 | 0 | 1 |
| 0.5 | 0 | 1 | 10 | 10 | 10 | 0 | 0 | 0 | 0.5 | 0 | 1 |
| 1 | 0 | 1 | 10 | 10 | 10 | 10 | 10 | 10 | 1 | 0 | 1 |
| 0 | 0.5 | 1 | −10 | −10 | −10 | 0 | 0 | 0 | 0 | 0.5 | 1 |
| 0.5 | 0.5 | 1 | 0 | 0 | 0 | 0 | 0 | 0 | 0.5 | 0.5 | 1 |
| 1 | 0.5 | 1 | 10 | 10 | 10 | 0 | 0 | 0 | 1 | 0.5 | 1 |

TABLE 1-continued

| | | | | | | | | | | | |
|---|---|---|---|---|---|---|---|---|---|---|---|
| 0 | 1 | 1 | −10 | −10 | −10 | −10 | −10 | −10 | 0 | 1 | 1 |
| 0.5 | 1 | 1 | −10 | −10 | −10 | 0 | 0 | 0 | 0.5 | 1 | 1 |
| 1 | 1 | 1 | 0 | 0 | 0 | 0 | 0 | 0 | 1 | 1 | 1 |

By referring to Table 1, a specified driving operation (driving method) in the Reference example is described. The first column represents a relative color density (C, M, Y) in a targeted renewal display state. The second column represents voltages applied during a reset period and relative color densities in a ground state after being reset. The reset period is made up of 2 sub-frames Ra and Rb in the driving of the Reference example and an applying voltage that can be taken is −30V.

The third column represents voltages applied during the first sub-frame group period and relative color densities in the first intermediate transition state I-1 after the period. The first sub-frame group period is made up of 2 sub-frames 1$a$ and 1$b$ and an applying voltage that can be taken is +30V and 0V.

The reason for having set to be 2 sub-frames is that the response time of a charged particle at an applying voltage 30V is 0.2 sec and the one sub-frame period is 0.1 sec being equivalent to the time required for a particle to move by about one half between layers at the applying voltage 30V. The fourth column represents voltages applied during the second sub-frame group period and the relative color densities during the second intermediate transition state I-2 after the period.

The second sub-frame group period is made up of 4 sub-frames 2$a$, 2$b$, 2$v$, and 2$d$ and an applying voltage that can be taken is +15V, 0V, −15V. The reason for having set to be 4 sub-frames is that the response time of a charged particle at an applying voltage 15V is 0.4 sec and the one sub-frame period is 0.1 sec being equivalent to the time required for a particle to move by about one fourth between layers at the applying voltage 15V. The fifth column represents voltages applied during the third sub-frame group periods and relative color densities in the final renewing display state NEXT after the period.

The third sub-frame group period is made up of 6 sub-frames 3$a$, 3$b$, 3$c$, 3$d$, 3$f$ and an applying voltage that can be taken is +10V, 0V, −10V. The reason for having set to be 6 sub-frames is that the response time of a particle at 10V is 0.6 sec and 1 sub-frame period is 0.1 sec. During the reset period, by applying V1 (−30V) for 2 frames to move and gather charged particles C, M, Y on a side opposite to a display surface, a white (W) in a ground state is displayed.

Each reset period and sub-frame group period are described first which occur in the transition state of a screen from a previous screen to a final transition state being a renewed screen. During the reset period, a voltage V1 (=−30V) for two frames is applied and the charged particles C, M, Y are moved and gathered on a side opposite to a display surface to display a white (W) in a ground state.

During the first sub-frame group period, in a manner to correspond to the relative color density of the charged particle Y, when the relative color density (Y) is 0, an applying voltage of 0V is applied and when the relative color density (Y) is 0.5, an applying voltage 30V is applied only for 1 sub-frame and when the relative color density (Y) is 1, an applying voltage 30V is applied for 2 sub-frames. By these operations, a change occurs from the ground state W to the first intermediate state (C, M, Y) (=Ry, Ry, and Ry) (Ry is 3 gray levels and Ry=0, 0.5, 1).

During the second sub-frame group period, M-Y being a difference between a charged particle M to be targeted and the relative color density of a charged particle Y is calculated and a voltage −15V or 15V is applied by predetermined numbers of times.

For example, when the relative color density (Y)=0.5 and relative color density (M)=0, a difference in the relative color density (M−Y)=−0.5 and, therefore, the voltage −15V is applied during 2 sub-frames which causes the charged particles M and C to be moved to the display surface and the opposite surface, resulting in lowering of gray levels by one. When the relative color density (Y)=0.5 and the relative color density (M)=0.5, a voltage 0V is applied.

When the relative color density (Y)=0.5 and relative color density (M)=1, in order to raise the gray level by one, a voltage 15V is applied during 2 sub-frames to increase charged particles M and C on the display surface side. By operating as above, a transition occurs from the first intermediate transition state I-1: (C, M, Y)=(Ry, Ry, Ry) to the second intermediate state I-2: (C, M, Y)=(Rm, Rm, Ry) (Rm is 3 gray levels and Rm=0, 0.5, 1).

During the third sub-frame group period, a difference C-M in the relative color density between the charged particle C and charged particle M to be targeted is calculated and −10V or 10V is applied by predetermined numbers of time. For example, when the relative color density (M)=0.5 and the relative color density (C)=0, the difference (C−M) in color density=−0.5 and, therefore, −10V is applied during 3 sub-frames and by moving the charged particle C to the display surface and opposite side to lower the gray level by one.

When the relative color density (M)=0.5 and the relative color density (C)=0.5, 0V is applied. When the relative color density (M)=0.5 and relative color density (C)=1, in order to raise the gray level by one, 10V is applied during 3 sub-frames to increase the charged particles on the display surface.

Thus, a transition occurs from the second intermediate transition state I-2: (C, M, Y)=(Rm, Rm, Ry) to a final display state NEXT: (C, M, Y)=(Rc, Rm, Ry) (Rc is 3 gray levels and Rc=0, 0.5, 1). In FIGS. 3A to 11C, specified driving waveforms based on Table 1 are shown. For example, by referring to the driving waveform in FIG. 12 taken out from FIG. 8B, an intermediate color and gray level display to realize the display state (C, M, Y)=(0.5, 1, 0.5) are explained.

First, to erase a previous display state (current screen) CURRENT, during the reset period, −30V is applied during 2 sub-frames (0.2 sec) for transition to a white displaying ground state W: (C, M, Y)=(0, 0, 0). Next, during the first sub-frame group period, +30V is applied during 1 sub-frame period and 0V is applied during 1 sub-frame period for transition to the first intermediate transition state I-1: (C, M, Y)=(0.5, 0.5, 0.5).

During the next second sub-frame group period, +15V is applied during 2 sub-frame periods and 0V is applied during 2 sub-frame periods for transition to the second intermediate transition state I-2: (C, M, Y)=(1, 1, 0.5). During the third sub-frame group period, −10V is applied during 3 sub-frame periods and 0V is applied during 3 sub-frame periods for a transition to a renewed display state NEXT: (C, M, Y)=(0.5, 1.0, 0.5).

Figure 12:
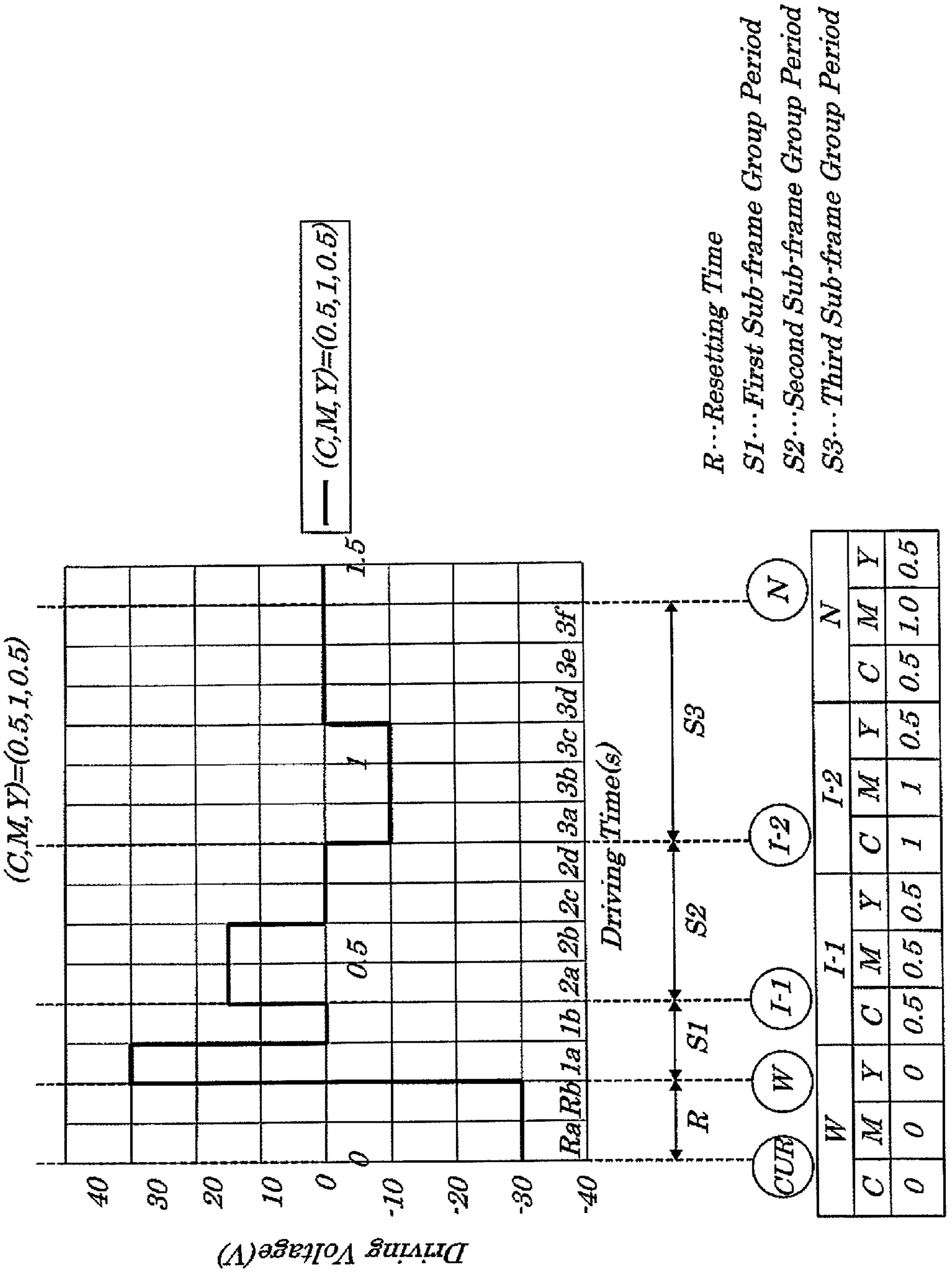
FIG. 12 is a diagram showing a driving waveform and an intermediate transition state at time of screen renewal to be used in the reference example.
Figure 13:
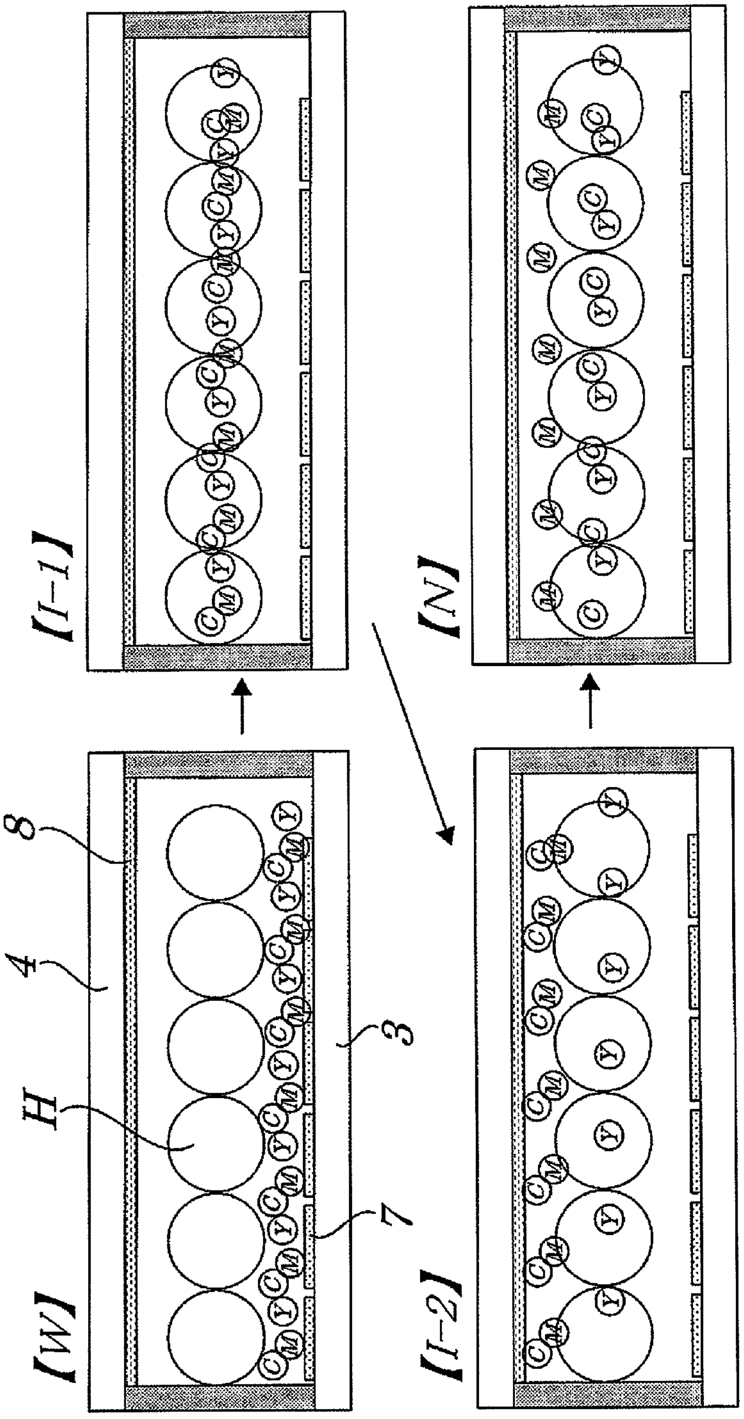
FIG. 13 is a diagram showing a driving waveform and an intermediate transition state at time of screen renewal to be used in the reference example.
Figure 14A:
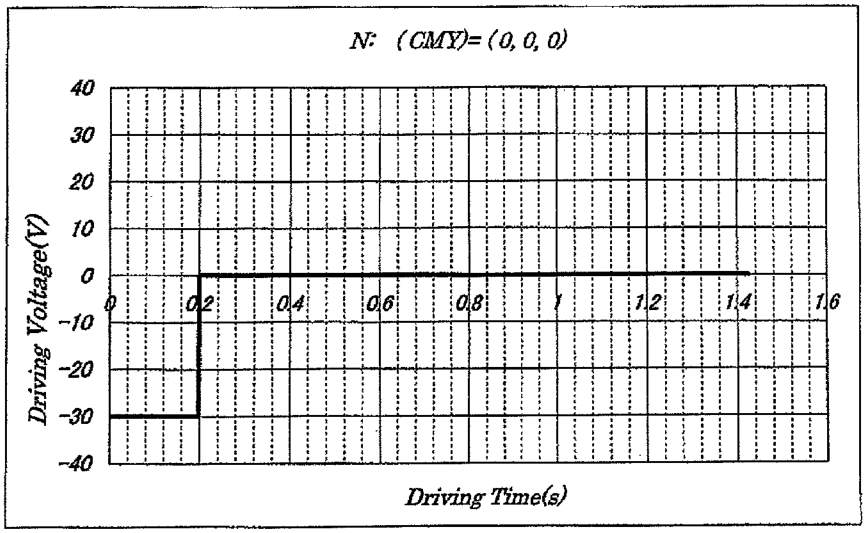
FIGS. 14A, 14B and 14C are diagrams to explain a driving operation according to a first exemplary embodiment of the present invention, and in detail showing a driving voltage waveform to be applied to a display section at time of displaying an intermediate color and gray levels.
Figure 14B:
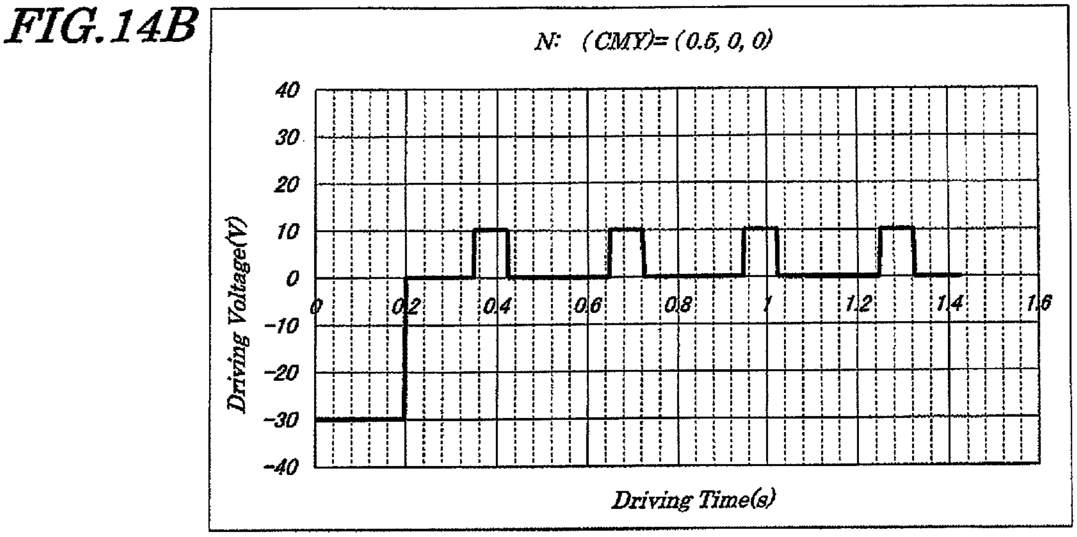
Figure 14C:
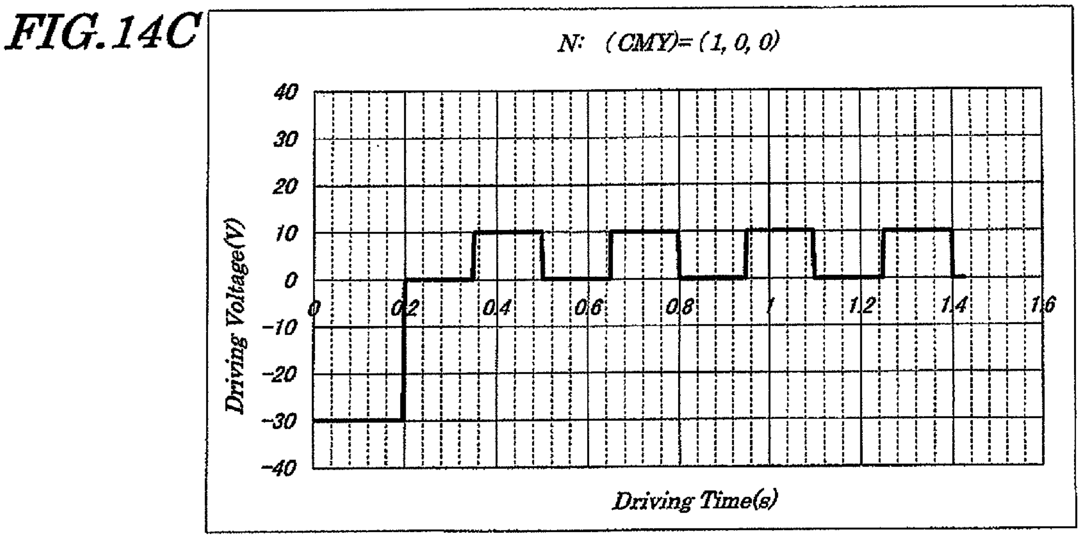
Figure 15A:
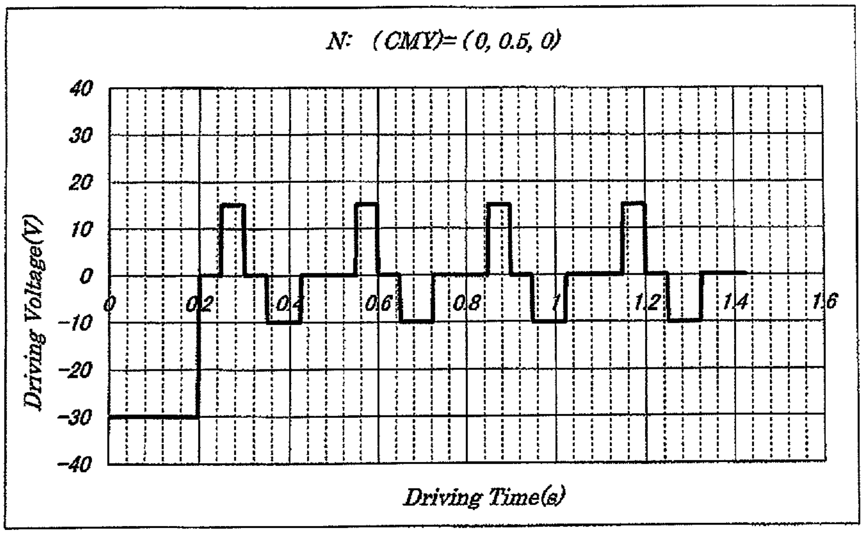
FIGS. 15A, 15B and 15C are diagrams showing a driving voltage waveform to be applied to the display section according to the first exemplary embodiment.
Figure 15B:
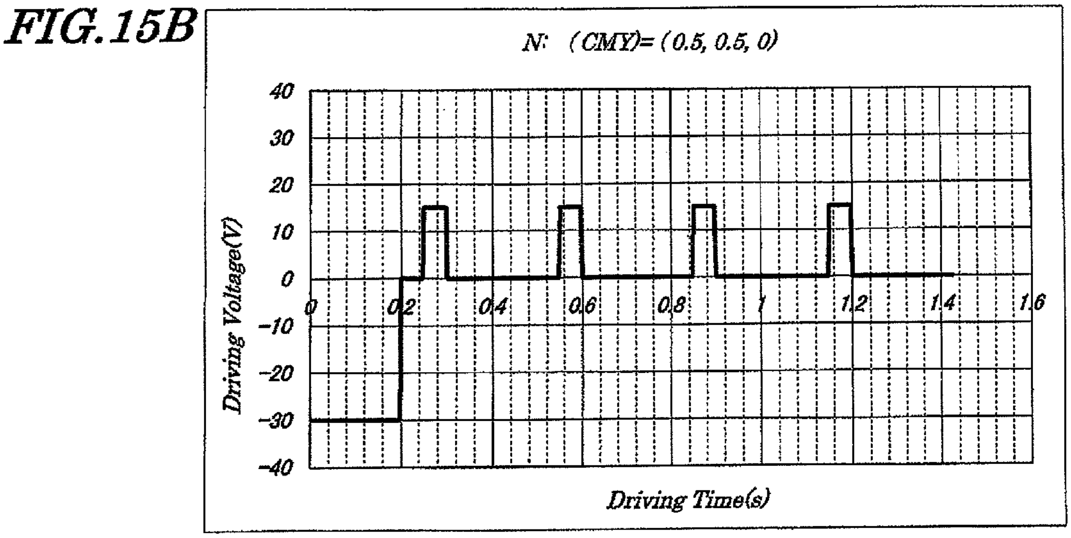
Figure 15C:
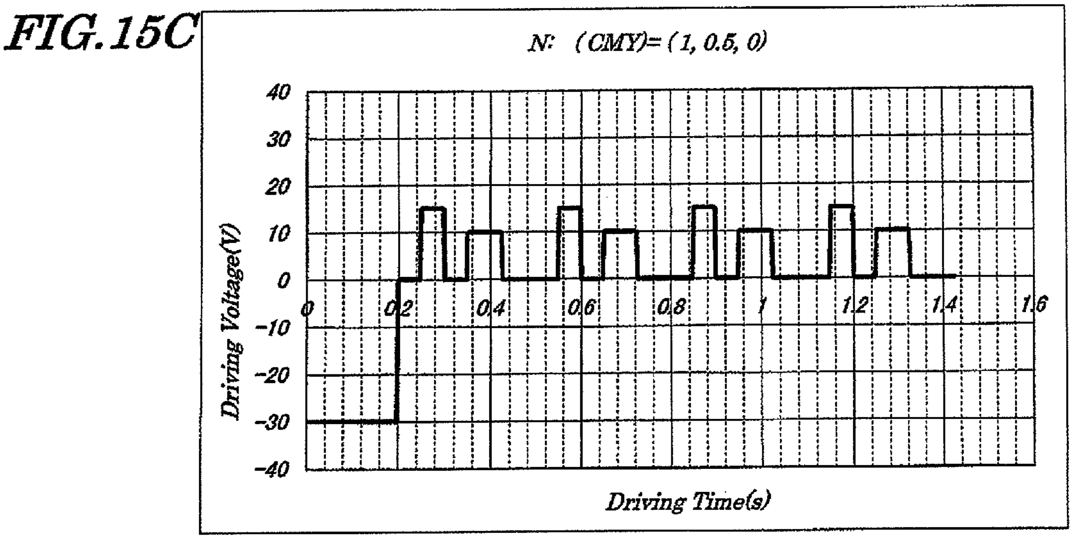
Figure 16A:
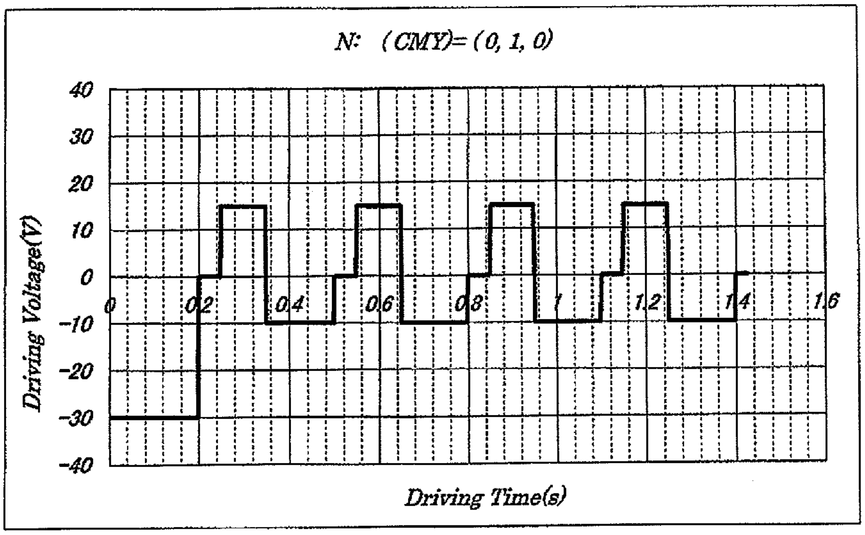
FIGS. 16A, 16B and 16C are diagrams showing a driving voltage waveform to be applied to the display section according to the first exemplary embodiment.
Figure 16B:
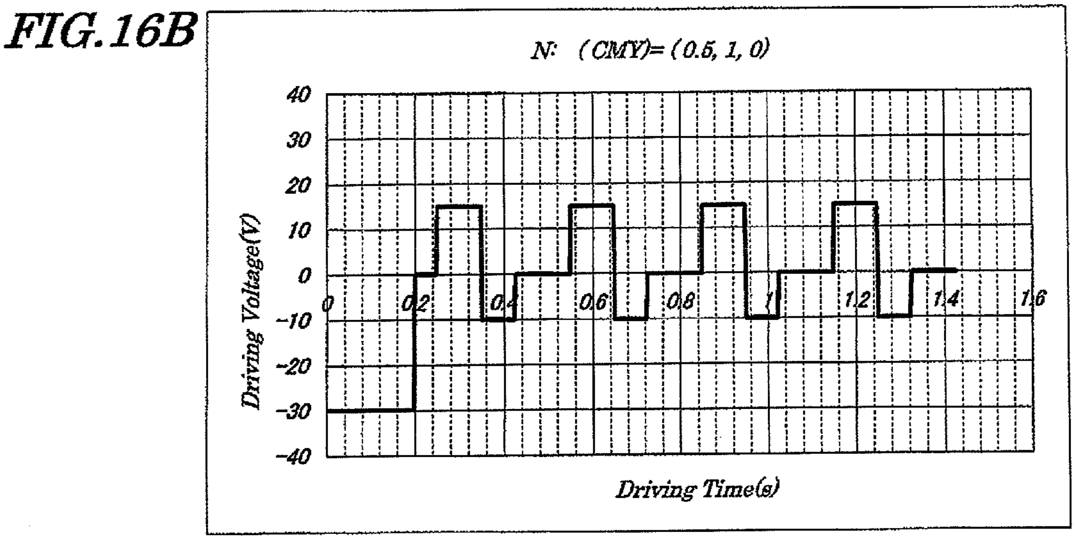
Figure 16C:
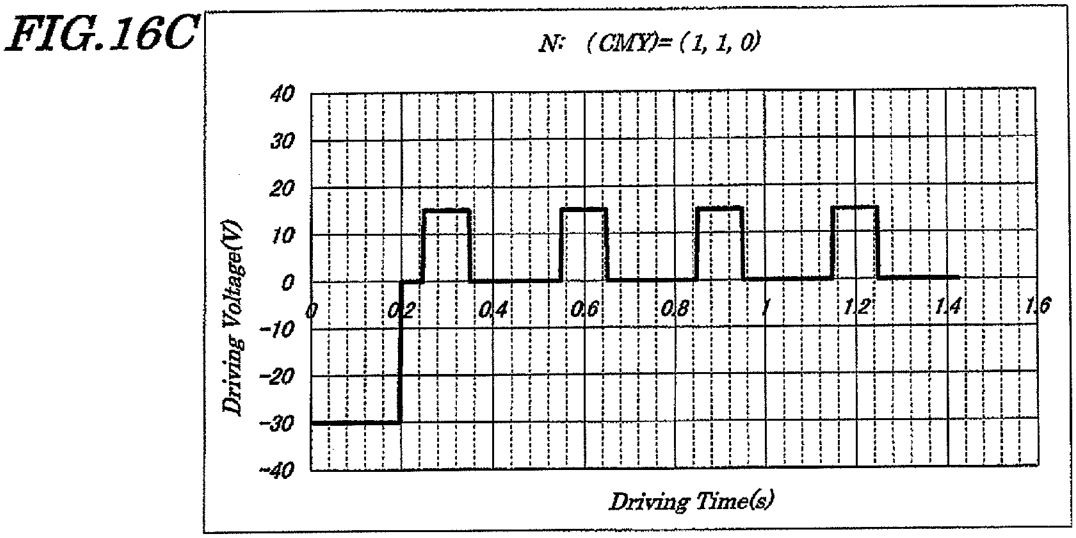
Figure 17A:
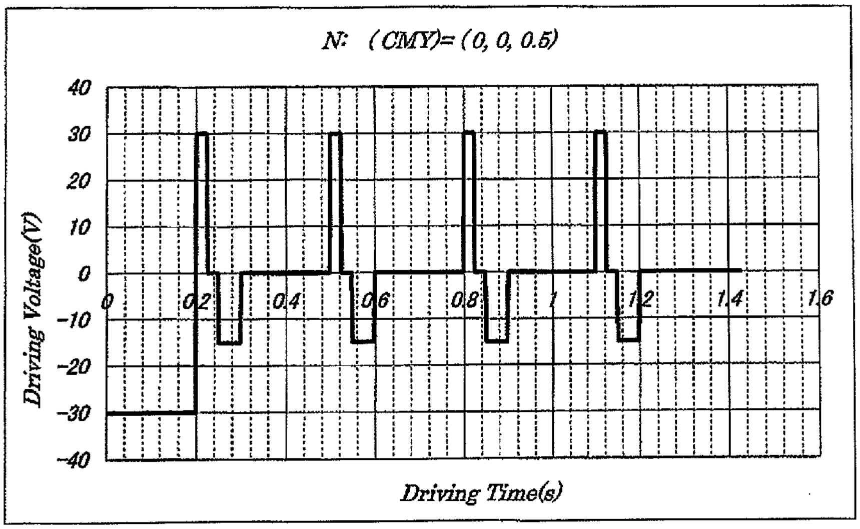
FIGS. 17A, 17B and 17C are diagrams showing a driving voltage waveform to be applied to the display section according to the first exemplary embodiment.
Figure 17B:
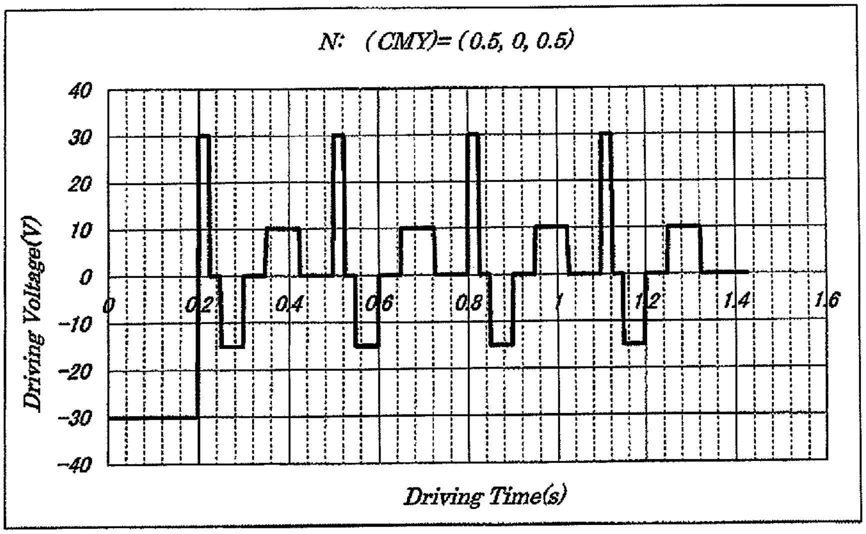
Figure 17C:
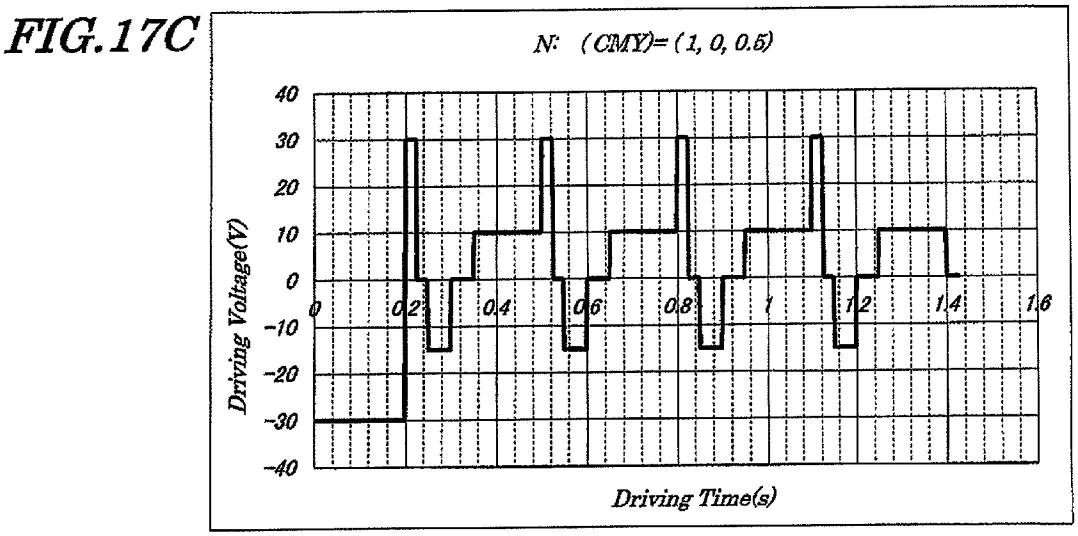
Figure 18A:
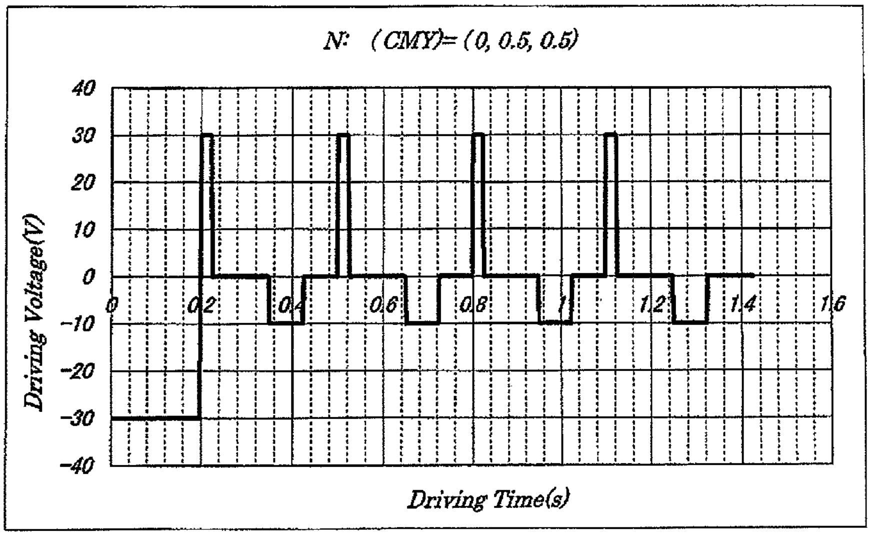
FIGS. 18A, 18B and 18C are diagrams showing a driving voltage waveform to be applied to the display section according to the first exemplary embodiment.
Figure 18B:
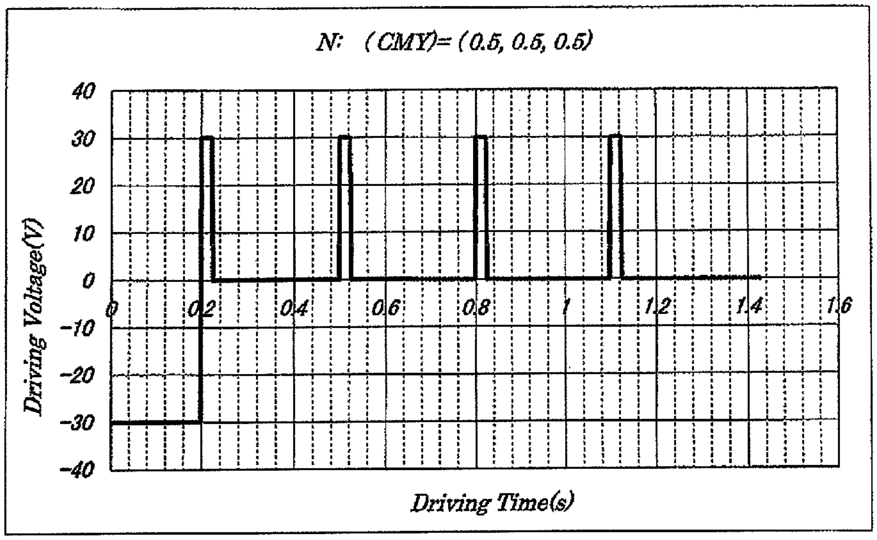
Figure 18C:
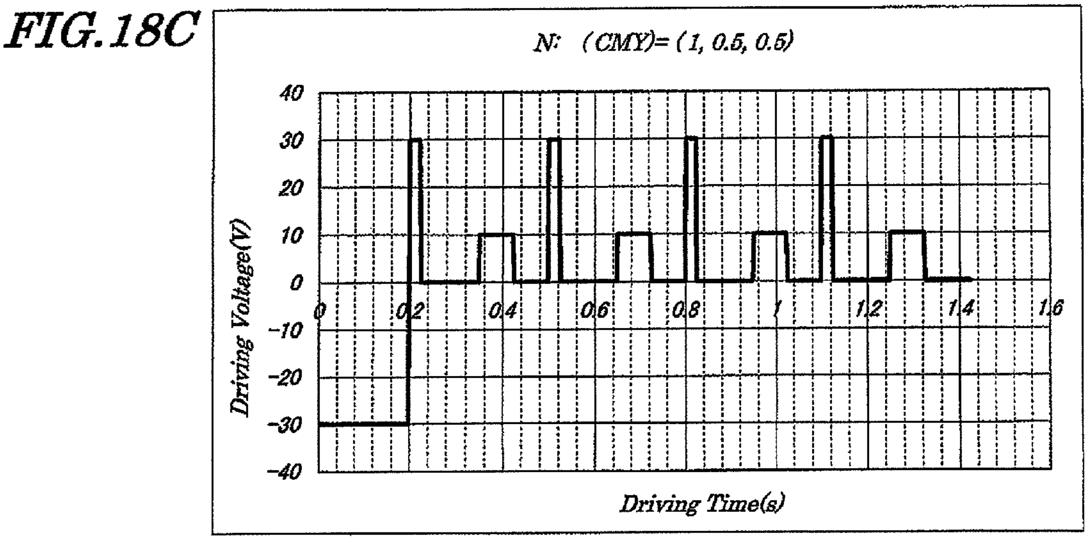
Figure 19A:
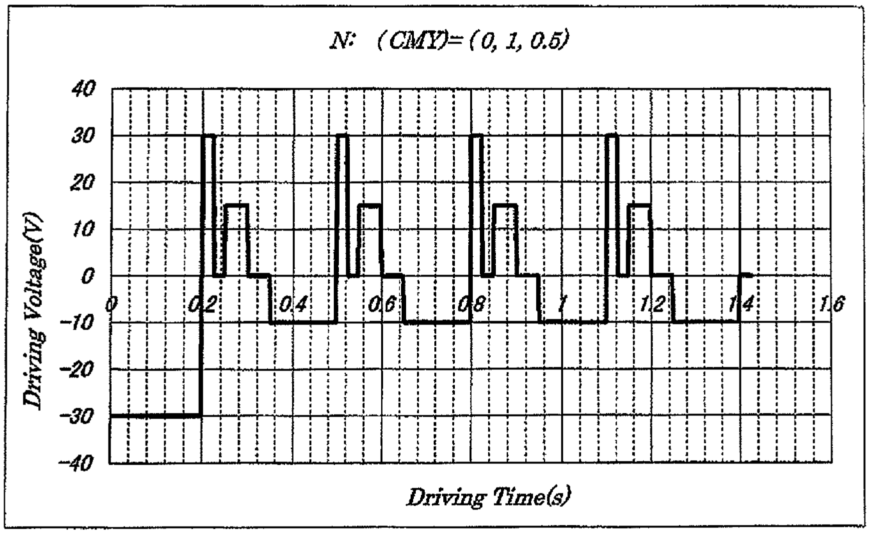
FIGS. 19A, 19B and 19C are diagrams showing a driving voltage waveform to be applied to the display section according to the first exemplary embodiment.
Figure 19B:
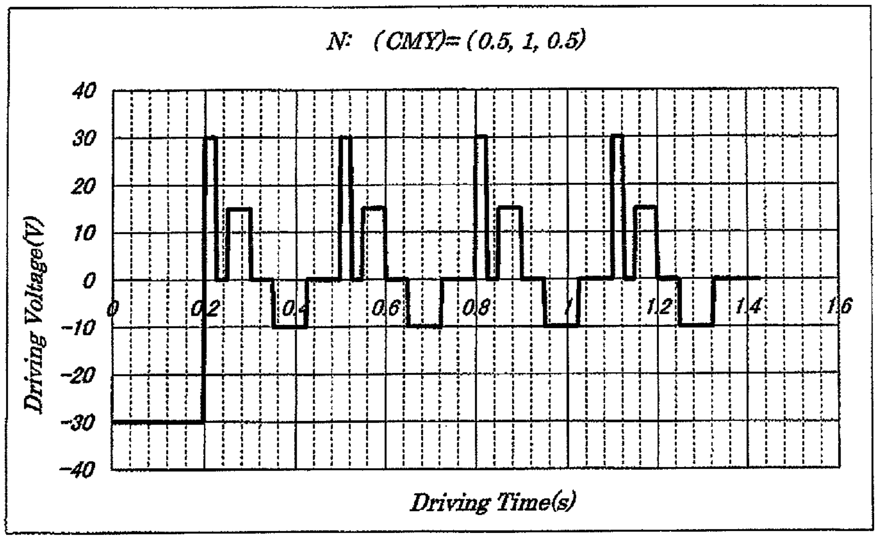
Figure 19C:
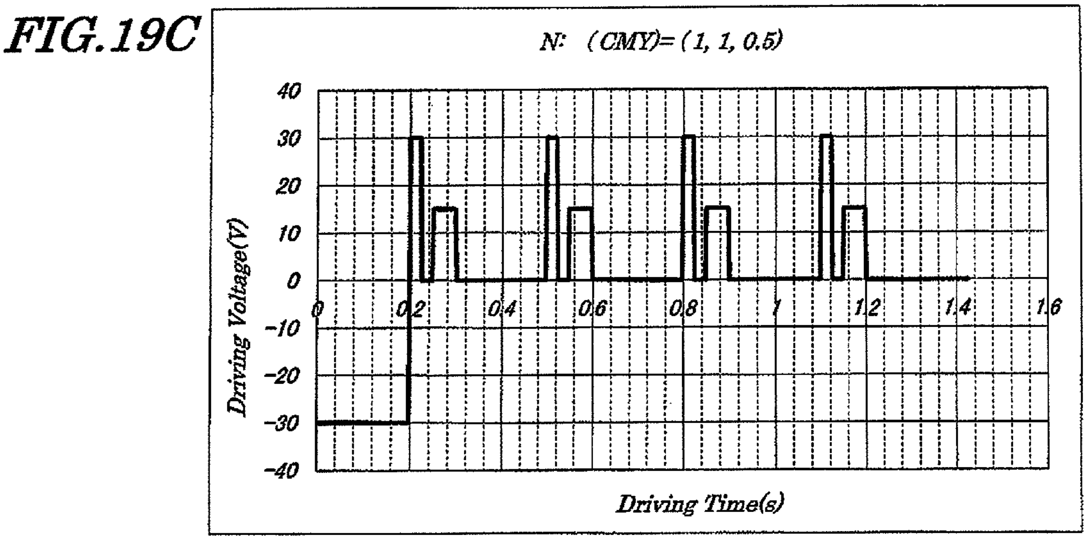

FIG. 13 shows each of the intermediate transition states of charged particles C, M, Y in response to driving waveforms in FIG. 12. After the end of the reset period, the charged particles C, M, Y move together to the glass substrate 3 side and only the white supporting body is seen from the facing substrate 4 side and, thus, a transition to a display state W occurs. During the next first sub-frame group period, the charged particles C, M, Y move from the TFT glass substrate 3 side to an intermediate position between the TFT glass substrate and facing substrate 4 and thus a transition to the first intermediate state I-1.

Then, during the second sub-frame group period, the charged particle Y stays in the intermediate position and the charged particles C and M move to the display surface side and, thus a transition to the second intermediate transition state I-2 occurs. During the third sub-frame group period, the charged particle M stays on the surface and the transition of only the charged particle C to the intermediate position, thus enabling a transition to a specified renewed display state NEXT.

Meanwhile, for example, when a targeted display state is NEXT: (C, M, Y)=(1.0, 1.0, 0.5), the first intermediate transition state I-1: (C, M, Y)=(0.5, 0.5, 0.5) and I-2: (1.0, 1.0, 0.5) and since the (I-2) is the final display state NEXT, the third sub-frame group period can be omitted and the intermediate transition state I-2 is not required.

Moreover, when a targeted display state is NEXT: (C, M, Y)=(0.5, 0.5, 0.5), the first intermediate transition state I-1: (C, M, Y)=(0.5, 0.5, 0.5) and since the first intermediate transition state is a final display state NEXT, the second and third sub-frame group period can be omitted and the intermediate transition states I-1 and I-2 are not required. Additionally, when NEXT: (C, M, Y)=(0, 0, 0), the final display state NEXT can be realized only by the reset period. Therefore, when the ground state or intermediate transition state I-1 or intermediate transition state I-2 coincides with the final display state NEXT, the sub-frame period thereafter may be omitted.

In the above descriptions, the case where the mobility of the charged particles C, M, Y are the same is explained, however, when the mobility is different, even if, during the first intermediate transition state I-1, the relative color density of the charged particle Y is allowed to adjust so as to be (Y)=Ry, the relative color density of the charged C, and M is made to be different from one another.

Moreover, even when, during the second intermediate transition state I-2, the relative color density of the charged particle Y is adjusted so that (Y)=Ry and the relative color density of the charged particle M is controlled so that (M)=Rm, the relative color density of the charged particle Y is made different from Rm. As a result, it can be generalized that the relative color density (C, M, Y) of the first intermediate transition state I-1=(X, X, Ry) (X: arbitrary, X≠Ry) and the relative color density (C, M, Y) during the second intermediate transition state=(X, Rm, Ry) (X: arbitrary, X≠Rm).

In the above descriptions, the time required for the charged particles to move from a rear side to a display surface side differs depending on an applying voltage of the charged particles C, M, Y and when V1=30V, t1 is 0.2 sec and when V2=15V, t2 is 0.4 sec and when V3=10V, t3 is 0.6.

However, when the mobility of the charged particles C, M, Y is the same, if generalized, the sub-frame period t1, t2, and t3 of each sub-frame group period, when an applying voltage of each of the sub-frame group periods is V1, V2, and V3, "Vi·ti" is set to be constant (i=1, 2, 3). When the unit sub-frame time is constant, if the number of sub-frames for each period is "ni", "Vi·ni"=constant (n=1, 2, 3). Moreover, by making the number of sub-frames be constant, the unit sub-frame time for each period may be made different depending on each period.

Moreover, in the above description, the case where a white (W) is displayed in the ground state after being reset is described, however, even when a black (K) is to be displayed in the ground state, the driving waveform can be formed according to the same principle as the white display.

Additionally, in the sub-frame group period during which the relative color density of the CMY under the intermediate transition is made to be "0" or "1", even if an excessive voltage is applied during the sub-frame group period, the relative color density is saturated to be "0" or "1", it is needless to say that an excessive applying voltage may be applied. Also, in the above description, each of the C, M, and Y is at 3 gray level, however, it is also needless to say that, even in the multiple gray levels including 2 or 3 gray levels, the same driving can be realized.

Thus, according to configurations of the Reference example, multiple gray level representation including not only each single color (R, G, B, C, M, Y, W, K) but also intermediate colors can be achieved by a simple configuration. However, the technologies disclosed in the Reference example has problems. That is, changes in luminance or colors in the intermediate transition state are very large and technological problems of preventing the occurrence of a flicker still remain unsolved.

For example, for the transition to the final display state NEXT: (C, M, Y)=(0, 1, 0), a transition is to occur to the first intermediate transition state I-1: (C, M, Y)=(0, 0, 0) and then a transition is to occur to the second intermediate transition state I-2: (C, M, Y)=(1, 1, 0) and finally to the NEXT: (C, M, Y)=(0, 1, 0). That is, in order to display magenta as a final color, the previous screen is once erased and a white (W) is to be displayed during the ground state WK and first intermediate transition state I-1 and then a blue (B) having a relative color density 1 is to be displayed during the second intermediate transition state I-2 and finally the magenta is to be displayed.

Therefore, the technology disclosed in the Reference example cannot overcome a disadvantage of the occurrence of discomfort "flickering" occurring on a screen at the time of renewal caused by large and rapid changes in luminance and color density at the process of screen renewal since, at the time of renewal from a previous screen to a next screen, an intermediate transition occurs where one or two primary colors (relative color density 1) are displayed.

First Exemplary Embodiment

Hereinafter, by referring to drawings, the first exemplary embodiment of the present invention is described in detail. Unless clearly described, configurations of an electronic paper display device of the first exemplary embodiment of the present invention are the same as those described in the Reference example and their descriptions are omitted accordingly, however, if necessary for the explanation of the embodiments, figures and tables are used as references.

Driving Operations

<Case of Repeated Applications of Unit Driving Waveforms>

According to the first exemplary embodiment of the present invention, by increasing sub-frame frequencies and by repeating the application of the driving waveforms (hereinafter, referred to as a unit driving waveform or basic waveform) shown in Table 1, a smooth transition is realized from the ground state WK to the final display state NEXT.

That is, in the embodiment, at time of the renewal of a screen, for example, when a final display state is set to be NEXT: (C, M, Y)=(1, 0, 1), a smooth transition occurs from a ground state (0, 0, 0) to (0, 0, 0)→ . . . →(0.25, 0, 0.25)→ . . . →(0.5, 0, 0.5)→ . . . →(0.75, 0, 0.75)→ . . . →(1, 0, 1).

In Table 2-1 to Table 2-5, specified driving voltage data including five stages are shown which is used in the first exemplary embodiment providing three gray levels for each of three colors CMY. First, Table 2-1 shows driving voltages during a reset period and a ground state WK after the application of voltages.

Table 2-2 shows driving voltages during a first driving voltage applying period and an intermediate transition state I1-3 after the application of voltages. Table 2-3 shows driving voltages during a second driving voltage applying period and an intermediate transition state I2-3 after the application of voltages and Table 2-4 shows driving voltages during a third driving voltage applying period and an intermediate transition state after the application of voltages, Table 2-5 shows driving voltages during a fourth driving voltage applying period and a final display state NEXT after the application of voltages.

The transition to the final display state NEXT is realized by repeating the application of the unit driving waveform four times wherein one sub-period is 25 msec being quadruple four and a unit driving waveform period is made up of 12 sub-frames (two sub-frames for the first sub-frame group period, four sub-frames for the second sub-frame group periods and six sub-frames for the third sub-frame group period). Meanwhile, the period during which the unit driving waveforms are repeated is called a "reset period".

TABLE 2-1

| Reset Previous Screen is not Referred to. | | | | | | | | | | | | | | |
|---|---|---|---|---|---|---|---|---|---|---|---|---|---|---|
| Targetted | | | Reset Period | | | | | | | | | | | |
| Renewing Screen Display | | | Applied Voltage | | | | | | | | Ground State WK | | | |
| C | M | Y | Ra | Rb | Rc | Rd | Re | Rf | Rg | Rh | C | M | Y |
| 0 | 0 | 0 | −30 | −30 | −30 | −30 | −30 | −30 | −30 | −30 | 0 | 0 | 0 |
| 0.5 | 0 | 0 | −30 | −30 | −30 | −30 | −30 | −30 | −30 | −30 | 0 | 0 | 0 |
| 1 | 0 | 0 | −30 | −30 | −30 | −30 | −30 | −30 | −30 | −30 | 0 | 0 | 0 |
| 0 | 0.5 | 0 | −30 | −30 | −30 | −30 | −30 | −30 | −30 | −30 | 0 | 0 | 0 |
| 0.5 | 0.5 | 0 | −30 | −30 | −30 | −30 | −30 | −30 | −30 | −30 | 0 | 0 | 0 |
| 1 | 0.5 | 0 | −30 | −30 | −30 | −30 | −30 | −30 | −30 | −30 | 0 | 0 | 0 |
| 0 | 1 | 0 | −30 | −30 | −30 | −30 | −30 | −30 | −30 | −30 | 0 | 0 | 0 |
| 0.5 | 1 | 0 | −30 | −30 | −30 | −30 | −30 | −30 | −30 | −30 | 0 | 0 | 0 |
| 1 | 1 | 0 | −30 | −30 | −30 | −30 | −30 | −30 | −30 | −30 | 0 | 0 | 0 |
| 0 | 0 | 0.5 | −30 | −30 | −30 | −30 | −30 | −30 | −30 | −30 | 0 | 0 | 0 |
| 0.5 | 0 | 0.5 | −30 | −30 | −30 | −30 | −30 | −30 | −30 | −30 | 0 | 0 | 0 |
| 1 | 0 | 0.5 | −30 | −30 | −30 | −30 | −30 | −30 | −30 | −30 | 0 | 0 | 0 |
| 0 | 0.5 | 0.5 | −30 | −30 | −30 | −30 | −30 | −30 | −30 | −30 | 0 | 0 | 0 |
| 0.5 | 0.5 | 0.5 | −30 | −30 | −30 | −30 | −30 | −30 | −30 | −30 | 0 | 0 | 0 |
| 1 | 0.5 | 0.5 | −30 | −30 | −30 | −30 | −30 | −30 | −30 | −30 | 0 | 0 | 0 |
| 0 | 1 | 0.5 | −30 | −30 | −30 | −30 | −30 | −30 | −30 | −30 | 0 | 0 | 0 |
| 0.5 | 1 | 0.5 | −30 | −30 | −30 | −30 | −30 | −30 | −30 | −30 | 0 | 0 | 0 |
| 1 | 1 | 0.5 | −30 | −30 | −30 | −30 | −30 | −30 | −30 | −30 | 0 | 0 | 0 |
| 0 | 0 | 1 | −30 | −30 | −30 | −30 | −30 | −30 | −30 | −30 | 0 | 0 | 0 |
| 0.5 | 0 | 1 | −30 | −30 | −30 | −30 | −30 | −30 | −30 | −30 | 0 | 0 | 0 |
| 1 | 0 | 1 | −30 | −30 | −30 | −30 | −30 | −30 | −30 | −30 | 0 | 0 | 0 |
| 0 | 0.5 | 1 | −30 | −30 | −30 | −30 | −30 | −30 | −30 | −30 | 0 | 0 | 0 |
| 0.5 | 0.5 | 1 | −30 | −30 | −30 | −30 | −30 | −30 | −30 | −30 | 0 | 0 | 0 |
| 1 | 0.5 | 1 | −30 | −30 | −30 | −30 | −30 | −30 | −30 | −30 | 0 | 0 | 0 |
| 0 | 1 | 1 | −30 | −30 | −30 | −30 | −30 | −30 | −30 | −30 | 0 | 0 | 0 |
| 0.5 | 1 | 1 | −30 | −30 | −30 | −30 | −30 | −30 | −30 | −30 | 0 | 0 | 0 |
| 1 | 1 | 1 | −30 | −30 | −30 | −30 | −30 | −30 | −30 | −30 | 0 | 0 | 0 |

TABLE 2-2

| Driving Wavefrom (First Time) | | | | | | | | | | | | | | |
|---|---|---|---|---|---|---|---|---|---|---|---|---|---|---|
| Ground | | | First Sub-frame Group | | | | | Second Sub-frame Group | | | | | | |
| State WK | | | Applied Voltage | | Intermediate Transition I1-1 | | | Applied Voltage | | | | Intermediate Transition I1-2 | | |
| C | M | Y | W1-1a | W1-1b | C | M | Y | W1-2a | W1-2b | W1-2c | W1-2d | C | M | Y |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 15 | 15 | 0 | 0 | 0.125 | 0.125 | 0 |
| 0 | 0 | 0 | 0 | 0 | 0 | 0 | 0 | 15 | 15 | 0 | 0 | 0.125 | 0.125 | 0 |
| 0 | 0 | 0 | 0 | 0 | 0 | 0 | 0 | 15 | 15 | 0 | 0 | 0.125 | 0.125 | 0 |
| 0 | 0 | 0 | 0 | 0 | 0 | 0 | 0 | 15 | 15 | 15 | 15 | 0.25 | 0.25 | 0 |

TABLE 2-2-continued

| Driving Wavefrom (First Time) | | | | | | | | | | | | | | |
|---|---|---|---|---|---|---|---|---|---|---|---|---|---|---|
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 30 | 0 | 0.125 | 0.125 | 0.125 | −15 | −15 | 0 | 0 | 0 | 0 | 0.125 |
| 0 | 0 | 0 | 30 | 0 | 0.125 | 0.125 | 0.125 | −15 | −15 | 0 | 0 | 0 | 0 | 0.125 |
| 0 | 0 | 0 | 30 | 0 | 0.125 | 0.125 | 0.125 | −15 | −15 | 0 | 0 | 0 | 0 | 0.125 |
| 0 | 0 | 0 | 30 | 0 | 0.125 | 0.125 | 0.125 | 0 | 0 | 0 | 0 | 0.125 | 0.125 | 0.125 |
| 0 | 0 | 0 | 30 | 0 | 0.125 | 0.125 | 0.125 | 0 | 0 | 0 | 0 | 0.125 | 0.125 | 0.125 |
| 0 | 0 | 0 | 30 | 0 | 0.125 | 0.125 | 0.125 | 0 | 0 | 0 | 0 | 0.125 | 0.125 | 0.125 |
| 0 | 0 | 0 | 30 | 0 | 0.125 | 0.125 | 0.125 | 15 | 15 | 0 | 0 | 0.25 | 0.25 | 0.125 |
| 0 | 0 | 0 | 30 | 0 | 0.125 | 0.125 | 0.125 | 15 | 15 | 0 | 0 | 0.25 | 0.25 | 0.125 |
| 0 | 0 | 0 | 30 | 0 | 0.125 | 0.125 | 0.125 | 15 | 15 | 0 | 0 | 0.25 | 0.25 | 0.125 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | 0 | 0 | 0.125 | 0.125 | 0.25 |
| 0 | 0 | 0 | 30 | 30 | 0.25 | 0.25 | 0.25 | −15 | −15 | 0 | 0 | 0.125 | 0.125 | 0.25 |
| 0 | 0 | 0 | 30 | 30 | 0.25 | 0.25 | 0.25 | −15 | −15 | 0 | 0 | 0.125 | 0.125 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |

| Ground State WK | | | Third Sub-frame Group: Applied Voltage | | | | | | Intermediate Transition I1-3 | | |
|---|---|---|---|---|---|---|---|---|---|---|---|
| C | M | Y | W1-3a | W1-3b | W1-3c | W1-3d | W1-3e | W1-3f | C | M | Y |
| 0 | 0 | 0 | 0 | 0 | 0 | 0 | 0 | 0 | 0 | 0 | 0 |
| 0 | 0 | 0 | 10 | 10 | 10 | 0 | 0 | 0 | 0.125 | 0 | 0 |
| 0 | 0 | 0 | 10 | 10 | 10 | 10 | 10 | 10 | 0.25 | 0 | 0 |
| 0 | 0 | 0 | −10 | −10 | −10 | 0 | 0 | 0 | 0 | 0.125 | 0 |
| 0 | 0 | 0 | 0 | 0 | 0 | 0 | 0 | 0 | 0.125 | 0.125 | 0 |
| 0 | 0 | 0 | 10 | 10 | 10 | 0 | 0 | 0 | 0.25 | 0.125 | 0 |
| 0 | 0 | 0 | −10 | −10 | −10 | −10 | −10 | −10 | 0 | 0.25 | 0 |
| 0 | 0 | 0 | −10 | −10 | −10 | 0 | 0 | 0 | 0.125 | 0.25 | 0 |
| 0 | 0 | 0 | 0 | 0 | 0 | 0 | 0 | 0 | 0.25 | 0.25 | 0 |
| 0 | 0 | 0 | 0 | 0 | 0 | 0 | 0 | 0 | 0 | 0 | 0.125 |
| 0 | 0 | 0 | 10 | 10 | 10 | 0 | 0 | 0 | 0.125 | 0 | 0.125 |
| 0 | 0 | 0 | 10 | 10 | 10 | 10 | 10 | 10 | 0.25 | 0 | 0.125 |
| 0 | 0 | 0 | −10 | −10 | −10 | 0 | 0 | 0 | 0 | 0.125 | 0.125 |
| 0 | 0 | 0 | 0 | 0 | 0 | 0 | 0 | 0 | 0.125 | 0.125 | 0.125 |
| 0 | 0 | 0 | 10 | 10 | 10 | 0 | 0 | 0 | 0.25 | 0.125 | 0.125 |
| 0 | 0 | 0 | −10 | −10 | −10 | −10 | −10 | −10 | 0 | 0.25 | 0.125 |
| 0 | 0 | 0 | −10 | −10 | −10 | 0 | 0 | 0 | 0.125 | 0.25 | 0.125 |
| 0 | 0 | 0 | 0 | 0 | 0 | 0 | 0 | 0 | 0.25 | 0.25 | 0.125 |
| 0 | 0 | 0 | 0 | 0 | 0 | 0 | 0 | 0 | 0 | 0 | 0.25 |
| 0 | 0 | 0 | 10 | 10 | 10 | 0 | 0 | 0 | 0.125 | 0 | 0.25 |
| 0 | 0 | 0 | 10 | 10 | 10 | 10 | 10 | 10 | 0.25 | 0 | 0.25 |
| 0 | 0 | 0 | −10 | −10 | −10 | 0 | 0 | 0 | 0 | 0.125 | 0.25 |
| 0 | 0 | 0 | 0 | 0 | 0 | 0 | 0 | 0 | 0.125 | 0.125 | 0.25 |
| 0 | 0 | 0 | 10 | 10 | 10 | 0 | 0 | 0 | 0.25 | 0.125 | 0.25 |
| 0 | 0 | 0 | −10 | −10 | −10 | −10 | −10 | −10 | 0 | 0.25 | 0.25 |
| 0 | 0 | 0 | −10 | −10 | −10 | 0 | 0 | 0 | 0.125 | 0.25 | 0.25 |
| 0 | 0 | 0 | 0 | 0 | 0 | 0 | 0 | 0 | 0.25 | 0.25 | 0.25 |

TABLE 2-3

| Driving Wavefrom (Second Time) | | | | | | | | | | | | | | |
|---|---|---|---|---|---|---|---|---|---|---|---|---|---|---|
| | | | First Sub-frame Group | | | | | Second Sub-frame Group | | | | | | |
| Intermediate Transition I1-3 | | | Applied Voltage | | Intermediate Transition I2-1 | | | Applied Voltage | | | | Intermediate Transition I2-2 | | |
| C | M | Y | W2-1a | W2-1b | C | M | Y | W2-2a | W2-2b | W2-2c | W2-2d | C | M | Y |
| 0 | 0 | 0 | 0 | 0 | 0 | 0 | 0 | 0 | 0 | 0 | 0 | 0 | 0 | 0 |
| 0.125 | 0 | 0 | 0 | 0 | 0.125 | 0 | 0 | 0 | 0 | 0 | 0 | 0.125 | 0 | 0 |
| 0.25 | 0 | 0 | 0 | 0 | 0.25 | 0 | 0 | 0 | 0 | 0 | 0 | 0.25 | 0 | 0 |
| 0 | 0.125 | 0 | 0 | 0 | 0 | 0.125 | 0 | 15 | 15 | 0 | 0 | 0.125 | 0.25 | 0 |
| 0.125 | 0.125 | 0 | 0 | 0 | 0.125 | 0.125 | 0 | 15 | 15 | 0 | 0 | 0.25 | 0.25 | 0 |
| 0.25 | 0.125 | 0 | 0 | 0 | 0.25 | 0.125 | 0 | 15 | 15 | 0 | 0 | 0.375 | 0.25 | 0 |
| 0 | 0.25 | 0 | 0 | 0 | 0 | 0.25 | 0 | 15 | 15 | 15 | 15 | 0.25 | 0.5 | 0 |
| 0.125 | 0.25 | 0 | 0 | 0 | 0.125 | 0.25 | 0 | 15 | 15 | 15 | 15 | 0.375 | 0.5 | 0 |

TABLE 2-3-continued

Driving Wavefrom (Second Time)

| | | | | | | | | | | | | | | |
|---|---|---|---|---|---|---|---|---|---|---|---|---|---|---|
| 0.25 | 0.25 | 0 | 0 | 0 | 0.25 | 0.25 | 0 | 15 | 15 | 15 | 15 | 0.5 | 0.5 | 0 |
| 0 | 0 | 0.125 | 30 | 0 | 0.125 | 0.125 | 0.25 | −15 | −15 | 0 | 0 | 0 | 0 | 0.25 |
| 0.125 | 0 | 0.125 | 30 | 0 | 0.25 | 0.125 | 0.25 | −15 | −15 | 0 | 0 | 0.125 | 0 | 0.25 |
| 0.25 | 0 | 0.125 | 30 | 0 | 0.375 | 0.125 | 0.25 | −15 | −15 | 0 | 0 | 0.25 | 0 | 0.25 |
| 0 | 0.125 | 0.125 | 30 | 0 | 0.125 | 0.25 | 0.25 | 0 | 0 | 0 | 0 | 0.125 | 0.25 | 0.25 |
| 0.125 | 0.125 | 0.125 | 30 | 0 | 0.25 | 0.25 | 0.25 | 0 | 0 | 0 | 0 | 0.25 | 0.25 | 0.25 |
| 0.25 | 0.125 | 0.125 | 30 | 0 | 0.375 | 0.25 | 0.25 | 0 | 0 | 0 | 0 | 0.375 | 0.25 | 0.25 |
| 0 | 0.25 | 0.125 | 30 | 0 | 0.125 | 0.375 | 0.25 | 15 | 15 | 0 | 0 | 0.25 | 0.5 | 0.25 |
| 0.125 | 0.25 | 0.125 | 30 | 0 | 0.25 | 0.375 | 0.25 | 15 | 15 | 0 | 0 | 0.375 | 0.5 | 0.25 |
| 0.25 | 0.25 | 0.125 | 30 | 0 | 0.375 | 0.375 | 0.25 | 15 | 15 | 0 | 0 | 0.5 | 0.5 | 0.25 |
| 0 | 0 | 0.25 | 30 | 30 | 0.25 | 0.25 | 0.5 | −15 | −15 | −15 | −15 | 0 | 0 | 0.5 |
| 0.125 | 0 | 0.25 | 30 | 30 | 0.375 | 0.25 | 0.5 | −15 | −15 | −15 | −15 | 0.125 | 0 | 0.5 |
| 0.25 | 0 | 0.25 | 30 | 30 | 0.5 | 0.25 | 0.5 | −15 | −15 | −15 | −15 | 0.25 | 0 | 0.5 |
| 0 | 0.125 | 0.25 | 30 | 30 | 0.25 | 0.375 | 0.5 | −15 | −15 | 0 | 0 | 0.125 | 0.25 | 0.5 |
| 0.125 | 0.125 | 0.25 | 30 | 30 | 0.375 | 0.375 | 0.5 | −15 | −15 | 0 | 0 | 0.25 | 0.25 | 0.5 |
| 0.25 | 0.125 | 0.25 | 30 | 30 | 0.5 | 0.375 | 0.5 | −15 | −15 | 0 | 0 | 0.375 | 0.25 | 0.5 |
| 0 | 0.25 | 0.25 | 30 | 30 | 0.25 | 0.5 | 0.5 | 0 | 0 | 0 | 0 | 0.25 | 0.5 | 0.5 |
| 0.125 | 0.25 | 0.25 | 30 | 30 | 0.375 | 0.5 | 0.5 | 0 | 0 | 0 | 0 | 0.375 | 0.5 | 0.5 |
| 0.25 | 0.25 | 0.25 | 30 | 30 | 0.5 | 0.5 | 0.5 | 0 | 0 | 0 | 0 | 0.5 | 0.5 | 0.5 |

| Third Sub-frame Group | | | | | | | | | | | |
|---|---|---|---|---|---|---|---|---|---|---|---|
| Intermediate Transition I1-3 | | | Applied Voltage | | | | | | Intermediate Transition I2-3 | | |
| C | M | Y | W2-3a | W2-3b | W2-3c | W2-3d | W2-3e | W2-3f | C | M | Y |
| 0 | 0 | 0 | 0 | 0 | 0 | 0 | 0 | 0 | 0 | 0 | 0 |
| 0.125 | 0 | 0 | 10 | 10 | 10 | 0 | 0 | 0 | 0.25 | 0 | 0 |
| 0.25 | 0 | 0 | 10 | 10 | 10 | 10 | 10 | 10 | 0.5 | 0 | 0 |
| 0 | 0.125 | 0 | −10 | −10 | −10 | 0 | 0 | 0 | 0 | 0.25 | 0 |
| 0.125 | 0.125 | 0 | 0 | 0 | 0 | 0 | 0 | 0 | 0.25 | 0.25 | 0 |
| 0.25 | 0.125 | 0 | 10 | 10 | 10 | 0 | 0 | 0 | 0.5 | 0.25 | 0 |
| 0 | 0.25 | 0 | −10 | −10 | −10 | −10 | −10 | −10 | 0 | 0.5 | 0 |
| 0.125 | 0.25 | 0 | −10 | −10 | −10 | 0 | 0 | 0 | 0.25 | 0.5 | 0 |
| 0.25 | 0.25 | 0 | 0 | 0 | 0 | 0 | 0 | 0 | 0.5 | 0.5 | 0 |
| 0 | 0 | 0.125 | 0 | 0 | 0 | 0 | 0 | 0 | 0 | 0 | 0.25 |
| 0.125 | 0 | 0.125 | 10 | 10 | 10 | 0 | 0 | 0 | 0.25 | 0 | 0.25 |
| 0.25 | 0 | 0.125 | 10 | 10 | 10 | 10 | 10 | 10 | 0.5 | 0 | 0.25 |
| 0 | 0.125 | 0.125 | −10 | −10 | −10 | 0 | 0 | 0 | 0 | 0.25 | 0.25 |
| 0.125 | 0.125 | 0.125 | 0 | 0 | 0 | 0 | 0 | 0 | 0.25 | 0.25 | 0.25 |
| 0.25 | 0.125 | 0.125 | 10 | 10 | 10 | 0 | 0 | 0 | 0.5 | 0.25 | 0.25 |
| 0 | 0.25 | 0.125 | −10 | −10 | −10 | −10 | −10 | −10 | 0 | 0.5 | 0.25 |
| 0.125 | 0.25 | 0.125 | −10 | −10 | −10 | 0 | 0 | 0 | 0.25 | 0.5 | 0.25 |
| 0.25 | 0.25 | 0.125 | 0 | 0 | 0 | 0 | 0 | 0 | 0.5 | 0.5 | 0.25 |
| 0 | 0 | 0.25 | 0 | 0 | 0 | 0 | 0 | 0 | 0 | 0 | 0.5 |
| 0.125 | 0 | 0.25 | 10 | 10 | 10 | 0 | 0 | 0 | 0.25 | 0 | 0.5 |
| 0.25 | 0 | 0.25 | 10 | 10 | 10 | 10 | 10 | 10 | 0.5 | 0 | 0.5 |
| 0 | 0.125 | 0.25 | −10 | −10 | −10 | 0 | 0 | 0 | 0 | 0.25 | 0.5 |
| 0.125 | 0.125 | 0.25 | 0 | 0 | 0 | 0 | 0 | 0 | 0.25 | 0.25 | 0.5 |
| 0.25 | 0.125 | 0.25 | 10 | 10 | 10 | 0 | 0 | 0 | 0.5 | 0.25 | 0.5 |
| 0 | 0.25 | 0.25 | −10 | −10 | −10 | −10 | −10 | −10 | 0 | 0.5 | 0.5 |
| 0.125 | 0.25 | 0.25 | −10 | −10 | −10 | 0 | 0 | 0 | 0.25 | 0.5 | 0.5 |
| 0.25 | 0.25 | 0.25 | 0 | 0 | 0 | 0 | 0 | 0 | 0.5 | 0.5 | 0.5 |

TABLE 2-4

Driving Wavefrom (Third Time)

| | | | First Sub-frame Group | | | | | Second Sub-frame Group | | | | | | |
|---|---|---|---|---|---|---|---|---|---|---|---|---|---|---|
| Intermediate Transition I2-3 | | | Applied Voltage | | Intermediate Transition I3-1 | | | Applied Voltage | | | | Intermediate Transition I3-2 | | |
| C | M | Y | W3-1a | W3-1b | C | M | Y | W3-2a | W3-2b | W3-2c | W3-2d | C | M | Y |
| 0 | 0 | 0 | 0 | 0 | 0 | 0 | 0 | 0 | 0 | 0 | 0 | 0 | 0 | 0 |
| 0.25 | 0 | 0 | 0 | 0 | 0.25 | 0 | 0 | 0 | 0 | 0 | 0 | 0.25 | 0 | 0 |
| 0.5 | 0 | 0 | 0 | 0 | 0.5 | 0 | 0 | 0 | 0 | 0 | 0 | 0.5 | 0 | 0 |
| 0 | 0.25 | 0 | 0 | 0 | 0 | 0.25 | 0 | 15 | 15 | 0 | 0 | 0.125 | 0.375 | 0 |
| 0.25 | 0.25 | 0 | 0 | 0 | 0.25 | 0.25 | 0 | 15 | 15 | 0 | 0 | 0.375 | 0.375 | 0 |
| 0.5 | 0.25 | 0 | 0 | 0 | 0.5 | 0.25 | 0 | 15 | 15 | 0 | 0 | 0.625 | 0.375 | 0 |
| 0 | 0.5 | 0 | 0 | 0 | 0 | 0.5 | 0 | 15 | 15 | 15 | 15 | 0.25 | 0.75 | 0 |
| 0.25 | 0.5 | 0 | 0 | 0 | 0.25 | 0.5 | 0 | 15 | 15 | 15 | 15 | 0.5 | 0.75 | 0 |
| 0.5 | 0.5 | 0 | 0 | 0 | 0.5 | 0.5 | 0 | 15 | 15 | 15 | 15 | 0.75 | 0.75 | 0 |

TABLE 2-4-continued

Driving Wavefrom (Third Time)

| | | | | | | | | | | | | | | |
|---|---|---|---|---|---|---|---|---|---|---|---|---|---|---|
| 0 | 0 | 0.25 | 30 | 0 | 0.125 | 0.125 | 0.375 | −15 | −15 | 0 | 0 | 0 | 0 | 0.375 |
| 0.25 | 0 | 0.25 | 30 | 0 | 0.375 | 0.125 | 0.375 | −15 | −15 | 0 | 0 | 0.25 | 0 | 0.375 |
| 0.5 | 0 | 0.25 | 30 | 0 | 0.625 | 0.125 | 0.375 | −15 | −15 | 0 | 0 | 0.5 | 0 | 0.375 |
| 0 | 0.25 | 0.25 | 30 | 0 | 0.125 | 0.375 | 0.375 | 0 | 0 | 0 | 0 | 0.125 | 0.375 | 0.375 |
| 0.25 | 0.25 | 0.25 | 30 | 0 | 0.375 | 0.375 | 0.375 | 0 | 0 | 0 | 0 | 0.375 | 0.375 | 0.375 |
| 0.5 | 0.25 | 0.25 | 30 | 0 | 0.625 | 0.375 | 0.375 | 0 | 0 | 0 | 0 | 0.625 | 0.375 | 0.375 |
| 0 | 0.5 | 0.25 | 30 | 0 | 0.125 | 0.625 | 0.375 | 15 | 15 | 0 | 0 | 0.25 | 0.75 | 0.375 |
| 0.25 | 0.5 | 0.25 | 30 | 0 | 0.375 | 0.625 | 0.375 | 15 | 15 | 0 | 0 | 0.5 | 0.75 | 0.375 |
| 0.5 | 0.5 | 0.25 | 30 | 0 | 0.625 | 0.625 | 0.375 | 15 | 15 | 0 | 0 | 0.75 | 0.75 | 0.375 |
| 0 | 0 | 0.5 | 30 | 30 | 0.25 | 0.25 | 0.75 | −15 | −15 | −15 | −15 | 0 | 0 | 0.75 |
| 0.25 | 0 | 0.5 | 30 | 30 | 0.5 | 0.25 | 0.75 | −15 | −15 | −15 | −15 | 0.25 | 0 | 0.75 |
| 0.5 | 0 | 0.5 | 30 | 30 | 0.75 | 0.25 | 0.75 | −15 | −15 | −15 | −15 | 0.5 | 0 | 0.75 |
| 0 | 0.25 | 0.5 | 30 | 30 | 0.25 | 0.5 | 0.75 | −15 | −15 | 0 | 0 | 0.125 | 0.375 | 0.75 |
| 0.25 | 0.25 | 0.5 | 30 | 30 | 0.5 | 0.5 | 0.75 | −15 | −15 | 0 | 0 | 0.375 | 0.375 | 0.75 |
| 0.5 | 0.25 | 0.5 | 30 | 30 | 0.75 | 0.5 | 0.75 | −15 | −15 | 0 | 0 | 0.625 | 0.375 | 0.75 |
| 0 | 0.5 | 0.5 | 30 | 30 | 0.25 | 0.75 | 0.75 | 0 | 0 | 0 | 0 | 0.25 | 0.75 | 0.75 |
| 0.25 | 0.5 | 0.5 | 30 | 30 | 0.5 | 0.75 | 0.75 | 0 | 0 | 0 | 0 | 0.5 | 0.75 | 0.75 |
| 0.5 | 0.5 | 0.5 | 30 | 30 | 0.75 | 0.75 | 0.75 | 0 | 0 | 0 | 0 | 0.75 | 0.75 | 0.75 |

| | | | Third Sub-frame Group | | | | | | | | |
|---|---|---|---|---|---|---|---|---|---|---|---|
| Intermediate Transition I2-3 | | | Applied Voltage | | | | | | Intermediate Transition I3-3 | | |
| C | M | Y | W3-3a | W3-3b | W3-3c | W3-3d | W3-3e | W3-3f | C | M | Y |
| 0 | 0 | 0 | 0 | 0 | 0 | 0 | 0 | 0 | 0 | 0 | 0 |
| 0.25 | 0 | 0 | 10 | 10 | 10 | 0 | 0 | 0 | 0.375 | 0 | 0 |
| 0.5 | 0 | 0 | 10 | 10 | 10 | 10 | 10 | 10 | 0.75 | 0 | 0 |
| 0 | 0.25 | 0 | −10 | −10 | −10 | 0 | 0 | 0 | 0 | 0.375 | 0 |
| 0.25 | 0.25 | 0 | 0 | 0 | 0 | 0 | 0 | 0 | 0.375 | 0.375 | 0 |
| 0.5 | 0.25 | 0 | 10 | 10 | 10 | 0 | 0 | 0 | 0.75 | 0.375 | 0 |
| 0 | 0.5 | 0 | −10 | −10 | −10 | −10 | −10 | −10 | 0 | 0.75 | 0 |
| 0.25 | 0.5 | 0 | −10 | −10 | −10 | 0 | 0 | 0 | 0.375 | 0.75 | 0 |
| 0.5 | 0.5 | 0 | 0 | 0 | 0 | 0 | 0 | 0 | 0.75 | 0.75 | 0 |
| 0 | 0 | 0.25 | 0 | 0 | 0 | 0 | 0 | 0 | 0 | 0 | 0.375 |
| 0.25 | 0 | 0.25 | 10 | 10 | 10 | 0 | 0 | 0 | 0.375 | 0 | 0.375 |
| 0.5 | 0 | 0.25 | 10 | 10 | 10 | 10 | 10 | 10 | 0.75 | 0 | 0.375 |
| 0 | 0.25 | 0.25 | −10 | −10 | −10 | 0 | 0 | 0 | 0 | 0.375 | 0.375 |
| 0.25 | 0.25 | 0.25 | 0 | 0 | 0 | 0 | 0 | 0 | 0.375 | 0.375 | 0.375 |
| 0.5 | 0.25 | 0.25 | 10 | 10 | 10 | 0 | 0 | 0 | 0.75 | 0.375 | 0.375 |
| 0 | 0.5 | 0.25 | −10 | −10 | −10 | −10 | −10 | −10 | 0 | 0.75 | 0.375 |
| 0.25 | 0.5 | 0.25 | −10 | −10 | −10 | 0 | 0 | 0 | 0.375 | 0.75 | 0.375 |
| 0.5 | 0.5 | 0.25 | 0 | 0 | 0 | 0 | 0 | 0 | 0.75 | 0.75 | 0.375 |
| 0 | 0 | 0.5 | 0 | 0 | 0 | 0 | 0 | 0 | 0 | 0 | 0.75 |
| 0.25 | 0 | 0.5 | 10 | 10 | 10 | 0 | 0 | 0 | 0.375 | 0 | 0.75 |
| 0.5 | 0 | 0.5 | 10 | 10 | 10 | 10 | 10 | 10 | 0.75 | 0 | 0.75 |
| 0 | 0.25 | 0.5 | −10 | −10 | −10 | 0 | 0 | 0 | 0 | 0.375 | 0.75 |
| 0.25 | 0.25 | 0.5 | 0 | 0 | 0 | 0 | 0 | 0 | 0.375 | 0.375 | 0.75 |
| 0.5 | 0.25 | 0.5 | 10 | 10 | 10 | 0 | 0 | 0 | 0.75 | 0.375 | 0.75 |
| 0 | 0.5 | 0.5 | −10 | −10 | −10 | −10 | −10 | −10 | 0 | 0.75 | 0.75 |
| 0.25 | 0.5 | 0.5 | −10 | −10 | −10 | 0 | 0 | 0 | 0.375 | 0.75 | 0.75 |
| 0.5 | 0.5 | 0.5 | 0 | 0 | 0 | 0 | 0 | 0 | 0.75 | 0.75 | 0.75 |

TABLE 2-5

Driving Wavefrom (Fourth Time)

| | | | First Sub-frame Group | | | | | Second Sub-frame Group | | | | | | |
|---|---|---|---|---|---|---|---|---|---|---|---|---|---|---|
| Intermediate Transition I3-3 | | | Applied Voltage | | Intermediate Transition I4-1 | | | Applied Voltage | | | | Intermediate Transition I4-2 | | |
| C | M | Y | W4-1a | W4-1b | C | M | Y | W4-2a | W4-2b | W4-2c | W4-2d | C | M | Y |
| 0 | 0 | 0 | 0 | 0 | 0 | 0 | 0 | 0 | 0 | 0 | 0 | 0 | 0 | 0 |
| 0.375 | 0 | 0 | 0 | 0 | 0.375 | 0 | 0 | 0 | 0 | 0 | 0 | 0.375 | 0 | 0 |
| 0.75 | 0 | 0 | 0 | 0 | 0.75 | 0 | 0 | 0 | 0 | 0 | 0 | 0.75 | 0 | 0 |
| 0 | 0.375 | 0 | 0 | 0 | 0 | 0.375 | 0 | 15 | 15 | 0 | 0 | 0.125 | 0.5 | 0 |
| 0.375 | 0.375 | 0 | 0 | 0 | 0.375 | 0.375 | 0 | 15 | 15 | 0 | 0 | 0.5 | 0.5 | 0 |
| 0.75 | 0.375 | 0 | 0 | 0 | 0.75 | 0.375 | 0 | 15 | 15 | 0 | 0 | 0.875 | 0.5 | 0 |
| 0 | 0.75 | 0 | 0 | 0 | 0 | 0.75 | 0 | 15 | 15 | 15 | 15 | 0.25 | 1 | 0 |
| 0.375 | 0.75 | 0 | 0 | 0 | 0.375 | 0.75 | 0 | 15 | 15 | 15 | 15 | 0.625 | 1 | 0 |
| 0.75 | 0.75 | 0 | 0 | 0 | 0.75 | 0.75 | 0 | 15 | 15 | 15 | 15 | 1 | 1 | 0 |
| 0 | 0 | 0.375 | 30 | 0 | 0.125 | 0.125 | 0.5 | −15 | −15 | 0 | 0 | 0 | 0 | 0.5 |

TABLE 2-5-continued

| Driving Wavefrom (Fourth Time) | | | | | | | | | | | | | | |
|---|---|---|---|---|---|---|---|---|---|---|---|---|---|---|
| 0.375 | 0 | 0.375 | 30 | 0 | 0.5 | 0.125 | 0.5 | −15 | −15 | 0 | 0 | 0.375 | 0 | 0.5 |
| 0.75 | 0 | 0.375 | 30 | 0 | 0.875 | 0.125 | 0.5 | −15 | −15 | 0 | 0 | 0.75 | 0 | 0.5 |
| 0 | 0.375 | 0.375 | 30 | 0 | 0.125 | 0.5 | 0.5 | 0 | 0 | 0 | 0 | 0.125 | 0.5 | 0.5 |
| 0.375 | 0.375 | 0.375 | 30 | 0 | 0.5 | 0.5 | 0.5 | 0 | 0 | 0 | 0 | 0.5 | 0.5 | 0.5 |
| 0.75 | 0.375 | 0.375 | 30 | 0 | 0.875 | 0.5 | 0.5 | 0 | 0 | 0 | 0 | 0.875 | 0.5 | 0.5 |
| 0 | 0.75 | 0.375 | 30 | 0 | 0.125 | 0.875 | 0.5 | 15 | 15 | 0 | 0 | 0.25 | 1 | 0.5 |
| 0.375 | 0.75 | 0.375 | 30 | 0 | 0.5 | 0.875 | 0.5 | 15 | 15 | 0 | 0 | 0.625 | 1 | 0.5 |
| 0.75 | 0.75 | 0.375 | 30 | 0 | 0.875 | 0.875 | 0.5 | 15 | 15 | 0 | 0 | 1 | 1 | 0.5 |
| 0 | 0 | 0.75 | 30 | 30 | 0.25 | 0.25 | 1 | −15 | −15 | −15 | −15 | 0 | 0 | 1 |
| 0.375 | 0 | 0.75 | 30 | 30 | 0.625 | 0.25 | 1 | −15 | −15 | −15 | −15 | 0.375 | 0 | 1 |
| 0.75 | 0 | 0.75 | 30 | 30 | 1 | 0.25 | 1 | −15 | −15 | −15 | −15 | 0.75 | 0 | 1 |
| 0 | 0.375 | 0.75 | 30 | 30 | 0.25 | 0.625 | 1 | −15 | −15 | 0 | 0 | 0.125 | 0.5 | 1 |
| 0.375 | 0.375 | 0.75 | 30 | 30 | 0.625 | 0.625 | 1 | −15 | −15 | 0 | 0 | 0.5 | 0.5 | 1 |
| 0.75 | 0.375 | 0.75 | 30 | 30 | 1 | 0.625 | 1 | −15 | −15 | 0 | 0 | 0.875 | 0.5 | 1 |
| 0 | 0.75 | 0.75 | 30 | 30 | 0.25 | 1 | 1 | 0 | 0 | 0 | 0 | 0.25 | 1 | 1 |
| 0.375 | 0.75 | 0.75 | 30 | 30 | 0.625 | 1 | 1 | 0 | 0 | 0 | 0 | 0.625 | 1 | 1 |
| 0.75 | 0.75 | 0.75 | 30 | 30 | 1 | 1 | 1 | 0 | 0 | 0 | 0 | 1 | 1 | 1 |

| | | | Third Sub-frame Group | | | | | | | | |
|---|---|---|---|---|---|---|---|---|---|---|---|
| Intermediate Transition I3-3 | | | Applied Voltage | | | | | | Intermediate Transition I4-3 | | |
| C | M | Y | W4-3a | W4-3b | W4-3c | W4-3d | W4-3e | W4-3f | C | M | Y |
| 0 | 0 | 0 | 0 | 0 | 0 | 0 | 0 | 0 | 0 | 0 | 0 |
| 0.375 | 0 | 0 | 10 | 10 | 10 | 0 | 0 | 0 | 0.5 | 0 | 0 |
| 0.75 | 0 | 0 | 10 | 10 | 10 | 10 | 10 | 10 | 1 | 0 | 0 |
| 0 | 0.375 | 0 | −10 | −10 | −10 | 0 | 0 | 0 | 0 | 0.5 | 0 |
| 0.375 | 0.375 | 0 | 0 | 0 | 0 | 0 | 0 | 0 | 0.5 | 0.5 | 0 |
| 0.75 | 0.375 | 0 | 10 | 10 | 10 | 0 | 0 | 0 | 1 | 0.5 | 0 |
| 0 | 0.75 | 0 | −10 | −10 | −10 | −10 | −10 | −10 | 0 | 1 | 0 |
| 0.375 | 0.75 | 0 | −10 | −10 | −10 | 0 | 0 | 0 | 0.5 | 1 | 0 |
| 0.75 | 0.75 | 0 | 0 | 0 | 0 | 0 | 0 | 0 | 1 | 1 | 0 |
| 0 | 0 | 0.375 | 0 | 0 | 0 | 0 | 0 | 0 | 0 | 0 | 0.5 |
| 0.375 | 0 | 0.375 | 10 | 10 | 10 | 0 | 0 | 0 | 0.5 | 0 | 0.5 |
| 0.75 | 0 | 0.375 | 10 | 10 | 10 | 10 | 10 | 10 | 1 | 0 | 0.5 |
| 0 | 0.375 | 0.375 | −10 | −10 | −10 | 0 | 0 | 0 | 0 | 0.5 | 0.5 |
| 0.375 | 0.375 | 0.375 | 0 | 0 | 0 | 0 | 0 | 0 | 0.5 | 0.5 | 0.5 |
| 0.75 | 0.375 | 0.375 | 10 | 10 | 10 | 0 | 0 | 0 | 1 | 0.5 | 0.5 |
| 0 | 0.75 | 0.375 | −10 | −10 | −10 | −10 | −10 | −10 | 0 | 1 | 0.5 |
| 0.375 | 0.75 | 0.375 | −10 | −10 | −10 | 0 | 0 | 0 | 0.5 | 1 | 0.5 |
| 0.75 | 0.75 | 0.375 | 0 | 0 | 0 | 0 | 0 | 0 | 1 | 1 | 0.5 |
| 0 | 0 | 0.75 | 0 | 0 | 0 | 0 | 0 | 0 | 0 | 0 | 1 |
| 0.375 | 0 | 0.75 | 10 | 10 | 10 | 0 | 0 | 0 | 0.5 | 0 | 1 |
| 0.75 | 0 | 0.75 | 10 | 10 | 10 | 10 | 10 | 10 | 1 | 0 | 1 |
| 0 | 0.375 | 0.75 | −10 | −10 | −10 | 0 | 0 | 0 | 0 | 0.5 | 1 |
| 0.375 | 0.375 | 0.75 | 0 | 0 | 0 | 0 | 0 | 0 | 0.5 | 0.5 | 1 |
| 0.75 | 0.375 | 0.75 | 10 | 10 | 10 | 0 | 0 | 0 | 1 | 0.5 | 1 |
| 0 | 0.75 | 0.75 | −10 | −10 | −10 | −10 | −10 | −10 | 0 | 1 | 1 |
| 0.375 | 0.75 | 0.75 | −10 | −10 | −10 | 0 | 0 | 0 | 0.5 | 1 | 1 |
| 0.75 | 0.75 | 0.75 | 0 | 0 | 0 | 0 | 0 | 0 | 1 | 1 | 1 |

By referring to Tables 2-1 and 2-5, specified driving operations (driving method) of the embodiment are described below. In Table 2-1, the first column represents relative color density (C, M, Y) in the targeted renewal display state. The second column represents an applying voltage in a reset period and the relative color density in a ground state after the application of the reset period. The reset period is made up of, in the driving of the present embodiment, eight sub-frames Ra to Rh and an applying voltage that can be taken is −30V.

In Table 2-2, the first column represents the intermediate transition state after the application of voltages during the reset period and the second column represents a first application for a unit driving waveform, which is made up of 12 sub-frames. An applying voltage to be applied during each of the sub-frame periods and intermediate transition states I1-1, I1-2, and I1-3 are represented.

The unit driving waveform corresponds to the first voltage applying period for applying V1, 0, and −V1[V] to the second voltage applying period for applying V2, 0, and −V2[V], and to the third voltage applying period for applying V3, 0, −V3 [V]. The first sub-frame group period is made up of two sub-frames W1-1*a* and W1-1*b* and the applying voltage that can be taken is +30V and 0V. The second sub-frame group period is made up of four sub-frames 2*a*, 2*b*, 2*c*, and 2*d* and an applying voltage that can be taken is +15V, 0V, and −15V. The third sub-frame group period is made up of 6 sub-frames 3*a*, 3*b*, 3*c*, 3*d*, 3*e*, and 3*f* and an applying voltage that can be taken is +10V, 0V, and −10V.

Similarly, Table 2-3 represents an applying voltage and an intermediate transition state for each sub-frame during the period of second application of the unit driving waveform and Table 2-4 represents an applying voltage and an intermediate transition state for each sub-frame during the period of the third application of the unit driving waveform and Table 2-5 represents an applying voltage and an intermediate transition for each sub-frame during the period of fourth application of the unit driving waveform.

Figure 20A:
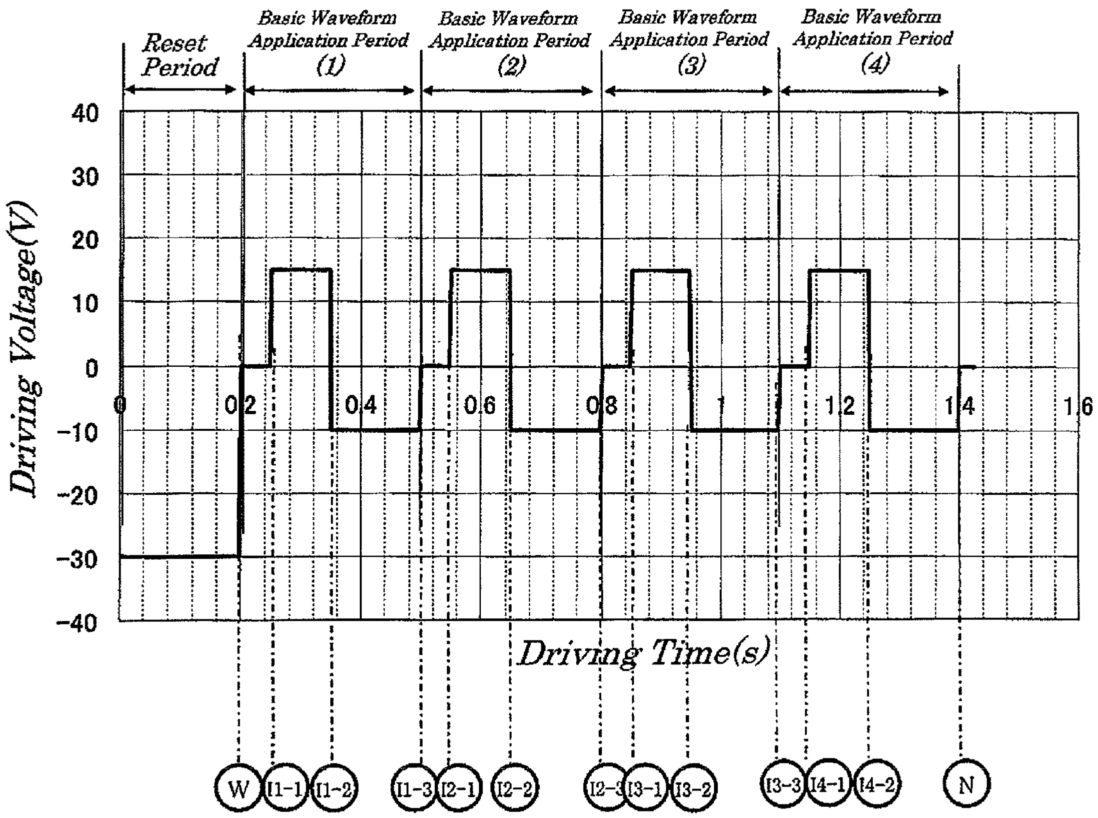
FIG. 20A is a diagram showing a driving waveform and FIG. 20B is a diagram showing an intermediate transition state at time of screen renewal in the first exemplary embodiment.
Figure 20B:
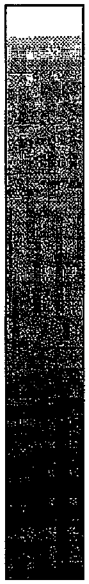

In FIGS. 14A to 19C, specified voltage driving waveforms based on Table 2-1 to Table 2-5 are described. For example, FIGS. 20A 20B are a diagram and a table showing an applying waveform extracted from FIG. 16A, which is used for transition to the final transition state NEXT: (C, M, Y)=(0, 1, 0). By describing the display state in the intermediate transition for each period in the waveform, changes in luminance and color in the intermediate transition of the relative color density.

Figure 21:
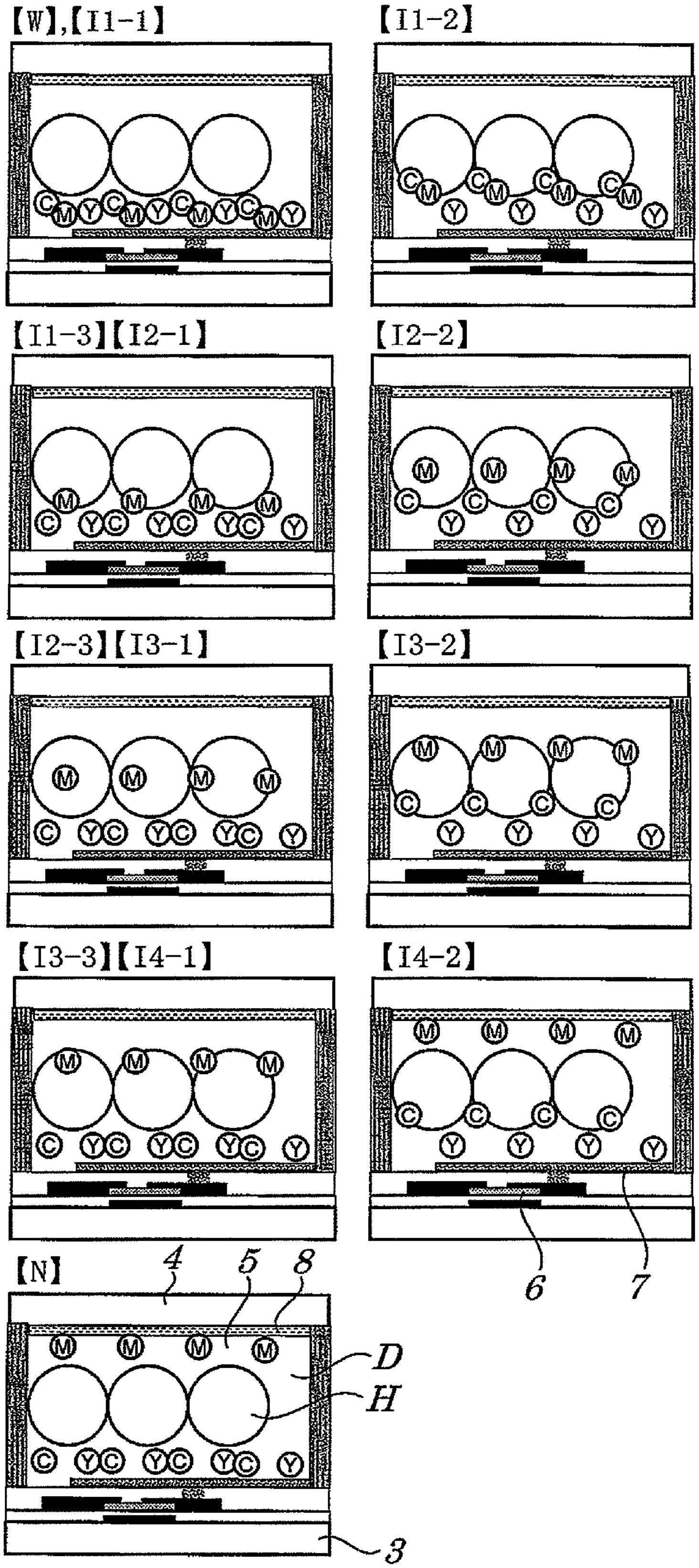
FIG. 21 is a diagram showing an intermediate transition state representing a behavior of an electrophoretic particle at time of screen renewal in the first exemplary embodiment.

The state of the charged particles C, M, Y in the display state of the intermediate transition for each period is shown in FIG. 21. Here, for simplification of explanation, it is presumed that the relative color density linearly increases or decreases depending on an applied period before the charged particles C, M, Y reach a facing substrate or TFT substrate surface side and when having reached the facing substrate or TFT substrate surface side, the relative color density is saturated. First, during the reset period, a transition occurs from a previous screen state to the reset state W: (C, M, Y)=(0, 0, 0). At this point of time, each of the charged particles C, M, Y has already moved to the TFT substrate side.

Next, by referring to FIGS. 20A and 20B (Table 2-2) and FIG. 21, operations during the first voltage applying period for the unit driving waveform. Since no voltage is applied in the reset state: W: (C, M, Y)=(0, 0, 0) and during the first sub-frame group period, the display I1-1: (0, 0, 0) remains unchanged. Next, during the second sub-frame group period, 15V is applied during the 4 sub-frames, that is, for 100 msec.

It is presumed that the time required for each particle to move from the TFT substrate to the facing substrate is 0.4 sec at 15V and, therefore, when 15V is applied for 100 msec, the C and M particles move by ¼ distance. As a result, a transition occurs to the display I1-2 (0.25, 0.25, 0). Next, during the third sub-frame period, −10V is applied during 6 sub-frames, that is, for 150 msec. This causes the C particle having once moved to be again returned to the TFT substrate. Therefore, a transition occurs to the display state I1-3: (0, 0.25, 0).

Next, operations during the period of second application of the unit driving waveform are described. Since no voltage is applied in the display state I1-3: (C, M, Y)=(0, 0.25, 0) and during the first sub-frame group period, the display state I2-1: (0, 0.25, 0) remains unchanged. Next, during the second sub-frame group period, 15V is applied for 4 sub-frames, that is, for 100 msec.

It is presumed that the time required for each particle to move from the TFT substrate to the facing substrate is 0.4 sec at 15V and, therefore, when 15V is applied for 100 msec, C and H particles move by ¼ distance. The M particle has already moved by ¼ of the distance between the TFT and facing substrate during the first period of the application of the unit driving waveform and, further, moves only by ¼ and then moves to the center of the distance between the TFT and facing substrate. Meanwhile, since the C particle has been returned to the TFT substrate side after the period of first application of the unit driving waveform and, therefore, moves by only ¼ the distance between the TFT and facing substrate by the present voltage application.

As a result, a transition occurs to the display state I2-2: (0.25, 0.5, 0). Next, during the third sub-frame group period, −10V is applied for 6 sub-frames, that is, for 150 msec. This causes the C particle having once moved to be returned again to the TFT substrate side. This causes a transition to occur to the display state I2-3: (0, 0.5, 0).

The same operations are repeated in the fourth application of the unit driving waveform and, after the third application of the unit driving waveform and a transition occurs to the display state I3-2: (0, 0.25, 0) and then a transition occurs to be final display state NEXT: (0, 1, 0) after the fourth application of the unit driving waveform.

As described above, according to the driving operation of the embodiment, the previous screen is reset to be in the white displaying ground state after the end of the period of the first application of the unit driving waveform, a transition occurs to the intermediate transition state (C, M, Y)=(0, 0.25, 0) and, after the end of the period of second application of the driving waveform and, then, another transition occurs to the display state (C, M, Y)=(0, 0.5, 0) and after the end of the period of the third application of the driving waveform, a transition occurs to the display state (C, M, Y)=(0, 0.75, 0) and, after the end of the period of the fourth application of the driving waveform, a transition occurs to the final display state NEXT: (C, M, Y)=(0, 1, 0).

Then, within a period of the application of each driving waveform, the charged particle is a C particle and changes in C density is controlled within ΔC=±0.25. Therefore, in the transition from a previous screen to a renewed screen, the previous screen is reset to be in a white state and, after some changes in luminance and/or color, a white color becomes gradually a magenta color and a transition to a final targeted display state of a magenta. By the above driving method, discomfort "flicking" during the screen renewing process is controlled to realize a predetermined intermediate color and gray level displaying.

According to the embodiment, as described above, the applications of the unit driving waveforms are repeated four times, however, by further increasing the sub-frame frequency and by repeating the application of the unit driving waveform four times or more, changes in color in the intermediate transition (for example, ΔC, ΔM, ΔY) can be made smaller thereby controlling the "flickering". Moreover, after the period of the application of each unit driving waveform, by applying 0V for several frames, hues of (0, 0.25, 0), (0, 0.5, 0), and (0, 0.75, 0) . . . can emphasize an intermediate transition state being near to the final display state and, as a result, the flickering in the screen can be reduced.

Moreover, according to the first exemplary embodiment, the application of the unit driving waveform is repeated during the first sub-frame group periods, however, in the targeted renewal display state, the sub-frame group period not required may be omitted and only the first to third sub-frame groups during which the application is not required may be repeated.

Moreover, in the sub-frame group periods during which the relative color density of each of the CMY in the intermediate transition, unless the excessive application of the voltage during the sub-frame group period causes the relative color density to be saturated to be "0" or "1", the voltage may be applied excessively. Even if the period for the application of 0V may be reduced to shorten the driving time. Similarly, by making the number of sub-frame periods be constant, the unit sub-frame time in each period can be made different one another for each period.

In the above description, the case where a white (W) is displayed in a ground state after being reset is described, however, even when a black (K) is to be displayed in the ground state, a driving waveform can be formed by the same thinking way. In every final display state, by selecting a ground state to display a white or black so that the intermediate transition state I-1 or I-2 coincides with the final display state NEXT, it is made possible to shorten the driving time. Moreover, in the above descriptions, each of the C, M, Y is able to display 3 gray levels, however, it is needless to say that multiple gray levels including two or three or more gray levels allow the driving of the embodiment.

In the above description, the driving method can be applied to three kinds of particles C, M, and Y, however, the driving method can be applied to K, G, B three colors instead of CMY three colors and also to CMYK four colors or CMYRGB six colors.

Creation of Lookup Table

Next, a method for creation and conversion of a lookup table (Look Up Table, LUT) to realize the driving waveforms shown in FIGS. 14A to 19C is described. As understood by Table 1, during the reset periods (Ra to Rh), irrespective of a targeted renewal display state (C, M, Y), a specified voltage is applied. Thereafter, the application of the driving waveform used as a base waveform is repeated four times. Therefore, by using the LUT, as shown in Table 3, by preparing the LUT group R_WF ((a) in Table 3) for the reset period, LUT group B_WF ((b) in Table 3) for a unit driving waveform and by selecting a predetermined LUT out of the LUT groups of R_WF, B_WF for every sub-frame, a desired driving waveform can be expressed.

That is, the application of a same voltage during the reset period is repeated for 8 sub-frames and, therefore, it is enough to prepare one R_WF being a LUT on a m-th row and first column and the unit driving waveform repeated four times is made up 12 sub frames, thus it is also enough to prepare the LUT on the m-th row and first column for 12 sub-frames. The LUT for 12 sub-frames for the unit driving waveform is used as the LUT group B_WFn (n=1 to 12) for the unit driving waveform.

Moreover, the "n" represents the n-th LUT defining an applying voltage during the n-th sub-frame period out of the unit driving waveform applying periods. An index representing the row number "m" is given as a binary number and high-order 2 bits are Y gray level where m [4:5]=[00], [01], [10] and intermediate order 2 bits are M gray level where m [2:3]=[00], [01], [10] and low-order 2 bits are C gray level where m[0:1]=[00], [01], [10].

On a matrix element of each row, a driver data signal is provided which is to be supplied to a data driver (to be described later) of the electronic paper display device when a transition occurs to gray level data of a pixel on the renewal screen during each sub-frame. Here, the driver data signal is 3 bit binary numbers which take [000], [001], [010], [011], [100], [101], [110], and [111].

The data driver is configured to output 0V when the [000] is inputted and similarly output 10V for [001], 15V for [010], 30V for [011], 0V for [000], −10V for [101], −15V for [110] and −30V for [111]. In the above configuration, the LUT group to realize the driving waveform in Table 2-1 to Table 2-5 is shown in (a) and (b) in Table 3.

TABLE 3

LUT Configuration
[000] = 0 V, [000] = 10 V, [010] = 15 V, [011] = 30 V, [101] = −10 V, [110] = −15 V, [111] = −30 V (a) LUT for Reset Period

| Display State | | | | |
|---|---|---|---|---|
| C | M | Y | m | WF1 |
| 0 | 0 | 0 | [000000] | [111] |
| 0.5 | 0 | 0 | [000001] | [111] |
| 1 | 0 | 0 | [000010] | [111] |
| 0 | 0.5 | 0 | [000100] | [111] |
| 0.5 | 0.5 | 0 | [000101] | [111] |
| 1 | 0.5 | 0 | [000110] | [111] |
| 0 | 1 | 0 | [001000] | [111] |
| 0.5 | 1 | 0 | [001001] | [111] |
| 1 | 1 | 0 | [001010] | [111] |
| 0 | 0 | 0.5 | [010000] | [111] |
| 0.5 | 0 | 0.5 | [010001] | [111] |
| 1 | 0 | 0.5 | [010010] | [111] |
| 0 | 0.5 | 0.5 | [010100] | [111] |
| 0.5 | 0.5 | 0.5 | [010101] | [111] |
| 1 | 0.5 | 0.5 | [010110] | [111] |
| 0 | 1 | 0.5 | [011000] | [111] |
| 0.5 | 1 | 0.5 | [011001] | [111] |
| 1 | 1 | 0.5 | [011010] | [111] |
| 0 | 0 | 1 | [100000] | [111] |
| 0.5 | 0 | 1 | [100001] | [111] |
| 1 | 0 | 1 | [100010] | [111] |
| 0 | 0.5 | 1 | [100100] | [111] |
| 0.5 | 0.5 | 1 | [100101] | [111] |
| 1 | 0.5 | 1 | [100110] | [111] |
| 0 | 1 | 1 | [101000] | [111] |
| 0.5 | 1 | 1 | [101001] | [111] |
| 1 | 1 | 1 | [101010] | [111] |

(b) LUT for Unit Driving Waveform

| Display State | | | | | | | | | | | | | | | |
|---|---|---|---|---|---|---|---|---|---|---|---|---|---|---|---|
| C | M | Y | m | WF1 | WF2 | WF3 | WF4 | WF5 | WF6 | WF7 | WF8 | WF9 | WF10 | WF11 | WF12 |
| 0 | 0 | 0 | [000000] | [000] | [000] | [000] | [000] | [000] | [000] | [000] | [000] | [000] | [000] | [000] | [000] |
| 0.5 | 0 | 0 | [000001] | [000] | [000] | [000] | [000] | [000] | [000] | [001] | [001] | [001] | [000] | [000] | [000] |

TABLE 3-continued

LUT Configuration
[000] = 0 V, [000] = 10 V, [010] = 15 V, [011] = 30 V, [101] = −10 V, [110] = −15 V, [111] = −30 V

| | | | | | | | | | | | | | | | |
|---|---|---|---|---|---|---|---|---|---|---|---|---|---|---|---|
| 1 | 0 | 0 | [000010] | [000] | [000] | [000] | [000] | [000] | [000] | [001] | [001] | [001] | [001] | [001] | [001] |
| 0 | 0.5 | 0 | [000100] | [000] | [000] | [010] | [010] | [000] | [000] | [101] | [101] | [101] | [000] | [000] | [000] |
| 0.5 | 0.5 | 0 | [000101] | [000] | [000] | [010] | [010] | [000] | [000] | [000] | [000] | [000] | [000] | [000] | [000] |
| 1 | 0.5 | 0 | [000110] | [000] | [000] | [010] | [010] | [000] | [000] | [001] | [001] | [001] | [000] | [000] | [000] |
| 0 | 1 | 0 | [001000] | [000] | [000] | [010] | [010] | [010] | [010] | [101] | [101] | [101] | [101] | [101] | [101] |
| 0.5 | 1 | 0 | [001001] | [000] | [000] | [010] | [010] | [010] | [010] | [101] | [101] | [101] | [000] | [000] | [000] |
| 1 | 1 | 0 | [001010] | [000] | [000] | [010] | [010] | [010] | [010] | [000] | [000] | [000] | [000] | [000] | [000] |
| 0 | 0 | 0.5 | [010000] | [011] | [000] | [110] | [110] | [000] | [000] | [000] | [000] | [000] | [000] | [000] | [000] |
| 0.5 | 0 | 0.5 | [010001] | [011] | [000] | [110] | [110] | [000] | [000] | [001] | [001] | [001] | [000] | [000] | [000] |
| 1 | 0 | 0.5 | [010010] | [011] | [000] | [110] | [110] | [000] | [000] | [001] | [001] | [001] | [001] | [001] | [001] |
| 0 | 0.5 | 0.5 | [010100] | [011] | [000] | [000] | [000] | [000] | [000] | [101] | [101] | [101] | [000] | [000] | [000] |
| 0.5 | 0.5 | 0.5 | [010101] | [011] | [000] | [000] | [000] | [000] | [000] | [000] | [000] | [000] | [000] | [000] | [000] |
| 1 | 0.5 | 0.5 | [010110] | [011] | [000] | [000] | [000] | [000] | [000] | [001] | [001] | [001] | [000] | [000] | [000] |
| 0 | 1 | 0.5 | [011000] | [011] | [000] | [010] | [010] | [000] | [000] | [101] | [101] | [101] | [101] | [101] | [101] |
| 0.5 | 1 | 0.5 | [011001] | [011] | [000] | [010] | [010] | [000] | [000] | [101] | [101] | [101] | [000] | [000] | [000] |
| 1 | 1 | 0.5 | [011010] | [011] | [000] | [010] | [010] | [000] | [000] | [000] | [000] | [000] | [000] | [000] | [000] |
| 0 | 0 | 1 | [100000] | [011] | [011] | [110] | [110] | [110] | [110] | [000] | [000] | [000] | [000] | [000] | [000] |
| 0.5 | 0 | 1 | [100001] | [011] | [011] | [110] | [110] | [110] | [110] | [001] | [001] | [001] | [000] | [000] | [000] |
| 1 | 0 | 1 | [100010] | [011] | [011] | [110] | [110] | [110] | [110] | [001] | [001] | [001] | [001] | [001] | [001] |
| 0 | 0.5 | 1 | [100100] | [011] | [011] | [110] | [110] | [000] | [000] | [101] | [101] | [101] | [000] | [000] | [000] |
| 0.5 | 0.5 | 1 | [100101] | [011] | [011] | [110] | [110] | [000] | [000] | [000] | [000] | [000] | [000] | [000] | [000] |
| 1 | 0.5 | 1 | [100110] | [011] | [011] | [110] | [110] | [000] | [000] | [001] | [001] | [001] | [000] | [000] | [000] |
| 0 | 1 | 1 | [101000] | [011] | [011] | [000] | [000] | [000] | [000] | [101] | [101] | [101] | [101] | [101] | [101] |
| 0.5 | 1 | 1 | [101001] | [011] | [011] | [000] | [000] | [000] | [000] | [101] | [101] | [101] | [000] | [000] | [000] |
| 1 | 1 | 1 | [101010] | [011] | [011] | [000] | [000] | [000] | [000] | [000] | [000] | [000] | [000] | [000] | [000] |

For example, when the display state NEXT: (C, M, Y)=(0, 1, 0), the relative color density (C)=[00], the relative color density (M)=[10], (Y)=[00] and, therefore, the row number "m" of the LUT is [001000]. At this point, according to Table 2, the driving waveform being equivalent to −30V for 8 sub-frames to be applied during the reset period and, as a result, the corresponding element data of the LUT group R_LUT for resetting is R_WF1 [001000]=[111].

Moreover, during the first voltage applying period out of periods for applying the unit driving waveforms, 0V is applied for 2 sub-frames and B_WFn[001000]=[000] (n=1, 2). Next, during the second voltage applying period out of periods for applying the unit driving waveforms, 15V is applied for 4 sub-frames and B_WFn[001000]=[010] (n=3, 4, 5, 6).

During the third voltage applying period out of periods for applying the unit driving waveforms, −10V is applied for 6 sub-frames and, B_WFn[001000]=[101] (n=7, 8, 9, 10, 11, 12). A correspondence relation between other driving waveforms and each element of the LUT is the same as above.

Circuit Configurations

Figure 22:
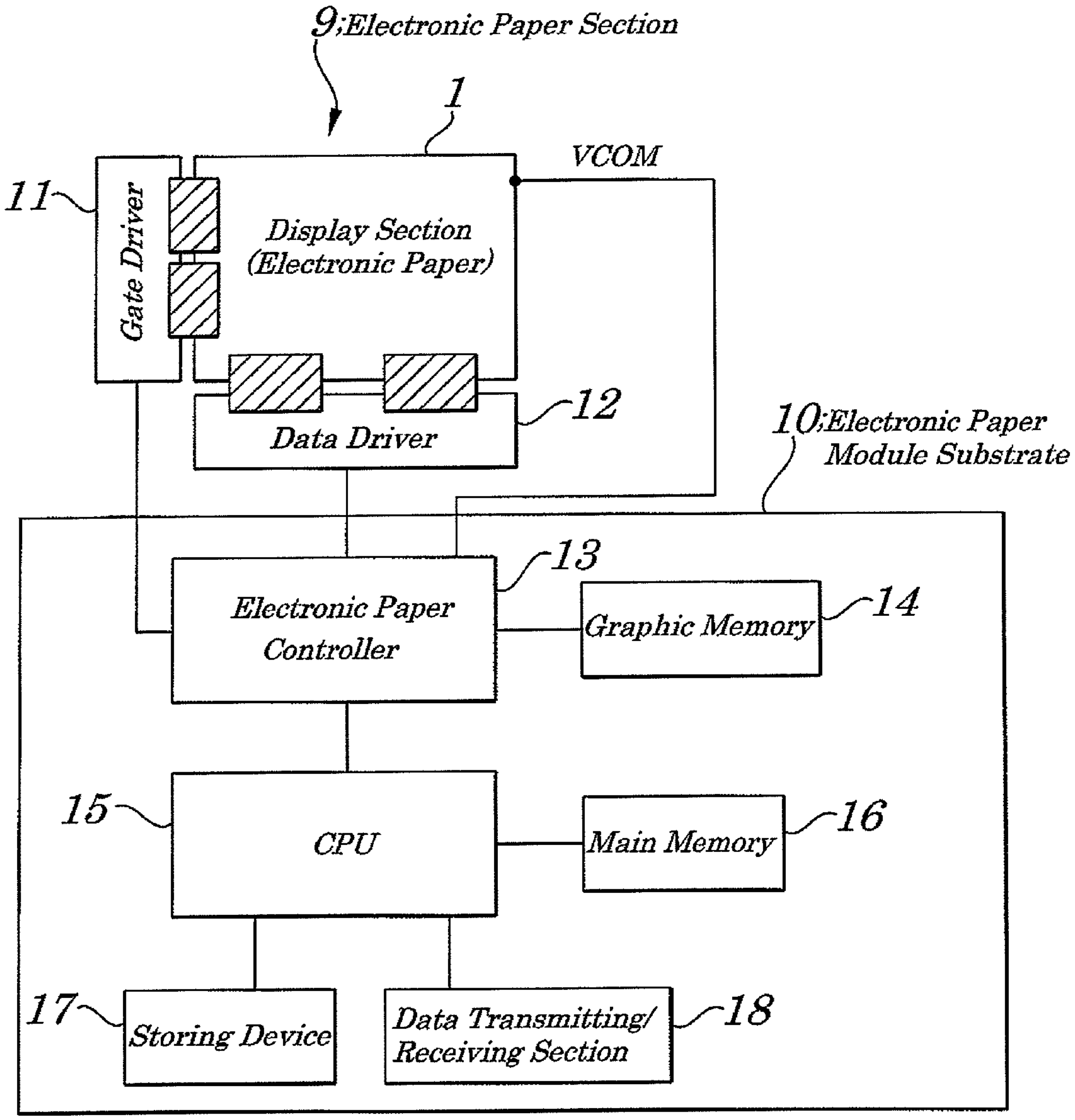
FIG. 22 is a block diagram showing electrical configurations of an electronic paper display device (image display device) according to the first exemplary embodiment.
Figure 23:
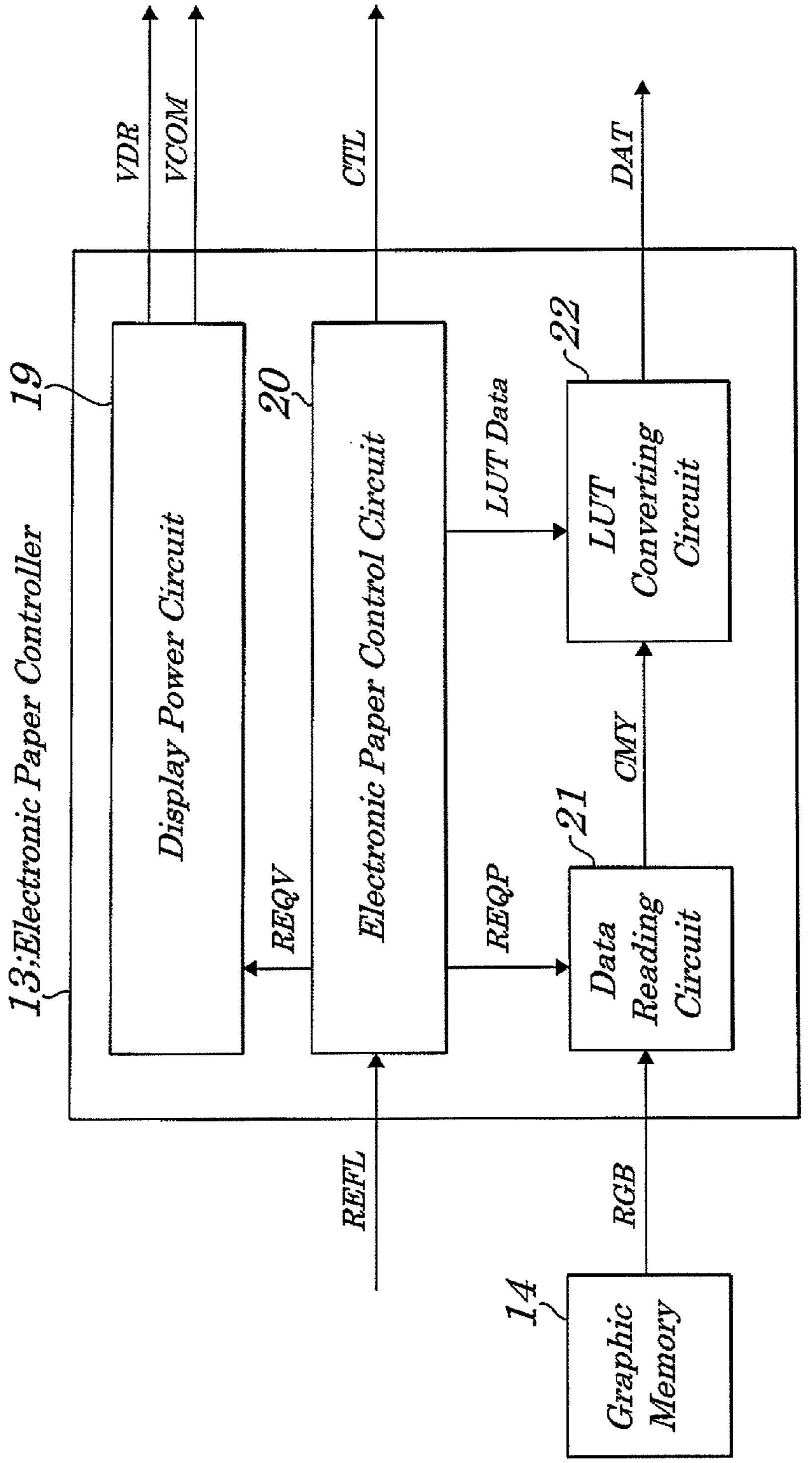
FIG. 23 is a block diagram showing, in detail, an electronic paper controller making up the electronic paper display device according to the first exemplary embodiment.
Figure 24:
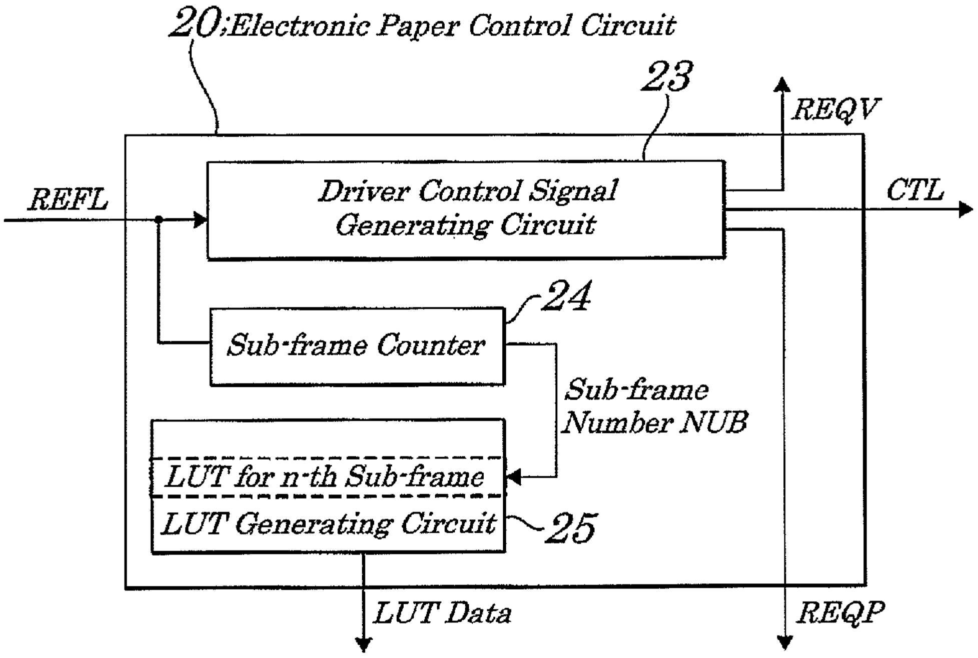
FIG. 24 is a block diagram showing, in detail, an electronic paper controlling circuit making up the electronic paper display device according to the first exemplary embodiment.
Figure 25:
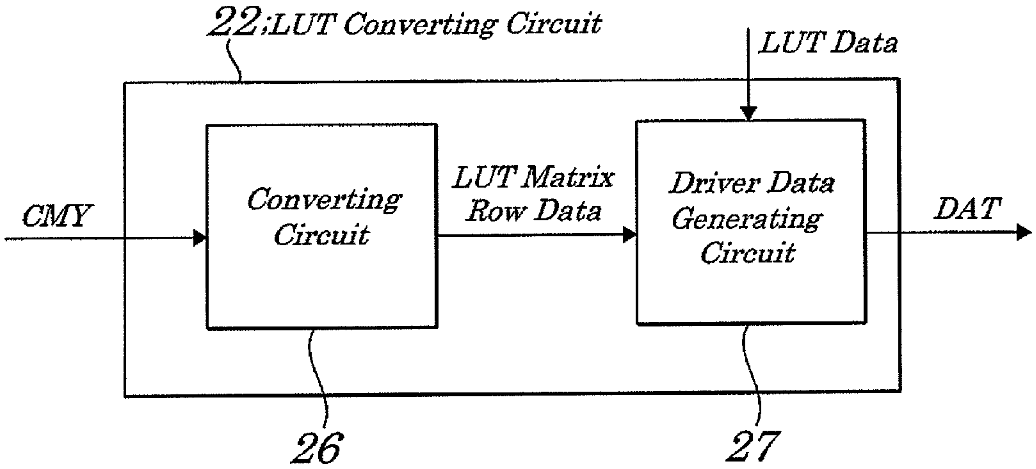
FIG. 25 is a block diagram showing, in detail, an LUT conversion circuit making up the electronic paper display device according to the first exemplary embodiment.

Next, circuit configurations of the embodiment are described. FIG. 22 is a block diagram showing electronic configuration of an electronic paper display device (image display device) of the first exemplary embodiment of the present invention. FIG. 23 is a block diagram showing, in detail, electronic configuration of an electronic paper controller for the electronic paper display device. FIG. 24 is a block diagram showing, in detail, electronic configuration of an electronic paper control circuit for the electronic paper controller. FIG. 25 is a block diagram showing, in detail, an LUT converting circuit for the electronic paper controller.

The electronic paper display device, as describe above, is an image display device to be driven according to driving waveforms of the embodiment and, as shown in FIG. 22, is made up of an electronic paper section 9 being able to perform color displaying and an electronic paper module substrate 10.

The above electronic paper section 9 having a memory property includes a display section (electronic paper) having an electrophoretic display device able to realize (color displaying and a driver (voltage applying means) to drive the display section 1. The driver is made up of a gate driver 11 to perform a shift register operation and a data driver 12 to output multiple values.

Moreover, the electronic paper module substrate 10 is provided with an electronic paper controller 13 to drive the electronic paper section 9, a graphic memory 14 making up a frame buffer, a CPU (Central Processor Unt) to control each section of the device and to provide image data to the electronic paper controller 13, a main memory 16. Such as a ROM and RAM, a storing device (storage) to store various image data or various programs, and a data transmitting and receiving section 18 having a wireless LAN and the like.

The above electronic paper controller 13 has a circuit configuration serving as a voltage control means to realize a driver waveform at time of screen renewal shown in FIGS. 14A to 19C by using the LUT group R_WFn and B_WFn ("n" is 1 to 15) and specifically, as shown in FIG. 23, includes a display power supply circuit 19, an electronic control circuit 20, a data reading circuit 21, and an LUT conversion circuit 22.

The data reading circuit 21 is configured to read RGB data representing a color gray level of a pixel of a renewal image (NEXT screen) written by the CPU 15 into the graphic memory 14 and, after converting the data into display color La*b*, to convert into corresponding CMY relative color density data to transmit to the LUT conversion circuit 22.

The CMY relative color density data converted here is represented by 8-bit binary number and its high-order 2 bits are [00], the next 2 bits are Y (yellow) gray level taking [00], [01], [10] and the next 2 bits are M (magenta) gray level taking [00], [01] and [10] and its low-order 2 bits are C (cyan) gray level taking [00], [01] and [10]. However, the relative color density corresponding to the CMY gray levels is not limited to the above embodiment and if there is a one to one correspondence, another different data may be employed. Moreover, the CPU 15 may store the converted CMY relative color density instead of the RGB data into the graphic memory.

The display power circuit 19 is configured to receive a power output request signal REQV transmitted from the electronic paper control circuit 20 to supply a plurality of reference voltages VDR to the drivers 11 and 12 of the electronic paper section 9 and to apply a COM voltage VCOM which gives a reference potential of the electronic paper section 9 to a facing electrode (common electrode) 8.

The electronic paper control circuit 20, as shown in FIG. 24, a driver control signal generating circuit 23 and a sub-frame counter 24, an LUT creating circuit 25. The driver control signal generating circuit 23, when receiving a screen renewing command REFL from the CPU, outputs a driver control signal CTL to a gate driver 11 and data driver 12 of the electronic paper section 9 and also outputs a reading request signal REQP of gray level data for every clock (every pixel) to a data reading circuit 21. The driver control signal generating circuit 23 also outputs the power output request signal REQV to the display power circuit 19.

The above sub-frame counter 24, when receiving a screen renewing command from the CPU 15, starts counting of the sub-frames and counts up the sub-frames for a number of frames required for screen renewal and outputs a sub-frame number NUB showing that the present driving is for the n-th sub-frame.

The LUT creating circuit 25 reads the LUT group R_WFn for resetting and the LUT group B_WFn for a unit driving waveform which are shown in Table 3 and stored in a non-volatile memory and creates LUT corresponding to a sub-frame number and outputs LUT data to the LUT converting circuit 22.

For example, in the sub-frame W2*a*-*a* in Table 2, the second application of the unit driving waveform being a base waveform corresponds to a second in the second sub-frame group and, therefore the LUT group WF4 for the unit driving waveform in Table 3 is read and is outputted to the LUT converting circuit.

The LUT converting circuit 22, as shown in FIG. 25, is made up of a conversion circuit 26 and a driver data generating circuit 27. The conversion circuit 26 deletes the high-order 2 bits of the 8-bit CMY relative color density transmitted from the data reading circuit 21 to convert into the LUT matrix row number m and outputs to the driver data generating circuit 27. The driver data generating circuit 27, by referring to the LUT data outputted from the electronic paper control circuit 20, outputs an LUT matrix element corresponding to the LUT matrix row number "m" outputted from the conversion circuit 26 as driver data DAT, to the drivers 11 and 12 of the electronic paper section 9. Thus, the electronic paper controller 13 outputs driver data DAT to realize the driving waveform shown in FIGS. 14A to 19C.

According to the first exemplary embodiment, at time of screen renewal, when a specified display state NEXT: (Rc, Rm, Ry) is realized, the sub-frame frequency is increased by N-times (N is a natural number being 2 or more) and the application of the unit basic waveform is repeated N-times and, therefore, while the occurrence of discomfort "flickering" in a process of a screen renewal is suppressed and specified intermediate color and gray level can be achieved.

Second Exemplary Embodiment

Next, the second exemplary embodiment of the present invention is described. According to the first exemplary embodiment, in order to prevent the occurrence of discomfort "flickering" in the process of the screen renewing process, the sub-frame frequency is increased. However, there is a limit in the increasing of the sub-frame frequency caused by high power consumption at time of driving and by driving capability limitation of a panel.

For example, if the application of waveforms is repeated four times, the sub-frame period is 25 msec, however, if the application of waveforms is repeated ten times, the sub-frame period is 10 msec, which comes near to the limitation of writing capability of a TFT.

To solve this problem, according to the second exemplary embodiment, by combining a plurality of kinds of unit driving waveforms and repeating the combined waveforms, the increase in the sub-frame frequency is suppressed. Moreover, in the second exemplary embodiment, circuit configurations and corresponding LUT creating method are almost the same as those in the above first exemplary embodiment and these descriptions may be simplified or omitted accordingly.

Creation of Unit Driving Waveforms

First, a method for creating a unit driving waveform serving as a base for suppressing an increase in driving frequency is described below. As understood from the driving waveforms shown in Tables 2-1 to 2-5, for realization of the final display state NEXT: (C, M, Y)=(Rc, Rm, Ry), there are two cases, one case in which V1 (=30V) is applied only to W1-1*a* as in the case of the final transmission state NEXT: (C, M, Y)=(1, 0, 0.5) and the other case in which V1 (=30V) is applied to both W1-1*a* and W1-1*b* as in the case of the final transition state NEXT: (C, M, Y)=(1, 0, 1).

Similarly, there are also two cases, one case in which V2 (=15V) or −V2 (=−15V) is applied to all of W1-2*a* and W1-2*b* and the other case in which V2 (=15V) or −V2 (=−15V) is applied to all of W1-2*a*, W1-2*b*, W1-2*c*, and W1-2*d*.

Further, there are two cases, one case in which V3 (=10V) or −V3 (=−10V) is applied only to W1-3*a*, W1-3*b*, and W1-3*c* and the other case in which V3 (=10V) or −V3 (=−10V) is applied to all of W1-3*a*, W1-3*b*, W1-3*c*, W1-3*d*, W1-3*e*, and W1-3*f*. According to the method of the embodiment, the application of voltages V1 (V2, V3) is stopped to only part of the above.

As an example, by referring to Tables 4-1 to 4-5, the method of creating a unit driving waveform to display a final transition state NEXT: (C, M, Y)=(1, 0, 0.5) is explained.

In Tables 4-1 to 4-5, specified driving voltage data of three colors CMY each having three gray levels to be used in the second exemplary embodiment. Here, Tables 4-1 shows driving voltages in a reset period and a ground state after applications. Table 4-2 shows a driving voltage and an intermediate transition state in a first applying period of the unit waveform A.

Table 4-2 shows a driving voltage and an intermediate transition state in a first applying period of a unit driving waveform A. Table 4-3 shows a driving voltage and an intermediate transition state after the application in a first applying period of the unit driving waveform B.

Table 4-4 shows a driving voltage and an intermediate transition state after the application in the second applying period of the unit driving waveform B. Here, the 1 sub-frame period is set to be quadruple high speed 25 msec of the driving waveform before the improvement after the occurrence of the "flickering".

In Table 2-2 used in the first exemplary embodiment, the driving waveform to display the final transition state NEXT: (C, M, Y)=(1, 0, 0.5) is W1-1*a*=30V, W1-1*b*=0V, however, in the second exemplary embodiment, a voltage for W1-1*b* is set to be the same as that for W1-1*a*, W1-1*a*=W1-1*b* is corrected to be 30V.

Moreover, in Table 2-2, W1-2*a*=W1-2*b*=−15V and W1-2*c*=W1-2*d*=0V, however, in the unit driving waveform A of the second exemplary embodiment, voltages for W1-2*c* and W1-2*d* are set to be the same as those for W1-2*a* and W1-2*b* and voltages for W1-2*c* and W1-2*d* are set to be the same as that for W1-2*a* and W1-2*b* and voltages for W1-2*a*=W1-2*b*=W1-2*c*=W1-2*d*=−15V.

Moreover, in Table 2-2, W1-3*a* (b, c, d, e, f)=10V and the voltage is the same as that for the first and second portions and no correction is needed accordingly. By the application of the unit driving waveform A, as shown in Tables 4-2, a transition occurs to the intermediate transition state IA1-3: (C, M, Y)=(0.25, 0, 0.25).

Next, in the period equivalent to a second applying period of the unit driving waveform shown in Tables 2-3, by applying a unit driving waveform B being different from the unit driving waveform A, as shown in Tables 4-3, a transition is made to occur to the intermediate transition state IB1-3: (C, M, Y)=(0.5, 0, 0.25) after the end of the second applying period of the unit driving waveform.

Consequently, W2-1*a*(b)=0V, W2-2*a* (b, c, d)=0V, W2-3*a* (b, c, d, e, f)=10V may be applied. This enables a transition to the intermediate transition state I2-3: (C, M, Y)=(0.5, 0, 0.25). By repeating the application of the unit driving waveform A and of the unit driving waveform B, a transition is allowed to occur to the final display state NEXT: (C, M, Y)=(1, 0, 0.5).

In Tables 4-1 to 4-5, driving waveforms for the final display state of all three gray levels are shown. In Tables 4-1 to 4-5, the sub-frame frequency is the same as those in Tables 2-1 to 2-5, however, W1-1*a* and W1-1*b* have the same voltages and W1-2*a* and W1-2*b* (c, d) have the same voltages, and W1-3*a* and W1-3*b* (c, d, e, f) have the same voltage and, therefore, the sub-frame frequency can be reduced to a half (4 sub-frames for a rest period and 6 sub-frames for the voltage applying period of driving waveforms A and B).

Figures 26A, 26B:
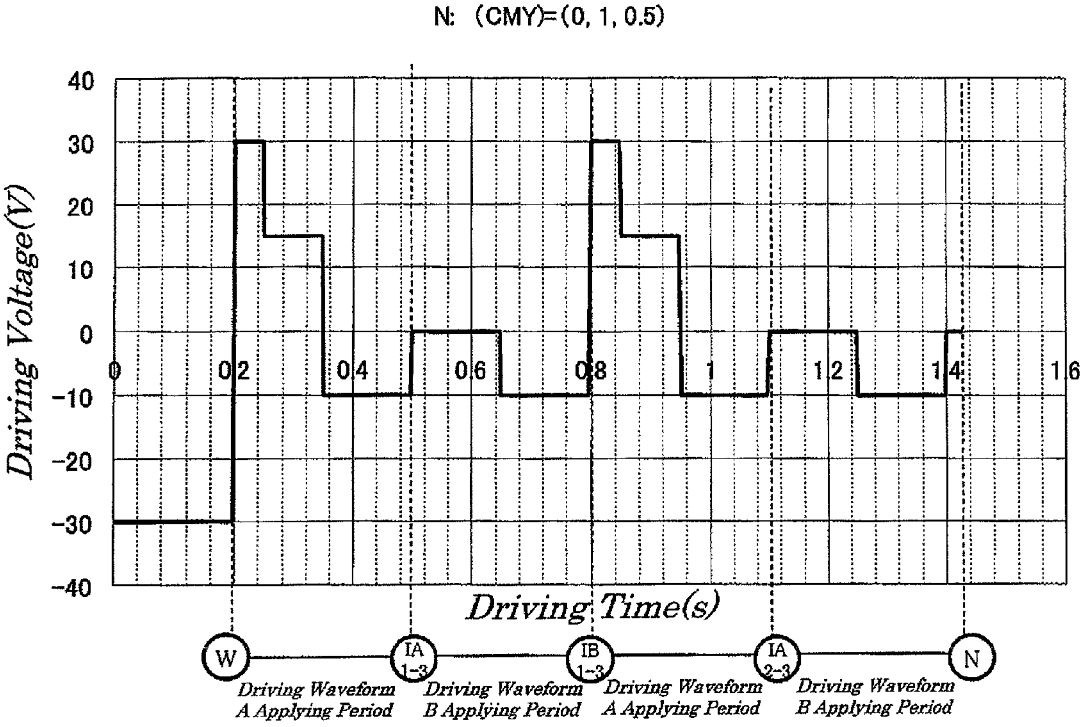
FIG. 26A is a diagram showing a driving voltage waveform and FIG. 26B is a table showing an intermediate transition state at time of screen renewal to be used in a second exemplary embodiment of the present invention.

In Table 5, a driving waveform whose sub-frame frequency has been reduced to a half to be used in the second exemplary embodiment is shown. In FIGS. 26A and 26B, during the transition to NEXT: (C, M, Y)=(0, 1, 0.5), the driving wave-form s and intermediate transition state to be used in the second exemplary embodiment are shown.

TABLE 4-1

| Reset | | | | | | | | | | | | | | | | |
|---|---|---|---|---|---|---|---|---|---|---|---|---|---|---|---|---|
| Targetted Renewing | | | Reset Period | | | | | | | | | | | | | |
| Screen Display | | | Applied Voltage | | | | | | | | Ground State WK | | |
| C | M | Y | Ra | Rb | Rc | Rd | Re | Rf | Rg | Rh | C | M | Y |
| 0 | 0 | 0 | −30 | −30 | −30 | −30 | −30 | −30 | −30 | −30 | 0 | 0 | 0 |
| 0.5 | 0 | 0 | −30 | −30 | −30 | −30 | −30 | −30 | −30 | −30 | 0 | 0 | 0 |
| 1 | 0 | 0 | −30 | −30 | −30 | −30 | −30 | −30 | −30 | −30 | 0 | 0 | 0 |
| 0 | 0.5 | 0 | −30 | −30 | −30 | −30 | −30 | −30 | −30 | −30 | 0 | 0 | 0 |
| 0.5 | 0.5 | 0 | −30 | −30 | −30 | −30 | −30 | −30 | −30 | −30 | 0 | 0 | 0 |
| 1 | 0.5 | 0 | −30 | −30 | −30 | −30 | −30 | −30 | −30 | −30 | 0 | 0 | 0 |
| 0 | 1 | 0 | −30 | −30 | −30 | −30 | −30 | −30 | −30 | −30 | 0 | 0 | 0 |
| 0.5 | 1 | 0 | −30 | −30 | −30 | −30 | −30 | −30 | −30 | −30 | 0 | 0 | 0 |
| 1 | 1 | 0 | −30 | −30 | −30 | −30 | −30 | −30 | −30 | −30 | 0 | 0 | 0 |
| 0 | 0 | 0.5 | −30 | −30 | −30 | −30 | −30 | −30 | −30 | −30 | 0 | 0 | 0 |
| 0.5 | 0 | 0.5 | −30 | −30 | −30 | −30 | −30 | −30 | −30 | −30 | 0 | 0 | 0 |
| 1 | 0 | 0.5 | −30 | −30 | −30 | −30 | −30 | −30 | −30 | −30 | 0 | 0 | 0 |
| 0 | 0.5 | 0.5 | −30 | −30 | −30 | −30 | −30 | −30 | −30 | −30 | 0 | 0 | 0 |
| 0.5 | 0.5 | 0.5 | −30 | −30 | −30 | −30 | −30 | −30 | −30 | −30 | 0 | 0 | 0 |
| 1 | 0.5 | 0.5 | −30 | −30 | −30 | −30 | −30 | −30 | −30 | −30 | 0 | 0 | 0 |
| 0 | 1 | 0.5 | −30 | −30 | −30 | −30 | −30 | −30 | −30 | −30 | 0 | 0 | 0 |
| 0.5 | 1 | 0.5 | −30 | −30 | −30 | −30 | −30 | −30 | −30 | −30 | 0 | 0 | 0 |
| 1 | 1 | 0.5 | −30 | −30 | −30 | −30 | −30 | −30 | −30 | −30 | 0 | 0 | 0 |
| 0 | 0 | 1 | −30 | −30 | −30 | −30 | −30 | −30 | −30 | −30 | 0 | 0 | 0 |
| 0.5 | 0 | 1 | −30 | −30 | −30 | −30 | −30 | −30 | −30 | −30 | 0 | 0 | 0 |
| 1 | 0 | 1 | −30 | −30 | −30 | −30 | −30 | −30 | −30 | −30 | 0 | 0 | 0 |
| 0 | 0.5 | 1 | −30 | −30 | −30 | −30 | −30 | −30 | −30 | −30 | 0 | 0 | 0 |
| 0.5 | 0.5 | 1 | −30 | −30 | −30 | −30 | −30 | −30 | −30 | −30 | 0 | 0 | 0 |
| 1 | 0.5 | 1 | −30 | −30 | −30 | −30 | −30 | −30 | −30 | −30 | 0 | 0 | 0 |
| 0 | 1 | 1 | −30 | −30 | −30 | −30 | −30 | −30 | −30 | −30 | 0 | 0 | 0 |
| 0.5 | 1 | 1 | −30 | −30 | −30 | −30 | −30 | −30 | −30 | −30 | 0 | 0 | 0 |
| 1 | 1 | 1 | −30 | −30 | −30 | −30 | −30 | −30 | −30 | −30 | 0 | 0 | 0 |

TABLE 4-2

| Driving Wavefrom A (First Time) | | | | | | | | | | | | | | | | |
|---|---|---|---|---|---|---|---|---|---|---|---|---|---|---|---|---|
| | | | Driving Wavefrom A | | | | | | | | | | | |
| | | | First Sub-frame Group | | | | | Second Sub-frame Group | | | | | | |
| Ground State WK | | | Applied Voltage | | Intermediate Transition IA1-1 | | | Applied Voltage | | | | Intermediate Transition IA1-2 | | |
| C | M | Y | A1-1a | A1-1b | C | M | Y | A1-2a | A1-2b | A1-2c | A1-2d | C | M | Y |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

TABLE 4-2-continued

Driving Wavefrom A (First Time)

| | | | | | | | | | | | | | | |
|---|---|---|---|---|---|---|---|---|---|---|---|---|---|---|
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 0 | 0 | 0 | 0 | 0 | 15 | 15 | 15 | 15 | 0.25 | 0.25 | 0 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 15 | 15 | 15 | 15 | 0.5 | 0.5 | 0.25 |
| 0 | 0 | 0 | 30 | 30 | 0.25 | 0.25 | 0.25 | 15 | 15 | 15 | 15 | 0.5 | 0.5 | 0.25 |
| 0 | 0 | 0 | 30 | 30 | 0.25 | 0.25 | 0.25 | 15 | 15 | 15 | 15 | 0.5 | 0.5 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | −15 | −15 | −15 | −15 | 0 | 0 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |
| 0 | 0 | 0 | 30 | 30 | 0.25 | 0.25 | 0.25 | 0 | 0 | 0 | 0 | 0.25 | 0.25 | 0.25 |

| | | | Driving Wavefrom A Third Sub-frame Group | | | | | | | | |
|---|---|---|---|---|---|---|---|---|---|---|---|
| Ground State WK | | | Applied Voltage | | | | | | Intermediate Transition IA1-3 | | |
| C | M | Y | A1-3a | A1-3b | A1-3c | A1-3d | A1-3e | A1-3f | C | M | Y |
| 0 | 0 | 0 | 0 | 0 | 0 | 0 | 0 | 0 | 0 | 0 | 0 |
| 0 | 0 | 0 | 10 | 10 | 10 | 10 | 10 | 10 | 0.25 | 0 | 0 |
| 0 | 0 | 0 | 10 | 10 | 10 | 10 | 10 | 10 | 0.25 | 0 | 0 |
| 0 | 0 | 0 | −10 | −10 | −10 | −10 | −10 | −10 | 0 | 0.25 | 0 |
| 0 | 0 | 0 | 0 | 0 | 0 | 0 | 0 | 0 | 0.25 | 0.25 | 0 |
| 0 | 0 | 0 | 10 | 10 | 10 | 10 | 10 | 10 | 0.5 | 0.25 | 0 |
| 0 | 0 | 0 | −10 | −10 | −10 | −10 | −10 | −10 | 0 | 0.25 | 0 |
| 0 | 0 | 0 | −10 | −10 | −10 | −10 | −10 | −10 | 0 | 0.25 | 0 |
| 0 | 0 | 0 | 0 | 0 | 0 | 0 | 0 | 0 | 0.25 | 0.25 | 0 |
| 0 | 0 | 0 | 0 | 0 | 0 | 0 | 0 | 0 | 0 | 0 | 0.25 |
| 0 | 0 | 0 | 10 | 10 | 10 | 10 | 10 | 10 | 0.25 | 0 | 0.25 |
| 0 | 0 | 0 | 10 | 10 | 10 | 10 | 10 | 10 | 0.25 | 0 | 0.25 |
| 0 | 0 | 0 | −10 | −10 | −10 | −10 | −10 | −10 | 0 | 0.25 | 0.25 |
| 0 | 0 | 0 | 0 | 0 | 0 | 0 | 0 | 0 | 0.25 | 0.25 | 0.25 |
| 0 | 0 | 0 | 10 | 10 | 10 | 10 | 10 | 10 | 0.5 | 0.25 | 0.25 |
| 0 | 0 | 0 | −10 | −10 | −10 | −10 | −10 | −10 | 0.25 | 0.5 | 0.25 |
| 0 | 0 | 0 | −10 | −10 | −10 | −10 | −10 | −10 | 0.25 | 0.5 | 0.25 |
| 0 | 0 | 0 | 0 | 0 | 0 | 0 | 0 | 0 | 0.5 | 0.5 | 0.25 |
| 0 | 0 | 0 | 0 | 0 | 0 | 0 | 0 | 0 | 0 | 0 | 0.25 |
| 0 | 0 | 0 | 10 | 10 | 10 | 10 | 10 | 10 | 0.25 | 0 | 0.25 |
| 0 | 0 | 0 | 10 | 10 | 10 | 10 | 10 | 10 | 0.25 | 0 | 0.25 |
| 0 | 0 | 0 | 0 | 0 | 0 | 0 | 0 | 0 | 0 | 0 | 0.25 |
| 0 | 0 | 0 | 0 | 0 | 0 | 0 | 0 | 0 | 0 | 0 | 0.25 |
| 0 | 0 | 0 | 10 | 10 | 10 | 10 | 10 | 10 | 0.25 | 0 | 0.25 |
| 0 | 0 | 0 | −10 | −10 | −10 | −10 | −10 | −10 | 0 | 0.25 | 0.25 |
| 0 | 0 | 0 | −10 | −10 | −10 | −10 | −10 | −10 | 0 | 0.25 | 0.25 |
| 0 | 0 | 0 | 0 | 0 | 0 | 0 | 0 | 0 | 0.25 | 0.25 | 0.25 |

TABLE 4-3

Driving Wavefrom B (Second Time)

| | | | Driving Wavefrom B | | | | | | | | | | | |
|---|---|---|---|---|---|---|---|---|---|---|---|---|---|---|
| | | | First Sub-frame Group | | | | | Second Sub-frame Group | | | | | | |
| | | | Applied Voltage | | Intermediate Transition IB1-1 | | | Applied Voltage | | | | Intermediate Transition IB1-2 | | |
| C | M | Y | B1-1a | B1-1b | C | M | Y | B1-2a | B1-2b | B1-2c | B1-2d | C | M | Y |
| 0 | 0 | 0 | 0 | 0 | 0 | 0 | 0 | 0 | 0 | 0 | 0 | 0 | 0 | 0 |
| 0.25 | 0 | 0 | 0 | 0 | 0.25 | 0 | 0 | 0 | 0 | 0 | 0 | 0.25 | 0 | 0 |

TABLE 4-3-continued

| Driving Wavefrom B (Second Time) | | | | | | | | | | | | | | |
|---|---|---|---|---|---|---|---|---|---|---|---|---|---|---|
| 0.25 | 0 | 0 | 0 | 0 | 0.25 | 0 | 0 | 0 | 0 | 0 | 0 | 0.25 | 0 | 0 |
| 0 | 0.25 | 0 | 0 | 0 | 0 | 0.25 | 0 | 0 | 0 | 0 | 0 | 0 | 0.25 | 0 |
| 0.25 | 0.25 | 0 | 0 | 0 | 0.25 | 0.25 | 0 | 0 | 0 | 0 | 0 | 0.25 | 0.25 | 0 |
| 0.5 | 0.25 | 0 | 0 | 0 | 0.5 | 0.25 | 0 | 0 | 0 | 0 | 0 | 0.5 | 0.25 | 0 |
| 0 | 0.25 | 0 | 0 | 0 | 0 | 0.25 | 0 | 15 | 15 | 15 | 15 | 0.25 | 0.5 | 0 |
| 0 | 0.25 | 0 | 0 | 0 | 0 | 0.25 | 0 | 15 | 15 | 15 | 15 | 0.25 | 0.5 | 0 |
| 0.25 | 0.25 | 0 | 0 | 0 | 0.25 | 0.25 | 0 | 15 | 15 | 15 | 15 | 0.5 | 0.5 | 0 |
| 0 | 0 | 0.25 | 0 | 0 | 0 | 0 | 0.25 | 0 | 0 | 0 | 0 | 0 | 0 | 0.25 |
| 0.25 | 0 | 0.25 | 0 | 0 | 0.25 | 0 | 0.25 | 0 | 0 | 0 | 0 | 0.25 | 0 | 0.25 |
| 0.25 | 0 | 0.25 | 0 | 0 | 0.25 | 0 | 0.25 | 0 | 0 | 0 | 0 | 0.25 | 0 | 0.25 |
| 0 | 0.25 | 0.25 | 0 | 0 | 0 | 0.25 | 0.25 | 0 | 0 | 0 | 0 | 0 | 0.25 | 0.25 |
| 0.25 | 0.25 | 0.25 | 0 | 0 | 0.25 | 0.25 | 0.25 | 0 | 0 | 0 | 0 | 0.25 | 0.25 | 0.25 |
| 0.5 | 0.25 | 0.25 | 0 | 0 | 0.5 | 0.25 | 0.25 | 0 | 0 | 0 | 0 | 0.5 | 0.25 | 0.25 |
| 0.25 | 0.5 | 0.25 | 0 | 0 | 0.25 | 0.5 | 0.25 | 0 | 0 | 0 | 0 | 0.25 | 0.5 | 0.25 |
| 0.25 | 0.5 | 0.25 | 0 | 0 | 0.25 | 0.5 | 0.25 | 0 | 0 | 0 | 0 | 0.25 | 0.5 | 0.25 |
| 0.5 | 0.5 | 0.25 | 0 | 0 | 0.5 | 0.5 | 0.25 | 0 | 0 | 0 | 0 | 0.5 | 0.5 | 0.25 |
| 0 | 0 | 0.25 | 30 | 30 | 0.25 | 0.25 | 0.5 | −15 | −15 | −15 | −15 | 0 | 0 | 0.5 |
| 0.25 | 0 | 0.25 | 30 | 30 | 0.5 | 0.25 | 0.5 | −15 | −15 | −15 | −15 | 0.25 | 0 | 0.5 |
| 0.25 | 0 | 0.25 | 30 | 30 | 0.5 | 0.25 | 0.5 | −15 | −15 | −15 | −15 | 0.25 | 0 | 0.5 |
| 0 | 0 | 0.25 | 30 | 30 | 0.25 | 0.25 | 0.5 | 0 | 0 | 0 | 0 | 0.25 | 0.25 | 0.5 |
| 0 | 0 | 0.25 | 30 | 30 | 0.25 | 0.25 | 0.5 | 0 | 0 | 0 | 0 | 0.25 | 0.25 | 0.5 |
| 0.25 | 0 | 0.25 | 30 | 30 | 0.5 | 0.25 | 0.5 | 0 | 0 | 0 | 0 | 0.5 | 0.25 | 0.5 |
| 0 | 0.25 | 0.25 | 30 | 30 | 0.25 | 0.5 | 0.5 | 0 | 0 | 0 | 0 | 0.25 | 0.5 | 0.5 |
| 0 | 0.25 | 0.25 | 30 | 30 | 0.25 | 0.5 | 0.5 | 0 | 0 | 0 | 0 | 0.25 | 0.5 | 0.5 |
| 0.25 | 0.25 | 0.25 | 30 | 30 | 0.5 | 0.5 | 0.5 | 0 | 0 | 0 | 0 | 0.5 | 0.5 | 0.5 |

| | | | Driving Wavefrom B Third Sub-frame Group | | | | | | | | |
|---|---|---|---|---|---|---|---|---|---|---|---|
| | | | Applied Voltage | | | | | | Intermediate Transition IB1-3 | | |
| C | M | Y | B1-3a | B1-3b | B1-3c | B1-3d | B1-3e | B1-3f | C | M | Y |
| 0 | 0 | 0 | 0 | 0 | 0 | 0 | 0 | 0 | 0 | 0 | 0 |
| 0.25 | 0 | 0 | 0 | 0 | 0 | 0 | 0 | 0 | 0.25 | 0 | 0 |
| 0.25 | 0 | 0 | 10 | 10 | 10 | 10 | 10 | 10 | 0.5 | 0 | 0 |
| 0 | 0.25 | 0 | 0 | 0 | 0 | 0 | 0 | 0 | 0 | 0.25 | 0 |
| 0.25 | 0.25 | 0 | 0 | 0 | 0 | 0 | 0 | 0 | 0.25 | 0.25 | 0 |
| 0.5 | 0.25 | 0 | 0 | 0 | 0 | 0 | 0 | 0 | 0.5 | 0.25 | 0 |
| 0 | 0.25 | 0 | −10 | −10 | −10 | −10 | −10 | −10 | 0 | 0.5 | 0 |
| 0 | 0.25 | 0 | 0 | 0 | 0 | 0 | 0 | 0 | 0.25 | 0.5 | 0 |
| 0.25 | 0.25 | 0 | 0 | 0 | 0 | 0 | 0 | 0 | 0.5 | 0.5 | 0 |
| 0 | 0 | 0.25 | 0 | 0 | 0 | 0 | 0 | 0 | 0 | 0 | 0.25 |
| 0.25 | 0 | 0.25 | 0 | 0 | 0 | 0 | 0 | 0 | 0.25 | 0 | 0.25 |
| 0.25 | 0 | 0.25 | 10 | 10 | 10 | 10 | 10 | 10 | 0.5 | 0 | 0.25 |
| 0 | 0.25 | 0.25 | 0 | 0 | 0 | 0 | 0 | 0 | 0 | 0.25 | 0.25 |
| 0.25 | 0.25 | 0.25 | 0 | 0 | 0 | 0 | 0 | 0 | 0.25 | 0.25 | 0.25 |
| 0.5 | 0.25 | 0.25 | 0 | 0 | 0 | 0 | 0 | 0 | 0.5 | 0.25 | 0.25 |
| 0.25 | 0.5 | 0.25 | −10 | −10 | −10 | −10 | −10 | −10 | 0 | 0.5 | 0.25 |
| 0.25 | 0.5 | 0.25 | 0 | 0 | 0 | 0 | 0 | 0 | 0.25 | 0.5 | 0.25 |
| 0.5 | 0.5 | 0.25 | 0 | 0 | 0 | 0 | 0 | 0 | 0.5 | 0.5 | 0.25 |
| 0 | 0 | 0.25 | 0 | 0 | 0 | 0 | 0 | 0 | 0 | 0 | 0.5 |
| 0.25 | 0 | 0.25 | 0 | 0 | 0 | 0 | 0 | 0 | 0.25 | 0 | 0.5 |
| 0.25 | 0 | 0.25 | 10 | 10 | 10 | 10 | 10 | 10 | 0.5 | 0 | 0.5 |
| 0 | 0 | 0.25 | −10 | −10 | −10 | −10 | −10 | −10 | 0 | 0.25 | 0.5 |
| 0 | 0 | 0.25 | 0 | 0 | 0 | 0 | 0 | 0 | 0.25 | 0.25 | 0.5 |
| 0.25 | 0 | 0.25 | 0 | 0 | 0 | 0 | 0 | 0 | 0.5 | 0.25 | 0.5 |
| 0 | 0.25 | 0.25 | −10 | −10 | −10 | −10 | −10 | −10 | 0 | 0.5 | 0.5 |
| 0 | 0.25 | 0.25 | 0 | 0 | 0 | 0 | 0 | 0 | 0.25 | 0.5 | 0.5 |
| 0.25 | 0.25 | 0.25 | 0 | 0 | 0 | 0 | 0 | 0 | 0.5 | 0.5 | 0.5 |

TABLE 4-4

| Driving Wavefrom A (Second Time) | | | | | | | | | | | | | | |
|---|---|---|---|---|---|---|---|---|---|---|---|---|---|---|
| | | | Driving Wavefrom A | | | | | | | | | | | |
| | | | First-Sub-frame Group | | | | | Second Sub-frame Group | | | | | | |
| Ground State | | | Applied Voltage | | Intermediate Transition IA2-1 | | | Applied Voltage | | | | Intermediate Transition IA2-2 | | |
| C | M | Y | A2-1a | A2-1b | C | M | Y | A2-2a | A2-2b | A2-2c | A2-2d | C | M | Y |
| 0 | 0 | 0 | 0 | 0 | 0 | 0 | 0 | 0 | 0 | 0 | 0 | 0 | 0 | 0 |
| 0.25 | 0 | 0 | 0 | 0 | 0.25 | 0 | 0 | 0 | 0 | 0 | 0 | 0.25 | 0 | 0 |

TABLE 4-4-continued

| Driving Wavefrom A (Second Time) | | | | | | | | | | | | | | |
|---|---|---|---|---|---|---|---|---|---|---|---|---|---|---|
| 0.5 | 0 | 0 | 0 | 0 | 0.5 | 0 | 0 | 0 | 0 | 0 | 0 | 0.5 | 0 | 0 |
| 0 | 0.25 | 0 | 0 | 0 | 0 | 0.25 | 0 | 15 | 15 | 15 | 15 | 0.25 | 0.5 | 0 |
| 0.25 | 0.25 | 0 | 0 | 0 | 0.25 | 0.25 | 0 | 15 | 15 | 15 | 15 | 0.5 | 0.5 | 0 |
| 0.5 | 0.25 | 0 | 0 | 0 | 0.5 | 0.25 | 0 | 15 | 15 | 15 | 15 | 0.75 | 0.5 | 0 |
| 0 | 0.5 | 0 | 0 | 0 | 0 | 0.5 | 0 | 15 | 15 | 15 | 15 | 0.25 | 0.75 | 0 |
| 0.25 | 0.5 | 0 | 0 | 0 | 0.25 | 0.5 | 0 | 15 | 15 | 15 | 15 | 0.5 | 0.75 | 0 |
| 0.5 | 0.5 | 0 | 0 | 0 | 0.5 | 0.5 | 0 | 15 | 15 | 15 | 15 | 0.75 | 0.75 | 0 |
| 0 | 0 | 0.25 | 30 | 30 | 0.25 | 0.25 | 0.5 | −15 | −15 | −15 | −15 | 0 | 0 | 0.5 |
| 0.25 | 0 | 0.25 | 30 | 30 | 0.5 | 0.25 | 0.5 | −15 | −15 | −15 | −15 | 0.25 | 0 | 0.5 |
| 0.5 | 0 | 0.25 | 30 | 30 | 0.75 | 0.25 | 0.5 | −15 | −15 | −15 | −15 | 0.5 | 0 | 0.5 |
| 0 | 0.25 | 0.25 | 30 | 30 | 0.25 | 0.5 | 0.5 | 0 | 0 | 0 | 0 | 0.25 | 0.5 | 0.5 |
| 0.25 | 0.25 | 0.25 | 30 | 30 | 0.5 | 0.5 | 0.5 | 0 | 0 | 0 | 0 | 0.5 | 0.5 | 0.5 |
| 0.5 | 0.25 | 0.25 | 30 | 30 | 0.75 | 0.5 | 0.5 | 0 | 0 | 0 | 0 | 0.75 | 0.5 | 0.5 |
| 0 | 0.5 | 0.25 | 30 | 30 | 0.25 | 0.75 | 0.5 | 15 | 15 | 15 | 15 | 0.5 | 1 | 0.5 |
| 0.25 | 0.5 | 0.25 | 30 | 30 | 0.5 | 0.75 | 0.5 | 15 | 15 | 15 | 15 | 0.75 | 1 | 0.5 |
| 0.5 | 0.5 | 0.25 | 30 | 30 | 0.75 | 0.75 | 0.5 | 15 | 15 | 15 | 15 | 1 | 1 | 0.5 |
| 0 | 0 | 0.5 | 30 | 30 | 0.25 | 0.25 | 0.75 | −15 | −15 | −15 | −15 | 0 | 0 | 0.75 |
| 0.25 | 0 | 0.5 | 30 | 30 | 0.5 | 0.25 | 0.75 | −15 | −15 | −15 | −15 | 0.25 | 0 | 0.75 |
| 0.5 | 0 | 0.5 | 30 | 30 | 0.75 | 0.25 | 0.75 | −15 | −15 | −15 | −15 | 0.5 | 0 | 0.75 |
| 0 | 0.25 | 0.5 | 30 | 30 | 0.25 | 0.5 | 0.75 | −15 | −15 | −15 | −15 | 0 | 0.25 | 0.75 |
| 0.25 | 0.25 | 0.5 | 30 | 30 | 0.5 | 0.5 | 0.75 | −15 | −15 | −15 | −15 | 0.25 | 0.25 | 0.75 |
| 0.5 | 0.25 | 0.5 | 30 | 30 | 0.75 | 0.5 | 0.75 | −15 | −15 | −15 | −15 | 0.5 | 0.25 | 0.75 |
| 0 | 0.5 | 0.5 | 30 | 30 | 0.25 | 0.75 | 0.75 | 0 | 0 | 0 | 0 | 0.25 | 0.75 | 0.75 |
| 0.25 | 0.5 | 0.5 | 30 | 30 | 0.5 | 0.75 | 0.75 | 0 | 0 | 0 | 0 | 0.5 | 0.75 | 0.75 |
| 0.5 | 0.5 | 0.5 | 30 | 30 | 0.75 | 0.75 | 0.75 | 0 | 0 | 0 | 0 | 0.75 | 0.75 | 0.75 |

| | | | Driving Wavefrom A Third Sub-frame Group | | | | | | | | |
|---|---|---|---|---|---|---|---|---|---|---|---|
| Ground State | | | Applied Voltage | | | | | | Intermediate Transition IA2-3 | | |
| C | M | Y | A2-3a | A2-3b | A2-3c | A2-3d | A2-3e | A2-3f | C | M | Y |
| 0 | 0 | 0 | 0 | 0 | 0 | 0 | 0 | 0 | 0 | 0 | 0 |
| 0.25 | 0 | 0 | 10 | 10 | 10 | 10 | 10 | 10 | 0.5 | 0 | 0 |
| 0.5 | 0 | 0 | 10 | 10 | 10 | 10 | 10 | 10 | 0.75 | 0 | 0 |
| 0 | 0.25 | 0 | −10 | −10 | −10 | −10 | −10 | −10 | 0 | 0.5 | 0 |
| 0.25 | 0.25 | 0 | 0 | 0 | 0 | 0 | 0 | 0 | 0.5 | 0.5 | 0 |
| 0.5 | 0.25 | 0 | 10 | 10 | 10 | 10 | 10 | 10 | 1 | 0.5 | 0 |
| 0 | 0.5 | 0 | −10 | −10 | −10 | −10 | −10 | −10 | 0 | 0.75 | 0 |
| 0.25 | 0.5 | 0 | −10 | −10 | −10 | −10 | −10 | −10 | 0.25 | 0.75 | 0 |
| 0.5 | 0.5 | 0 | 0 | 0 | 0 | 0 | 0 | 0 | 0.75 | 0.75 | 0 |
| 0 | 0 | 0.25 | 0 | 0 | 0 | 0 | 0 | 0 | 0 | 0 | 0.5 |
| 0.25 | 0 | 0.25 | 10 | 10 | 10 | 10 | 10 | 10 | 0.5 | 0 | 0.5 |
| 0.5 | 0 | 0.25 | 10 | 10 | 10 | 10 | 10 | 10 | 0.75 | 0 | 0.5 |
| 0 | 0.25 | 0.25 | −10 | −10 | −10 | −10 | −10 | −10 | 0 | 0.5 | 0.5 |
| 0.25 | 0.25 | 0.25 | 0 | 0 | 0 | 0 | 0 | 0 | 0.5 | 0.5 | 0.5 |
| 0.5 | 0.25 | 0.25 | 10 | 10 | 10 | 10 | 10 | 10 | 1 | 0.5 | 0.5 |
| 0 | 0.5 | 0.25 | −10 | −10 | −10 | −10 | −10 | −10 | 0.25 | 1 | 0.5 |
| 0.25 | 0.5 | 0.25 | −10 | −10 | −10 | −10 | −10 | −10 | 0.5 | 1 | 0.5 |
| 0.5 | 0.5 | 0.25 | 0 | 0 | 0 | 0 | 0 | 0 | 1 | 1 | 0.5 |
| 0 | 0 | 0.5 | 0 | 0 | 0 | 0 | 0 | 0 | 0 | 0 | 0.75 |
| 0.25 | 0 | 0.5 | 10 | 10 | 10 | 10 | 10 | 10 | 0.5 | 0 | 0.75 |
| 0.5 | 0 | 0.5 | 10 | 10 | 10 | 10 | 10 | 10 | 0.75 | 0 | 0.75 |
| 0 | 0.25 | 0.5 | 0 | 0 | 0 | 0 | 0 | 0 | 0 | 0.25 | 0.75 |
| 0.25 | 0.25 | 0.5 | 0 | 0 | 0 | 0 | 0 | 0 | 0.25 | 0.25 | 0.75 |
| 0.5 | 0.25 | 0.5 | 10 | 10 | 10 | 10 | 10 | 10 | 0.75 | 0.25 | 0.75 |
| 0 | 0.5 | 0.5 | −10 | −10 | −10 | −10 | −10 | −10 | 0 | 0.75 | 0.75 |
| 0.25 | 0.5 | 0.5 | −10 | −10 | −10 | −10 | −10 | −10 | 0.25 | 0.75 | 0.75 |
| 0.5 | 0.5 | 0.5 | 0 | 0 | 0 | 0 | 0 | 0 | 0.75 | 0.75 | 0.75 |

TABLE 4-5

| Driving Wavefrom B (Second Time) | | | | | | | | | | | | | | |
|---|---|---|---|---|---|---|---|---|---|---|---|---|---|---|
| | | | Driving Wavefrom B | | | | | | | | | | | |
| | | | First-Sub-frame Group | | | | | Second Sub-frame Group | | | | | | |
| | | | Applied Voltage | | Intermediate Transition IB2-1 | | | Applied Voltage | | | | Intermediate Transition IB2-2 | | |
| C | M | Y | B2-1a | B2-1b | C | M | Y | B2-2a | B2-2b | B2-2c | B2-2d | C | M | Y |
| 0 | 0 | 0 | 0 | 0 | 0 | 0 | 0 | 0 | 0 | 0 | 0 | 0 | 0 | 0 |
| 0.5 | 0 | 0 | 0 | 0 | 0.5 | 0 | 0 | 0 | 0 | 0 | 0 | 0.5 | 0 | 0 |
| 0.75 | 0 | 0 | 0 | 0 | 0.75 | 0 | 0 | 0 | 0 | 0 | 0 | 0.75 | 0 | 0 |
| 0 | 0.5 | 0 | 0 | 0 | 0 | 0.5 | 0 | 0 | 0 | 0 | 0 | 0 | 0.5 | 0 |
| 0.5 | 0.5 | 0 | 0 | 0 | 0.5 | 0.5 | 0 | 0 | 0 | 0 | 0 | 0.5 | 0.5 | 0 |
| 1 | 0.5 | 0 | 0 | 0 | 1 | 0.5 | 0 | 0 | 0 | 0 | 0 | 1 | 0.5 | 0 |
| 0 | 0.75 | 0 | 0 | 0 | 0 | 0.75 | 0 | 15 | 15 | 15 | 15 | 0.25 | 1 | 0 |
| 0.25 | 0.75 | 0 | 0 | 0 | 0.25 | 0.75 | 0 | 15 | 15 | 15 | 15 | 0.5 | 1 | 0 |
| 0.75 | 0.75 | 0 | 0 | 0 | 0.75 | 0.75 | 0 | 15 | 15 | 15 | 15 | 1 | 1 | 0 |
| 0 | 0 | 0.5 | 0 | 0 | 0 | 0 | 0.5 | 0 | 0 | 0 | 0 | 0 | 0 | 0.5 |
| 0.5 | 0 | 0.5 | 0 | 0 | 0.5 | 0 | 0.5 | 0 | 0 | 0 | 0 | 0.5 | 0 | 0.5 |
| 0.75 | 0 | 0.5 | 0 | 0 | 0.75 | 0 | 0.5 | 0 | 0 | 0 | 0 | 0.75 | 0 | 0.5 |
| 0 | 0.5 | 0.5 | 0 | 0 | 0 | 0.5 | 0.5 | 0 | 0 | 0 | 0 | 0 | 0.5 | 0.5 |
| 0.5 | 0.5 | 0.5 | 0 | 0 | 0.5 | 0.5 | 0.5 | 0 | 0 | 0 | 0 | 0.5 | 0.5 | 0.5 |
| 1 | 0.5 | 0.5 | 0 | 0 | 1 | 0.5 | 0.5 | 0 | 0 | 0 | 0 | 1 | 0.5 | 0.5 |
| 0.25 | 1 | 0.5 | 0 | 0 | 0.25 | 1 | 0.5 | 0 | 0 | 0 | 0 | 0.25 | 1 | 0.5 |
| 0.5 | 1 | 0.5 | 0 | 0 | 0.5 | 1 | 0.5 | 0 | 0 | 0 | 0 | 0.5 | 1 | 0.5 |
| 1 | 1 | 0.5 | 0 | 0 | 1 | 1 | 0.5 | 0 | 0 | 0 | 0 | 1 | 1 | 0.5 |
| 0 | 0 | 0.75 | 30 | 30 | 0.25 | 0.25 | 1 | −15 | −15 | −15 | −15 | 0 | 0 | 1 |
| 0.5 | 0 | 0.75 | 30 | 30 | 0.75 | 0.25 | 1 | −15 | −15 | −15 | −15 | 0.5 | 0 | 1 |
| 0.75 | 0 | 0.75 | 30 | 30 | 1 | 0.25 | 1 | −15 | −15 | −15 | −15 | 0.75 | 0 | 1 |
| 0 | 0.25 | 0.75 | 30 | 30 | 0.25 | 0.5 | 1 | 0 | 0 | 0 | 0 | 0.25 | 0.5 | 1 |
| 0.25 | 0.25 | 0.75 | 30 | 30 | 0.5 | 0.5 | 1 | 0 | 0 | 0 | 0 | 0.5 | 0.5 | 1 |
| 0.75 | 0.25 | 0.75 | 30 | 30 | 1 | 0.5 | 1 | 0 | 0 | 0 | 0 | 1 | 0.5 | 1 |
| 0 | 0.75 | 0.75 | 30 | 30 | 0.25 | 1 | 1 | 0 | 0 | 0 | 0 | 0.25 | 1 | 1 |
| 0.25 | 0.75 | 0.75 | 30 | 30 | 0.5 | 1 | 1 | 0 | 0 | 0 | 0 | 0.5 | 1 | 1 |
| 0.75 | 0.75 | 0.75 | 30 | 30 | 1 | 1 | 1 | 0 | 0 | 0 | 0 | 1 | 1 | 1 |

| | | | Driving Wavefrom B Third Sub-frame Group | | | | | | | | |
|---|---|---|---|---|---|---|---|---|---|---|---|
| | | | Applied Voltage | | | | | | N | | |
| C | M | Y | B2-3a | B2-3b | B2-3c | B2-3d | B2-3e | B2-3f | C | M | Y |
| 0 | 0 | 0 | 0 | 0 | 0 | 0 | 0 | 0 | 0 | 0 | 0 |
| 0.5 | 0 | 0 | 0 | 0 | 0 | 0 | 0 | 0 | 0.5 | 0 | 0 |
| 0.75 | 0 | 0 | 10 | 10 | 10 | 10 | 10 | 10 | 1 | 0 | 0 |
| 0 | 0.5 | 0 | 0 | 0 | 0 | 0 | 0 | 0 | 0 | 0.5 | 0 |
| 0.5 | 0.5 | 0 | 0 | 0 | 0 | 0 | 0 | 0 | 0.5 | 0.5 | 0 |
| 1 | 0.5 | 0 | 0 | 0 | 0 | 0 | 0 | 0 | 1 | 0.5 | 0 |
| 0 | 0.75 | 0 | −10 | −10 | −10 | −10 | −10 | −10 | 0 | 1 | 0 |
| 0.25 | 0.75 | 0 | 0 | 0 | 0 | 0 | 0 | 0 | 0.5 | 1 | 0 |
| 0.75 | 0.75 | 0 | 0 | 0 | 0 | 0 | 0 | 0 | 1 | 1 | 0 |
| 0 | 0 | 0.5 | 0 | 0 | 0 | 0 | 0 | 0 | 0 | 0 | 0.5 |
| 0.5 | 0 | 0.5 | 0 | 0 | 0 | 0 | 0 | 0 | 0.5 | 0 | 0.5 |
| 0.75 | 0 | 0.5 | 10 | 10 | 10 | 10 | 10 | 10 | 1 | 0 | 0.5 |
| 0 | 0.5 | 0.5 | 0 | 0 | 0 | 0 | 0 | 0 | 0 | 0.5 | 0.5 |
| 0.5 | 0.5 | 0.5 | 0 | 0 | 0 | 0 | 0 | 0 | 0.5 | 0.5 | 0.5 |
| 1 | 0.5 | 0.5 | 0 | 0 | 0 | 0 | 0 | 0 | 1 | 0.5 | 0.5 |
| 0.25 | 1 | 0.5 | −10 | −10 | −10 | −10 | −10 | −10 | 0 | 1 | 0.5 |
| 0.5 | 1 | 0.5 | 0 | 0 | 0 | 0 | 0 | 0 | 0.5 | 1 | 0.5 |
| 1 | 1 | 0.5 | 0 | 0 | 0 | 0 | 0 | 0 | 1 | 1 | 0.5 |
| 0 | 0 | 0.75 | 0 | 0 | 0 | 0 | 0 | 0 | 0 | 0 | 1 |
| 0.5 | 0 | 0.75 | 0 | 0 | 0 | 0 | 0 | 0 | 0.5 | 0 | 1 |
| 0.75 | 0 | 0.75 | 10 | 10 | 10 | 10 | 10 | 10 | 1 | 0 | 1 |
| 0 | 0.25 | 0.75 | −10 | −10 | −10 | −10 | −10 | −10 | 0 | 0.5 | 1 |
| 0.25 | 0.25 | 0.75 | 0 | 0 | 0 | 0 | 0 | 0 | 0.5 | 0.5 | 1 |
| 0.75 | 0.25 | 0.75 | 0 | 0 | 0 | 0 | 0 | 0 | 1 | 0.5 | 1 |
| 0 | 0.75 | 0.75 | −10 | −10 | −10 | −10 | −10 | −10 | 0 | 1 | 1 |
| 0.25 | 0.75 | 0.75 | 0 | 0 | 0 | 0 | 0 | 0 | 0.5 | 1 | 1 |
| 0.75 | 0.75 | 0.75 | 0 | 0 | 0 | 0 | 0 | 0 | 1 | 1 | 1 |

TABLE 5

| Targetted Renewing Screen Display | | | Reset Period Applied Voltage | | | | Driving Wavefrom A (First Time) Applied Voltage | | | | | |
|---|---|---|---|---|---|---|---|---|---|---|---|---|
| C | M | Y | Ra | Rb | Rc | Rd | A1-1a | A1-2a | A1-2b | A1-3a | A1-3b | A1-3c |
| 0 | 0 | 0 | −30 | −30 | −30 | −30 | 0 | 0 | 0 | 0 | 0 | 0 |
| 0.5 | 0 | 0 | −30 | −30 | −30 | −30 | 0 | 0 | 0 | 10 | 10 | 10 |
| 1 | 0 | 0 | −30 | −30 | −30 | −30 | 0 | 0 | 0 | 10 | 10 | 10 |
| 0 | 0.5 | 0 | −30 | −30 | −30 | −30 | 0 | 15 | 15 | −10 | −10 | −10 |
| 0.5 | 0.5 | 0 | −30 | −30 | −30 | −30 | 0 | 15 | 15 | 0 | 0 | 0 |
| 1 | 0.5 | 0 | −30 | −30 | −30 | −30 | 0 | 15 | 15 | 10 | 10 | 10 |
| 0 | 1 | 0 | −30 | −30 | −30 | −30 | 0 | 15 | 15 | −10 | −10 | −10 |
| 0.5 | 1 | 0 | −30 | −30 | −30 | −30 | 0 | 15 | 15 | −10 | −10 | −10 |
| 1 | 1 | 0 | −30 | −30 | −30 | −30 | 0 | 15 | 15 | 0 | 0 | 0 |
| 0 | 0 | 0.5 | −30 | −30 | −30 | −30 | 30 | −15 | −15 | 0 | 0 | 0 |
| 0.5 | 0 | 0.5 | −30 | −30 | −30 | −30 | 30 | −15 | −15 | 10 | 10 | 10 |
| 1 | 0 | 0.5 | −30 | −30 | −30 | −30 | 30 | −15 | −15 | 10 | 10 | 10 |
| 0 | 0.5 | 0.5 | −30 | −30 | −30 | −30 | 30 | 0 | 0 | −10 | −10 | −10 |
| 0.5 | 0.5 | 0.5 | −30 | −30 | −30 | −30 | 30 | 0 | 0 | 0 | 0 | 0 |
| 1 | 0.5 | 0.5 | −30 | −30 | −30 | −30 | 30 | 0 | 0 | 10 | 10 | 10 |
| 0 | 1 | 0.5 | −30 | −30 | −30 | −30 | 30 | 15 | 15 | −10 | −10 | −10 |
| 0.5 | 1 | 0.5 | −30 | −30 | −30 | −30 | 30 | 15 | 15 | −10 | −10 | −10 |
| 1 | 1 | 0.5 | −30 | −30 | −30 | −30 | 30 | 15 | 15 | 0 | 0 | 0 |
| 0 | 0 | 1 | −30 | −30 | −30 | −30 | 30 | −15 | −15 | 0 | 0 | 0 |
| 0.5 | 0 | 1 | −30 | −30 | −30 | −30 | 30 | −15 | −15 | 10 | 10 | 10 |
| 1 | 0 | 1 | −30 | −30 | −30 | −30 | 30 | −15 | −15 | 10 | 10 | 10 |
| 0 | 0.5 | 1 | −30 | −30 | −30 | −30 | 30 | −15 | −15 | 0 | 0 | 0 |
| 0.5 | 0.5 | 1 | −30 | −30 | −30 | −30 | 30 | −15 | −15 | 0 | 0 | 0 |
| 1 | 0.5 | 1 | −30 | −30 | −30 | −30 | 30 | −15 | −15 | 10 | 10 | 10 |
| 0 | 1 | 1 | −30 | −30 | −30 | −30 | 30 | 0 | 0 | −10 | −10 | −10 |
| 0.5 | 1 | 1 | −30 | −30 | −30 | −30 | 30 | 0 | 0 | −10 | −10 | −10 |
| 1 | 1 | 1 | −30 | −30 | −30 | −30 | 30 | 0 | 0 | 0 | 0 | 0 |

| Targetted Renewing Screen Display | | | Driving Wavefrom B (First Time) Applied Voltage | | | | | | Driving Wavefrom A (Second Time) Applied Voltage | | | | | |
|---|---|---|---|---|---|---|---|---|---|---|---|---|---|---|
| C | M | Y | B1-1a | B1-2a | B1-2b | B1-3a | B1-3b | B1-3c | A2-1a | A2-2a | A2-2b | A2-3a | A2-3b | A2-3c |
| 0 | 0 | 0 | 0 | 0 | 0 | 0 | 0 | 0 | 0 | 0 | 0 | 0 | 0 | 0 |
| 0.5 | 0 | 0 | 0 | 0 | 0 | 0 | 0 | 0 | 0 | 0 | 0 | 10 | 10 | 10 |
| 1 | 0 | 0 | 0 | 0 | 0 | 10 | 10 | 10 | 0 | 0 | 0 | 10 | 10 | 10 |
| 0 | 0.5 | 0 | 0 | 0 | 0 | 0 | 0 | 0 | 0 | 15 | 15 | −10 | −10 | −10 |
| 0.5 | 0.5 | 0 | 0 | 0 | 0 | 0 | 0 | 0 | 0 | 15 | 15 | 0 | 0 | 0 |
| 1 | 0.5 | 0 | 0 | 0 | 0 | 0 | 0 | 0 | 0 | 15 | 15 | 10 | 10 | 10 |
| 0 | 1 | 0 | 0 | 15 | 15 | −10 | −10 | −10 | 0 | 15 | 15 | −10 | −10 | −10 |
| 0.5 | 1 | 0 | 0 | 15 | 15 | 0 | 0 | 0 | 0 | 15 | 15 | −10 | −10 | −10 |
| 1 | 1 | 0 | 0 | 15 | 15 | 0 | 0 | 0 | 0 | 15 | 15 | 0 | 0 | 0 |
| 0 | 0 | 0.5 | 0 | 0 | 0 | 0 | 0 | 0 | 30 | −15 | −15 | 0 | 0 | 0 |
| 0.5 | 0 | 0.5 | 0 | 0 | 0 | 0 | 0 | 0 | 30 | −15 | −15 | 10 | 10 | 10 |
| 1 | 0 | 0.5 | 0 | 0 | 0 | 10 | 10 | 10 | 30 | −15 | −15 | 10 | 10 | 10 |
| 0 | 0.5 | 0.5 | 0 | 0 | 0 | 0 | 0 | 0 | 30 | 0 | 0 | −10 | −10 | −10 |
| 0.5 | 0.5 | 0.5 | 0 | 0 | 0 | 0 | 0 | 0 | 30 | 0 | 0 | 0 | 0 | 0 |
| 1 | 0.5 | 0.5 | 0 | 0 | 0 | 0 | 0 | 0 | 30 | 0 | 0 | 10 | 10 | 10 |
| 0 | 1 | 0.5 | 0 | 0 | 0 | −10 | −10 | −10 | 30 | 15 | 15 | −10 | −10 | −10 |
| 0.5 | 1 | 0.5 | 0 | 0 | 0 | 0 | 0 | 0 | 30 | 15 | 15 | −10 | −10 | −10 |
| 1 | 1 | 0.5 | 0 | 0 | 0 | 0 | 0 | 0 | 30 | 15 | 15 | 0 | 0 | 0 |
| 0 | 0 | 1 | 30 | −15 | −15 | 0 | 0 | 0 | 30 | −15 | −15 | 0 | 0 | 0 |
| 0.5 | 0 | 1 | 30 | −15 | −15 | 0 | 0 | 0 | 30 | −15 | −15 | 10 | 10 | 10 |
| 1 | 0 | 1 | 30 | −15 | −15 | 10 | 10 | 10 | 30 | −15 | −15 | 10 | 10 | 10 |
| 0 | 0.5 | 1 | 30 | 0 | 0 | −10 | −10 | −10 | 30 | −15 | −15 | 0 | 0 | 0 |
| 0.5 | 0.5 | 1 | 30 | 0 | 0 | 0 | 0 | 0 | 30 | −15 | −15 | 0 | 0 | 0 |
| 1 | 0.5 | 1 | 30 | 0 | 0 | 0 | 0 | 0 | 30 | −15 | −15 | 10 | 10 | 10 |
| 0 | 1 | 1 | 30 | 0 | 0 | −10 | −10 | −10 | 30 | 0 | 0 | −10 | −10 | −10 |
| 0.5 | 1 | 1 | 30 | 0 | 0 | 0 | 0 | 0 | 30 | 0 | 0 | −10 | −10 | −10 |
| 1 | 1 | 1 | 30 | 0 | 0 | 0 | 0 | 0 | 30 | 0 | 0 | 0 | 0 | 0 |

| Targetted Renewing Screen Display | | | Driving Wavefrom B (Second Time) Applied Voltage | | | | | |
|---|---|---|---|---|---|---|---|---|
| C | M | Y | B2-1a | B2-2a | B2-2b | B2-3a | B2-3b | B2-3c |
| 0 | 0 | 0 | 0 | 0 | 0 | 0 | 0 | 0 |
| 0.5 | 0 | 0 | 0 | 0 | 0 | 0 | 0 | 0 |
| 1 | 0 | 0 | 0 | 0 | 0 | 10 | 10 | 10 |

TABLE 5-continued

| | | | | | | | | |
|---|---|---|---|---|---|---|---|---|
| 0 | 0.5 | 0 | 0 | 0 | 0 | 0 | 0 | 0 |
| 0.5 | 0.5 | 0 | 0 | 0 | 0 | 0 | 0 | 0 |
| 1 | 0.5 | 0 | 0 | 0 | 0 | 0 | 0 | 0 |
| 0 | 1 | 0 | 0 | 15 | 15 | −10 | −10 | −10 |
| 0.5 | 1 | 0 | 0 | 15 | 15 | 0 | 0 | 0 |
| 1 | 1 | 0 | 0 | 15 | 15 | 0 | 0 | 0 |
| 0 | 0 | 0.5 | 0 | 0 | 0 | 0 | 0 | 0 |
| 0.5 | 0 | 0.5 | 0 | 0 | 0 | 0 | 0 | 0 |
| 1 | 0 | 0.5 | 0 | 0 | 0 | 10 | 10 | 10 |
| 0 | 0.5 | 0.5 | 0 | 0 | 0 | 0 | 0 | 0 |
| 0.5 | 0.5 | 0.5 | 0 | 0 | 0 | 0 | 0 | 0 |
| 1 | 0.5 | 0.5 | 0 | 0 | 0 | 0 | 0 | 0 |
| 0 | 1 | 0.5 | 0 | 0 | 0 | −10 | −10 | −10 |
| 0.5 | 1 | 0.5 | 0 | 0 | 0 | 0 | 0 | 0 |
| 1 | 1 | 0.5 | 0 | 0 | 0 | 0 | 0 | 0 |
| 0 | 0 | 1 | 30 | −15 | −15 | 0 | 0 | 0 |
| 0.5 | 0 | 1 | 30 | −15 | −15 | 0 | 0 | 0 |
| 1 | 0 | 1 | 30 | −15 | −15 | 10 | 10 | 10 |
| 0 | 0.5 | 1 | 30 | 0 | 0 | −10 | −10 | −10 |
| 0.5 | 0.5 | 1 | 30 | 0 | 0 | 0 | 0 | 0 |
| 1 | 0.5 | 1 | 30 | 0 | 0 | 0 | 0 | 0 |
| 0 | 1 | 1 | 30 | 0 | 0 | −10 | −10 | −10 |
| 0.5 | 1 | 1 | 30 | 0 | 0 | 0 | 0 | 0 |
| 1 | 1 | 1 | 30 | 0 | 0 | 0 | 0 | 0 |

Thus, in the second exemplary embodiment, as in the first exemplary embodiment, the application of the unit driving waveform is repeated four times, however, by further increasing the sub-frame frequency and repeating the application of the unit driving waveforms four times or more, changes in color (for example, ΔC, ΔM, ΔY) during the intermediate transition can be made smaller, thereby suppressing the occurrence of the flicker.

Moreover, after the end of the driving period of each unit driving waveform, by applying 0V for several sub-frames, a hue of (0, 0.25, 0), (0, 0.5, 0), and (0, 0.75, 0), . . . can emphasize an intermediate transition state near to the final display state, which can reduce further the flickering of the screen.

Moreover, accordance to the second exemplary embodiment, the application of the unit driving waveform during the entire first to third sub-frame groups is repeated, however, when the targeted renewal display state is to be obtained, the sub-frame group not required for display may be omitted and the application may be repeated only during the first to third sub-frames required.

In th sub-frame period to allow the relative color density of CMY during the intermediate transition to be "0" or "1", unless the relative color density is saturate to be "0" or "1" even when the applying voltage during the sub-frame is applied excessively, the excessive applying voltage can be performed. By shortening a period for application of 0V, the during period can be reduced. Similarly, by allowing the number of sub-frames for each driving period to be smaller, the unit sub-frame time for each driving period may be different.

In the above description, the ground state displaying a white (W) after the resetting is described, however, even if the ground state displays a black (K), the driving waveform can be created in accordance with the same thinking way as above. By selecting a white or a black for each ground state so that the intermediate transition state I-1 or I-2 coincide with the final display state NEXT, it is needless to say that each of the C, M, Y has 3 grade levels, however, the present method can be applied to multiple gray levels including 2 and 3 gray levels.

In the above description, three kinds of particles C, M, Y for CMY three colors are used, however, the present driving method can be applied to KGB three colors instead of the CMY three colors. Further, the driving method can be applied to 4 colors CMYK and 6 colors, CMYRGB as well. In the second exemplary embodiment, since the application of the unit driving waveforms is repeated N times, discomfort "flickering" in the screen renewal can be suppressed and specified intermediate color and gray level displaying can be realized.

Additionally, in the first exemplary embodiment, the number of the sub-frames for transition to the final display state is 8 sub-frames during the reset period, 12 sub-frames during the driving waveform applying period, four times (48 sub-frames) and, therefore, 56 sub-frames in total are required, meanwhile, in the second exemplary embodiment, 28 sub-frames (reduced by half) are enough and the sub-frame frequency can be lowered to a half, thus enabling the reduction of load of device configurations.

In the second exemplary embodiment, as shown in Tables 4-1 to 4-5, the application of the unit driving waveforms A and B is alternately repeated by two times for each, four times in total, as understood from FIGS. 26A and 26B, however, by combining the unit driving waveform A with the unit driving waveform B, these two kinds of unit driving waveforms can be considered as a single unit driving waveform as a whole.

By thinking like this, in the second exemplary embodiment, it can be thought that the application of the unit driving waveform C is repeated two times (at a repeating frequency reduced to a half). As the changes in color during the intermediate transition (for example, ΔC, ΔM, ΔY) becomes finer, the repeating frequency becomes higher and, as the changes in color during the intermediate transition frequency becomes coarse, the repeating frequency becomes lower and, therefore, a designer, if necessary, can set a change in color during the intermediate transition (that is, can set a repeating frequency).

Third Exemplary Embodiment

Next, a third exemplary embodiment of the present invention is described. The third exemplary embodiment differs greatly from the Reference example in that, in the Reference example, a reset period is provided and a previous screen is erased and, after a transition to a white ground state, a renewed screen is displayed, however, in the third exemplary embodiment, by referring to the previous screen and no reset period is provided and a renewed screen is displayed only during a reset period.

Driving Operation

<Case of One Time Application of Driving Waveform>

In the electrophoretic display device of the third exemplary embodiment, when a screen renewal is carried out from a previous screen CURRENT: (C, M, Y)=(Rc', Rm', Ry') to a next screen NEXT: (C, M, Y)=(Rc, Rm, Ry), a reset period is not provided and a transition occurs only from an intermediate transition state I-1→I-2 and finally to a final display state (renewal display state).

A driving period over a plurality of sub-frames includes a first sub-frame group period during which (first voltage applying period) in which voltage of V1, 0, −V1[V] are applied, a second sub-frame group period (second voltage applying period) during which voltage of V2, 0, −V2[V] are applied, and a third sub-frame group period (third voltage applying period) during which V3, 0, −V3[V] are applied.

The first sub-frame group period is a transition period from a display state CURRENT of a previous screen to a first intermediate transition state during which a relative color density of a charged particle Y becomes Ry, the second sub-frame group period is a transition period during which a transition occurs from the first intermediate transition state I-1 to a second intermediate transition state I-2 during which a relative color density of a charged particle M becomes Rm, and the third sub-frame group period is a transition period during which a transition occurs from the second intermediate transition state I-2 to a final display state NEXT.

Here, the relative color density Rx (x=c, m, y) takes 0 to 1 and Rx=0 represents a state where no any X particle (any of charged particles C, M, Y) exists on a surface and Rx=1 represents a state where all X particles have moved to the surface. Therefore, (C, M, Y) represents a state where a white is displayed and (C, M, Y)=(1, 1, 1) represents a state where a black is displayed.

Tables 6-1 to 6-8 show, in the third exemplary embodiment, in the case of three colors CMY each providing three gray levels, a specified driving waveform to display a state from the previous (C, M, Y)=(Rc, Rm, Ry) to a renewed screen (C, M, Y)=(Rc, Rm, Ry). Table 6-1 shows an applying voltage and an intermediate transition state for a transition from CURRENT: (0, 0, 0) to NEXT: (Rc, Rm, Ry) (Rx=three gray levels of 0, 0.5, 1. x=c, m, y). Similarly, Table 6-2 shows an applying voltage and an intermediate transition state for a transition from CURRENT: (1, 0, 0) to NEXT: (Rc, Rm, Ry).

Table 6-3 shows an applying voltage and an intermediate transition state for a transition from CURRENT: (0, 1, 0) to NEXT: (Rc, Rm, Ry). Table 6-4 shows an applying voltage and an intermediate transition state for a transition from CURRENT: (1, 1, 0) to NEXT: (Rc, Rm, Ry). Table 6-5 shows an applying voltage and an intermediate transition state for a transition from CURRENT: (0, 0, 1) to NEXT: (Rc, Rm, Ry). Table 6-6 shows an applying voltage and an intermediate transition state for a transition from CURRENT: (1, 0, 1) to NEXT: (Rc, Rm, Ry). Table 6-7 shows an applying voltage and an intermediate transition state for a transition from CURRENT: (0, 1, 1) to NEXT: (Rc, Rm, Ry). Table 6-8 shows an applying voltage and an intermediate transition state for a transition from CURRENT: (1, 1, 1) to NEXT: (Rc, Rm, Ry).

For simplification, as display states of the previous screen, 8 types of the states including (C, M, Y)=(0, 0, 0), (1, 0, 0), (0, 1, 0), (1, 1, 0), (0, 0, 1), (1, 0, 1), (0, 1, 1) (1, 1, 1) are shown, however, even if the previous screen is other middle tone/color mixing state, according the same thought as shown below, as shown in Table 6-9, driving waveforms can be created.

Here, for simplification, each charged particle C, M, Y is set to be |Qc|>|Qm|>|Qy| and a threshold voltage to initiate the movement of a particle is set to be |Vth(c)|<|Vth(m)|<|Vth(y)|, however, by making weight and size of a particle be different from one another, mobility to a same applied voltage is set to be the same among the charged particles C, M, Y. As shown in Tables 6-1 to 6-8, the driving voltage is set to be |V1|=30V for the first sub-frame group period and is set to be |V2|=15V for the second sub-frame group period and is set to be |V3|=10V for the third sub-frame group period (moreover, it is needless to say that, if necessary, the driving voltage can be set to be any given value.

Moreover, there is a relation of V×Δt=constant, where V is an applying voltage V and Δt is time required for each charged particle C, M, Y to move from a rear to a surface and according to a simple model, the applying voltage is in inverse proportion with the time Δt. In the third exemplary embodiment, the time required for a charged particle C to move from a rear to a surface (or surface to a rear) is set to be 0.2 sec at the |V| being 30V, 0.4 sec at the |V| being 15V, and 0.6 sec at the |V| being 10V.

Also, the time required for a charged particle M to move from a rear to a surface (or from a surface to a rear) is set to be 0.2 sec at the |V| being 30V and 0.4 sec at the |V| being 15V. The time required for a charged particle Y to move from a rear to a surface (or from a surface to a rear) is set to be 0.2 sec at the |V| being 30V.

By taking these conditions into consideration, according to the third exemplary embodiment, a screen renewing period is made of 12 sub-frames, with 1 sub-frame period being 100 msec, (as the first sub-frame period, 2 sub-frames are provided, as the second sub-frame period, 4 sub-frames are provided, and as the third sub-frame period 3, 6 sub-frames are provided).

In Tables 6-1 and 6-9, the first column represents relative color densities (C, M, Y) in a targeted renewal display state. The second column represents relative color densities in a display state of a previous screen. The third column represents voltages applied during the first sub-frame group periods and relative color densities in the first intermediate transition state I-1 after the end of the first sub-frame group period.

The first sub-frame group period is made up of two sub-frames 1*a* and 1*b* and applying voltages that can be taken is +30V, 0V, −30V. The reason why the first sub-frame group period is made up of the two sub-frames is that a response time of a particle at the voltage of 30V is 0.2 sec and 1 sub-frame period is 0.1 sec. The fourth column represents voltages applied during the second sub-frame group periods and the relative color densities in the second intermediate transition state I-2 after the end of the second sub-frame group period.

The second sub-frame group period is made up of 4 sub-frames 2*a*, 2*b*, 2*c*, and 2*d*. The reason why the second sub-frame group period includes the 4 sub-frames is that a response time for a particle at 15V is 0.4 sec and 1 sub-frame period is 0.1 sec.

The fifth column represents voltages applied during the third sub-frame group periods and the relative color densities in the final renewed display state NEXT after the end of the third sub-frame group period. The third sub-frame group period is made up of 6 sub-frames 3*a*, 3*b*, 3*c*, 3*d*, and 3*f* and an applying voltage that can be taken is +10V, 0V, and −10V. The reason why 6 sub-frames are employed is that a response time of a particle at 10V is 0.6 sec and 1 sub-frame period is 0.1 sec.

TABLE 6-1

| Targetted Renewing Screen Display C | M | Y | Current Screen Display CUR C | M | Y | First Sub-frame Group Applied Voltage 1a | 1b | Intermediate Transition I-1 C | M | Y | Second Sub-frame Group Applied Voltage 2a | 2b | 2c | 2d | Intermediate Transition I-2 C | M | Y |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0.5 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 |
| 0 | 0.5 | 0 | 0 | 0 | 0 | 0 | 0 | 0 | 0 | 0 | 15 | 15 | 0 | 0 | 0.5 | 0.5 | 0 |
| 0.5 | 0.5 | 0 | 0 | 0 | 0 | 0 | 0 | 0 | 0 | 0 | 15 | 15 | 0 | 0 | 0.5 | 0.5 | 0 |
| 1 | 0.5 | 0 | 0 | 0 | 0 | 0 | 0 | 0 | 0 | 0 | 15 | 15 | 0 | 0 | 0.5 | 0.5 | 0 |
| 0 | 1 | 0 | 0 | 0 | 0 | 0 | 0 | 0 | 0 | 0 | 15 | 15 | 15 | 15 | 1 | 1 | 0 |
| 0.5 | 1 | 0 | 0 | 0 | 0 | 0 | 0 | 0 | 0 | 0 | 15 | 15 | 15 | 15 | 1 | 1 | 0 |
| 1 | 1 | 0 | 0 | 0 | 0 | 0 | 0 | 0 | 0 | 0 | 15 | 15 | 15 | 15 | 1 | 1 | 0 |
| 0 | 0 | 0.5 | 0 | 0 | 0 | 30 | 0 | 0.5 | 0.5 | 0.5 | −15 | −15 | 0 | 0 | 0 | 0 | 0.5 |
| 0.5 | 0 | 0.5 | 0 | 0 | 0 | 30 | 0 | 0.5 | 0.5 | 0.5 | −15 | −15 | 0 | 0 | 0 | 0 | 0.5 |
| 1 | 0 | 0.5 | 0 | 0 | 0 | 30 | 0 | 0.5 | 0.5 | 0.5 | −15 | −15 | 0 | 0 | 0 | 0 | 0.5 |
| 0 | 0.5 | 0.5 | 0 | 0 | 0 | 30 | 0 | 0.5 | 0.5 | 0.5 | 0 | 0 | 0 | 0 | 0.5 | 0.5 | 0.5 |
| 0.5 | 0.5 | 0.5 | 0 | 0 | 0 | 30 | 0 | 0.5 | 0.5 | 0.5 | 0 | 0 | 0 | 0 | 0.5 | 0.5 | 0.5 |
| 1 | 0.5 | 0.5 | 0 | 0 | 0 | 30 | 0 | 0.5 | 0.5 | 0.5 | 0 | 0 | 0 | 0 | 0.5 | 0.5 | 0.5 |
| 0 | 1 | 0.5 | 0 | 0 | 0 | 30 | 0 | 0.5 | 0.5 | 0.5 | 15 | 15 | 0 | 0 | 1 | 1 | 0.5 |
| 0.5 | 1 | 0.5 | 0 | 0 | 0 | 30 | 0 | 0.5 | 0.5 | 0.5 | 15 | 15 | 0 | 0 | 1 | 1 | 0.5 |
| 1 | 1 | 0.5 | 0 | 0 | 0 | 30 | 0 | 0.5 | 0.5 | 0.5 | 15 | 15 | 0 | 0 | 1 | 1 | 0.5 |
| 0 | 0 | 1 | 0 | 0 | 0 | 30 | 30 | 1 | 1 | 1 | −15 | −15 | −15 | −15 | 0 | 0 | 1 |
| 0.5 | 0 | 1 | 0 | 0 | 0 | 30 | 30 | 1 | 1 | 1 | −15 | −15 | −15 | −15 | 0 | 0 | 1 |
| 1 | 0 | 1 | 0 | 0 | 0 | 30 | 30 | 1 | 1 | 1 | −15 | −15 | −15 | −15 | 0 | 0 | 1 |
| 0 | 0.5 | 1 | 0 | 0 | 0 | 30 | 30 | 1 | 1 | 1 | −15 | −15 | 0 | 0 | 0.5 | 0.5 | 1 |
| 0.5 | 0.5 | 1 | 0 | 0 | 0 | 30 | 30 | 1 | 1 | 1 | −15 | −15 | 0 | 0 | 0.5 | 0.5 | 1 |
| 1 | 0.5 | 1 | 0 | 0 | 0 | 30 | 30 | 1 | 1 | 1 | −15 | −15 | 0 | 0 | 0.5 | 0.5 | 1 |
| 0 | 1 | 1 | 0 | 0 | 0 | 30 | 30 | 1 | 1 | 1 | 0 | 0 | 0 | 0 | 1 | 1 | 1 |
| 0.5 | 1 | 1 | 0 | 0 | 0 | 30 | 30 | 1 | 1 | 1 | 0 | 0 | 0 | 0 | 1 | 1 | 1 |
| 1 | 1 | 1 | 0 | 0 | 0 | 30 | 30 | 1 | 1 | 1 | 0 | 0 | 0 | 0 | 1 | 1 | 1 |

| Targetted Renewing Screen Display C | M | Y | Current Screen Display CUR C | M | Y | Third Sub-frame Group Applied Voltage 3a | 3b | 3c | 3d | 3e | 3f | Renewed Screen Display N C | M | Y |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0.5 | 0 | 0 | 0 | 0 | 0 | 10 | 10 | 10 | 0 | 0 | 0 | 0.5 | 0 | 0 |
| 1 | 0 | 0 | 0 | 0 | 0 | 10 | 10 | 10 | 10 | 10 | 10 | 1 | 0 | 0 |
| 0 | 0.5 | 0 | 0 | 0 | 0 | −10 | −10 | −10 | 0 | 0 | 0 | 0 | 0.5 | 0 |
| 0.5 | 0.5 | 0 | 0 | 0 | 0 | 0 | 0 | 0 | 0 | 0 | 0 | 0.5 | 0.5 | 0 |
| 1 | 0.5 | 0 | 0 | 0 | 0 | 10 | 10 | 10 | 0 | 0 | 0 | 1 | 0.5 | 0 |
| 0 | 1 | 0 | 0 | 0 | 0 | −10 | −10 | −10 | −10 | −10 | −10 | 0 | 1 | 0 |
| 0.5 | 1 | 0 | 0 | 0 | 0 | −10 | −10 | −10 | 0 | 0 | 0 | 0.5 | 1 | 0 |
| 1 | 1 | 0 | 0 | 0 | 0 | 0 | 0 | 0 | 0 | 0 | 0 | 1 | 1 | 0 |
| 0 | 0 | 0.5 | 0 | 0 | 0 | 0 | 0 | 0 | 0 | 0 | 0 | 0 | 0 | 0.5 |
| 0.5 | 0 | 0.5 | 0 | 0 | 0 | 10 | 10 | 10 | 0 | 0 | 0 | 0.5 | 0 | 0.5 |
| 1 | 0 | 0.5 | 0 | 0 | 0 | 10 | 10 | 10 | 10 | 10 | 10 | 1 | 0 | 0.5 |
| 0 | 0.5 | 0.5 | 0 | 0 | 0 | −10 | −10 | −10 | 0 | 0 | 0 | 0 | 0.5 | 0.5 |
| 0.5 | 0.5 | 0.5 | 0 | 0 | 0 | 0 | 0 | 0 | 0 | 0 | 0 | 0.5 | 0.5 | 0.5 |
| 1 | 0.5 | 0.5 | 0 | 0 | 0 | 10 | 10 | 10 | 0 | 0 | 0 | 1 | 0.5 | 0.5 |
| 0 | 1 | 0.5 | 0 | 0 | 0 | −10 | −10 | −10 | −10 | −10 | −10 | 0 | 1 | 0.5 |
| 0.5 | 1 | 0.5 | 0 | 0 | 0 | −10 | −10 | −10 | 0 | 0 | 0 | 0.5 | 1 | 0.5 |
| 1 | 1 | 0.5 | 0 | 0 | 0 | 0 | 0 | 0 | 0 | 0 | 0 | 1 | 1 | 0.5 |
| 0 | 0 | 1 | 0 | 0 | 0 | 0 | 0 | 0 | 0 | 0 | 0 | 0 | 0 | 1 |
| 0.5 | 0 | 1 | 0 | 0 | 0 | 10 | 10 | 10 | 0 | 0 | 0 | 0.5 | 0 | 1 |
| 1 | 0 | 1 | 0 | 0 | 0 | 10 | 10 | 10 | 10 | 10 | 10 | 1 | 0 | 1 |
| 0 | 0.5 | 1 | 0 | 0 | 0 | −10 | −10 | −10 | 0 | 0 | 0 | 0 | 0.5 | 1 |
| 0.5 | 0.5 | 1 | 0 | 0 | 0 | 0 | 0 | 0 | 0 | 0 | 0 | 0.5 | 0.5 | 1 |
| 1 | 0.5 | 1 | 0 | 0 | 0 | 10 | 10 | 10 | 0 | 0 | 0 | 1 | 0.5 | 1 |
| 0 | 1 | 1 | 0 | 0 | 0 | −10 | −10 | −10 | −10 | −10 | −10 | 0 | 1 | 1 |
| 0.5 | 1 | 1 | 0 | 0 | 0 | −10 | −10 | −10 | 0 | 0 | 0 | 0.5 | 1 | 1 |
| 1 | 1 | 1 | 0 | 0 | 0 | 0 | 0 | 0 | 0 | 0 | 0 | 1 | 1 | 1 |

TABLE 6-2

| Targetted Renewing Screen Display | | | Current Screen Display CUR | | | First Sub-frame Group Applied Voltage | | First Sub-frame Group Intermediate Transition I-1 | | | Second Sub-frame Group Applied Voltage | | | | Second Sub-frame Group Intermediate Transition I-2 | | |
|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y |
| 0 | 0 | 0 | 1 | 0 | 0 | 0 | 0 | 1 | 0 | 0 | 0 | 0 | 0 | 0 | 1 | 0 | 0 |
| 0.5 | 0 | 0 | 1 | 0 | 0 | 0 | 0 | 1 | 0 | 0 | 0 | 0 | 0 | 0 | 1 | 0 | 0 |
| 1 | 0 | 0 | 1 | 0 | 0 | 0 | 0 | 1 | 0 | 0 | 0 | 0 | 0 | 0 | 1 | 0 | 0 |
| 0 | 0.5 | 0 | 1 | 0 | 0 | 0 | 0 | 1 | 0 | 0 | 15 | 15 | 0 | 0 | 1 | 0.5 | 0 |
| 0.5 | 0.5 | 0 | 1 | 0 | 0 | 0 | 0 | 1 | 0 | 0 | 15 | 15 | 0 | 0 | 1 | 0.5 | 0 |
| 1 | 0.5 | 0 | 1 | 0 | 0 | 0 | 0 | 1 | 0 | 0 | 15 | 15 | 0 | 0 | 1 | 0.5 | 0 |
| 0 | 1 | 0 | 1 | 0 | 0 | 0 | 0 | 1 | 0 | 0 | 15 | 15 | 15 | 15 | 1 | 1 | 0 |
| 0.5 | 1 | 0 | 1 | 0 | 0 | 0 | 0 | 1 | 0 | 0 | 15 | 15 | 15 | 15 | 1 | 1 | 0 |
| 1 | 1 | 0 | 1 | 0 | 0 | 0 | 0 | 1 | 0 | 0 | 15 | 15 | 15 | 15 | 1 | 1 | 0 |
| 0 | 0 | 0.5 | 1 | 0 | 0 | 30 | 0 | 1 | 0.5 | 0.5 | −15 | −15 | 0 | 0 | 0.5 | 0 | 0.5 |
| 0.5 | 0 | 0.5 | 1 | 0 | 0 | 30 | 0 | 1 | 0.5 | 0.5 | −15 | −15 | 0 | 0 | 0.5 | 0 | 0.5 |
| 1 | 0 | 0.5 | 1 | 0 | 0 | 30 | 0 | 1 | 0.5 | 0.5 | −15 | −15 | 0 | 0 | 0.5 | 0 | 0.5 |
| 0 | 0.5 | 0.5 | 1 | 0 | 0 | 30 | 0 | 1 | 0.5 | 0.5 | 0 | 0 | 0 | 0 | 1 | 0.5 | 0.5 |
| 0.5 | 0.5 | 0.5 | 1 | 0 | 0 | 30 | 0 | 1 | 0.5 | 0.5 | 0 | 0 | 0 | 0 | 1 | 0.5 | 0.5 |
| 1 | 0.5 | 0.5 | 1 | 0 | 0 | 30 | 0 | 1 | 0.5 | 0.5 | 0 | 0 | 0 | 0 | 1 | 0.5 | 0.5 |
| 0 | 1 | 0.5 | 1 | 0 | 0 | 30 | 0 | 1 | 0.5 | 0.5 | 15 | 15 | 0 | 0 | 1 | 1 | 0.5 |
| 0.5 | 1 | 0.5 | 1 | 0 | 0 | 30 | 0 | 1 | 0.5 | 0.5 | 15 | 15 | 0 | 0 | 1 | 1 | 0.5 |
| 1 | 1 | 0.5 | 1 | 0 | 0 | 30 | 0 | 1 | 0.5 | 0.5 | 15 | 15 | 0 | 0 | 1 | 1 | 0.5 |
| 0 | 0 | 1 | 1 | 0 | 0 | 30 | 30 | 1 | 1 | 1 | −15 | −15 | −15 | −15 | 0 | 0 | 1 |
| 0.5 | 0 | 1 | 1 | 0 | 0 | 30 | 30 | 1 | 1 | 1 | −15 | −15 | −15 | −15 | 0 | 0 | 1 |
| 1 | 0 | 1 | 1 | 0 | 0 | 30 | 30 | 1 | 1 | 1 | −15 | −15 | −15 | −15 | 0 | 0 | 1 |
| 0 | 0.5 | 1 | 1 | 0 | 0 | 30 | 30 | 1 | 1 | 1 | −15 | −15 | 0 | 0 | 0.5 | 0.5 | 1 |
| 0.5 | 0.5 | 1 | 1 | 0 | 0 | 30 | 30 | 1 | 1 | 1 | −15 | −15 | 0 | 0 | 0.5 | 0.5 | 1 |
| 1 | 0.5 | 1 | 1 | 0 | 0 | 30 | 30 | 1 | 1 | 1 | −15 | −15 | 0 | 0 | 0.5 | 0.5 | 1 |
| 0 | 1 | 1 | 1 | 0 | 0 | 30 | 30 | 1 | 1 | 1 | 0 | 0 | 0 | 0 | 1 | 1 | 1 |
| 0.5 | 1 | 1 | 1 | 0 | 0 | 30 | 30 | 1 | 1 | 1 | 0 | 0 | 0 | 0 | 1 | 1 | 1 |
| 1 | 1 | 1 | 1 | 0 | 0 | 30 | 30 | 1 | 1 | 1 | 0 | 0 | 0 | 0 | 1 | 1 | 1 |

| Targetted Renewing Screen Display | | | Current Screen Display CUR | | | Third Sub-frame Group Applied Voltage | | | | | | Third Sub-frame Group Renewed Screen Display N | | |
|---|---|---|---|---|---|---|---|---|---|---|---|---|---|---|
| C | M | Y | C | M | Y | 3a | 3b | 3c | 3d | 3e | 3f | C | M | Y |
| 0 | 0 | 0 | 1 | 0 | 0 | −10 | −10 | −10 | −10 | −10 | −10 | 0 | 0 | 0 |
| 0.5 | 0 | 0 | 1 | 0 | 0 | −10 | −10 | −10 | 0 | 0 | 0 | 0.5 | 0 | 0 |
| 1 | 0 | 0 | 1 | 0 | 0 | 0 | 0 | 0 | 0 | 0 | 0 | 1 | 0 | 0 |
| 0 | 0.5 | 0 | 1 | 0 | 0 | −10 | −10 | −10 | −10 | −10 | −10 | 0 | 0.5 | 0 |
| 0.5 | 0.5 | 0 | 1 | 0 | 0 | −10 | −10 | −10 | 0 | 0 | 0 | 0.5 | 0.5 | 0 |
| 1 | 0.5 | 0 | 1 | 0 | 0 | 0 | 0 | 0 | 0 | 0 | 0 | 1 | 0.5 | 0 |
| 0 | 1 | 0 | 1 | 0 | 0 | −10 | −10 | −10 | −10 | −10 | −10 | 0 | 1 | 0 |
| 0.5 | 1 | 0 | 1 | 0 | 0 | −10 | −10 | −10 | 0 | 0 | 0 | 0.5 | 1 | 0 |
| 1 | 1 | 0 | 1 | 0 | 0 | 0 | 0 | 0 | 0 | 0 | 0 | 1 | 1 | 0 |
| 0 | 0 | 0.5 | 1 | 0 | 0 | −10 | −10 | −10 | 0 | 0 | 0 | 0 | 0 | 0.5 |
| 0.5 | 0 | 0.5 | 1 | 0 | 0 | 0 | 0 | 0 | 0 | 0 | 0 | 0.5 | 0 | 0.5 |
| 1 | 0 | 0.5 | 1 | 0 | 0 | 10 | 10 | 10 | 0 | 0 | 0 | 1 | 0 | 0.5 |
| 0 | 0.5 | 0.5 | 1 | 0 | 0 | −10 | −10 | −10 | −10 | −10 | −10 | 0 | 0.5 | 0.5 |
| 0.5 | 0.5 | 0.5 | 1 | 0 | 0 | −10 | −10 | −10 | 0 | 0 | 0 | 0.5 | 0.5 | 0.5 |
| 1 | 0.5 | 0.5 | 1 | 0 | 0 | 0 | 0 | 0 | 0 | 0 | 0 | 1 | 0.5 | 0.5 |
| 0 | 1 | 0.5 | 1 | 0 | 0 | −10 | −10 | −10 | −10 | −10 | −10 | 0 | 1 | 0.5 |
| 0.5 | 1 | 0.5 | 1 | 0 | 0 | −10 | −10 | −10 | 0 | 0 | 0 | 0.5 | 1 | 0.5 |
| 1 | 1 | 0.5 | 1 | 0 | 0 | 0 | 0 | 0 | 0 | 0 | 0 | 1 | 1 | 0.5 |
| 0 | 0 | 1 | 1 | 0 | 0 | 0 | 0 | 0 | 0 | 0 | 0 | 0 | 0 | 1 |
| 0.5 | 0 | 1 | 1 | 0 | 0 | 10 | 10 | 10 | 0 | 0 | 0 | 0.5 | 0 | 1 |
| 1 | 0 | 1 | 1 | 0 | 0 | 10 | 10 | 10 | 10 | 10 | 10 | 1 | 0 | 1 |
| 0 | 0.5 | 1 | 1 | 0 | 0 | −10 | −10 | −10 | 0 | 0 | 0 | 0 | 0.5 | 1 |
| 0.5 | 0.5 | 1 | 1 | 0 | 0 | 0 | 0 | 0 | 0 | 0 | 0 | 0.5 | 0.5 | 1 |
| 1 | 0.5 | 1 | 1 | 0 | 0 | 10 | 10 | 10 | 0 | 0 | 0 | 1 | 0.5 | 1 |
| 0 | 1 | 1 | 1 | 0 | 0 | −10 | −10 | −10 | −10 | 10 | −10 | 0 | 1 | 1 |
| 0.5 | 1 | 1 | 1 | 0 | 0 | −10 | −10 | −10 | 0 | 0 | 0 | 0.5 | 1 | 1 |
| 1 | 1 | 1 | 1 | 0 | 0 | 0 | 0 | 0 | 0 | 0 | 0 | 1 | 1 | 1 |

TABLE 6-3

| Targetted Renewing Screen Display | | | Current Screen Display CUR | | | First Sub-frame Group Applied Voltage | | First Sub-frame Group Intermediate Transition I-1 | | | Second Sub-frame Group Applied Voltage | | | | Second Sub-frame Group Intermediate Transition I-2 | | |
|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y |
| 0 | 0 | 0 | 0 | 1 | 0 | 0 | 0 | 0 | 1 | 0 | −15 | −15 | −15 | −15 | 0 | 0 | 0 |
| 0.5 | 0 | 0 | 0 | 1 | 0 | 0 | 0 | 0 | 1 | 0 | −15 | −15 | −15 | −15 | 0 | 0 | 0 |
| 1 | 0 | 0 | 0 | 1 | 0 | 0 | 0 | 0 | 1 | 0 | −15 | −15 | −15 | −15 | 0 | 0 | 0 |
| 0 | 0.5 | 0 | 0 | 1 | 0 | 0 | 0 | 0 | 1 | 0 | −15 | −15 | 0 | 0 | 0 | 0.5 | 0 |
| 0.5 | 0.5 | 0 | 0 | 1 | 0 | 0 | 0 | 0 | 1 | 0 | −15 | −15 | 0 | 0 | 0 | 0.5 | 0 |
| 1 | 0.5 | 0 | 0 | 1 | 0 | 0 | 0 | 0 | 1 | 0 | −15 | −15 | 0 | 0 | 0 | 0.5 | 0 |
| 0 | 1 | 0 | 0 | 1 | 0 | 0 | 0 | 0 | 1 | 0 | 0 | 0 | 0 | 0 | 0 | 1 | 0 |
| 0.5 | 1 | 0 | 0 | 1 | 0 | 0 | 0 | 0 | 1 | 0 | 0 | 0 | 0 | 0 | 0 | 1 | 0 |
| 1 | 1 | 0 | 0 | 1 | 0 | 0 | 0 | 0 | 1 | 0 | 0 | 0 | 0 | 0 | 0 | 1 | 0 |
| 0 | 0 | 0.5 | 0 | 1 | 0 | 30 | 0 | 0.5 | 1 | 0.5 | −15 | −15 | −15 | −15 | 0 | 0 | 0.5 |
| 0.5 | 0 | 0.5 | 0 | 1 | 0 | 30 | 0 | 0.5 | 1 | 0.5 | −15 | −15 | −15 | −15 | 0 | 0 | 0.5 |
| 1 | 0 | 0.5 | 0 | 1 | 0 | 30 | 0 | 0.5 | 1 | 0.5 | −15 | −15 | −15 | −15 | 0 | 0 | 0.5 |
| 0 | 0.5 | 0.5 | 0 | 1 | 0 | 30 | 0 | 0.5 | 1 | 0.5 | −15 | −15 | 0 | 0 | 0 | 0.5 | 0.5 |
| 0.5 | 0.5 | 0.5 | 0 | 1 | 0 | 30 | 0 | 0.5 | 1 | 0.5 | −15 | −15 | 0 | 0 | 0 | 0.5 | 0.5 |
| 1 | 0.5 | 0.5 | 0 | 1 | 0 | 30 | 0 | 0.5 | 1 | 0.5 | −15 | −15 | 0 | 0 | 0 | 0.5 | 0.5 |
| 0 | 1 | 0.5 | 0 | 1 | 0 | 30 | 0 | 0.5 | 1 | 0.5 | 0 | 0 | 0 | 0 | 0.5 | 1 | 0.5 |
| 0.5 | 1 | 0.5 | 0 | 1 | 0 | 30 | 0 | 0.5 | 1 | 0.5 | 0 | 0 | 0 | 0 | 0.5 | 1 | 0.5 |
| 1 | 1 | 0.5 | 0 | 1 | 0 | 30 | 0 | 0.5 | 1 | 0.5 | 0 | 0 | 0 | 0 | 0.5 | 1 | 0.5 |
| 0 | 0 | 1 | 0 | 1 | 0 | 30 | 30 | 1 | 1 | 1 | −15 | −15 | −15 | −15 | 0 | 0 | 1 |
| 0.5 | 0 | 1 | 0 | 1 | 0 | 30 | 30 | 1 | 1 | 1 | −15 | −15 | −15 | −15 | 0 | 0 | 1 |
| 1 | 0 | 1 | 0 | 1 | 0 | 30 | 30 | 1 | 1 | 1 | −15 | −15 | −15 | −15 | 0 | 0 | 1 |
| 0 | 0.5 | 1 | 0 | 1 | 0 | 30 | 30 | 1 | 1 | 1 | −15 | −15 | 0 | 0 | 0.5 | 0.5 | 1 |
| 0.5 | 0.5 | 1 | 0 | 1 | 0 | 30 | 30 | 1 | 1 | 1 | −15 | −15 | 0 | 0 | 0.5 | 0.5 | 1 |
| 1 | 0.5 | 1 | 0 | 1 | 0 | 30 | 30 | 1 | 1 | 1 | −15 | −15 | 0 | 0 | 0.5 | 0.5 | 1 |
| 0 | 1 | 1 | 0 | 1 | 0 | 30 | 30 | 1 | 1 | 1 | 0 | 0 | 0 | 0 | 1 | 1 | 1 |
| 0.5 | 1 | 1 | 0 | 1 | 0 | 30 | 30 | 1 | 1 | 1 | 0 | 0 | 0 | 0 | 1 | 1 | 1 |
| 1 | 1 | 1 | 0 | 1 | 0 | 30 | 30 | 1 | 1 | 1 | 0 | 0 | 0 | 0 | 1 | 1 | 1 |

| Targetted Renewing Screen Display | | | Current Screen Display CUR | | | Third Sub-frame Group Applied Voltage | | | | | | Third Sub-frame Group Renewed Screen Display N | | |
|---|---|---|---|---|---|---|---|---|---|---|---|---|---|---|
| C | M | Y | C | M | Y | 3a | 3b | 3c | 3d | 3e | 3f | C | M | Y |
| 0 | 0 | 0 | 0 | 1 | 0 | 0 | 0 | 0 | 0 | 0 | 0 | 0 | 0 | 0 |
| 0.5 | 0 | 0 | 0 | 1 | 0 | 10 | 10 | 10 | 0 | 0 | 0 | 0.5 | 0 | 0 |
| 1 | 0 | 0 | 0 | 1 | 0 | 10 | 10 | 10 | 10 | 10 | 10 | 1 | 0 | 0 |
| 0 | 0.5 | 0 | 0 | 1 | 0 | 0 | 0 | 0 | 0 | 0 | 0 | 0 | 0.5 | 0 |
| 0.5 | 0.5 | 0 | 0 | 1 | 0 | 10 | 10 | 10 | 0 | 0 | 0 | 0.5 | 0.5 | 0 |
| 1 | 0.5 | 0 | 0 | 1 | 0 | 10 | 10 | 10 | 10 | 10 | 10 | 1 | 0.5 | 0 |
| 0 | 1 | 0 | 0 | 1 | 0 | 0 | 0 | 0 | 0 | 0 | 0 | 0 | 1 | 0 |
| 0.5 | 1 | 0 | 0 | 1 | 0 | 10 | 10 | 10 | 0 | 0 | 0 | 0.5 | 1 | 0 |
| 1 | 1 | 0 | 0 | 1 | 0 | 10 | 10 | 10 | 10 | 10 | 10 | 1 | 1 | 0 |
| 0 | 0 | 0.5 | 0 | 1 | 0 | 0 | 0 | 0 | 0 | 0 | 0 | 0 | 0 | 0.5 |
| 0.5 | 0 | 0.5 | 0 | 1 | 0 | 10 | 10 | 10 | 0 | 0 | 0 | 0.5 | 0 | 0.5 |
| 1 | 0 | 0.5 | 0 | 1 | 0 | 10 | 10 | 10 | 10 | 10 | 10 | 1 | 0 | 0.5 |
| 0 | 0.5 | 0.5 | 0 | 1 | 0 | −10 | −10 | −10 | 0 | 0 | 0 | 0 | 0.5 | 0.5 |
| 0.5 | 0.5 | 0.5 | 0 | 1 | 0 | 0 | 0 | 0 | 0 | 0 | 0 | 0 | 0.5 | 0.5 |
| 1 | 0.5 | 0.5 | 0 | 1 | 0 | 10 | 10 | 10 | 0 | 0 | 0 | 0.5 | 0.5 | 0.5 |
| 0 | 1 | 0.5 | 0 | 1 | 0 | −10 | −10 | −10 | −10 | −10 | −10 | 0 | 1 | 0.5 |
| 0.5 | 1 | 0.5 | 0 | 1 | 0 | −10 | −10 | −10 | 0 | 0 | 0 | 0 | 1 | 0.5 |
| 1 | 1 | 0.5 | 0 | 1 | 0 | 0 | 0 | 0 | 0 | 0 | 0 | 0.5 | 1 | 0.5 |
| 0 | 0 | 1 | 0 | 1 | 0 | 0 | 0 | 0 | 0 | 0 | 0 | 0 | 0 | 1 |
| 0.5 | 0 | 1 | 0 | 1 | 0 | 10 | 10 | 10 | 0 | 0 | 0 | 0.5 | 0 | 1 |
| 1 | 0 | 1 | 0 | 1 | 0 | 10 | 10 | 10 | 10 | 10 | 10 | 1 | 0 | 1 |
| 0 | 0.5 | 1 | 0 | 1 | 0 | −10 | −10 | −10 | 0 | 0 | 0 | 0 | 0.5 | 1 |
| 0.5 | 0.5 | 1 | 0 | 1 | 0 | 0 | 0 | 0 | 0 | 0 | 0 | 0.5 | 0.5 | 1 |
| 1 | 0.5 | 1 | 0 | 1 | 0 | 10 | 10 | 10 | 0 | 0 | 0 | 1 | 0.5 | 1 |
| 0 | 1 | 1 | 0 | 1 | 0 | −10 | −10 | −10 | −10 | −10 | −10 | 0 | 1 | 1 |
| 0.5 | 1 | 1 | 0 | 1 | 0 | −10 | −10 | −10 | 0 | 0 | 0 | 0.5 | 1 | 1 |
| 1 | 1 | 1 | 0 | 1 | 0 | 0 | 0 | 0 | 0 | 0 | 0 | 1 | 1 | 1 |

TABLE 6-4

| Targetted Renewing Screen Display | | | Current Screen Display CUR | | | First Sub-frame Group Applied Voltage | | First Sub-frame Group Intermediate Transition I-1 | | | Second Sub-frame Group Applied Voltage | | | | Second Sub-frame Group Intermediate Transition I-2 | | |
|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y |
| 0 | 0 | 0 | 1 | 1 | 0 | 0 | 0 | 1 | 1 | 0 | −15 | −15 | −15 | −15 | 0 | 0 | 0 |
| 0.5 | 0 | 0 | 1 | 1 | 0 | 0 | 0 | 1 | 1 | 0 | −15 | −15 | −15 | −15 | 0 | 0 | 0 |
| 1 | 0 | 0 | 1 | 1 | 0 | 0 | 0 | 1 | 1 | 0 | −15 | −15 | −15 | −15 | 0 | 0 | 0 |
| 0 | 0.5 | 0 | 1 | 1 | 0 | 0 | 0 | 1 | 1 | 0 | −15 | −15 | 0 | 0 | 0.5 | 0.5 | 0 |
| 0.5 | 0.5 | 0 | 1 | 1 | 0 | 0 | 0 | 1 | 1 | 0 | −15 | −15 | 0 | 0 | 0.5 | 0.5 | 0 |
| 1 | 0.5 | 0 | 1 | 1 | 0 | 0 | 0 | 1 | 1 | 0 | −15 | −15 | 0 | 0 | 0.5 | 0.5 | 0 |
| 0 | 1 | 0 | 1 | 1 | 0 | 0 | 0 | 1 | 1 | 0 | 0 | 0 | 0 | 0 | 1 | 1 | 0 |
| 0.5 | 1 | 0 | 1 | 1 | 0 | 0 | 0 | 1 | 1 | 0 | 0 | 0 | 0 | 0 | 1 | 1 | 0 |
| 1 | 1 | 0 | 1 | 1 | 0 | 0 | 0 | 1 | 1 | 0 | 0 | 0 | 0 | 0 | 1 | 1 | 0 |
| 0 | 0 | 0.5 | 1 | 1 | 0 | 30 | 0 | 1 | 1 | 0.5 | −15 | −15 | −15 | −15 | 0 | 0 | 0.5 |
| 0.5 | 0 | 0.5 | 1 | 1 | 0 | 30 | 0 | 1 | 1 | 0.5 | −15 | −15 | −15 | −15 | 0 | 0 | 0.5 |
| 1 | 0 | 0.5 | 1 | 1 | 0 | 30 | 0 | 1 | 1 | 0.5 | −15 | −15 | −15 | −15 | 0 | 0 | 0.5 |
| 0 | 0.5 | 0.5 | 1 | 1 | 0 | 30 | 0 | 1 | 1 | 0.5 | −15 | −15 | 0 | 0 | 0.5 | 0.5 | 0.5 |
| 0.5 | 0.5 | 0.5 | 1 | 1 | 0 | 30 | 0 | 1 | 1 | 0.5 | −15 | −15 | 0 | 0 | 0.5 | 0.5 | 0.5 |
| 1 | 0.5 | 0.5 | 1 | 1 | 0 | 30 | 0 | 1 | 1 | 0.5 | −15 | −15 | 0 | 0 | 0.5 | 0.5 | 0.5 |
| 0 | 1 | 0.5 | 1 | 1 | 0 | 30 | 0 | 1 | 1 | 0.5 | 0 | 0 | 0 | 0 | 1 | 1 | 0.5 |
| 0.5 | 1 | 0.5 | 1 | 1 | 0 | 30 | 0 | 1 | 1 | 0.5 | 0 | 0 | 0 | 0 | 1 | 1 | 0.5 |
| 1 | 1 | 0.5 | 1 | 1 | 0 | 30 | 0 | 1 | 1 | 0.5 | 0 | 0 | 0 | 0 | 1 | 1 | 0.5 |
| 0 | 0 | 1 | 1 | 1 | 0 | 30 | 30 | 1 | 1 | 1 | −15 | −15 | −15 | −15 | 0 | 0 | 1 |
| 0.5 | 0 | 1 | 1 | 1 | 0 | 30 | 30 | 1 | 1 | 1 | −15 | −15 | −15 | −15 | 0 | 0 | 1 |
| 1 | 0 | 1 | 1 | 1 | 0 | 30 | 30 | 1 | 1 | 1 | −15 | −15 | −15 | −15 | 0 | 0 | 1 |
| 0 | 0.5 | 1 | 1 | 1 | 0 | 30 | 30 | 1 | 1 | 1 | −15 | −15 | 0 | 0 | 0.5 | 0.5 | 1 |
| 0.5 | 0.5 | 1 | 1 | 1 | 0 | 30 | 30 | 1 | 1 | 1 | −15 | −15 | 0 | 0 | 0.5 | 0.5 | 1 |
| 1 | 0.5 | 1 | 1 | 1 | 0 | 30 | 30 | 1 | 1 | 1 | −15 | −15 | 0 | 0 | 0.5 | 0.5 | 1 |
| 0 | 1 | 1 | 1 | 1 | 0 | 30 | 30 | 1 | 1 | 1 | 0 | 0 | 0 | 0 | 1 | 1 | 1 |
| 0.5 | 1 | 1 | 1 | 1 | 0 | 30 | 30 | 1 | 1 | 1 | 0 | 0 | 0 | 0 | 1 | 1 | 1 |
| 1 | 1 | 1 | 1 | 1 | 0 | 30 | 30 | 1 | 1 | 1 | 0 | 0 | 0 | 0 | 1 | 1 | 1 |

| Targetted Renewing Screen Display | | | Current Screen Display CUR | | | Third Sub-frame Group Applied Voltage | | | | | | Third Sub-frame Group Renewed Screen Display N | | |
|---|---|---|---|---|---|---|---|---|---|---|---|---|---|---|
| C | M | Y | C | M | Y | 3a | 3b | 3c | 3d | 3e | 3f | C | M | Y |
| 0 | 0 | 0 | 1 | 1 | 0 | 0 | 0 | 0 | 0 | 0 | 0 | 0 | 0 | 0 |
| 0.5 | 0 | 0 | 1 | 1 | 0 | 10 | 10 | 10 | 0 | 0 | 0 | 0.5 | 0 | 0 |
| 1 | 0 | 0 | 1 | 1 | 0 | 10 | 10 | 10 | 10 | 10 | 10 | 1 | 0 | 0 |
| 0 | 0.5 | 0 | 1 | 1 | 0 | −10 | −10 | −10 | 0 | 0 | 0 | 0 | 0.5 | 0 |
| 0.5 | 0.5 | 0 | 1 | 1 | 0 | 0 | 0 | 0 | 0 | 0 | 0 | 0.5 | 0.5 | 0 |
| 1 | 0.5 | 0 | 1 | 1 | 0 | 10 | 10 | 10 | 0 | 0 | 0 | 1 | 0.5 | 0 |
| 0 | 1 | 0 | 1 | 1 | 0 | −10 | −10 | −10 | −10 | −10 | −10 | 0 | 1 | 0 |
| 0.5 | 1 | 0 | 1 | 1 | 0 | −10 | −10 | −10 | 0 | 0 | 0 | 0.5 | 1 | 0 |
| 1 | 1 | 0 | 1 | 1 | 0 | 0 | 0 | 0 | 0 | 0 | 0 | 1 | 1 | 0 |
| 0 | 0 | 0.5 | 1 | 1 | 0 | 0 | 0 | 0 | 0 | 0 | 0 | 0 | 0 | 0.5 |
| 0.5 | 0 | 0.5 | 1 | 1 | 0 | 10 | 10 | 10 | 0 | 0 | 0 | 0.5 | 0 | 0.5 |
| 1 | 0 | 0.5 | 1 | 1 | 0 | 10 | 10 | 10 | 10 | 10 | 10 | 1 | 0 | 0.5 |
| 0 | 0.5 | 0.5 | 1 | 1 | 0 | −10 | −10 | −10 | 0 | 0 | 0 | 0 | 0.5 | 0.5 |
| 0.5 | 0.5 | 0.5 | 1 | 1 | 0 | 0 | 0 | 0 | 0 | 0 | 0 | 0.5 | 0.5 | 0.5 |
| 1 | 0.5 | 0.5 | 1 | 1 | 0 | 10 | 10 | 10 | 0 | 0 | 0 | 1 | 0.5 | 0.5 |
| 0 | 1 | 0.5 | 1 | 1 | 0 | −10 | −10 | −10 | −10 | −10 | −10 | 0 | 1 | 0.5 |
| 0.5 | 1 | 0.5 | 1 | 1 | 0 | −10 | −10 | −10 | 0 | 0 | 0 | 0.5 | 1 | 0.5 |
| 1 | 1 | 0.5 | 1 | 1 | 0 | 0 | 0 | 0 | 0 | 0 | 0 | 1 | 1 | 0.5 |
| 0 | 0 | 1 | 1 | 1 | 0 | 0 | 0 | 0 | 0 | 0 | 0 | 0 | 0 | 1 |
| 0.5 | 0 | 1 | 1 | 1 | 0 | 10 | 10 | 10 | 0 | 0 | 0 | 0.5 | 0 | 1 |
| 1 | 0 | 1 | 1 | 1 | 0 | 10 | 10 | 10 | 10 | 10 | 10 | 1 | 0 | 1 |
| 0 | 0.5 | 1 | 1 | 1 | 0 | −10 | −10 | −10 | 0 | 0 | 0 | 0 | 0.5 | 1 |
| 0.5 | 0.5 | 1 | 1 | 1 | 0 | 0 | 0 | 0 | 0 | 0 | 0 | 0.5 | 0.5 | 1 |
| 1 | 0.5 | 1 | 1 | 1 | 0 | 10 | 10 | 10 | 0 | 0 | 0 | 1 | 0.5 | 1 |
| 0 | 1 | 1 | 1 | 1 | 0 | −10 | −10 | −10 | −10 | −10 | −10 | 0 | 1 | 1 |
| 0.5 | 1 | 1 | 1 | 1 | 0 | −10 | −10 | −10 | 0 | 0 | 0 | 0.5 | 1 | 1 |
| 1 | 1 | 1 | 1 | 1 | 0 | 0 | 0 | 0 | 0 | 0 | 0 | 1 | 1 | 1 |

TABLE 6-5

| Targetted Renewing Screen Display | | | Current Screen Display CUR | | | First Sub-frame Group: Applied Voltage | | First Sub-frame Group: Intermediate Transition I-1 | | | Second Sub-frame Group: Applied Voltage | | | | Second Sub-frame Group: Intermediate Transition I-2 | | | Third Sub-frame Group: Applied Voltage | | | | | | Third Sub-frame Group: Renewed Screen Display N | | |
|---|---|---|---|---|---|---|---|---|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y | 3a | 3b | 3c | 3d | 3e | 3f | C | M | Y |
| 0 | 0 | 0 | 0 | 0 | 1 | −30 | −30 | 0 | 0 | 0 | 0 | 0 | 0 | 0 | 0 | 0 | 0 | 0 | 0 | 0 | 0 | 0 | 0 | 0 | 0 | 0 |
| 0.5 | 0 | 0 | 0 | 0 | 1 | −30 | −30 | 0 | 0 | 0 | 0 | 0 | 0 | 0 | 0 | 0 | 0 | 10 | 10 | 10 | 0 | 0 | 0 | 0.5 | 0 | 0 |
| 1 | 0 | 0 | 0 | 0 | 1 | −30 | −30 | 0 | 0 | 0 | 0 | 0 | 0 | 0 | 0 | 0 | 0 | 10 | 10 | 10 | 10 | 10 | 10 | 1 | 0 | 0 |
| 0 | 0.5 | 0 | 0 | 0 | 1 | −30 | −30 | 0 | 0 | 0 | 15 | 15 | 0 | 0 | 0.5 | 0.5 | 0 | −10 | −10 | −10 | 0 | 0 | 0 | 0 | 0.5 | 0 |
| 0.5 | 0.5 | 0 | 0 | 0 | 1 | −30 | −30 | 0 | 0 | 0 | 15 | 15 | 0 | 0 | 0.5 | 0.5 | 0 | 0 | 0 | 0 | 0 | 0 | 0 | 0.5 | 0.5 | 0 |
| 1 | 0.5 | 0 | 0 | 0 | 1 | −30 | −30 | 0 | 0 | 0 | 15 | 15 | 0 | 0 | 0.5 | 0.5 | 0 | 10 | 10 | 10 | 0 | 0 | 0 | 1 | 0.5 | 0 |
| 0 | 1 | 0 | 0 | 0 | 1 | −30 | −30 | 0 | 0 | 0 | 15 | 15 | 15 | 15 | 1 | 1 | 0 | −10 | −10 | −10 | −10 | −10 | −10 | 0 | 1 | 0 |
| 0.5 | 1 | 0 | 0 | 0 | 1 | −30 | −30 | 0 | 0 | 0 | 15 | 15 | 15 | 15 | 1 | 1 | 0 | −10 | −10 | −10 | 0 | 0 | 0 | 0.5 | 1 | 0 |
| 1 | 1 | 0 | 0 | 0 | 1 | −30 | −30 | 0 | 0 | 0 | 15 | 15 | 15 | 15 | 1 | 1 | 0 | 0 | 0 | 0 | 0 | 0 | 0 | 1 | 1 | 0 |
| 0 | 0 | 0.5 | 0 | 0 | 1 | −30 | 0 | 0 | 0 | 0.5 | 0 | 0 | 0 | 0 | 0 | 0 | 0.5 | 0 | 0 | 0 | 0 | 0 | 0 | 0 | 0 | 0.5 |
| 0.5 | 0 | 0.5 | 0 | 0 | 1 | −30 | 0 | 0 | 0 | 0.5 | 0 | 0 | 0 | 0 | 0 | 0 | 0.5 | 10 | 10 | 10 | 0 | 0 | 0 | 0.5 | 0 | 0.5 |
| 1 | 0 | 0.5 | 0 | 0 | 1 | −30 | 0 | 0 | 0 | 0.5 | 0 | 0 | 0 | 0 | 0 | 0 | 0.5 | 10 | 10 | 10 | 10 | 10 | 10 | 1 | 0 | 0.5 |
| 0 | 0.5 | 0.5 | 0 | 0 | 1 | −30 | 0 | 0 | 0 | 0.5 | 15 | 15 | 0 | 0 | 0.5 | 0.5 | 0.5 | −10 | −10 | −10 | 0 | 0 | 0 | 0 | 0.5 | 0.5 |
| 0.5 | 0.5 | 0.5 | 0 | 0 | 1 | −30 | 0 | 0 | 0 | 0.5 | 15 | 15 | 0 | 0 | 0.5 | 0.5 | 0.5 | 0 | 0 | 0 | 0 | 0 | 0 | 0.5 | 0.5 | 0.5 |
| 1 | 0.5 | 0.5 | 0 | 0 | 1 | −30 | 0 | 0 | 0 | 0.5 | 15 | 15 | 0 | 0 | 0.5 | 0.5 | 0.5 | 10 | 10 | 10 | 0 | 0 | 0 | 1 | 0.5 | 0.5 |
| 0 | 1 | 0.5 | 0 | 0 | 1 | −30 | 0 | 0 | 0 | 0.5 | 15 | 15 | 15 | 15 | 1 | 1 | 0.5 | −10 | −10 | −10 | −10 | −10 | −10 | 0 | 1 | 0.5 |
| 0.5 | 1 | 0.5 | 0 | 0 | 1 | −30 | 0 | 0 | 0 | 0.5 | 15 | 15 | 15 | 15 | 1 | 1 | 0.5 | −10 | −10 | −10 | 0 | 0 | 0 | 0.5 | 1 | 0.5 |
| 1 | 1 | 0.5 | 0 | 0 | 1 | −30 | 0 | 0 | 0 | 0.5 | 15 | 15 | 15 | 15 | 1 | 1 | 0.5 | 0 | 0 | 0 | 0 | 0 | 0 | 1 | 1 | 0.5 |
| 0 | 0 | 1 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 1 |
| 0.5 | 0 | 1 | 0 | 0 | 1 | 0 | 0 | 0 | 0 | 1 | 0 | 0 | 0 | 0 | 0 | 0 | 1 | 10 | 10 | 10 | 0 | 0 | 0 | 0.5 | 0 | 1 |
| 1 | 0 | 1 | 0 | 0 | 1 | 0 | 0 | 0 | 0 | 1 | 0 | 0 | 0 | 0 | 0 | 0 | 1 | 10 | 10 | 10 | 10 | 10 | 10 | 1 | 0 | 1 |
| 0 | 0.5 | 1 | 0 | 0 | 1 | 0 | 0 | 0 | 0 | 1 | 15 | 15 | 0 | 0 | 0.5 | 0.5 | 1 | −10 | −10 | −10 | 0 | 0 | 0 | 0 | 0.5 | 1 |
| 0.5 | 0.5 | 1 | 0 | 0 | 1 | 0 | 0 | 0 | 0 | 1 | 15 | 15 | 0 | 0 | 0.5 | 0.5 | 1 | 0 | 0 | 0 | 0 | 0 | 0 | 0.5 | 0.5 | 1 |
| 1 | 0.5 | 1 | 0 | 0 | 1 | 0 | 0 | 0 | 0 | 1 | 15 | 15 | 0 | 0 | 0.5 | 0.5 | 1 | 10 | 10 | 10 | 0 | 0 | 0 | 1 | 0.5 | 1 |
| 0 | 1 | 1 | 0 | 0 | 1 | 0 | 0 | 0 | 0 | 1 | 15 | 15 | 15 | 15 | 1 | 1 | 1 | −10 | −10 | −10 | −10 | −10 | −10 | 0 | 1 | 1 |
| 0.5 | 1 | 1 | 0 | 0 | 1 | 0 | 0 | 0 | 0 | 1 | 15 | 15 | 15 | 15 | 1 | 1 | 1 | −10 | −10 | −10 | 0 | 0 | 0 | 0.5 | 1 | 1 |
| 1 | 1 | 1 | 0 | 0 | 1 | 0 | 0 | 0 | 0 | 1 | 15 | 15 | 15 | 15 | 1 | 1 | 1 | 0 | 0 | 0 | 0 | 0 | 0 | 1 | 1 | 1 |

TABLE 6-6

| Targetted Renewing Screen Display | | | Current Screen Display CUR | | | First Sub-frame Group: Applied Voltage | | First Sub-frame Group: Intermediate Transition I-1 | | | Second Sub-frame Group: Applied Voltage | | | | Second Sub-frame Group: Intermediate Transition I-2 | | | Third Sub-frame Group: Applied Voltage | | | | | | Third Sub-frame Group: Renewed Screen Display N | | |
|---|---|---|---|---|---|---|---|---|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y | 3a | 3b | 3c | 3d | 3e | 3f | C | M | Y |
| 0 | 0 | 0 | 1 | 0 | 1 | −30 | −30 | 0 | 0 | 0 | 0 | 0 | 0 | 0 | 0 | 0 | 0 | 0 | 0 | 0 | 0 | 0 | 0 | 0 | 0 | 0 |
| 0.5 | 0 | 0 | 1 | 0 | 1 | −30 | −30 | 0 | 0 | 0 | 0 | 0 | 0 | 0 | 0 | 0 | 0 | 10 | 10 | 10 | 0 | 0 | 0 | 0.5 | 0 | 0 |
| 1 | 0 | 0 | 1 | 0 | 1 | −30 | −30 | 0 | 0 | 0 | 0 | 0 | 0 | 0 | 0 | 0 | 0 | 10 | 10 | 10 | 10 | 10 | 10 | 1 | 0 | 0 |
| 0 | 0.5 | 0 | 1 | 0 | 1 | −30 | −30 | 0 | 0 | 0 | 15 | 15 | 0 | 0 | 0.5 | 0.5 | 0 | −10 | −10 | −10 | 0 | 0 | 0 | 0 | 0.5 | 0 |
| 0.5 | 0.5 | 0 | 1 | 0 | 1 | −30 | −30 | 0 | 0 | 0 | 15 | 15 | 0 | 0 | 0.5 | 0.5 | 0 | 0 | 0 | 0 | 0 | 0 | 0 | 0.5 | 0.5 | 0 |
| 1 | 0.5 | 0 | 1 | 0 | 1 | −30 | −30 | 0 | 0 | 0 | 15 | 15 | 0 | 0 | 0.5 | 0.5 | 0 | 10 | 10 | 10 | 0 | 0 | 0 | 1 | 0.5 | 0 |
| 0 | 1 | 0 | 1 | 0 | 1 | −30 | −30 | 0 | 0 | 0 | 15 | 15 | 15 | 15 | 1 | 1 | 0 | −10 | −10 | −10 | −10 | −10 | −10 | 0 | 1 | 0 |
| 0.5 | 1 | 0 | 1 | 0 | 1 | −30 | −30 | 0 | 0 | 0 | 15 | 15 | 15 | 15 | 1 | 1 | 0 | −10 | −10 | −10 | 0 | 0 | 0 | 0.5 | 1 | 0 |
| 1 | 1 | 0 | 1 | 0 | 1 | −30 | −30 | 0 | 0 | 0 | 15 | 15 | 15 | 15 | 1 | 1 | 0 | 0 | 0 | 0 | 0 | 0 | 0 | 1 | 1 | 0 |
| 0 | 0 | 0.5 | 1 | 0 | 1 | −30 | 0 | 0.5 | 0 | 0.5 | 0 | 0 | 0 | 0 | 0.5 | 0 | 0.5 | −10 | −10 | −10 | 0 | 0 | 0 | 0 | 0 | 0.5 |
| 0.5 | 0 | 0.5 | 1 | 0 | 1 | −30 | 0 | 0.5 | 0 | 0.5 | 0 | 0 | 0 | 0 | 0.5 | 0 | 0.5 | 0 | 0 | 0 | 0 | 0 | 0 | 0.5 | 0 | 0.5 |
| 1 | 0 | 0.5 | 1 | 0 | 1 | −30 | 0 | 0.5 | 0 | 0.5 | 0 | 0 | 0 | 0 | 0.5 | 0 | 0.5 | 10 | 10 | 10 | 0 | 0 | 0 | 1 | 0 | 0.5 |
| 0 | 0.5 | 0.5 | 1 | 0 | 1 | −30 | 0 | 0.5 | 0 | 0.5 | 15 | 15 | 0 | 0 | 1 | 0.5 | 0.5 | −10 | −10 | −10 | −10 | −10 | −10 | 0 | 0.5 | 0.5 |
| 0.5 | 0.5 | 0.5 | 1 | 0 | 1 | −30 | 0 | 0.5 | 0 | 0.5 | 15 | 15 | 0 | 0 | 1 | 0.5 | 0.5 | −10 | −10 | −10 | 0 | 0 | 0 | 0.5 | 0.5 | 0.5 |
| 1 | 0.5 | 0.5 | 1 | 0 | 1 | −30 | 0 | 0.5 | 0 | 0.5 | 15 | 15 | 0 | 0 | 1 | 0.5 | 0.5 | 0 | 0 | 0 | 0 | 0 | 0 | 1 | 0.5 | 0.5 |
| 0 | 1 | 0.5 | 1 | 0 | 1 | −30 | 0 | 0.5 | 0 | 0.5 | 15 | 15 | 15 | 15 | 1 | 1 | 0.5 | −10 | −10 | −10 | −10 | −10 | −10 | 0 | 1 | 0.5 |
| 0.5 | 1 | 0.5 | 1 | 0 | 1 | −30 | 0 | 0.5 | 0 | 0.5 | 15 | 15 | 15 | 15 | 1 | 1 | 0.5 | −10 | −10 | −10 | 0 | 0 | 0 | 0.5 | 1 | 0.5 |
| 1 | 1 | 0.5 | 1 | 0 | 1 | −30 | 0 | 0.5 | 0 | 0.5 | 15 | 15 | 15 | 15 | 1 | 1 | 0.5 | 0 | 0 | 0 | 0 | 0 | 0 | 1 | 1 | 0.5 |
| 0 | 0 | 1 | 1 | 0 | 1 | 0 | 0 | 1 | 0 | 1 | 0 | 0 | 0 | 0 | 1 | 0 | 1 | −10 | −10 | −10 | −10 | −10 | −10 | 0 | 0 | 1 |
| 0.5 | 0 | 1 | 1 | 0 | 1 | 0 | 0 | 1 | 0 | 1 | 0 | 0 | 0 | 0 | 1 | 0 | 1 | −10 | −10 | −10 | 0 | 0 | 0 | 0.5 | 0 | 1 |
| 1 | 0 | 1 | 1 | 0 | 1 | 0 | 0 | 1 | 0 | 1 | 0 | 0 | 0 | 0 | 1 | 0 | 1 | 0 | 0 | 0 | 0 | 0 | 0 | 1 | 0 | 1 |
| 0 | 0.5 | 1 | 1 | 0 | 1 | 0 | 0 | 1 | 0 | 1 | 15 | 15 | 0 | 0 | 1 | 0.5 | 1 | −10 | −10 | −10 | −10 | −10 | −10 | 0 | 0.5 | 1 |
| 0.5 | 0.5 | 1 | 1 | 0 | 1 | 0 | 0 | 1 | 0 | 1 | 15 | 15 | 0 | 0 | 1 | 0.5 | 1 | −10 | −10 | −10 | 0 | 0 | 0 | 0.5 | 0.5 | 1 |
| 1 | 0.5 | 1 | 1 | 0 | 1 | 0 | 0 | 1 | 0 | 1 | 15 | 15 | 0 | 0 | 1 | 0.5 | 1 | 0 | 0 | 0 | 0 | 0 | 0 | 1 | 0.5 | 1 |
| 0 | 1 | 1 | 1 | 0 | 1 | 0 | 0 | 1 | 0 | 1 | 15 | 15 | 15 | 15 | 1 | 1 | 1 | −10 | −10 | −10 | −10 | −10 | −10 | 0 | 1 | 1 |
| 0.5 | 1 | 1 | 1 | 0 | 1 | 0 | 0 | 1 | 0 | 1 | 15 | 15 | 15 | 15 | 1 | 1 | 1 | −10 | −10 | −10 | 0 | 0 | 0 | 0.5 | 1 | 1 |
| 1 | 1 | 1 | 1 | 0 | 1 | 0 | 0 | 1 | 0 | 1 | 15 | 15 | 15 | 15 | 1 | 1 | 1 | 0 | 0 | 0 | 0 | 0 | 0 | 1 | 1 | 1 |

TABLE 6-7

| Targetted Renewing Screen Display | | | Current Screen Display CUR | | | First Sub-frame Group: Applied Voltage | | First Sub-frame Group: Intermediate Transition I-1 | | | Second Sub-frame Group: Applied Voltage | | | | Second Sub-frame Group: Intermediate Transition I-2 | | |
|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y |
| 0 | 0 | 0 | 0 | 1 | 1 | −30 | −30 | 0 | 0 | 0 | 0 | 0 | 0 | 0 | 0 | 0 | 0 |
| 0.5 | 0 | 0 | 0 | 1 | 1 | −30 | −30 | 0 | 0 | 0 | 0 | 0 | 0 | 0 | 0 | 0 | 0 |
| 1 | 0 | 0 | 0 | 1 | 1 | −30 | −30 | 0 | 0 | 0 | 0 | 0 | 0 | 0 | 0 | 0 | 0 |
| 0 | 0.5 | 0 | 0 | 1 | 1 | −30 | −30 | 0 | 0 | 0 | 15 | 15 | 0 | 0 | 0.5 | 0.5 | 0 |
| 0.5 | 0.5 | 0 | 0 | 1 | 1 | −30 | −30 | 0 | 0 | 0 | 15 | 15 | 0 | 0 | 0.5 | 0.5 | 0 |
| 1 | 0.5 | 0 | 0 | 1 | 1 | −30 | −30 | 0 | 0 | 0 | 15 | 15 | 0 | 0 | 0.5 | 0.5 | 0 |
| 0 | 1 | 0 | 0 | 1 | 1 | −30 | −30 | 0 | 0 | 0 | 15 | 15 | 15 | 15 | 1 | 1 | 0 |
| 0.5 | 1 | 0 | 0 | 1 | 1 | −30 | −30 | 0 | 0 | 0 | 15 | 15 | 15 | 15 | 1 | 1 | 0 |
| 1 | 1 | 0 | 0 | 1 | 1 | −30 | −30 | 0 | 0 | 0 | 15 | 15 | 15 | 15 | 1 | 1 | 0 |
| 0 | 0 | 0.5 | 0 | 1 | 1 | −30 | 0 | 0 | 0.5 | 0.5 | −15 | −15 | 0 | 0 | 0 | 0 | 0.5 |
| 0.5 | 0 | 0.5 | 0 | 1 | 1 | −30 | 0 | 0 | 0.5 | 0.5 | −15 | −15 | 0 | 0 | 0 | 0 | 0.5 |
| 1 | 0 | 0.5 | 0 | 1 | 1 | −30 | 0 | 0 | 0.5 | 0.5 | −15 | −15 | 0 | 0 | 0 | 0 | 0.5 |
| 0 | 0.5 | 0.5 | 0 | 1 | 1 | −30 | 0 | 0 | 0.5 | 0.5 | 0 | 0 | 0 | 0 | 0 | 0.5 | 0.5 |
| 0.5 | 0.5 | 0.5 | 0 | 1 | 1 | −30 | 0 | 0 | 0.5 | 0.5 | 0 | 0 | 0 | 0 | 0 | 0.5 | 0.5 |
| 1 | 0.5 | 0.5 | 0 | 1 | 1 | −30 | 0 | 0 | 0.5 | 0.5 | 0 | 0 | 0 | 0 | 0 | 0.5 | 0.5 |
| 0 | 1 | 0.5 | 0 | 1 | 1 | −30 | 0 | 0 | 0.5 | 0.5 | 15 | 15 | 0 | 0 | 0.5 | 1 | 0.5 |
| 0.5 | 1 | 0.5 | 0 | 1 | 1 | −30 | 0 | 0 | 0.5 | 0.5 | 15 | 15 | 0 | 0 | 0.5 | 1 | 0.5 |
| 1 | 1 | 0.5 | 0 | 1 | 1 | −30 | 0 | 0 | 0.5 | 0.5 | 15 | 15 | 0 | 0 | 0.5 | 1 | 0.5 |
| 0 | 0 | 1 | 0 | 1 | 1 | 0 | 0 | 0 | 1 | 1 | −15 | −15 | −15 | −15 | 0 | 0 | 1 |
| 0.5 | 0 | 1 | 0 | 1 | 1 | 0 | 0 | 0 | 1 | 1 | −15 | −15 | −15 | −15 | 0 | 0 | 1 |
| 1 | 0 | 1 | 0 | 1 | 1 | 0 | 0 | 0 | 1 | 1 | −15 | −15 | −15 | −15 | 0 | 0 | 1 |
| 0 | 0.5 | 1 | 0 | 1 | 1 | 0 | 0 | 0 | 1 | 1 | −15 | −15 | 0 | 0 | 0 | 0.5 | 1 |
| 0.5 | 0.5 | 1 | 0 | 1 | 1 | 0 | 0 | 0 | 1 | 1 | −15 | −15 | 0 | 0 | 0 | 0.5 | 1 |
| 1 | 0.5 | 1 | 0 | 1 | 1 | 0 | 0 | 0 | 1 | 1 | −15 | −15 | 0 | 0 | 0 | 0.5 | 1 |
| 0 | 1 | 1 | 0 | 1 | 1 | 0 | 0 | 0 | 1 | 1 | 0 | 0 | 0 | 0 | 0 | 1 | 1 |
| 0.5 | 1 | 1 | 0 | 1 | 1 | 0 | 0 | 0 | 1 | 1 | 0 | 0 | 0 | 0 | 0 | 1 | 1 |
| 1 | 1 | 1 | 0 | 1 | 1 | 0 | 0 | 0 | 1 | 1 | 0 | 0 | 0 | 0 | 0 | 1 | 1 |

| Targetted Renewing Screen Display | | | Current Screen Display CUR | | | Third Sub-frame Group: Applied Voltage | | | | | | Third Sub-frame Group: Renewed Screen Display N | | |
|---|---|---|---|---|---|---|---|---|---|---|---|---|---|---|
| C | M | Y | C | M | Y | 3a | 3b | 3c | 3d | 3e | 3f | C | M | Y |
| 0 | 0 | 0 | 0 | 1 | 1 | 0 | 0 | 0 | 0 | 0 | 0 | 0 | 0 | 0 |
| 0.5 | 0 | 0 | 0 | 1 | 1 | 10 | 10 | 10 | 0 | 0 | 0 | 0.5 | 0 | 0 |
| 1 | 0 | 0 | 0 | 1 | 1 | 10 | 10 | 10 | 10 | 10 | 10 | 1 | 0 | 0 |
| 0 | 0.5 | 0 | 0 | 1 | 1 | −10 | −10 | −10 | 0 | 0 | 0 | 0 | 0.5 | 0 |
| 0.5 | 0.5 | 0 | 0 | 1 | 1 | 0 | 0 | 0 | 0 | 0 | 0 | 0.5 | 0.5 | 0 |
| 1 | 0.5 | 0 | 0 | 1 | 1 | 10 | 10 | 10 | 0 | 0 | 0 | 1 | 0.5 | 0 |
| 0 | 1 | 0 | 0 | 1 | 1 | −10 | −10 | −10 | −10 | −10 | −10 | 0 | 1 | 0 |
| 0.5 | 1 | 0 | 0 | 1 | 1 | −10 | −10 | −10 | 0 | 0 | 0 | 0.5 | 1 | 0 |
| 1 | 1 | 0 | 0 | 1 | 1 | 0 | 0 | 0 | 0 | 0 | 0 | 1 | 1 | 0 |
| 0 | 0 | 0.5 | 0 | 1 | 1 | 0 | 0 | 0 | 0 | 0 | 0 | 0 | 0 | 0.5 |
| 0.5 | 0 | 0.5 | 0 | 1 | 1 | 10 | 10 | 10 | 0 | 0 | 0 | 0.5 | 0 | 0.5 |
| 1 | 0 | 0.5 | 0 | 1 | 1 | 10 | 10 | 10 | 10 | 10 | 10 | 1 | 0 | 0.5 |
| 0 | 0.5 | 0.5 | 0 | 1 | 1 | 0 | 0 | 0 | 0 | 0 | 0 | 0 | 0.5 | 0.5 |
| 0.5 | 0.5 | 0.5 | 0 | 1 | 1 | 10 | 10 | 10 | 0 | 0 | 0 | 0.5 | 0.5 | 0.5 |
| 1 | 0.5 | 0.5 | 0 | 1 | 1 | 10 | 10 | 10 | 10 | 10 | 10 | 1 | 0.5 | 0.5 |
| 0 | 1 | 0.5 | 0 | 1 | 1 | −10 | −10 | −10 | 0 | 0 | 0 | 0 | 1 | 0.5 |
| 0.5 | 1 | 0.5 | 0 | 1 | 1 | 0 | 0 | 0 | 0 | 0 | 0 | 0.5 | 1 | 0.5 |
| 1 | 1 | 0.5 | 0 | 1 | 1 | 10 | 10 | 10 | 0 | 0 | 0 | 1 | 1 | 0.5 |
| 0 | 0 | 1 | 0 | 1 | 1 | 0 | 0 | 0 | 0 | 0 | 0 | 0 | 0 | 1 |
| 0.5 | 0 | 1 | 0 | 1 | 1 | 10 | 10 | 10 | 0 | 0 | 0 | 0.5 | 0 | 1 |
| 1 | 0 | 1 | 0 | 1 | 1 | 10 | 10 | 10 | 10 | 10 | 10 | 1 | 0 | 1 |
| 0 | 0.5 | 1 | 0 | 1 | 1 | 0 | 0 | 0 | 0 | 0 | 0 | 0 | 0.5 | 1 |
| 0.5 | 0.5 | 1 | 0 | 1 | 1 | 10 | 10 | 10 | 0 | 0 | 0 | 0.5 | 0.5 | 1 |
| 1 | 0.5 | 1 | 0 | 1 | 1 | 10 | 10 | 10 | 10 | 10 | 10 | 1 | 0.5 | 1 |
| 0 | 1 | 1 | 0 | 1 | 1 | 0 | 0 | 0 | 0 | 0 | 0 | 0 | 1 | 1 |
| 0.5 | 1 | 1 | 0 | 1 | 1 | 10 | 10 | 10 | 0 | 0 | 0 | 0.5 | 1 | 1 |
| 1 | 1 | 1 | 0 | 1 | 1 | 10 | 10 | 10 | 10 | 10 | 10 | 1 | 1 | 1 |

TABLE 6-8

| Targetted Renewing Screen Display | | | Current Screen Display CUR | | | First Sub-frame Group Applied Voltage | | First Sub-frame Group Intermediate Transition I-1 | | | Second Sub-frame Group Applied Voltage | | | | Second Sub-frame Group Intermediate Transition I-2 | | |
|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y |
| 0 | 0 | 0 | 1 | 1 | 1 | −30 | −30 | 0 | 0 | 0 | 0 | 0 | 0 | 0 | 0 | 0 | 0 |
| 0.5 | 0 | 0 | 1 | 1 | 1 | −30 | −30 | 0 | 0 | 0 | 0 | 0 | 0 | 0 | 0 | 0 | 0 |
| 1 | 0 | 0 | 1 | 1 | 1 | −30 | −30 | 0 | 0 | 0 | 0 | 0 | 0 | 0 | 0 | 0 | 0 |
| 0 | 0.5 | 0 | 1 | 1 | 1 | −30 | −30 | 0 | 0 | 0 | 15 | 15 | 0 | 0 | 0.5 | 0.5 | 0 |
| 0.5 | 0.5 | 0 | 1 | 1 | 1 | −30 | −30 | 0 | 0 | 0 | 15 | 15 | 0 | 0 | 0.5 | 0.5 | 0 |
| 1 | 0.5 | 0 | 1 | 1 | 1 | −30 | −30 | 0 | 0 | 0 | 15 | 15 | 0 | 0 | 0.5 | 0.5 | 0 |
| 0 | 1 | 0 | 1 | 1 | 1 | −30 | −30 | 0 | 0 | 0 | 15 | 15 | 15 | 15 | 1 | 1 | 0 |
| 0.5 | 1 | 0 | 1 | 1 | 1 | −30 | −30 | 0 | 0 | 0 | 15 | 15 | 15 | 15 | 1 | 1 | 0 |
| 1 | 1 | 0 | 1 | 1 | 1 | −30 | −30 | 0 | 0 | 0 | 15 | 15 | 15 | 15 | 1 | 1 | 0 |
| 0 | 0 | 0.5 | 1 | 1 | 1 | −30 | 0 | 0.5 | 0.5 | 0.5 | −15 | −15 | 0 | 0 | 0 | 0 | 0.5 |
| 0.5 | 0 | 0.5 | 1 | 1 | 1 | −30 | 0 | 0.5 | 0.5 | 0.5 | −15 | −15 | 0 | 0 | 0 | 0 | 0.5 |
| 1 | 0 | 0.5 | 1 | 1 | 1 | −30 | 0 | 0.5 | 0.5 | 0.5 | −15 | −15 | 0 | 0 | 0 | 0 | 0.5 |
| 0 | 0.5 | 0.5 | 1 | 1 | 1 | −30 | 0 | 0.5 | 0.5 | 0.5 | 0 | 0 | 0 | 0 | 0.5 | 0.5 | 0.5 |
| 0.5 | 0.5 | 0.5 | 1 | 1 | 1 | −30 | 0 | 0.5 | 0.5 | 0.5 | 0 | 0 | 0 | 0 | 0.5 | 0.5 | 0.5 |
| 1 | 0.5 | 0.5 | 1 | 1 | 1 | −30 | 0 | 0.5 | 0.5 | 0.5 | 0 | 0 | 0 | 0 | 0.5 | 0.5 | 0.5 |
| 0 | 1 | 0.5 | 1 | 1 | 1 | −30 | 0 | 0.5 | 0.5 | 0.5 | 15 | 15 | 0 | 0 | 1 | 1 | 0.5 |
| 0.5 | 1 | 0.5 | 1 | 1 | 1 | −30 | 0 | 0.5 | 0.5 | 0.5 | 15 | 15 | 0 | 0 | 1 | 1 | 0.5 |
| 1 | 1 | 0.5 | 1 | 1 | 1 | −30 | 0 | 0.5 | 0.5 | 0.5 | 15 | 15 | 0 | 0 | 1 | 1 | 0.5 |
| 0 | 0 | 1 | 1 | 1 | 1 | 0 | 0 | 1 | 1 | 1 | −15 | −15 | −15 | −15 | 0 | 0 | 1 |
| 0.5 | 0 | 1 | 1 | 1 | 1 | 0 | 0 | 1 | 1 | 1 | −15 | −15 | −15 | −15 | 0 | 0 | 1 |
| 1 | 0 | 1 | 1 | 1 | 1 | 0 | 0 | 1 | 1 | 1 | −15 | −15 | −15 | −15 | 0 | 0 | 1 |
| 0 | 0.5 | 1 | 1 | 1 | 1 | 0 | 0 | 1 | 1 | 1 | −15 | −15 | 0 | 0 | 0.5 | 0.5 | 1 |
| 0.5 | 0.5 | 1 | 1 | 1 | 1 | 0 | 0 | 1 | 1 | 1 | −15 | −15 | 0 | 0 | 0.5 | 0.5 | 1 |
| 1 | 0.5 | 1 | 1 | 1 | 1 | 0 | 0 | 1 | 1 | 1 | −15 | −15 | 0 | 0 | 0.5 | 0.5 | 1 |
| 0 | 1 | 1 | 1 | 1 | 1 | 0 | 0 | 1 | 1 | 1 | 0 | 0 | 0 | 0 | 1 | 1 | 1 |
| 0.5 | 1 | 1 | 1 | 1 | 1 | 0 | 0 | 1 | 1 | 1 | 0 | 0 | 0 | 0 | 1 | 1 | 1 |
| 1 | 1 | 1 | 1 | 1 | 1 | 0 | 0 | 1 | 1 | 1 | 0 | 0 | 0 | 0 | 1 | 1 | 1 |

| Targetted Renewing Screen Display | | | Current Screen Display CUR | | | Third Sub-frame Group Applied Voltage | | | | | | Third Sub-frame Group Renewed Screen Display N | | |
|---|---|---|---|---|---|---|---|---|---|---|---|---|---|---|
| C | M | Y | C | M | Y | 3a | 3b | 3c | 3d | 3e | 3f | C | M | Y |
| 0 | 0 | 0 | 1 | 1 | 1 | 0 | 0 | 0 | 0 | 0 | 0 | 0 | 0 | 0 |
| 0.5 | 0 | 0 | 1 | 1 | 1 | 10 | 10 | 10 | 0 | 0 | 0 | 0.5 | 0 | 0 |
| 1 | 0 | 0 | 1 | 1 | 1 | 10 | 10 | 10 | 10 | 10 | 10 | 1 | 0 | 0 |
| 0 | 0.5 | 0 | 1 | 1 | 1 | −10 | −10 | −10 | 0 | 0 | 0 | 0 | 0.5 | 0 |
| 0.5 | 0.5 | 0 | 1 | 1 | 1 | 0 | 0 | 0 | 0 | 0 | 0 | 0.5 | 0.5 | 0 |
| 1 | 0.5 | 0 | 1 | 1 | 1 | 10 | 10 | 10 | 0 | 0 | 0 | 1 | 0.5 | 0 |
| 0 | 1 | 0 | 1 | 1 | 1 | −10 | −10 | −10 | −10 | −10 | −10 | 0 | 1 | 0 |
| 0.5 | 1 | 0 | 1 | 1 | 1 | −10 | −10 | −10 | 0 | 0 | 0 | 0.5 | 1 | 0 |
| 1 | 1 | 0 | 1 | 1 | 1 | 0 | 0 | 0 | 0 | 0 | 0 | 1 | 1 | 0 |
| 0 | 0 | 0.5 | 1 | 1 | 1 | 0 | 0 | 0 | 0 | 0 | 0 | 0 | 0 | 0.5 |
| 0.5 | 0 | 0.5 | 1 | 1 | 1 | 10 | 10 | 10 | 0 | 0 | 0 | 0.5 | 0 | 0.5 |
| 1 | 0 | 0.5 | 1 | 1 | 1 | 10 | 10 | 10 | 10 | 10 | 10 | 1 | 0 | 0.5 |
| 0 | 0.5 | 0.5 | 1 | 1 | 1 | −10 | −10 | −10 | 0 | 0 | 0 | 0 | 0.5 | 0.5 |
| 0.5 | 0.5 | 0.5 | 1 | 1 | 1 | 0 | 0 | 0 | 0 | 0 | 0 | 0.5 | 0.5 | 0.5 |
| 1 | 0.5 | 0.5 | 1 | 1 | 1 | 10 | 10 | 10 | 0 | 0 | 0 | 1 | 0.5 | 0.5 |
| 0 | 1 | 0.5 | 1 | 1 | 1 | −10 | −10 | −10 | −10 | −10 | −10 | 0 | 1 | 0.5 |
| 0.5 | 1 | 0.5 | 1 | 1 | 1 | −10 | −10 | −10 | 0 | 0 | 0 | 0.5 | 1 | 0.5 |
| 1 | 1 | 0.5 | 1 | 1 | 1 | 0 | 0 | 0 | 0 | 0 | 0 | 1 | 1 | 0.5 |
| 0 | 0 | 1 | 1 | 1 | 1 | 0 | 0 | 0 | 0 | 0 | 0 | 0 | 0 | 1 |
| 0.5 | 0 | 1 | 1 | 1 | 1 | 10 | 10 | 10 | 0 | 0 | 0 | 0.5 | 0 | 1 |
| 1 | 0 | 1 | 1 | 1 | 1 | 10 | 10 | 10 | 10 | 10 | 10 | 1 | 0 | 1 |
| 0 | 0.5 | 1 | 1 | 1 | 1 | −10 | −10 | −10 | 0 | 0 | 0 | 0 | 0.5 | 1 |
| 0.5 | 0.5 | 1 | 1 | 1 | 1 | 0 | 0 | 0 | 0 | 0 | 0 | 0.5 | 0.5 | 1 |
| 1 | 0.5 | 1 | 1 | 1 | 1 | 10 | 10 | 10 | 0 | 0 | 0 | 1 | 0.5 | 1 |
| 0 | 1 | 1 | 1 | 1 | 1 | −10 | −10 | −10 | −10 | −10 | −10 | 0 | 1 | 1 |
| 0.5 | 1 | 1 | 1 | 1 | 1 | −10 | −10 | −10 | 0 | 0 | 0 | 0.5 | 1 | 1 |
| 1 | 1 | 1 | 1 | 1 | 1 | 0 | 0 | 0 | 0 | 0 | 0 | 1 | 1 | 1 |

TABLE 6-9

| Targetted Renewing Screen Display | | | Current Screen Display CUR | | | First Sub-frame Group Applied Voltage | | First Sub-frame Group Intermediate Transition I-1 | | | Second Sub-frame Group Applied Voltage | | | | Second Sub-frame Group Intermediate Transition I-2 | | | Third Sub-frame Group Applied Voltage | | | | | | Third Sub-frame Group Renewed Screen Display N | | |
|---|---|---|---|---|---|---|---|---|---|---|---|---|---|---|---|---|---|---|---|---|---|---|---|---|---|---|
| C | M | Y | C | M | Y | 1a | 1b | C | M | Y | 2a | 2b | 2c | 2d | C | M | Y | 3a | 3b | 3c | 3d | 3e | 3f | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.5 | 0 | 0 | 0 | 0 | 0.5 | 0 | 0 | 0 | 0 | 0 | 0 | 0.5 | 0 | 0 | 10 | 10 | 10 | 0 | 0 | 0 | 1 | 0 | 0 |
| 1 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 1 | 0 | 0 |
| 0 | 1 | 0 | 0 | 0.5 | 0 | 0 | 0 | 0 | 0.5 | 0 | 15 | 15 | 0 | 0 | 0.5 | 1 | 0 | −10 | −10 | −10 | 0 | 0 | 0 | 0 | 1 | 0 |
| 1 | 1 | 0 | 0.5 | 0.5 | 0 | 0 | 0 | 0.5 | 0.5 | 0 | 15 | 15 | 0 | 0 | 1 | 1 | 0 | 0 | 0 | 0 | 0 | 0 | 0 | 1 | 1 | 0 |
| 1 | 1 | 0 | 1 | 0.5 | 0 | 0 | 0 | 1 | 0.5 | 0 | 15 | 15 | 0 | 0 | 1 | 1 | 0 | 0 | 0 | 0 | 0 | 0 | 0 | 1 | 1 | 0 |
| 0 | 1 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 1 | 0 |
| 1 | 1 | 0 | 0.5 | 1 | 0 | 0 | 0 | 0.5 | 1 | 0 | 0 | 0 | 0 | 0 | 0.5 | 1 | 0 | 10 | 10 | 10 | 0 | 0 | 0 | 1 | 1 | 0 |
| 1 | 1 | 0 | 1 | 1 | 0 | 0 | 0 | 1 | 1 | 0 | 0 | 0 | 0 | 0 | 1 | 1 | 0 | 0 | 0 | 0 | 0 | 0 | 0 | 1 | 1 | 0 |
| 0 | 0 | 1 | 0 | 0 | 0.5 | 30 | 0 | 0.5 | 0.5 | 1 | −15 | −15 | 0 | 0 | 0 | 0 | 1 | 0 | 0 | 0 | 0 | 0 | 0 | 0 | 0 | 1 |
| 1 | 0 | 1 | 0.5 | 0 | 0.5 | 30 | 0 | 1 | 0.5 | 1 | −15 | −15 | 0 | 0 | 0.5 | 0 | 1 | 10 | 10 | 10 | 0 | 0 | 0 | 1 | 0 | 1 |
| 1 | 0 | 1 | 1 | 0 | 0.5 | 30 | 0 | 1 | 0.5 | 1 | −15 | −15 | 0 | 0 | 0.5 | 0 | 1 | −10 | −10 | −10 | 0 | 0 | 0 | 0 | 0 | 1 |
| 0 | 1 | 1 | 0 | 0.5 | 0.5 | 30 | 0 | 0.5 | 1 | 1 | 0 | 0 | 0 | 0 | 0.5 | 1 | 1 | −10 | −10 | −10 | 0 | 0 | 0 | 0 | 1 | 1 |
| 1 | 1 | 1 | 0.5 | 0.5 | 0.5 | 30 | 0 | 1 | 1 | 1 | 0 | 0 | 0 | 0 | 1 | 1 | 1 | 0 | 0 | 0 | 0 | 0 | 0 | 1 | 1 | 1 |
| 1 | 1 | 1 | 1 | 0.5 | 0.5 | 30 | 0 | 1 | 1 | 1 | 0 | 0 | 0 | 0 | 1 | 1 | 1 | 0 | 0 | 0 | 0 | 0 | 0 | 1 | 1 | 1 |
| 0 | 1 | 1 | 0 | 1 | 0.5 | 30 | 0 | 0.5 | 1 | 1 | 0 | 0 | 0 | 0 | 0.5 | 1 | 1 | −10 | −10 | −10 | 0 | 0 | 0 | 0 | 1 | 1 |
| 1 | 1 | 1 | 0.5 | 1 | 0.5 | 30 | 0 | 1 | 1 | 1 | 0 | 0 | 0 | 0 | 1 | 1 | 1 | 0 | 0 | 0 | 0 | 0 | 0 | 1 | 1 | 1 |
| 1 | 1 | 1 | 1 | 1 | 0.5 | 30 | 0 | 1 | 1 | 1 | 0 | 0 | 0 | 0 | 1 | 1 | 1 | 0 | 0 | 0 | 0 | 0 | 0 | 1 | 1 | 1 |
| 0 | 0 | 1 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 1 |
| 1 | 0 | 1 | 0.5 | 0 | 1 | 0 | 0 | 0.5 | 0 | 1 | 0 | 0 | 0 | 0 | 0.5 | 0 | 1 | −10 | −10 | −10 | 0 | 0 | 0 | 0 | 0 | 1 |
| 1 | 0 | 1 | 1 | 0 | 1 | 0 | 0 | 1 | 0 | 1 | 0 | 0 | 0 | 0 | 1 | 0 | 1 | 0 | 0 | 0 | 0 | 0 | 0 | 1 | 0 | 1 |
| 0 | 1 | 1 | 0 | 0.5 | 1 | 0 | 0 | 0 | 0.5 | 1 | 15 | 15 | 0 | 0 | 0.5 | 1 | 1 | −10 | −10 | −10 | 0 | 0 | 0 | 0 | 1 | 1 |
| 1 | 1 | 1 | 0.5 | 0.5 | 1 | 0 | 0 | 0.5 | 0.5 | 1 | 15 | 15 | 0 | 0 | 1 | 1 | 1 | 0 | 0 | 0 | 0 | 0 | 0 | 1 | 1 | 1 |
| 1 | 1 | 1 | 1 | 0.5 | 1 | 0 | 0 | 1 | 0.5 | 1 | −15 | −15 | 0 | 0 | 0.5 | 0 | 1 | 10 | 10 | 10 | 0 | 0 | 0 | 1 | 0 | 1 |
| 0 | 1 | 1 | 0 | 1 | 1 | 0 | 0 | 0 | 1 | 1 | 0 | 0 | 0 | 0 | 0 | 1 | 1 | 0 | 0 | 0 | 0 | 0 | 0 | 0 | 1 | 1 |
| 1 | 1 | 1 | 0.5 | 1 | 1 | 0 | 0 | 0.5 | 1 | 1 | 0 | 0 | 0 | 0 | 0.5 | 1 | 1 | 10 | 10 | 10 | 0 | 0 | 0 | 1 | 1 | 1 |
| 1 | 1 | 1 | 1 | 1 | 1 | 0 | 0 | 1 | 1 | 1 | 0 | 0 | 0 | 0 | 1 | 1 | 1 | 0 | 0 | 0 | 0 | 0 | 0 | 1 | 1 | 1 |

Next, as an example, by referring to Table 6-2, renewing driving for the case when a display state of a previous screen (C, M, Y)=(1, 0, 0) is described.

During the first sub-frame group period, since a relative color density Y of a previous screen is 0, corresponding to a relative color density of a targeted charged particle, when a targeted relative color density (Y) is 0, the application of an applying voltage is not required and, therefore, 0V is applied during two sub-frames and during an intermediate transition state I-1: (C, M, Y)=(1, 0, 0), the display state of a previous screen is maintained. Meanwhile, when a targeted relative color density (Y) is 0.5, by applying an applying voltage of −30V only during 1 sub-frame period, a transition is allowed to occur to an intermediate transition state I-1: (C, M, Y)=(1, 0.5, 0.5).

When a targeted relative color density (Y) is 1, by applying an applying voltage of 30V only during 2 sub-frame periods, a transition is allowed to occur to an intermediate transition state I-1: (C, M, Y)=(1, 1, 1). This causes a transition from a previous screen display state CURRENT: (C, M, Y)=(1, 0, 1) to the first intermediate display state I-1: (C, M, Y)=(X, X, Ry) (X is a given value).

During the second sub-frame group period, by referring to a relative color density of a charged particle M of the first intermediate transition state I-1, so that a relative color density of the charged particle M becomes a targeted relative color density of the charged particle M, −15V or 15V is applied in specified numbers of times. For example, with a relative color density of M of the first intermediate transition state I-1 being set to be Rm' and with a relative color density of targeted M being set to be Rm, when Rm-Rm'=0, the application of the voltage is not required and, therefore, 0V is applied for 4 sub-frames.

Meanwhile, when Rm-Rm'=0.5, 15V is applied for 2 sub-frames and when Rm-Rm'=1, 15V is applied for 4 sub-frames. Conversely, when Rm-Rm'=−0.5, −15V is applied for 2 sub-frames and, when Rm-Rm'=−1, −15V is applied for 4 sub-frames. This causes a transition from the first intermediate transition state I-1: (C, M, Y)=(X, X, Ry) to the second intermediate transition state I-2: (C, M, Y)=(X, Rm, Ry) (X is a given value).

During the third sub-frame group period, by referring to a relative color density of a charged particle C of the second intermediate transition state I-2, so that a relative color density of the charged particle C becomes a targeted relative color density of the charged particle C, −10V or 10V is applied in specified numbers of times.

For example, with a relative color density of C of the first intermediate transition state I-1 being set to be Rc' and with a relative color density of targeted C being set to be Rc, when Rc-Rc'=0, the application of the voltage is not required and, therefore, 0V is applied for 6 sub-frames. when Rc-Rc'=0.5, 10V is applied for 3 sub-frames and when Rc-Rc'=1, 10V is applied for 6 sub-frames.

Conversely, when Rm-Rm'=−0.5, −15V is applied for 2 sub-frames and when Rc-Rc'=−0.5, −10V is applied for 3 sub-frames. This causes a transition from the second intermediate transition state I-2: (C, M, Y)=(x, Rm, Ry) to a targeted final display state NEXT: (C, M, Y)=(x, Rm, Ry).

Figure 27A:
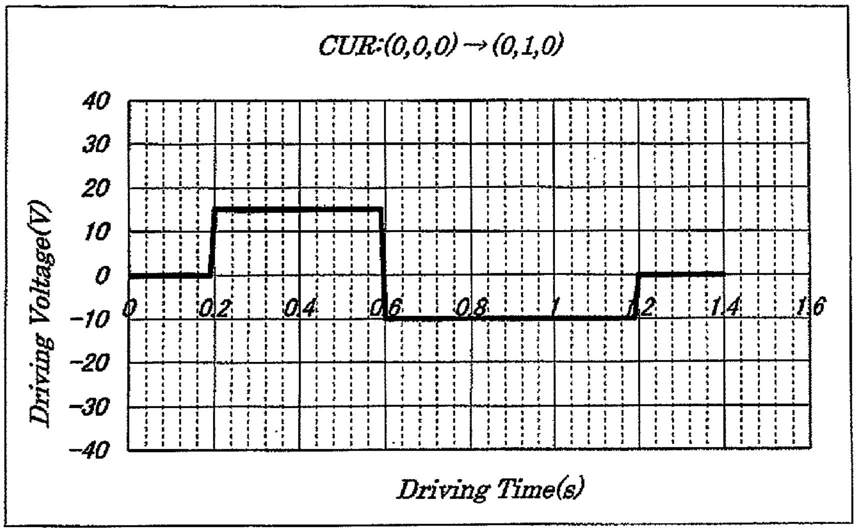
FIGS. 27A, 27B and 27C are diagrams showing a driving voltage waveform to be applied to a display section (electronic electrophoretic display device) according to the second exemplary embodiment.
Figure 27B:
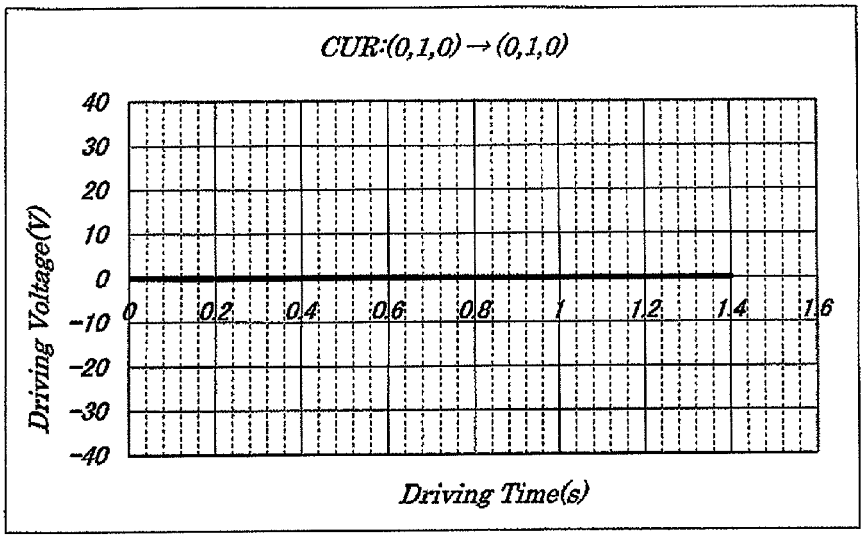
Figure 27C:
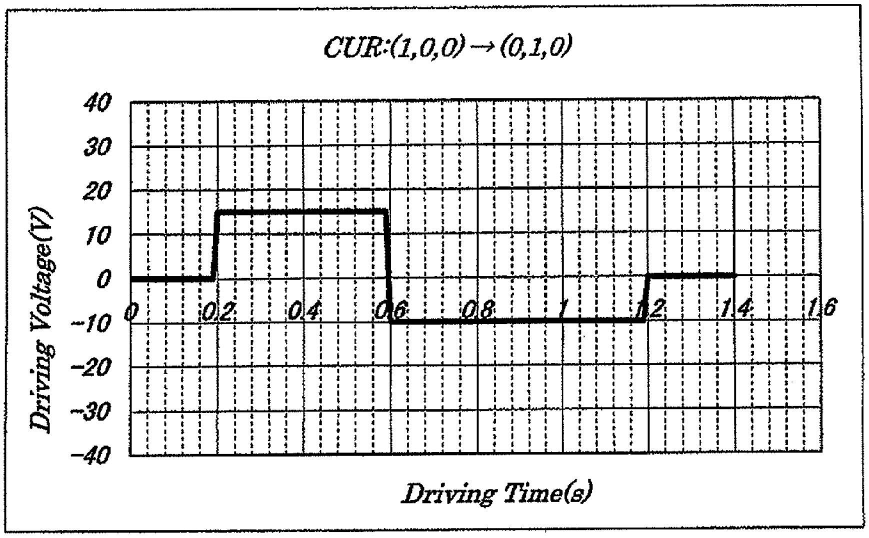
Figure 28A:
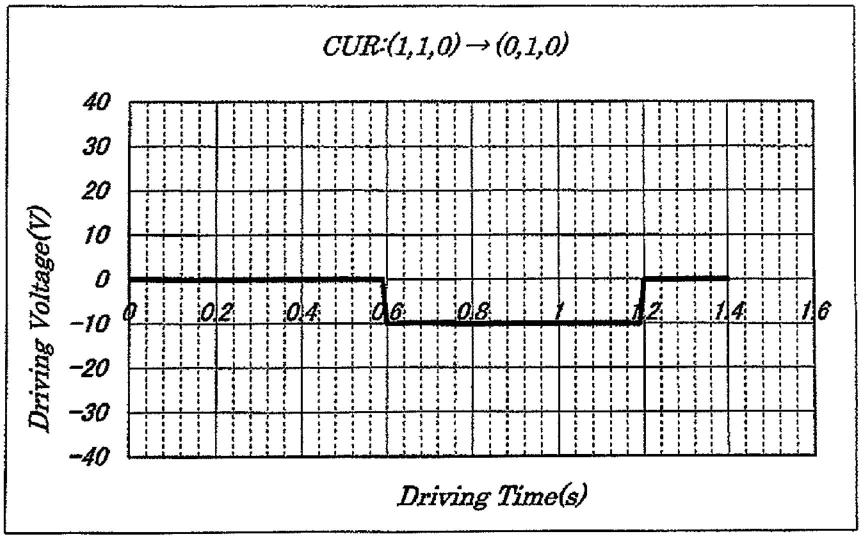
FIGS. 28A, 28B and 28C are diagrams showing a driving voltage waveform to be applied to the display section according to the second exemplary embodiment.
Figure 28B:
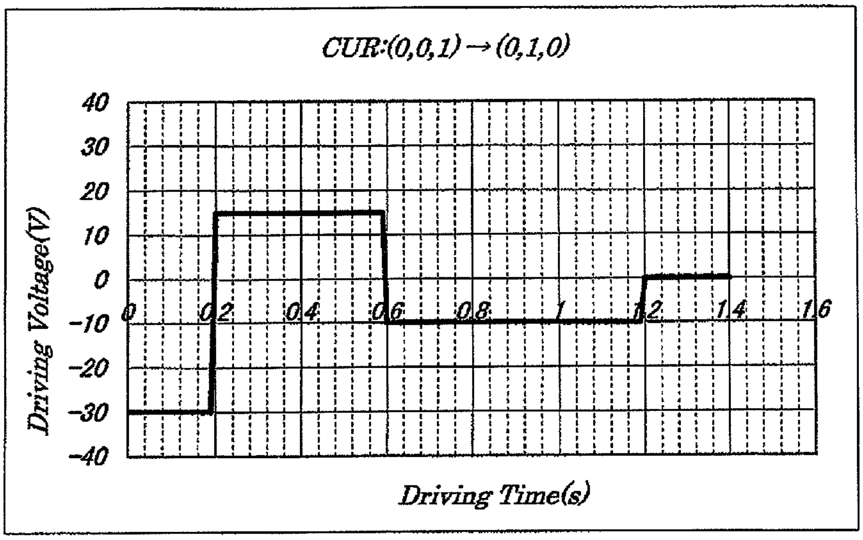
Figure 28C:
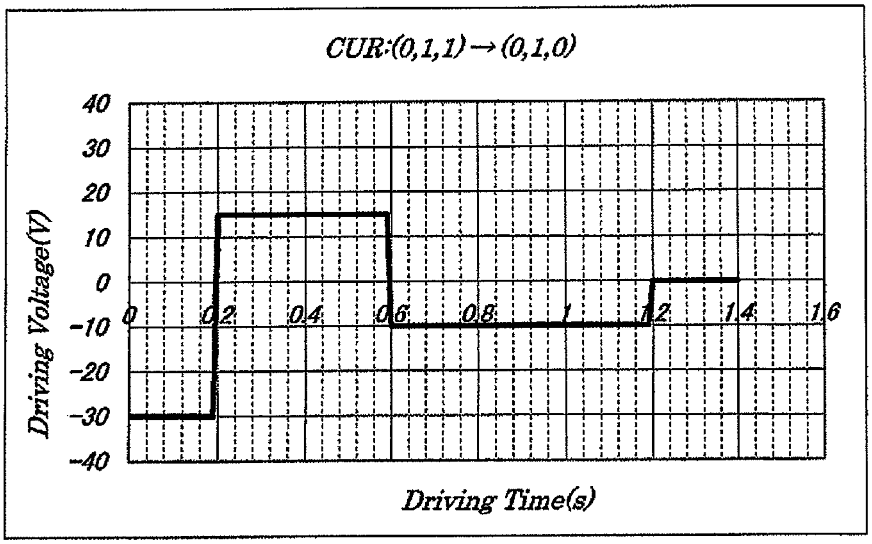
Figure 29A:
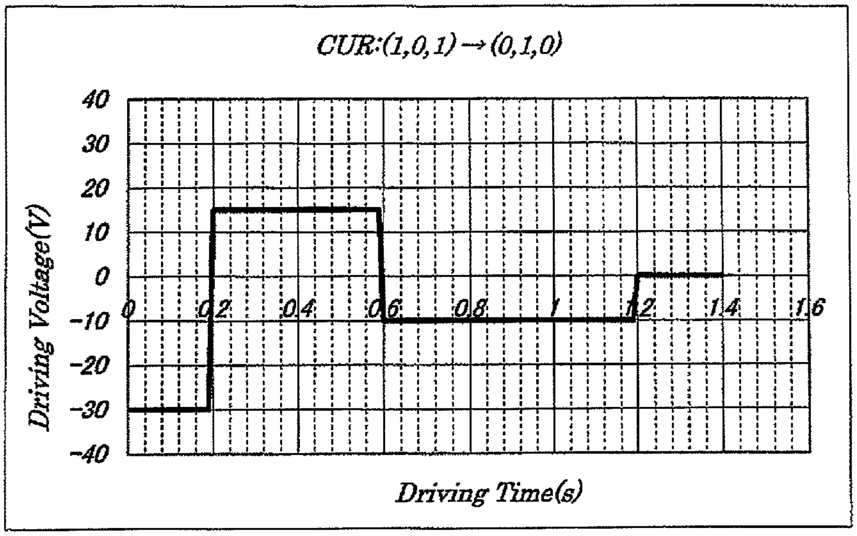
FIGS. 29A and 29B are diagrams showing a driving voltage waveform to be applied to the display section according to the second exemplary embodiment.
Figure 29B:
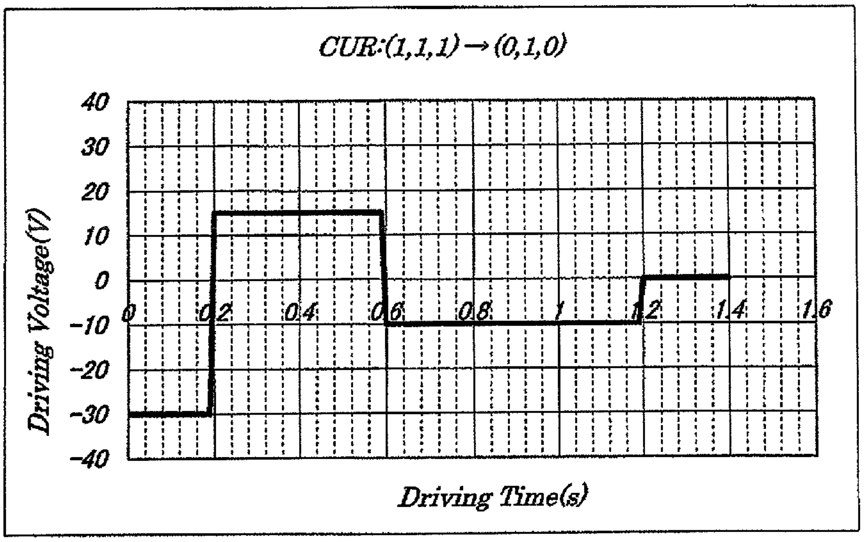

FIGS. 27 to 29 show driving waveforms for transition from a previous screen display state CURRENT: (Rc, Rm, Ry) to a targeted next screen display state NEXT: (0, 1, 0). As shown in FIGS. 27A to 29B, when a transition occurs from a previous screen display state CURRENT: (x, 0, 0) to a next screen display state NEXT: (1, 0, 0), when a transition occurs from a previous screen display state CURRENT: (1, 1, 0) to a next screen display state NEXT: (0, 1, 0), when a transition occurs from a previous screen display state CURRENT: (x, x, 1) to a next screen display state NEXT: (0, 1, 0) (x is 0 or 1), a driving waveform to be applied is different from that on a previous screen state and, therefore, by referring to the display state on the previous screen, the driving waveform in the final display state of a renewal screen must be determined.

As described above, the voltage applying period is made up of the first sub-frame group period during which a first voltage V1 (or V1) and/or 0V is applied to cause a transition of a color density of a previous charged particle Y from Ry on the previous screen to Ry' on a next screen, the second sub-frame group period during which, while a color density Ry of the charged particle Y remains unchanged by applying a second voltage V2 (or V2) and/or 0V, a transition is allowed to occur to the second intermediate transition state in which a relative color density of the charged particle M becomes Rm, and the third sub-frame group period during which, while color densities Rm and Ry of the charged particles M and Y remain unchanged by applying a third voltage V3 (or V3) and/or 0V, a transition is allowed to occur to the second intermediate transition state in which a relative color density of the charged particle C becomes Rc. Moreover, V1, V2, and V3 satisfy the relation of $(|Vth(c)|<|V3|<|Vth(m)|<|V2|<|Vth(y)|<|V1|)$.

Each of a voltage to be applied for each sub-frame is determined by referring to a display state of a previous screen and a display state of a renewed screen.

Further, in a targeted renewal display state, a sub-frame group not required can be omitted and driving can be performed only by a first to third sub-frame groups during which an application of voltages is necessary. Moreover, a driving waveform being different from Tables 6-1 to 6-9 having the same intermediate transition state and it is needless to say that the driving waveform is contained in the embodiment.

For example, in the sub-frame group period to make a relative color density of CMY during an intermediate transition be "0" or "1", if excessive application of a voltage during the sub-frame group makes a relative color density be saturated to be "0" or "1", the applying voltage may be supplied excessively. Also, the applying period of 0V may be omitted to shorten a driving period.

Similarly, by making the numbers of sub-frames for each period be constant, a unit sub-frame time for each period can be made different for each period. In the above description, each gray level of C, M, and y is 3, however, multiple gray levels such as two gray levels or three gray levels can be driven.

The previous screen is displayed at 2 gray levels and, after that, a next screen may be displayed using Tables 6-1 to 6-9. In the above description, three kinds of particles C, M, Y for CMY three colors are used, however, the present driving method can be applied to KGB three colors instead of the CMY three colors. Further, the driving method can be applied to 4 colors CMYK and 6 colors, CMYRGB as well.

The method of producing the LUT is identical to that of the first exemplary embodiment, however, according to the producing methods of the third exemplary embodiment, LUTR_LUT for the reset period is not required while a plurality of LUT groups corresponding to the display state on a previous screen and in the case of three gray levels on the previous screen, 27 (K=1 . . . 27) LUT groups for the LUT group Bk_LUTn (n=1 . . . 12) are required and, in the case where a previous screen is displayed at 2 gray levels, 8 LUT groups are required. Moreover, the circuit configuration for driving as above is the same as that of the first exemplary embodiment, however, there is a difference as below.

As image data to be stored in a graphic memory, both RGB data of pixels for a previous screen and RGB data of pixels for a renewal screen are required and the data reading circuit must read both the data. Moreover, the LUT producing circuit must read a LUT group Bk_LUTn corresponding to the RGB data of pixels for the previous screen from a non-volatile memory to produce an LUT corresponding to a sub-frame number.

Thus, according to the third exemplary embodiment of the present invention, displaying multiple gray scales including not only each of single colors (R, G, B, C, M, Y, W, and K) but also an intermediate color can be realized by using a simple configuration. Additionally, due to no reset period, screen renewal time can be shortened.

Fourth Exemplary Embodiment

Next, the fourth exemplary embodiment of the present invention is described. The fourth exemplary embodiment is an improvement of the above third exemplary embodiment and has a feature of using a driving method by repeated application of unit driving waveform. That is, in the fourth exemplary embodiment, by increasing a sub-frame frequency and by repeating the application of driving waveforms shown in Tables 6-1 to 6-9, a smooth transition is achieved from a previous screen state CURRENT to a final display state NEXT.

The unit driving waveform can be produced by the same method employed in the first exemplary embodiment which describes driving operations (driving method) using the repeated application of basic waveforms, however, the direct application of the method is very complicated.

The reason is that, in the first exemplary embodiment, the transition occurs from its ground state to the same direction, for example, the transition occurs from (0, 0, 0) to (1, 0, 1) and, therefore, each of the charged particles C, M, Y moves to the same direction (in the embodiment, to a display surface side) or does not move.

In the third exemplary embodiment, by one time application of a driving waveform, a transition is realized, however, in the fourth exemplary embodiment in which a smooth transition is to be made possible by repeated application of the unit driving waveforms, there is a case where the moving direction of each of the charged particles C, M, and Y is not constant.

For example, in the change from (0, 1, 1) to (1, 1, 0), the charged particle C moves to a display surface side and Y moves to a TFT substrate side and M particle stay on the display surface. Therefore, if −30V is applied, when the unit driving waveform is applied, it is supposed that the C particle is in the ground state "0" and does not move, however, when the unit driving waveform is applied a plurality of times, for example, the C particle is not in ground state after the first application of the driving waveform, due to the application of −30V during the second voltage application period, the C particles move, which is not predicted originally, thus causing a deviation.

In order to make correction of the deviation, by interposing the repeated application of the unit driving waveform between a correction second sub-frame group period during which a second voltage V2/−V2 is further applied and a correction third sub-frame group period during which a third voltage V3/−V3 is further applied to apply a correction driving waveform, a movement of a particle must be corrected.

In the example below, by setting 1 sub-frame period to be quadruple 25 msec and the application of the unit driving waveform is repeated four times during 12 sub-frames (2 sub-frames for the first sub-frame group period, 4 sub-frames for the second sub-frame group period, and 6 sub-frames for the third sub-frame group period) and by inserting the application of correction waveforms three times is repeated during 10 sub-frames (4 sub-frames for the correction second sub-frame and 6 sub-frames for the correction third sub-frame group period), the final display state NEXT can be realized.

For simplification, by referring to Tables 7-1 to 7-8, for 2 gray level for the CMY, driving waveform for the direct transition from a previous screen to a renewed screen. In Table 7-1, when the display state of a previous screen is CURRENT: (C, M, Y)=(0, 0, 0), the next screen state is a driving waveform for transition to the NEXT: (C, M, Y)=(Rc, Rm, Ry) (Rc, Rm, Ry is 0 or 1) and (a), (b), (c) and (d) in Tables 7-1 to 7-8 sequentially show the driving waveforms for four times application when the application of the correction waveform is repeated three times which are interposed between the four times unit driving waveforms and each of the unit driving waveform.

Similarly, Table 7-2 sequentially shows the driving waveforms for 4 times application for the transition from CURRENT: (C, M, Y)=(1, 0, 0) to NEXT: (C, M, Y)=(Rc, Rm, Ry) (Rc, Rm, Ry is 0 or 1). Table 7-3 sequentially shows the driving waveforms for 4 times application for the transition from CURRENT: (C, M, Y)=(0, 1, 0) to NEXT: (C, M, Y)=(Rc, Rm, Ry) (Rc, Rm, Ry is 0 or 1).

Table 7-4 sequentially shows the driving waveforms for 4 times application for the transition from CURRENT: (C, M, Y)=(1, 1, 0) to NEXT: (C, M, Y)=(Rc, Rm, Ry) (Rc, Rm, Ry is 0 or 1). Table 7-5 sequentially shows the driving waveforms for 4 times application for the transition from CURRENT: (C, M, Y)=(0, 0, 1) to NEXT: (C, M, Y)=(Rc, Rm, Ry) (Rc, Rm, Ry is 0 or 1). Table 7-6 sequentially shows the driving waveforms for 4 times application for the transition from CURRENT: (C, M, Y)=(1, 0, 1) to NEXT: (C, M, Y)=(Rc, Rm, Ry) (Rc, Rm, Ry is 0 or 1).

Table 7-7 sequentially shows the driving waveforms for 4 times application for the transition from CURRENT: (C, M, Y)=(0, 1, 1) to NEXT: (C, M, Y)=(Rc, Rm, Ry) (Rc, Rm, Ry is 0 or 1). Table 7-8 sequentially shows the driving waveforms for 4 times application for the transition from CURRENT: (C, M, Y)=(1, 1, 1) to NEXT: (C, M, Y)=(Rc, Rm, Ry) (Rc, Rm, Ry is 0 or 1).

TABLE 7-1

Basic Waveform Repeated Four Times (a)
First Time

| Targetted | | | | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| Renewing Screen Display | | | Current Screen Display CUR | | | | Intermediate Transition I1-2a | | | | Intermediate Transition I1-3a | | | Applied | | Intermediate Transition I1-1 | | |
| C | M | Y | C | M | Y | Applied Voltage | C | M | Y | Applied Voltage | C | M | Y | Voltage | | C | M | Y |
| 0 | 0 | 0 | 0 | 0 | 0 | | 0 | 0 | 0 | | 0 | 0 | 0 | 0 | 0 | 0 | 0 | 0 |
| 1 | 0 | 0 | 0 | 0 | 0 | | 0 | 0 | 0 | | 0 | 0 | 0 | 0 | 0 | 0 | 0 | 0 |
| 0 | 1 | 0 | 0 | 0 | 0 | | 0 | 0 | 0 | | 0 | 0 | 0 | 0 | 0 | 0 | 0 | 0 |
| 1 | 1 | 0 | 0 | 0 | 0 | | 0 | 0 | 0 | | 0 | 0 | 0 | 0 | 0 | 0 | 0 | 0 |
| 0 | 0 | 1 | 0 | 0 | 0 | | 0 | 0 | 0 | | 0 | 0 | 0 | 30 | 30 | 0.3 | 0.3 | 0.3 |
| 1 | 0 | 1 | 0 | 0 | 0 | | 0 | 0 | 0 | | 0 | 0 | 0 | 30 | 30 | 0.3 | 0.3 | 0.3 |
| 0 | 1 | 1 | 0 | 0 | 0 | | 0 | 0 | 0 | | 0 | 0 | 0 | 30 | 30 | 0.3 | 0.3 | 0.3 |
| 1 | 1 | 1 | 0 | 0 | 0 | | 0 | 0 | 0 | | 0 | 0 | 0 | 30 | 30 | 0.3 | 0.3 | 0.3 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Current Screen Display CUR | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 10 | 10 | 10 | 10 | 10 | 10 | 0.3 | 0 | 0 |
| 0 | 1 | 0 | 0 | 0 | 0 | 15 | 15 | 15 | 15 | 0.3 | 0.3 | 0 | −10 | −10 | −10 | −10 | −10 | −10 | 0 | 0.3 | 0 |
| 1 | 1 | 0 | 0 | 0 | 0 | 15 | 15 | 15 | 15 | 0.3 | 0.3 | 0 | 0 | 0 | 0 | 0 | 0 | 0 | 0.3 | 0.3 | 0 |
| 0 | 0 | 1 | 0 | 0 | 0 | −15 | −15 | −15 | −15 | 0 | 0 | 0.3 | 0 | 0 | 0 | 0 | 0 | 0 | 0 | 0 | 0.3 |
| 1 | 0 | 1 | 0 | 0 | 0 | −15 | −15 | −15 | −15 | 0 | 0 | 0.3 | 10 | 10 | 10 | 10 | 10 | 10 | 0.3 | 0 | 0.3 |
| 0 | 1 | 1 | 0 | 0 | 0 | 0 | 0 | 0 | 0 | 0.3 | 0.3 | 0.3 | −10 | −10 | −10 | −10 | −10 | −10 | 0 | 0.3 | 0.3 |
| 1 | 1 | 1 | 0 | 0 | 0 | 0 | 0 | 0 | 0 | 0.3 | 0.3 | 0.3 | 0 | 0 | 0 | 0 | 0 | 0 | 0.3 | 0.3 | 0.3 |

(b)
Second Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2a | | | | | | | | | Intermediate Transition I2-3a | | | Applied | | Intermediate Transition I2-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.3 | 0 | 0 | 0 | 0 | 0 | 0 | 0.3 | 0 | 0 | 0 | 0 | 0 | 0 | 0 | 0 | 0.3 | 0 | 0 | 0 | 0 | 0.3 | 0 | 0 |
| 0 | 1 | 0 | 0 | 0.3 | 0 | 0 | 0 | 0 | 0 | 0 | 0.3 | 0 | 0 | 0 | 0 | 0 | 0 | 0 | 0 | 0.3 | 0 | 0 | 0 | 0 | 0.3 | 0 |
| 1 | 1 | 0 | 0.3 | 0.3 | 0 | 0 | 0 | 0 | 0 | 0.3 | 0.3 | 0 | 0 | 0 | 0 | 0 | 0 | 0 | 0.3 | 0.3 | 0 | 0 | 0 | 0.3 | 0.3 | 0 |
| 0 | 0 | 1 | 0 | 0 | 0.3 | 0 | 0 | 0 | 0 | 0 | 0 | 0.3 | 0 | 0 | 0 | 0 | 0 | 0 | 0 | 0 | 0.3 | 30 | 30 | 0.3 | 0.3 | 0.5 |
| 1 | 0 | 1 | 0.3 | 0 | 0.3 | 0 | 0 | 0 | 0 | 0.3 | 0 | 0.3 | 0 | 0 | 0 | 0 | 0 | 0 | 0.3 | 0 | 0.3 | 30 | 30 | 0.5 | 0.3 | 0.5 |

TABLE 7-1-continued

| Basic Waveform Repeated Four Times | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0 | 0.3 | 0.3 | 0 | 0 | 0 | 0 | 0 | 0.3 | 0.3 | 0 | 0 | 0 | 0 | 0 | 0 | 0 | 0.3 | 0.3 | 30 | 30 | 0.3 | 0.5 | 0.5 |
| 1 | 1 | 1 | 0.3 | 0.3 | 0.3 | 0 | 0 | 0 | 0 | 0.3 | 0.3 | 0.3 | 0 | 0 | 0 | 0 | 0 | 0 | 0.3 | 0.3 | 0.3 | 30 | 30 | 0.5 | 0.5 | 0.5 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2b | | | | | | | | | Intermediate Transition I2-3b | | |
| C | M | Y | C | M | Y | Applied Voltage | | | | C | M | Y | Applied Voltage | | | | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.3 | 0 | 0 | 0 | 0 | 0 | 0 | 0.3 | 0 | 0 | 10 | 10 | 10 | 10 | 10 | 10 | 0.5 | 0 | 0 |
| 0 | 1 | 0 | 0 | 0.3 | 0 | 15 | 15 | 15 | 15 | 0.3 | 0.5 | 0 | −10 | −10 | −10 | −10 | −10 | −10 | 0 | 0.5 | 0 |
| 1 | 1 | 0 | 0.3 | 0.3 | 0 | 15 | 15 | 15 | 15 | 0.5 | 0.5 | 0 | 0 | 0 | 0 | 0 | 0 | 0 | 0.5 | 0.5 | 0 |
| 0 | 0 | 1 | 0 | 0 | 0.3 | −15 | −15 | −15 | −15 | 0 | 0 | 0.5 | 0 | 0 | 0 | 0 | 0 | 0 | 0 | 0 | 0.5 |
| 1 | 0 | 1 | 0.3 | 0 | 0.3 | −15 | −15 | −15 | −15 | 0.3 | 0 | 0.5 | 10 | 10 | 10 | 10 | 10 | 10 | 0.5 | 0 | 0.5 |
| 0 | 1 | 1 | 0 | 0.3 | 0.3 | 0 | 0 | 0 | 0 | 0.3 | 0.5 | 0.5 | −10 | −10 | −10 | −10 | −10 | −10 | 0 | 0.5 | 0.5 |
| 1 | 1 | 1 | 0.3 | 0.3 | 0.3 | 0 | 0 | 0 | 0 | 0.5 | 0.5 | 0.5 | 0 | 0 | 0 | 0 | 0 | 0 | 0.5 | 0.5 | 0.5 |

(c)
Third Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2a | | | | | | | | | Intermediate Transition I3-3a | | | Applied Voltage | | Intermediate Transition I3-1 | | |
| C | M | Y | C | M | Y | Applied Voltage | | | | C | M | Y | Applied Voltage | | | | | | C | M | Y | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.5 | 0 | 0 | 0 | 0 | 0 | 0 | 0.5 | 0 | 0 | 0 | 0 | 0 | 0 | 0 | 0 | 0.5 | 0 | 0 | 0 | 0 | 0.5 | 0 | 0 |
| 0 | 1 | 0 | 0 | 0.5 | 0 | 0 | 0 | 0 | 0 | 0 | 0.5 | 0 | 0 | 0 | 0 | 0 | 0 | 0 | 0 | 0.5 | 0 | 0 | 0 | 0 | 0.5 | 0 |
| 1 | 1 | 0 | 0.5 | 0.5 | 0 | 0 | 0 | 0 | 0 | 0.5 | 0.5 | 0 | 0 | 0 | 0 | 0 | 0 | 0 | 0.5 | 0.5 | 0 | 0 | 0 | 0.5 | 0.5 | 0 |
| 0 | 0 | 1 | 0 | 0 | 0.5 | 0 | 0 | 0 | 0 | 0 | 0 | 0.5 | 0 | 0 | 0 | 0 | 0 | 0 | 0 | 0 | 0.5 | 30 | 30 | 0.3 | 0.3 | 0.8 |
| 1 | 0 | 1 | 0.5 | 0 | 0.5 | 0 | 0 | 0 | 0 | 0.5 | 0 | 0.5 | 0 | 0 | 0 | 0 | 0 | 0 | 0.5 | 0 | 0.5 | 30 | 30 | 0.8 | 0.3 | 0.8 |
| 0 | 1 | 1 | 0 | 0.5 | 0.5 | 0 | 0 | 0 | 0 | 0 | 0.5 | 0.5 | 0 | 0 | 0 | 0 | 0 | 0 | 0 | 0.5 | 0.5 | 30 | 30 | 0.3 | 0.8 | 0.8 |
| 1 | 1 | 1 | 0.5 | 0.5 | 0.5 | 0 | 0 | 0 | 0 | 0.5 | 0.5 | 0.5 | 0 | 0 | 0 | 0 | 0 | 0 | 0.5 | 0.5 | 0.5 | 30 | 30 | 0.8 | 0.8 | 0.8 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.5 | 0 | 0 | 0 | 0 | 0 | 0 | 0.5 | 0 | 0 | 10 | 10 | 10 | 10 | 10 | 10 | 0.8 | 0 | 0 |
| 0 | 1 | 0 | 0 | 0.5 | 0 | 15 | 15 | 15 | 15 | 0.3 | 0.8 | 0 | −10 | −10 | −10 | −10 | −10 | −10 | 0 | 0.8 | 0 |
| 1 | 1 | 0 | 0.5 | 0.5 | 0 | 15 | 15 | 15 | 15 | 0.8 | 0.8 | 0 | 0 | 0 | 0 | 0 | 0 | 0 | 0.8 | 0.8 | 0 |
| 0 | 0 | 1 | 0 | 0 | 0.5 | −15 | −15 | −15 | −15 | 0 | 0 | 0.8 | 0 | 0 | 0 | 0 | 0 | 0 | 0 | 0 | 0.8 |
| 1 | 0 | 1 | 0.5 | 0 | 0.5 | −15 | −15 | −15 | −15 | 0.5 | 0 | 0.8 | 10 | 10 | 10 | 10 | 10 | 10 | 0.8 | 0 | 0.8 |
| 0 | 1 | 1 | 0 | 0.5 | 0.5 | 0 | 0 | 0 | 0 | 0.3 | 0.8 | 0.8 | −10 | −10 | −10 | −10 | −10 | −10 | 0 | 0.8 | 0.8 |
| 1 | 1 | 1 | 0.5 | 0.5 | 0.5 | 0 | 0 | 0 | 0 | 0.8 | 0.8 | 0.8 | 0 | 0 | 0 | 0 | 0 | 0 | 0.8 | 0.8 | 0.8 |

(d)
Fourth Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2a | | | | | | | | | Intermediate Transition I4-3a | | | Applied Voltage | | Intermediate Transition I4-1 | | |
| C | M | Y | C | M | Y | Applied Voltage | | | | C | M | Y | Applied Voltage | | | | | | C | M | Y | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.8 | 0 | 0 | 0 | 0 | 0 | 0 | 0.8 | 0 | 0 | 0 | 0 | 0 | 0 | 0 | 0 | 0.8 | 0 | 0 | 0 | 0 | 0.8 | 0 | 0 |
| 0 | 1 | 0 | 0 | 0.8 | 0 | 0 | 0 | 0 | 0 | 0 | 0.8 | 0 | 0 | 0 | 0 | 0 | 0 | 0 | 0 | 0.8 | 0 | 0 | 0 | 0 | 0.8 | 0 |
| 1 | 1 | 0 | 0.8 | 0.8 | 0 | 0 | 0 | 0 | 0 | 0.8 | 0.8 | 0 | 0 | 0 | 0 | 0 | 0 | 0 | 0.8 | 0.8 | 0 | 0 | 0 | 0.8 | 0.8 | 0 |
| 0 | 0 | 1 | 0 | 0 | 0.3 | 0 | 0 | 0 | 0 | 0 | 0 | 0.8 | 0 | 0 | 0 | 0 | 0 | 0 | 0 | 0 | 0.8 | 30 | 30 | 0.3 | 0.3 | 1 |
| 1 | 0 | 1 | 0.8 | 0 | 0.8 | 0 | 0 | 0 | 0 | 0.8 | 0 | 0.8 | 0 | 0 | 0 | 0 | 0 | 0 | 0.8 | 0 | 0.8 | 30 | 30 | 1 | 0.3 | 1 |
| 0 | 1 | 1 | 0 | 0.8 | 0.8 | 0 | 0 | 0 | 0 | 0 | 0.8 | 0.8 | 0 | 0 | 0 | 0 | 0 | 0 | 0 | 0.8 | 0.8 | 30 | 30 | 0.3 | 1 | 1 |
| 1 | 1 | 1 | 0.8 | 0.8 | 0.8 | 0 | 0 | 0 | 0 | 0.8 | 0.8 | 0.8 | 0 | 0 | 0 | 0 | 0 | 0 | 0.8 | 0.8 | 0.8 | 30 | 30 | 1 | 1 | 1 |

TABLE 7-1-continued

Basic Waveform Repeated Four Times

| Targetted Renewing Screen Display | | | Intermediate Transition I3-3b | | | Second Sub-frame Group Applied Voltage | | | | Intermediate Transition I4-2b | | | Third Sub-frame Group Applied Voltage | | | | | | Renewed Screen Display N | | |
|---|---|---|---|---|---|---|---|---|---|---|---|---|---|---|---|---|---|---|---|---|---|
| C | M | Y | C | M | Y | | | | | C | M | Y | | | | | | | C | M | Y |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0.8 | 0 | 0 | 0 | 0 | 0 | 0 | 0.8 | 0 | 0 | 10 | 10 | 10 | 10 | 10 | 10 | 1 | 0 | 0 |
| 0 | 1 | 0 | 0 | 0.8 | 0 | 15 | 15 | 15 | 15 | 0.3 | 1 | 0 | −10 | −10 | −10 | −10 | −10 | −10 | 0 | 1 | 0 |
| 1 | 1 | 0 | 0.8 | 0.8 | 0 | 15 | 15 | 15 | 15 | 1 | 1 | 0 | 0 | 0 | 0 | 0 | 0 | 0 | 1 | 1 | 0 |
| 0 | 0 | 1 | 0 | 0 | 0.3 | −15 | −15 | −15 | −15 | 0 | 0 | 1 | 0 | 0 | 0 | 0 | 0 | 0 | 0 | 0 | 1 |
| 1 | 0 | 1 | 0.8 | 0 | 0.8 | −15 | −15 | −15 | −15 | 0.8 | 0 | 1 | 10 | 10 | 10 | 10 | 10 | 10 | 1 | 0 | 1 |
| 0 | 1 | 1 | 0 | 0.8 | 0.8 | 0 | 0 | 0 | 0 | 0.3 | 1 | 1 | −10 | −10 | −10 | −10 | −10 | −10 | 0 | 1 | 1 |
| 1 | 1 | 1 | 0.8 | 0.8 | 0.8 | 0 | 0 | 0 | 0 | 1 | 1 | 1 | 0 | 0 | 0 | 0 | 0 | 0 | 1 | 1 | 1 |

TABLE 7-2

Basic Waveform Repeated Four Times (a)
First Time

| Targetted Renewing Screen Display | | | Current Screen Display CUR | | | Corrected Second Sub-frame Group Applied Voltage | Intermediate Transition I1-2a | | | Corrected Third Sub-frame Group Applied Voltage | Intermediate Transition I1-3a | | | First Sub-frame Group Applied Voltage | | Intermediate Transition I1-1 | | |
|---|---|---|---|---|---|---|---|---|---|---|---|---|---|---|---|---|---|---|
| C | M | Y | C | M | Y | | C | M | Y | | C | M | Y | | | C | M | Y |
| 0 | 0 | 0 | 1 | 0 | 0 | | 1 | 0 | 0 | | 1 | 0 | 0 | 0 | 0 | 1 | 0 | 0 |
| 1 | 0 | 0 | 1 | 0 | 0 | | 1 | 0 | 0 | | 1 | 0 | 0 | 0 | 0 | 1 | 0 | 0 |
| 0 | 1 | 0 | 1 | 0 | 0 | | 1 | 0 | 0 | | 1 | 0 | 0 | 0 | 0 | 1 | 0 | 0 |
| 1 | 1 | 0 | 1 | 0 | 0 | | 1 | 0 | 0 | | 1 | 0 | 0 | 0 | 0 | 1 | 0 | 0 |
| 0 | 0 | 1 | 1 | 0 | 0 | | 1 | 0 | 0 | | 1 | 0 | 0 | 30 | 30 | 1 | 0.3 | 0.3 |
| 1 | 0 | 1 | 1 | 0 | 0 | | 1 | 0 | 0 | | 1 | 0 | 0 | 30 | 30 | 1 | 0.3 | 0.3 |
| 0 | 1 | 1 | 1 | 0 | 0 | | 1 | 0 | 0 | | 1 | 0 | 0 | 30 | 30 | 1 | 0.3 | 0.3 |
| 1 | 1 | 1 | 1 | 0 | 0 | | 1 | 0 | 0 | | 1 | 0 | 0 | 30 | 30 | 1 | 0.3 | 0.3 |

| Targetted Renewing Screen Display | | | Current Screen Display CUR | | | Second Sub-frame Group Applied Voltage | | | | Intermediate Transition I1-2b | | | Third Sub-frame Group Applied Voltage | | | | | | Intermediate Transition I1-3b | | |
|---|---|---|---|---|---|---|---|---|---|---|---|---|---|---|---|---|---|---|---|---|---|
| C | M | Y | C | M | Y | | | | | C | M | Y | | | | | | | C | M | Y |
| 0 | 0 | 0 | 1 | 0 | 0 | 0 | 0 | 0 | 0 | 1 | 0 | 0 | −10 | −10 | −10 | −10 | −10 | −10 | 0.8 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 |
| 0 | 1 | 0 | 1 | 0 | 0 | 15 | 15 | 15 | 15 | 1 | 0.3 | 0 | −10 | −10 | −10 | −10 | −10 | −10 | 0.8 | 0.3 | 0 |
| 1 | 1 | 0 | 1 | 0 | 0 | 15 | 15 | 15 | 15 | 1 | 0.3 | 0 | 0 | 0 | 0 | 0 | 0 | 0 | 1 | 0.3 | 0 |
| 0 | 0 | 1 | 1 | 0 | 0 | −15 | −15 | −15 | −15 | 0.8 | 0 | 0.3 | 0 | 0 | 0 | 0 | 0 | 0 | 0.8 | 0 | 0.3 |
| 1 | 0 | 1 | 1 | 0 | 0 | −15 | −15 | −15 | −15 | 0.8 | 0 | 0.3 | 10 | 10 | 10 | 10 | 10 | 10 | 1 | 0 | 0.3 |
| 0 | 1 | 1 | 1 | 0 | 0 | 0 | 0 | 0 | 0 | 1 | 0.3 | 0.3 | −10 | −10 | −10 | −10 | −10 | −10 | 0.8 | 0.3 | 0.3 |
| 1 | 1 | 1 | 1 | 0 | 0 | 0 | 0 | 0 | 0 | 1 | 0.3 | 0.3 | 0 | 0 | 0 | 0 | 0 | 0 | 1 | 0.3 | 0.3 |

(b)
Second Time

| Targetted Renewing Screen Display | | | Intermediate Transition I1-3b | | | Corrected Second Sub-frame Group Applied Voltage | | | | Intermediate Transition I2-2a | | | Corrected Third Sub-frame Group Applied Voltage | | | | | | Intermediate Transition I2-3a | | | First Sub-frame Group Applied Voltage | | Intermediate Transition I2-1 | | |
|---|---|---|---|---|---|---|---|---|---|---|---|---|---|---|---|---|---|---|---|---|---|---|---|---|---|---|
| C | M | Y | C | M | Y | | | | | C | M | Y | | | | | | | C | M | Y | | | C | M | Y |
| 0 | 0 | 0 | 0.8 | 0 | 0 | 0 | 0 | 0 | 0 | 0.8 | 0 | 0 | 0 | 0 | 0 | 0 | 0 | 0 | 0.8 | 0 | 0 | 0 | 0 | 0.8 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 | 0 |
| 0 | 1 | 0 | 0.8 | 0.3 | 0 | 0 | 0 | 0 | 0 | 0.8 | 0.3 | 0 | −10 | −10 | −10 | −10 | −10 | −10 | 0.5 | 0.3 | 0 | 0 | 0 | 0.5 | 0.3 | 0 |
| 1 | 1 | 0 | 1 | 0.3 | 0 | 0 | 0 | 0 | 0 | 1 | 0.3 | 0 | 0 | 0 | 0 | 0 | 0 | 0 | 1 | 0.3 | 0 | 0 | 0 | 1 | 0.3 | 0 |
| 0 | 0 | 1 | 0.8 | 0 | 0.3 | 0 | 0 | 0 | 0 | 0.8 | 0 | 0.3 | −10 | −10 | −10 | −10 | −10 | −10 | 0.5 | 0 | 0.3 | 30 | 30 | 0.8 | 0.3 | 0.5 |
| 1 | 0 | 1 | 1 | 0 | 0.3 | 0 | 0 | 0 | 0 | 1 | 0 | 0.3 | 0 | 0 | 0 | 0 | 0 | 0 | 1 | 0 | 0.3 | 30 | 30 | 1 | 0.3 | 0.5 |

TABLE 7-2-continued

Basic Waveform Repeated Four Times

| | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0.8 | 0.3 | 0.3 | 0 | 0 | 0 | 0 | 0.8 | 0.3 | 0.3 | −10 | −10 | −10 | −10 | −10 | −10 | 0.5 | 0.3 | 0.3 | 30 | 30 | 0.8 | 0.5 | 0.5 |
| 1 | 1 | 1 | 1 | 0.3 | 0.3 | 0 | 0 | 0 | 0 | 1 | 0.3 | 0.3 | 0 | 0 | 0 | 0 | 0 | 0 | 1 | 0.3 | 0.3 | 30 | 30 | 1 | 0.5 | 0.5 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2b | | | | | | | | | Intermediate Transition I2-3b | | |
| C | M | Y | C | M | Y | Applied Voltage | | | | C | M | Y | Applied Voltage | | | | | | C | M | Y |
| 0 | 0 | 0 | 0.8 | 0 | 0 | 0 | 0 | 0 | 0 | 0.8 | 0 | 0 | −10 | −10 | −10 | −10 | −10 | −10 | 0.5 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 |
| 0 | 1 | 0 | 0.8 | 0.3 | 0 | 15 | 15 | 15 | 15 | 0.8 | 0.5 | 0 | −10 | −10 | −10 | −10 | −10 | −10 | 0.5 | 0.5 | 0 |
| 1 | 1 | 0 | 1 | 0.3 | 0 | 15 | 15 | 15 | 15 | 1 | 0.5 | 0 | 0 | 0 | 0 | 0 | 0 | 0 | 1 | 0.5 | 0 |
| 0 | 0 | 1 | 0.8 | 0 | 0.3 | −15 | −15 | −15 | −15 | 0.5 | 0 | 0.5 | 0 | 0 | 0 | 0 | 0 | 0 | 0.5 | 0 | 0.5 |
| 1 | 0 | 1 | 1 | 0 | 0.3 | −15 | −15 | −15 | −15 | 0.8 | 0 | 0.5 | 10 | 10 | 10 | 10 | 10 | 10 | 1 | 0 | 0.5 |
| 0 | 1 | 1 | 0.8 | 0.3 | 0.3 | 0 | 0 | 0 | 0 | 0.8 | 0.5 | 0.5 | −10 | −10 | −10 | −10 | −10 | −10 | 0.5 | 0.5 | 0.5 |
| 1 | 1 | 1 | 1 | 0.3 | 0.3 | 0 | 0 | 0 | 0 | 1 | 0.5 | 0.5 | 0 | 0 | 0 | 0 | 0 | 0 | 1 | 0.5 | 0.5 |

(c)
Third Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2a | | | | | | | | | Intermediate Transition I3-3a | | | Applied Voltage | | Intermediate Transition I3-1 | | |
| C | M | Y | C | M | Y | Applied Voltage | | | | C | M | Y | Applied Voltage | | | | | | C | M | Y | | | C | M | Y |
| 0 | 0 | 0 | 0.5 | 0 | 0 | 0 | 0 | 0 | 0 | 0.5 | 0 | 0 | 0 | 0 | 0 | 0 | 0 | 0 | 0.5 | 0 | 0 | 0 | 0 | 0.5 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 | 0 |
| 0 | 1 | 0 | 0.5 | 0.5 | 0 | 0 | 0 | 0 | 0 | 0.5 | 0.5 | 0 | −10 | −10 | −10 | −10 | −10 | −10 | 0.3 | 0.5 | 0 | 0 | 0 | 0.3 | 0.5 | 0 |
| 1 | 1 | 0 | 1 | 0.5 | 0 | 0 | 0 | 0 | 0 | 1 | 0.5 | 0 | 0 | 0 | 0 | 0 | 0 | 0 | 1 | 0.5 | 0 | 0 | 0 | 1 | 0.5 | 0 |
| 0 | 0 | 1 | 0.5 | 0 | 0.5 | 0 | 0 | 0 | 0 | 0.5 | 0 | 0.5 | −10 | −10 | −10 | −10 | −10 | −10 | 0.3 | 0 | 0.5 | 30 | 30 | 0.5 | 0.3 | 0.8 |
| 1 | 0 | 1 | 1 | 0 | 0.5 | 0 | 0 | 0 | 0 | 1 | 0 | 0.5 | 0 | 0 | 0 | 0 | 0 | 0 | 1 | 0 | 0.5 | 30 | 30 | 1 | 0.3 | 0.8 |
| 0 | 1 | 1 | 0.5 | 0.5 | 0.5 | 0 | 0 | 0 | 0 | 0.5 | 0.5 | 0.5 | −10 | −10 | −10 | −10 | −10 | −10 | 0.3 | 0.5 | 0.5 | 30 | 30 | 0.5 | 0.8 | 0.8 |
| 1 | 1 | 1 | 1 | 0.5 | 0.5 | 0 | 0 | 0 | 0 | 1 | 0.5 | 0.5 | 0 | 0 | 0 | 0 | 0 | 0 | 1 | 0.5 | 0.5 | 30 | 30 | 1 | 0.8 | 0.8 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0.5 | 0 | 0 | 0 | 0 | 0 | 0 | 0.5 | 0 | 0 | −10 | −10 | −10 | −10 | −10 | −10 | 0.3 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 |
| 0 | 1 | 0 | 0.5 | 0.5 | 0 | 15 | 15 | 15 | 15 | 0.5 | 0.8 | 0 | −10 | −10 | −10 | −10 | −10 | −10 | 0.3 | 0.8 | 0 |
| 1 | 1 | 0 | 1 | 0.5 | 0 | 15 | 15 | 15 | 15 | 1 | 0.8 | 0 | 0 | 0 | 0 | 0 | 0 | 0 | 1 | 0.8 | 0 |
| 0 | 0 | 1 | 0.5 | 0 | 0.5 | −15 | −15 | −15 | −15 | 0.3 | 0 | 0.8 | 0 | 0 | 0 | 0 | 0 | 0 | 0.3 | 0 | 0.8 |
| 1 | 0 | 1 | 1 | 0 | 0.5 | −15 | −15 | −15 | −15 | 0.8 | 0 | 0.8 | 10 | 10 | 10 | 10 | 10 | 10 | 1 | 0 | 0.8 |
| 0 | 1 | 1 | 0.5 | 0.5 | 0.5 | 0 | 0 | 0 | 0 | 0.5 | 0.8 | 0.8 | −10 | −10 | −10 | −10 | −10 | −10 | 0.3 | 0.8 | 0.8 |
| 1 | 1 | 1 | 1 | 0.5 | 0.5 | 0 | 0 | 0 | 0 | 1 | 0.8 | 0.8 | 0 | 0 | 0 | 0 | 0 | 0 | 1 | 0.8 | 0.8 |

(d)
Fourth Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2a | | | | | | | | | Intermediate Transition I4-3a | | | Applied Voltage | | Intermediate Transition I4-1 | | |
| C | M | Y | C | M | Y | Applied Voltage | | | | C | M | Y | Applied Voltage | | | | | | C | M | Y | | | C | M | Y |
| 0 | 0 | 0 | 0.3 | 0 | 0 | 0 | 0 | 0 | 0 | 0.3 | 0 | 0 | 0 | 0 | 0 | 0 | 0 | 0 | 0.3 | 0 | 0 | 0 | 0 | 0.3 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 | 0 |
| 0 | 1 | 0 | 0.3 | 0.8 | 0 | 0 | 0 | 0 | 0 | 0.3 | 0.8 | 0 | −10 | −10 | −10 | −10 | −10 | −10 | 0 | 0.8 | 0 | 0 | 0 | 0 | 0.8 | 0 |
| 1 | 1 | 0 | 1 | 0.8 | 0 | 0 | 0 | 0 | 0 | 1 | 0.8 | 0 | 0 | 0 | 0 | 0 | 0 | 0 | 1 | 0.8 | 0 | 0 | 0 | 1 | 0.8 | 0 |
| 0 | 0 | 1 | 0.3 | 0 | 0.8 | 0 | 0 | 0 | 0 | 0.3 | 0 | 0.8 | −10 | −10 | −10 | −10 | −10 | −10 | 0 | 0 | 0.8 | 30 | 30 | 0.3 | 0.3 | 1 |
| 1 | 0 | 1 | 1 | 0 | 0.8 | 0 | 0 | 0 | 0 | 1 | 0 | 0.8 | 0 | 0 | 0 | 0 | 0 | 0 | 1 | 0 | 0.8 | 30 | 30 | 1 | 0.3 | 1 |

TABLE 7-2-continued

Basic Waveform Repeated Four Times

| | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0.3 | 0.8 | 0.8 | 0 | 0 | 0 | 0 | 0.3 | 0.8 | 0.8 | −10 | −10 | −10 | −10 | −10 | −10 | 0 | 0.8 | 0.8 | 30 | 30 | 0.3 | 1 | 1 |
| 1 | 1 | 1 | 1 | 0.8 | 0.8 | 0 | 0 | 0 | 0 | 1 | 0.8 | 0.8 | 0 | 0 | 0 | 0 | 0 | 0 | 1 | 0.8 | 0.8 | 30 | 30 | 1 | 1 | 1 |

| Targetted Renewing Screen Display | | | Intermediate Transition I3-3b | | | Second Sub-frame Group: Applied Voltage | | | | Intermediate Transition I4-2b | | | Third Sub-frame Group: Applied Voltage | | | | | | Renewed Screen Display N | | |
|---|---|---|---|---|---|---|---|---|---|---|---|---|---|---|---|---|---|---|---|---|---|
| C | M | Y | C | M | Y | | | | | C | M | Y | | | | | | | C | M | Y |
| 0 | 0 | 0 | 0.3 | 0 | 0 | 0 | 0 | 0 | 0 | 0.3 | 0 | 0 | −10 | −10 | −10 | −10 | −10 | −10 | 0 | 0 | 0 |
| 1 | 0 | 0 | 1 | 0 | 0 | 0 | 0 | 0 | 0 | 1 | 0 | 0 | 0 | 0 | 0 | 0 | 0 | 0 | 1 | 0 | 0 |
| 0 | 1 | 0 | 0.3 | 0.8 | 0 | 15 | 15 | 15 | 15 | 0.3 | 1 | 0 | −10 | −10 | −10 | −10 | −10 | −10 | 0 | 1 | 0 |
| 1 | 1 | 0 | 1 | 0.8 | 0 | 15 | 15 | 15 | 15 | 1 | 1 | 0 | 0 | 0 | 0 | 0 | 0 | 0 | 1 | 1 | 0 |
| 0 | 0 | 1 | 0.3 | 0 | 0.8 | −15 | −15 | −15 | −15 | 0 | 0 | 1 | 0 | 0 | 0 | 0 | 0 | 0 | 0 | 0 | 1 |
| 1 | 0 | 1 | 1 | 0 | 0.8 | −15 | −15 | −15 | −15 | 0.8 | 0 | 1 | 10 | 10 | 10 | 10 | 10 | 10 | 1 | 0 | 1 |
| 0 | 1 | 1 | 0.3 | 0.8 | 0.8 | 0 | 0 | 0 | 0 | 0.3 | 1 | 1 | −10 | −10 | −10 | −10 | −10 | −10 | 0 | 1 | 1 |
| 1 | 1 | 1 | 1 | 0.8 | 0.8 | 0 | 0 | 0 | 0 | 1 | 1 | 1 | 0 | 0 | 0 | 0 | 0 | 0 | 1 | 1 | 1 |

TABLE 7-3

Basic Waveform Repeated Four Times (a)
First Time

| Targetted Renewing Screen Display | | | Current Screen Display CUR | | | Corrected Second Sub-frame Group: Applied Voltage | Intermediate Transition I1-2a | | | Corrected Third Sub-frame Group: Applied Voltage | Intermediate Transition I1-3a | | | First Sub-frame Group: Applied Voltage | | Intermediate Transition I1-1 | | |
|---|---|---|---|---|---|---|---|---|---|---|---|---|---|---|---|---|---|---|
| C | M | Y | C | M | Y | | C | M | Y | | C | M | Y | | | C | M | Y |
| 0 | 0 | 0 | 0 | 1 | 0 | | 0 | 1 | 0 | | 0 | 1 | 0 | 0 | 0 | 0 | 1 | 0 |
| 1 | 0 | 0 | 0 | 1 | 0 | | 0 | 1 | 0 | | 0 | 1 | 0 | 0 | 0 | 0 | 1 | 0 |
| 0 | 1 | 0 | 0 | 1 | 0 | | 0 | 1 | 0 | | 0 | 1 | 0 | 0 | 0 | 0 | 1 | 0 |
| 1 | 1 | 0 | 0 | 1 | 0 | | 0 | 1 | 0 | | 0 | 1 | 0 | 0 | 0 | 0 | 1 | 0 |
| 0 | 0 | 1 | 0 | 1 | 0 | | 0 | 1 | 0 | | 0 | 1 | 0 | 30 | 30 | 0.3 | 1 | 0.3 |
| 1 | 0 | 1 | 0 | 1 | 0 | | 0 | 1 | 0 | | 0 | 1 | 0 | 30 | 30 | 0.3 | 1 | 0.3 |
| 0 | 1 | 1 | 0 | 1 | 0 | | 0 | 1 | 0 | | 0 | 1 | 0 | 30 | 30 | 0.3 | 1 | 0.3 |
| 1 | 1 | 1 | 0 | 1 | 0 | | 0 | 1 | 0 | | 0 | 1 | 0 | 30 | 30 | 0.3 | 1 | 0.3 |

| Targetted Renewing Screen Display | | | Current Screen Display CUR | | | Second Sub-frame Group: Applied Voltage | | | | Intermediate Transition I1-2b | | | Third Sub-frame Group: Applied Voltage | | | | | | Intermediate Transition I1-3B | | |
|---|---|---|---|---|---|---|---|---|---|---|---|---|---|---|---|---|---|---|---|---|---|
| C | M | Y | C | M | Y | | | | | C | M | Y | | | | | | | C | M | Y |
| 0 | 0 | 0 | 0 | 1 | 0 | −15 | −15 | −15 | −15 | 0 | 0.8 | 0 | 0 | 0 | 0 | 0 | 0 | 0 | 0 | 0.8 | 0 |
| 1 | 0 | 0 | 0 | 1 | 0 | −15 | −15 | −15 | −15 | 0 | 0.8 | 0 | 10 | 10 | 10 | 10 | 10 | 10 | 0.3 | 0.8 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 |
| 1 | 1 | 0 | 0 | 1 | 0 | 0 | 0 | 0 | 0 | 0 | 1 | 0 | 10 | 10 | 10 | 10 | 10 | 10 | 0.3 | 1 | 0 |
| 0 | 0 | 1 | 0 | 1 | 0 | −15 | −15 | −15 | −15 | 0 | 0.8 | 0.3 | 0 | 0 | 0 | 0 | 0 | 0 | 0 | 0.8 | 0.3 |
| 1 | 0 | 1 | 0 | 1 | 0 | −15 | −15 | −15 | −15 | 0 | 0.8 | 0.3 | 10 | 10 | 10 | 10 | 10 | 10 | 0.3 | 0.8 | 0.3 |
| 0 | 1 | 1 | 0 | 1 | 0 | 0 | 0 | 0 | 0 | 0.3 | 1 | 0.3 | −10 | −10 | −10 | −10 | −10 | −10 | 0 | 1 | 0.3 |
| 1 | 1 | 1 | 0 | 1 | 0 | 0 | 0 | 0 | 0 | 0.3 | 1 | 0.3 | 0 | 0 | 0 | 0 | 0 | 0 | 0.3 | 1 | 0.3 |

(b)
Second Time

| Targetted Renewing Screen Display | | | Intermediate Transition I1-3b | | | Corrected Second Sub-frame Group: Applied Voltage | | | | Intermediate Transition I2-2a | | | Corrected Third Sub-frame Group: Applied Voltage | | | | | | Intermediate Transition I2-3a | | | First Sub-frame Group: Applied Voltage | | Intermediate Transition I2-1 | | |
|---|---|---|---|---|---|---|---|---|---|---|---|---|---|---|---|---|---|---|---|---|---|---|---|---|---|---|
| C | M | Y | C | M | Y | | | | | C | M | Y | | | | | | | C | M | Y | | | C | M | Y |
| 0 | 0 | 0 | 0 | 0.8 | 0 | 0 | 0 | 0 | 0 | 0 | 0.8 | 0 | 0 | 0 | 0 | 0 | 0 | 0 | 0 | 0.8 | 0 | 0 | 0 | 0 | 0.8 | 0 |
| 1 | 0 | 0 | 0.3 | 0.8 | 0 | 0 | 0 | 0 | 0 | 0.3 | 0.8 | 0 | 10 | 10 | 10 | 10 | 10 | 10 | 0.5 | 0.8 | 0 | 0 | 0 | 0.5 | 0.8 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 |

TABLE 7-3-continued

Basic Waveform Repeated Four Times

| | | | | | | | | | | | | | | | | | | | | | | | | | | |
|---|---|---|---|---|---|---|---|---|---|---|---|---|---|---|---|---|---|---|---|---|---|---|---|---|---|---|
| 1 | 1 | 0 | 0.3 | 1 | 0 | 0 | 0 | 0 | 0 | 0.3 | 1 | 0 | 0 | 0 | 0 | 0 | 0 | 0 | 0.3 | 1 | 0 | 0 | 0 | 0.3 | 1 | 0 |
| 0 | 0 | 1 | 0 | 0.8 | 0.3 | −15 | −15 | −15 | −15 | 0 | 0.5 | 0.3 | 0 | 0 | 0 | 0 | 0 | 0 | 0 | 0.5 | 0.3 | 30 | 30 | 0.3 | 0.8 | 0.5 |
| 1 | 0 | 1 | 0.3 | 0.8 | 0.3 | −15 | −15 | −15 | −15 | 0 | 0.5 | 0.3 | 10 | 10 | 10 | 10 | 10 | 10 | 0.3 | 0.5 | 0.3 | 30 | 30 | 0.5 | 0.8 | 0.5 |
| 0 | 1 | 1 | 0 | 1 | 0.3 | 0 | 0 | 0 | 0 | 0 | 1 | 0.3 | 0 | 0 | 0 | 0 | 0 | 0 | 0 | 1 | 0.3 | 30 | 30 | 0.3 | 1 | 0.5 |
| 1 | 1 | 1 | 0.3 | 1 | 0.3 | 0 | 0 | 0 | 0 | 0.3 | 1 | 0.3 | 0 | 0 | 0 | 0 | 0 | 0 | 0.3 | 1 | 0.3 | 30 | 30 | 0.5 | 1 | 0.5 |

| | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Targetted Renewing Screen Display | | | Intermediate Transition I1-3b | | | | | | | Intermediate Transition I2-2b | | | | | | | | | Intermediate Transition I2-3B | | |
| C | M | Y | C | M | Y | Applied Voltage | | | | C | M | Y | Applied Voltage | | | | | | C | M | Y |
| 0 | 0 | 0 | 0 | 0.8 | 0 | −15 | −15 | −15 | −15 | 0 | 0.5 | 0 | 0 | 0 | 0 | 0 | 0 | 0 | 0 | 0.5 | 0 |
| 1 | 0 | 0 | 0.3 | 0.8 | 0 | −15 | −15 | −15 | −15 | 0.3 | 0.5 | 0 | 10 | 10 | 10 | 10 | 10 | 10 | 0.5 | 0.5 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 |
| 1 | 1 | 0 | 0.3 | 1 | 0 | 0 | 0 | 0 | 0 | 0.3 | 1 | 0 | 10 | 10 | 10 | 10 | 10 | 10 | 0.5 | 1 | 0 |
| 0 | 0 | 1 | 0 | 0.8 | 0.3 | −15 | −15 | −15 | −15 | 0 | 0.5 | 0.5 | 0 | 0 | 0 | 0 | 0 | 0 | 0 | 0.5 | 0.5 |
| 1 | 0 | 1 | 0.3 | 0.8 | 0.3 | −15 | −15 | −15 | −15 | 0.3 | 0.5 | 0.5 | 10 | 10 | 10 | 10 | 10 | 10 | 0.5 | 0.5 | 0.5 |
| 0 | 1 | 1 | 0 | 1 | 0.3 | 0 | 0 | 0 | 0 | 0.3 | 1 | 0.5 | −10 | −10 | −10 | −10 | −10 | −10 | 0 | 1 | 0.5 |
| 1 | 1 | 1 | 0.3 | 1 | 0.3 | 0 | 0 | 0 | 0 | 0.5 | 1 | 0.5 | 0 | 0 | 0 | 0 | 0 | 0 | 0.5 | 1 | 0.5 |

(c)
Third Time

| | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Targetted Renewing Screen Display | | | Intermediate Transition I2-3b | | | | | | | Intermediate Transition I3-2a | | | | | | | | | Intermediate Transition I3-3a | | | Applied | | Intermediate Transition I3-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0.5 | 0 | 0 | 0 | 0 | 0 | 0 | 0.5 | 0 | 0 | 0 | 0 | 0 | 0 | 0 | 0 | 0.5 | 0 | 0 | 0 | 0 | 0.5 | 0 |
| 1 | 0 | 0 | 0.5 | 0.5 | 0 | 0 | 0 | 0 | 0 | 0.5 | 0.5 | 0 | 10 | 10 | 10 | 10 | 10 | 10 | 0.8 | 0.5 | 0 | 0 | 0 | 0.8 | 0.5 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 |
| 1 | 1 | 0 | 0.5 | 1 | 0 | 0 | 0 | 0 | 0 | 0.5 | 1 | 0 | 0 | 0 | 0 | 0 | 0 | 0 | 0.5 | 1 | 0 | 0 | 0 | 0.5 | 1 | 0 |
| 0 | 0 | 1 | 0 | 0.5 | 0.5 | −15 | −15 | −15 | −15 | 0 | 0.3 | 0.5 | 0 | 0 | 0 | 0 | 0 | 0 | 0 | 0.3 | 0.5 | 30 | 30 | 0.3 | 0.5 | 0.8 |
| 1 | 0 | 1 | 0.5 | 0.5 | 0.5 | −15 | −15 | −15 | −15 | 0.3 | 0.3 | 0.5 | 10 | 10 | 10 | 10 | 10 | 10 | 0.5 | 0.3 | 0.5 | 30 | 30 | 0.8 | 0.5 | 0.8 |
| 0 | 1 | 1 | 0 | 1 | 0.5 | 0 | 0 | 0 | 0 | 0 | 1 | 0.5 | 0 | 0 | 0 | 0 | 0 | 0 | 0 | 1 | 0.5 | 30 | 30 | 0.3 | 1 | 0.8 |
| 1 | 1 | 1 | 0.5 | 1 | 0.5 | 0 | 0 | 0 | 0 | 0.5 | 1 | 0.5 | 0 | 0 | 0 | 0 | 0 | 0 | 0.5 | 1 | 0.5 | 30 | 30 | 0.8 | 1 | 0.8 |

| | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Targetted Renewing Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0 | 0.5 | 0 | −15 | −15 | −15 | −15 | 0 | 0.3 | 0 | 0 | 0 | 0 | 0 | 0 | 0 | 0 | 0.3 | 0 |
| 1 | 0 | 0 | 0.5 | 0.5 | 0 | −15 | −15 | −15 | −15 | 0.5 | 0.3 | 0 | 10 | 10 | 10 | 10 | 10 | 10 | 0.8 | 0.3 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 |
| 1 | 1 | 0 | 0.5 | 1 | 0 | 0 | 0 | 0 | 0 | 0.5 | 1 | 0 | 10 | 10 | 10 | 10 | 10 | 10 | 0.8 | 1 | 0 |
| 0 | 0 | 1 | 0 | 0.5 | 0.5 | −15 | −15 | −15 | −15 | 0 | 0.3 | 0.8 | 0 | 0 | 0 | 0 | 0 | 0 | 0 | 0.3 | 0.8 |
| 1 | 0 | 1 | 0.5 | 0.5 | 0.5 | −15 | −15 | −15 | −15 | 0.5 | 0.3 | 0.8 | 10 | 10 | 10 | 10 | 10 | 10 | 0.8 | 0.3 | 0.8 |
| 0 | 1 | 1 | 0 | 1 | 0.5 | 0 | 0 | 0 | 0 | 0.3 | 1 | 0.8 | −10 | −10 | −10 | −10 | −10 | −10 | 0 | 1 | 0.8 |
| 1 | 1 | 1 | 0.5 | 1 | 0.5 | 0 | 0 | 0 | 0 | 0.8 | 1 | 0.8 | 0 | 0 | 0 | 0 | 0 | 0 | 0.8 | 1 | 0.8 |

(d)
Fourth Time

| | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Targetted Renewing Screen Display | | | Intermediate Transition I3-3b | | | | | | | Intermediate Transition I4-2a | | | | | | | | | Intermediate Transition I4-3a | | | Applied | | Intermediate Transition I4-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0.3 | 0 | 0 | 0 | 0 | 0 | 0 | 0.3 | 0 | 0 | 0 | 0 | 0 | 0 | 0 | 0 | 0.3 | 0 | 0 | 0 | 0 | 0.3 | 0 |
| 1 | 0 | 0 | 0.8 | 0.3 | 0 | 0 | 0 | 0 | 0 | 0.8 | 0.3 | 0 | 10 | 10 | 10 | 10 | 10 | 10 | 1 | 0.3 | 0 | 0 | 0 | 1 | 0.3 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 | 0 |
| 1 | 1 | 0 | 0.8 | 1 | 0 | 0 | 0 | 0 | 0 | 0.8 | 1 | 0 | 0 | 0 | 0 | 0 | 0 | 0 | 0.8 | 1 | 0 | 0 | 0 | 0.8 | 1 | 0 |
| 0 | 0 | 1 | 0 | 0.3 | 0.8 | −15 | −15 | −15 | −15 | 0 | 0 | 0.8 | 0 | 0 | 0 | 0 | 0 | 0 | 0 | 0 | 0.8 | 30 | 30 | 0.3 | 0.3 | 1 |
| 1 | 0 | 1 | 0.8 | 0.3 | 0.8 | −15 | −15 | −15 | −15 | 0.5 | 0 | 0.8 | 10 | 10 | 10 | 10 | 10 | 10 | 0.8 | 0 | 0.8 | 30 | 30 | 1 | 0.3 | 1 |

TABLE 7-3-continued

| Basic Waveform Repeated Four Times | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0 | 1 | 0.8 | 0 | 0 | 0 | 0 | 0 | 1 | 0.8 | 0 | 0 | 0 | 0 | 0 | 0 | 0 | 1 | 0.8 | 30 | 30 | 0.3 | 1 | 1 |
| 1 | 1 | 1 | 0.8 | 1 | 0.8 | 0 | 0 | 0 | 0 | 0.8 | 1 | 0.8 | 0 | 0 | 0 | 0 | 0 | 0 | 0.8 | 1 | 0.8 | 30 | 30 | 1 | 1 | 1 |

| | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Targetted Renewing Screen Display | | | Intermediate Transition I3-3b | | | | | | | Intermediate Transition I4-2b | | | | | | | | | Renewed Screen Display N | | |
| C | M | Y | C | M | Y | Applied Voltage | | | | C | M | Y | Applied Voltage | | | | | | C | M | Y |
| 0 | 0 | 0 | 0 | 0.3 | 0 | −15 | −15 | −15 | −15 | 0 | 0 | 0 | 0 | 0 | 0 | 0 | 0 | 0 | 0 | 0 | 0 |
| 1 | 0 | 0 | 0.8 | 0.3 | 0 | −15 | −15 | −15 | −15 | 0.8 | 0 | 0 | 10 | 10 | 10 | 10 | 10 | 10 | 1 | 0 | 0 |
| 0 | 1 | 0 | 0 | 1 | 0 | 0 | 0 | 0 | 0 | 0 | 1 | 0 | 0 | 0 | 0 | 0 | 0 | 0 | 0 | 1 | 0 |
| 1 | 1 | 0 | 0.8 | 1 | 0 | 0 | 0 | 0 | 0 | 0.8 | 1 | 0 | 10 | 10 | 10 | 10 | 10 | 10 | 1 | 1 | 0 |
| 0 | 0 | 1 | 0 | 0.3 | 0.8 | −15 | −15 | −15 | −15 | 0 | 0 | 1 | 0 | 0 | 0 | 0 | 0 | 0 | 0 | 0 | 1 |
| 1 | 0 | 1 | 0.8 | 0.3 | 0.8 | −15 | −15 | −15 | −15 | 0.8 | 0 | 1 | 10 | 10 | 10 | 10 | 10 | 10 | 1 | 0 | 1 |
| 0 | 1 | 1 | 0 | 1 | 0.8 | 0 | 0 | 0 | 0 | 0.3 | 1 | 1 | −10 | −10 | −10 | −10 | −10 | −10 | 0 | 1 | 1 |
| 1 | 1 | 1 | 0.8 | 1 | 0.8 | 0 | 0 | 0 | 0 | 1 | 1 | 1 | 0 | 0 | 0 | 0 | 0 | 0 | 1 | 1 | 1 |

TABLE 7-4

Basic Waveform Repeated Four Time (a)
First Time

| Targetted | | | Current | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| Renewing Screen Display | | | Screen Display CUR | | | | Intermediate Transition I1-2a | | | | Intermediate Transition I1-3a | | | | | Intermediate Transition I1-1 | | |
| C | M | Y | C | M | Y | Applied Voltage | C | M | Y | Applied Voltage | C | M | Y | Applied Voltage | | C | M | Y |
| 0 | 0 | 0 | 1 | 1 | 0 | | 1 | 1 | 0 | | 1 | 1 | 0 | 0 | 0 | 1 | 1 | 0 |
| 1 | 0 | 0 | 1 | 1 | 0 | | 1 | 1 | 0 | | 1 | 1 | 0 | 0 | 0 | 1 | 1 | 0 |
| 0 | 1 | 0 | 1 | 1 | 0 | | 1 | 1 | 0 | | 1 | 1 | 0 | 0 | 0 | 1 | 1 | 0 |
| 1 | 1 | 0 | 1 | 1 | 0 | | 1 | 1 | 0 | | 1 | 1 | 0 | 0 | 0 | 1 | 1 | 0 |
| 0 | 0 | 1 | 1 | 1 | 0 | | 1 | 1 | 0 | | 1 | 1 | 0 | 30 | 30 | 1 | 1 | 0.3 |
| 1 | 0 | 1 | 1 | 1 | 0 | | 1 | 1 | 0 | | 1 | 1 | 0 | 30 | 30 | 1 | 1 | 0.3 |
| 0 | 1 | 1 | 1 | 1 | 0 | | 1 | 1 | 0 | | 1 | 1 | 0 | 30 | 30 | 1 | 1 | 0.3 |
| 1 | 1 | 1 | 1 | 1 | 0 | | 1 | 1 | 0 | | 1 | 1 | 0 | 30 | 30 | 1 | 1 | 0.3 |

| Targetted | | | Current | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Screen Display CUR | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 1 | 1 | 0 | −15 | −15 | −15 | −15 | 0.8 | 0.8 | 0 | 0 | 0 | 0 | 0 | 0 | 0 | 0.8 | 0.8 | 0 |
| 1 | 0 | 0 | 1 | 1 | 0 | −15 | −15 | −15 | −15 | 0.8 | 0.8 | 0 | 10 | 10 | 10 | 10 | 10 | 10 | 1 | 0.8 | 0 |
| 0 | 1 | 0 | 1 | 1 | 0 | 0 | 0 | 0 | 0 | 1 | 1 | 0 | −10 | −10 | −10 | −10 | −10 | −10 | 0.8 | 1 | 0 |
| 1 | 1 | 0 | 1 | 1 | 0 | 0 | 0 | 0 | 0 | 1 | 1 | 0 | 0 | 0 | 0 | 0 | 0 | 0 | 1 | 1 | 0 |
| 0 | 0 | 1 | 1 | 1 | 0 | −15 | −15 | −15 | −15 | 0.8 | 0.8 | 0.3 | 0 | 0 | 0 | 0 | 0 | 0 | 0.8 | 0.8 | 0.3 |
| 1 | 0 | 1 | 1 | 1 | 0 | −15 | −15 | −15 | −15 | 0.8 | 0.8 | 0.3 | 10 | 10 | 10 | 10 | 10 | 10 | 1 | 0.8 | 0.3 |
| 0 | 1 | 1 | 1 | 1 | 0 | 0 | 0 | 0 | 0 | 1 | 1 | 0.3 | −10 | −10 | −10 | −10 | −10 | −10 | 0.8 | 1 | 0.3 |
| 1 | 1 | 1 | 1 | 1 | 0 | 0 | 0 | 0 | 0 | 1 | 1 | 0.3 | 0 | 0 | 0 | 0 | 0 | 0 | 1 | 1 | 0.3 |

(b)
Second Time

| Targetted | | | | | | Corrected Second Sub-frame Group | | | | | | | Corrected Third Sub-frame Group | | | | | | | | | First | |
|---|---|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2a | | | | | | | | | Intermediate Transition I2-3a | | | Sub-frame Group Applied | |
| C | M | Y | C | M | Y | Applied Voltage | | | | C | M | Y | Applied Voltage | | | | | | C | M | Y | Voltage | |
| 0 | 0 | 0 | 0.8 | 0.8 | 0 | 0 | 0 | 0 | 0 | 0.8 | 0.8 | 0 | 0 | 0 | 0 | 0 | 0 | 0 | 0.8 | 0.8 | 0 | 0 | 0 |
| 1 | 0 | 0 | 1 | 0.8 | 0 | 0 | 0 | 0 | 0 | 1 | 0.8 | 0 | 0 | 0 | 0 | 0 | 0 | 0 | 1 | 0.8 | 0 | 0 | 0 |
| 0 | 1 | 0 | 0.8 | 1 | 0 | 0 | 0 | 0 | 0 | 0.8 | 1 | 0 | 0 | 0 | 0 | 0 | 0 | 0 | 0.8 | 1 | 0 | 0 | 0 |

TABLE 7-4-continued

Basic Waveform Repeated Four Time

| | | | | | | | | | | | | | | | | | | | | | | | |
|---|---|---|---|---|---|---|---|---|---|---|---|---|---|---|---|---|---|---|---|---|---|---|---|
| 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 |
| 0 | 0 | 1 | 0.8 | 0.8 | 0.3 | −15 | −15 | −15 | −15 | 0.5 | 0.5 | 0.3 | 0 | 0 | 0 | 0 | 0 | 0 | 0.5 | 0.5 | 0.3 | 30 | 30 |
| 1 | 0 | 1 | 1 | 0.8 | 0.3 | −15 | −15 | −15 | −15 | 0.8 | 0.5 | 0.3 | 10 | 10 | 10 | 10 | 10 | 10 | 1 | 0.5 | 0.3 | 30 | 30 |
| 0 | 1 | 1 | 0.8 | 1 | 0.3 | 0 | 0 | 0 | 0 | 0.8 | 1 | 0.3 | −10 | −10 | −10 | −10 | −10 | −10 | 0.5 | 1 | 0.3 | 30 | 30 |
| 1 | 1 | 1 | 1 | 1 | 0.3 | 0 | 0 | 0 | 0 | 1 | 1 | 0.3 | 0 | 0 | 0 | 0 | 0 | 0 | 1 | 1 | 0.3 | 30 | 30 |

| Targetted Renewing Screen Display | | | Intermediate Transition I1-3b | | | First Sub-frame Group Intermediate Transition I2-1 | | | Second Sub-frame Group Applied Voltage | | | | Intermediate Transition I2-2b | | | Third Sub-frame Group Applied Voltage | | | | | | Intermediate Transition I2-3b | | |
|---|---|---|---|---|---|---|---|---|---|---|---|---|---|---|---|---|---|---|---|---|---|---|---|---|
| C | M | Y | C | M | Y | C | M | Y | | | | | C | M | Y | | | | | | | C | M | Y |
| 0 | 0 | 0 | 0.8 | 0.8 | 0 | 0.8 | 0.8 | 0 | −15 | −15 | −15 | −15 | 0.5 | 0.5 | 0 | 0 | 0 | 0 | 0 | 0 | 0 | 0.5 | 0.5 | 0 |
| 1 | 0 | 0 | 1 | 0.8 | 0 | 1 | 0.8 | 0 | −15 | −15 | −15 | −15 | 0.8 | 0.5 | 0 | 10 | 10 | 10 | 10 | 10 | 10 | 1 | 0.5 | 0 |
| 0 | 1 | 0 | 0.8 | 1 | 0 | 0.8 | 1 | 0 | 0 | 0 | 0 | 0 | 0.8 | 1 | 0 | −10 | −10 | −10 | −10 | −10 | −10 | 0.5 | 1 | 0 |
| 1 | 1 | 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 |
| 0 | 0 | 1 | 0.8 | 0.8 | 0.3 | 0.8 | 0.8 | 0.5 | −15 | −15 | −15 | −15 | 0.5 | 0.5 | 0.5 | 0 | 0 | 0 | 0 | 0 | 0 | 0.5 | 0.5 | 0.5 |
| 1 | 0 | 1 | 1 | 0.8 | 0.3 | 1 | 0.8 | 0.5 | −15 | −15 | −15 | −15 | 0.8 | 0.5 | 0.5 | 10 | 10 | 10 | 10 | 10 | 10 | 1 | 0.5 | 0.5 |
| 0 | 1 | 1 | 0.8 | 1 | 0.3 | 0.8 | 1 | 0.5 | 0 | 0 | 0 | 0 | 0.8 | 1 | 0.5 | −10 | −10 | −10 | −10 | −10 | −10 | 0.5 | 1 | 0.5 |
| 1 | 1 | 1 | 1 | 1 | 0.3 | 1 | 1 | 0.5 | 0 | 0 | 0 | 0 | 1 | 1 | 0.5 | 0 | 0 | 0 | 0 | 0 | 0 | 1 | 1 | 0.5 |

(c)
Third Time

| Targetted Renewing Screen Display | | | Intermediate Transition I2-3b | | | Corrected Second Sub-frame Group Applied Voltage | | | | Intermediate Transition I3-2a | | | Corrected Third Sub-frame Group Applied Voltage | | | | | | Intermediate Transition I3-3a | | | First Sub-frame Group Applied Voltage | |
|---|---|---|---|---|---|---|---|---|---|---|---|---|---|---|---|---|---|---|---|---|---|---|---|
| C | M | Y | C | M | Y | | | | | C | M | Y | | | | | | | C | M | Y | | |
| 0 | 0 | 0 | 0.5 | 0.5 | 0 | 0 | 0 | 0 | 0 | 0.5 | 0.5 | 0 | 0 | 0 | 0 | 0 | 0 | 0 | 0.5 | 0.5 | 0 | 0 | 0 |
| 1 | 0 | 0 | 1 | 0.5 | 0 | 0 | 0 | 0 | 0 | 1 | 0.5 | 0 | 0 | 0 | 0 | 0 | 0 | 0 | 1 | 0.5 | 0 | 0 | 0 |
| 0 | 1 | 0 | 0.5 | 1 | 0 | 0 | 0 | 0 | 0 | 0.5 | 1 | 0 | 0 | 0 | 0 | 0 | 0 | 0 | 0.5 | 1 | 0 | 0 | 0 |
| 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 |
| 0 | 0 | 1 | 0.5 | 0.5 | 0.5 | −15 | −15 | −15 | −15 | 0.3 | 0.3 | 0.5 | 0 | 0 | 0 | 0 | 0 | 0 | 0.3 | 0.3 | 0.5 | 30 | 30 |
| 1 | 0 | 1 | 1 | 0.5 | 0.5 | −15 | −15 | −15 | −15 | 0.8 | 0.3 | 0.5 | 10 | 10 | 10 | 10 | 10 | 10 | 1 | 0.3 | 0.5 | 30 | 30 |
| 0 | 1 | 1 | 0.5 | 1 | 0.5 | 0 | 0 | 0 | 0 | 0.5 | 1 | 0.5 | −10 | −10 | −10 | −10 | −10 | −10 | 0.3 | 1 | 0.5 | 30 | 30 |
| 1 | 1 | 1 | 1 | 1 | 0.5 | 0 | 0 | 0 | 0 | 1 | 1 | 0.5 | 0 | 0 | 0 | 0 | 0 | 0 | 1 | 1 | 0.5 | 30 | 30 |

| Targetted Renewing Screen Display | | | Intermediate Transition I2-3b | | | First Sub-frame Group Intermediate Transition I3-1 | | | Second Sub-frame Group Applied Voltage | | | | Intermediate Transition I3-2b | | | Third Sub-frame Group Applied Voltage | | | | | | Intermediate Transition I3-3b | | |
|---|---|---|---|---|---|---|---|---|---|---|---|---|---|---|---|---|---|---|---|---|---|---|---|---|
| C | M | Y | C | M | Y | C | M | Y | | | | | C | M | Y | | | | | | | C | M | Y |
| 0 | 0 | 0 | 0.5 | 0.5 | 0 | 0.5 | 0.5 | 0 | −15 | −15 | −15 | −15 | 0.3 | 0.3 | 0 | 0 | 0 | 0 | 0 | 0 | 0 | 0.3 | 0.3 | 0 |
| 1 | 0 | 0 | 1 | 0.5 | 0 | 1 | 0.5 | 0 | −15 | −15 | −15 | −15 | 0.8 | 0.3 | 0 | 10 | 10 | 10 | 10 | 10 | 10 | 1 | 0.3 | 0 |
| 0 | 1 | 0 | 0.5 | 1 | 0 | 0.5 | 1 | 0 | 0 | 0 | 0 | 0 | 0.5 | 1 | 0 | −10 | −10 | −10 | −10 | −10 | −10 | 0.3 | 1 | 0 |
| 1 | 1 | 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 |
| 0 | 0 | 1 | 0.5 | 0.5 | 0.5 | 0.5 | 0.5 | 0.8 | −15 | −15 | −15 | −15 | 0.3 | 0.3 | 0.8 | 0 | 0 | 0 | 0 | 0 | 0 | 0.3 | 0.3 | 0.8 |
| 1 | 0 | 1 | 1 | 0.5 | 0.5 | 1 | 0.5 | 0.8 | −15 | −15 | −15 | −15 | 0.8 | 0.3 | 0.8 | 10 | 10 | 10 | 10 | 10 | 10 | 1 | 0.3 | 0.8 |
| 0 | 1 | 1 | 0.5 | 1 | 0.5 | 0.5 | 1 | 0.8 | 0 | 0 | 0 | 0 | 0.5 | 1 | 0.8 | −10 | −10 | −10 | −10 | −10 | −10 | 0.3 | 1 | 0.8 |
| 1 | 1 | 1 | 1 | 1 | 0.5 | 1 | 1 | 0.8 | 0 | 0 | 0 | 0 | 1 | 1 | 0.8 | 0 | 0 | 0 | 0 | 0 | 0 | 1 | 1 | 0.8 |

(d)
Fourth Time

| Targetted Renewing Screen Display | | | Intermediate Transition I3-3b | | | Corrected Second Sub-frame Group Applied Voltage | | | | Intermediate Transition I4-2a | | | Corrected Third Sub-frame Group Applied Voltage | | | | | | Intermediate Transition I4-3a | | | First Sub-frame Group Applied Voltage | |
|---|---|---|---|---|---|---|---|---|---|---|---|---|---|---|---|---|---|---|---|---|---|---|---|
| C | M | Y | C | M | Y | | | | | C | M | Y | | | | | | | C | M | Y | | |
| 0 | 0 | 0 | 0.3 | 0.3 | 0 | 0 | 0 | 0 | 0 | 0.3 | 0.3 | 0 | 0 | 0 | 0 | 0 | 0 | 0 | 0.3 | 0.3 | 0 | 0 | 0 |
| 1 | 0 | 0 | 1 | 0.3 | 0 | 0 | 0 | 0 | 0 | 1 | 0.3 | 0 | 0 | 0 | 0 | 0 | 0 | 0 | 1 | 0.3 | 0 | 0 | 0 |
| 0 | 1 | 0 | 0.3 | 1 | 0 | 0 | 0 | 0 | 0 | 0.3 | 1 | 0 | 0 | 0 | 0 | 0 | 0 | 0 | 0.3 | 1 | 0 | 0 | 0 |

TABLE 7-4-continued

Basic Waveform Repeated Four Time

| | | | | | | | | | | | | | | | | | | | | | | | |
|---|---|---|---|---|---|---|---|---|---|---|---|---|---|---|---|---|---|---|---|---|---|---|---|
| 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 |
| 0 | 0 | 1 | 0.3 | 0.3 | 0.8 | −15 | −15 | −15 | −15 | 0 | 0 | 0.8 | 0 | 0 | 0 | 0 | 0 | 0 | 0 | 0 | 0.8 | 30 | 30 |
| 1 | 0 | 1 | 1 | 0.3 | 0.8 | −15 | −15 | −15 | −15 | 0.8 | 0 | 0.8 | 10 | 10 | 10 | 10 | 10 | 10 | 1 | 0 | 0.8 | 30 | 30 |
| 0 | 1 | 1 | 0.3 | 1 | 0.8 | 0 | 0 | 0 | 0 | 0.3 | 1 | 0.8 | −10 | −10 | −10 | −10 | −10 | −10 | 0 | 1 | 0.8 | 30 | 30 |
| 1 | 1 | 1 | 1 | 1 | 0.8 | 0 | 0 | 0 | 0 | 1 | 1 | 0.8 | 0 | 0 | 0 | 0 | 0 | 0 | 1 | 1 | 0.8 | 30 | 30 |

| Targetted | | | | | | First Sub-frame Group | | | Second Sub-frame Group | | | | | | | Third Sub-frame Group | | | | | | | | |
|---|---|---|---|---|---|---|---|---|---|---|---|---|---|---|---|---|---|---|---|---|---|---|---|---|
| Renewing Screen Display | | | Intermediate Transition I3-3b | | | Intermediate Transition I4-1 | | | | | | | Intermediate Transition I4-2b | | | | | | | | | Renewed Screen Display N | | |
| C | M | Y | C | M | Y | C | M | Y | Applied Voltage | | | | C | M | Y | Applied Voltage | | | | | | C | M | Y |
| 0 | 0 | 0 | 0.3 | 0.3 | 0 | 0.3 | 0.3 | 0 | −15 | −15 | −15 | −15 | 0 | 0 | 0 | 0 | 0 | 0 | 0 | 0 | 0 | 0 | 0 | 0 |
| 1 | 0 | 0 | 1 | 0.3 | 0 | 1 | 0.3 | 0 | −15 | −15 | −15 | −15 | 0.8 | 0 | 0 | 10 | 10 | 10 | 10 | 10 | 10 | 1 | 0 | 0 |
| 0 | 1 | 0 | 0.3 | 1 | 0 | 0.3 | 1 | 0 | 0 | 0 | 0 | 0 | 0.3 | 1 | 0 | −10 | −10 | −10 | −10 | −10 | −10 | 0 | 1 | 0 |
| 1 | 1 | 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 |
| 0 | 0 | 1 | 0.3 | 0.3 | 0.8 | 0.3 | 0.3 | 1 | −15 | −15 | −15 | −15 | 0 | 0 | 1 | 0 | 0 | 0 | 0 | 0 | 0 | 0 | 0 | 1 |
| 1 | 0 | 1 | 1 | 0.3 | 0.8 | 1 | 0.3 | 1 | −15 | −15 | −15 | −15 | 0.8 | 0 | 1 | 10 | 10 | 10 | 10 | 10 | 10 | 1 | 0 | 1 |
| 0 | 1 | 1 | 0.3 | 1 | 0.8 | 0.3 | 1 | 1 | 0 | 0 | 0 | 0 | 0.3 | 1 | 1 | −10 | −10 | −10 | −10 | −10 | −10 | 0 | 1 | 1 |
| 1 | 1 | 1 | 1 | 1 | 0.8 | 1 | 1 | 1 | 0 | 0 | 0 | 0 | 1 | 1 | 1 | 0 | 0 | 0 | 0 | 0 | 0 | 1 | 1 | 1 |

TABLE 7-5

Basic Waveform Repeated Four Times (a)
First Time

| Targetted | | | | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| Renewing Screen Display | | | Current Screen Display CUR | | | | Intermediate Transition I1-2a | | | | Intermediate Transition I1-3a | | | | | Intermediate Transition I1-1 | | |
| C | M | Y | C | M | Y | Applied Voltage | C | M | Y | Applied Voltage | C | M | Y | Applied Voltage | | C | M | Y |
| 0 | 0 | 0 | 0 | 0 | 1 | | 0 | 0 | 1 | | 0 | 0 | 1 | −30 | −30 | 0 | 0 | 0.8 |
| 1 | 0 | 0 | 0 | 0 | 1 | | 0 | 0 | 1 | | 0 | 0 | 1 | −30 | −30 | 0 | 0 | 0.8 |
| 0 | 1 | 0 | 0 | 0 | 1 | | 0 | 0 | 1 | | 0 | 0 | 1 | −30 | −30 | 0 | 0 | 0.8 |
| 1 | 1 | 0 | 0 | 0 | 1 | | 0 | 0 | 1 | | 0 | 0 | 1 | −30 | −30 | 0 | 0 | 0.8 |
| 0 | 0 | 1 | 0 | 0 | 1 | | 0 | 0 | 1 | | 0 | 0 | 1 | 0 | 0 | 0 | 0 | 1 |
| 1 | 0 | 1 | 0 | 0 | 1 | | 0 | 0 | 1 | | 0 | 0 | 1 | 0 | 0 | 0 | 0 | 1 |
| 0 | 1 | 1 | 0 | 0 | 1 | | 0 | 0 | 1 | | 0 | 0 | 1 | 0 | 0 | 0 | 0 | 1 |
| 1 | 1 | 1 | 0 | 0 | 1 | | 0 | 0 | 1 | | 0 | 0 | 1 | 0 | 0 | 0 | 0 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Current Screen Display CUR | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 0 | 0 | 1 | 0 | 0 | 0 | 0 | 0 | 0 | 0.8 | 0 | 0 | 0 | 0 | 0 | 0 | 0 | 0 | 0.8 |
| 1 | 0 | 0 | 0 | 0 | 1 | 0 | 0 | 0 | 0 | 0 | 0 | 0.8 | 10 | 10 | 10 | 10 | 10 | 10 | 0.3 | 0 | 0.8 |
| 0 | 1 | 0 | 0 | 0 | 1 | 15 | 15 | 15 | 15 | 0.3 | 0.3 | 0.8 | −10 | −10 | −10 | −10 | −10 | −10 | 0 | 0.3 | 0.8 |
| 1 | 1 | 0 | 0 | 0 | 1 | 15 | 15 | 15 | 15 | 0.3 | 0.3 | 0.8 | 0 | 0 | 0 | 0 | 0 | 0 | 0.3 | 0.3 | 0.8 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 |
| 1 | 0 | 1 | 0 | 0 | 1 | 0 | 0 | 0 | 0 | 0 | 0 | 1 | 10 | 10 | 10 | 10 | 10 | 10 | 0.3 | 0 | 1 |
| 0 | 1 | 1 | 0 | 0 | 1 | 15 | 15 | 15 | 15 | 0.3 | 0.3 | 1 | −10 | −10 | −10 | −10 | −10 | −10 | 0 | 0.3 | 1 |
| 1 | 1 | 1 | 0 | 0 | 1 | 15 | 15 | 15 | 15 | 0.3 | 0.3 | 1 | 0 | 0 | 0 | 0 | 0 | 0 | 0.3 | 0.3 | 1 |

TABLE 7-5-continued

Basic Waveform Repeated Four Times (b)
Second Time

| Targetted Renewing Screen Display | | | Intermediate Transition I1-3b | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| | | | | | | Applied Voltage | | | | Intermediate Transition I2-2a | | | Applied Voltage | | | | | | Intermediate Transition I2-3a | | | Applied Voltage | | Intermediate Transition I2-1 | | |
| C | M | Y | C | M | Y | | | | | C | M | Y | | | | | | | C | M | Y | | | C | M | Y |
| 0 | 0 | 0 | 0 | 0 | 0.8 | 0 | 0 | 0 | 0 | 0 | 0 | 0.8 | 0 | 0 | 0 | 0 | 0 | 0 | 0 | 0 | 0.8 | −30 | −30 | 0 | 0 | 0.5 |
| 1 | 0 | 0 | 0.3 | 0 | 0.8 | 0 | 0 | 0 | 0 | 0.3 | 0 | 0.8 | 10 | 10 | 10 | 10 | 10 | 10 | 0.5 | 0 | 0.8 | −30 | −30 | 0.3 | 0 | 0.5 |
| 0 | 1 | 0 | 0 | 0.3 | 0.8 | 15 | 15 | 15 | 15 | 0.3 | 0.5 | 0.8 | −10 | −10 | −10 | −10 | −10 | −10 | 0 | 0.5 | 0.8 | −30 | −30 | 0 | 0.3 | 0.5 |
| 1 | 1 | 0 | 0.3 | 0.3 | 0.8 | 15 | 15 | 15 | 15 | 0.5 | 0.5 | 0.8 | 0 | 0 | 0 | 0 | 0 | 0 | 0.5 | 0.5 | 0.8 | −30 | −30 | 0.3 | 0.3 | 0.5 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 |
| 1 | 0 | 1 | 0.3 | 0 | 1 | 0 | 0 | 0 | 0 | 0.3 | 0 | 1 | 0 | 0 | 0 | 0 | 0 | 0 | 0.3 | 0 | 1 | 0 | 0 | 0.3 | 0 | 1 |
| 0 | 1 | 1 | 0 | 0.3 | 1 | 0 | 0 | 0 | 0 | 0 | 0.3 | 1 | 0 | 0 | 0 | 0 | 0 | 0 | 0 | 0.3 | 1 | 0 | 0 | 0 | 0.3 | 1 |
| 1 | 1 | 1 | 0.3 | 0.3 | 1 | 0 | 0 | 0 | 0 | 0.3 | 0.3 | 1 | 0 | 0 | 0 | 0 | 0 | 0 | 0.3 | 0.3 | 1 | 0 | 0 | 0.3 | 0.3 | 1 |

| Targetted Renewing Screen Display | | | Intermediate Transition I1-3b | | | Second Sub-frame Group | | | | | | | Third Sub-frame Group | | | | | | | | |
|---|---|---|---|---|---|---|---|---|---|---|---|---|---|---|---|---|---|---|---|---|---|
| | | | | | | Applied Voltage | | | | Intermediate Transition I2-2b | | | Applied Voltage | | | | | | Intermediate Transition I2-3b | | |
| C | M | Y | C | M | Y | | | | | C | M | Y | | | | | | | C | M | Y |
| 0 | 0 | 0 | 0 | 0 | 0.8 | 0 | 0 | 0 | 0 | 0 | 0 | 0.5 | 0 | 0 | 0 | 0 | 0 | 0 | 0 | 0 | 0.5 |
| 1 | 0 | 0 | 0.3 | 0 | 0.8 | 0 | 0 | 0 | 0 | 0.3 | 0 | 0.5 | 10 | 10 | 10 | 10 | 10 | 10 | 0.5 | 0 | 0.5 |
| 0 | 1 | 0 | 0 | 0.3 | 0.8 | 15 | 15 | 15 | 15 | 0.3 | 0.5 | 0.5 | −10 | −10 | −10 | −10 | −10 | −10 | 0 | 0.5 | 0.5 |
| 1 | 1 | 0 | 0.3 | 0.3 | 0.8 | 15 | 15 | 15 | 15 | 0.5 | 0.5 | 0.5 | 0 | 0 | 0 | 0 | 0 | 0 | 0.5 | 0.5 | 0.5 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 |
| 1 | 0 | 1 | 0.3 | 0 | 1 | 0 | 0 | 0 | 0 | 0.3 | 0 | 1 | 10 | 10 | 10 | 10 | 10 | 10 | 0.5 | 0 | 1 |
| 0 | 1 | 1 | 0 | 0.3 | 1 | 15 | 15 | 15 | 15 | 0.3 | 0.5 | 1 | −10 | −10 | −10 | −10 | −10 | −10 | 0 | 0.5 | 1 |
| 1 | 1 | 1 | 0.3 | 0.3 | 1 | 15 | 15 | 15 | 15 | 0.5 | 0.5 | 1 | 0 | 0 | 0 | 0 | 0 | 0 | 0.5 | 0.5 | 1 |

(c)
Third Time

| Targetted Renewing Screen Display | | | Intermediate Transition I2-3b | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| | | | | | | Applied Voltage | | | | Intermediate Transition I3-2a | | | Applied Voltage | | | | | | Intermediate Transition I3-3a | | | Applied Voltage | | Intermediate Transition I3-1 | | |
| C | M | Y | C | M | Y | | | | | C | M | Y | | | | | | | C | M | Y | | | C | M | Y |
| 0 | 0 | 0 | 0 | 0 | 0.5 | 0 | 0 | 0 | 0 | 0 | 0 | 0.5 | 0 | 0 | 0 | 0 | 0 | 0 | 0 | 0 | 0.5 | −30 | −30 | 0 | 0 | 0.3 |
| 1 | 0 | 0 | 0.5 | 0 | 0.5 | 0 | 0 | 0 | 0 | 0.5 | 0 | 0.5 | 10 | 10 | 10 | 10 | 10 | 10 | 0.8 | 0 | 0.5 | −30 | −30 | 0.5 | 0 | 0.3 |
| 0 | 1 | 0 | 0 | 0.5 | 0.5 | 15 | 15 | 15 | 15 | 0.3 | 0.8 | 0.5 | −10 | −10 | −10 | −10 | −10 | −10 | 0 | 0.8 | 0.5 | −30 | −30 | 0 | 0.5 | 0.3 |
| 1 | 1 | 0 | 0.5 | 0.5 | 0.5 | 15 | 15 | 15 | 15 | 0.8 | 0.8 | 0.5 | 0 | 0 | 0 | 0 | 0 | 0 | 0.8 | 0.8 | 0.5 | −30 | −30 | 0.5 | 0.5 | 0.3 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 |
| 1 | 0 | 1 | 0.5 | 0 | 1 | 0 | 0 | 0 | 0 | 0.5 | 0 | 1 | 0 | 0 | 0 | 0 | 0 | 0 | 0.5 | 0 | 1 | 0 | 0 | 0.5 | 0 | 1 |
| 0 | 1 | 1 | 0 | 0.5 | 1 | 0 | 0 | 0 | 0 | 0 | 0.5 | 1 | 0 | 0 | 0 | 0 | 0 | 0 | 0 | 0.5 | 1 | 0 | 0 | 0 | 0.5 | 1 |
| 1 | 1 | 1 | 0.5 | 0.5 | 1 | 0 | 0 | 0 | 0 | 0.5 | 0.5 | 1 | 0 | 0 | 0 | 0 | 0 | 0 | 0.5 | 0.5 | 1 | 0 | 0 | 0.5 | 0.5 | 1 |

| Targetted Renewing Screen Display | | | Intermediate Transition I2-3b | | | Second Sub-frame Group | | | | | | | Third Sub-frame Group | | | | | | | | |
|---|---|---|---|---|---|---|---|---|---|---|---|---|---|---|---|---|---|---|---|---|---|
| | | | | | | Applied Voltage | | | | Intermediate Transition I3-2b | | | Applied Voltage | | | | | | Intermediate Transition I3-3b | | |
| C | M | Y | C | M | Y | | | | | C | M | Y | | | | | | | C | M | Y |
| 0 | 0 | 0 | 0 | 0 | 0.5 | 0 | 0 | 0 | 0 | 0 | 0 | 0.3 | 0 | 0 | 0 | 0 | 0 | 0 | 0 | 0 | 0.3 |
| 1 | 0 | 0 | 0.5 | 0 | 0.5 | 0 | 0 | 0 | 0 | 0.5 | 0 | 0.3 | 10 | 10 | 10 | 10 | 10 | 10 | 0.8 | 0 | 0.3 |
| 0 | 1 | 0 | 0 | 0.5 | 0.5 | 15 | 15 | 15 | 15 | 0.3 | 0.8 | 0.3 | −10 | −10 | −10 | −10 | −10 | −10 | 0 | 0.8 | 0.3 |
| 1 | 1 | 0 | 0.5 | 0.5 | 0.5 | 15 | 15 | 15 | 15 | 0.8 | 0.8 | 0.3 | 0 | 0 | 0 | 0 | 0 | 0 | 0.8 | 0.8 | 0.3 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 |
| 1 | 0 | 1 | 0.5 | 0 | 1 | 0 | 0 | 0 | 0 | 0.5 | 0 | 1 | 10 | 10 | 10 | 10 | 10 | 10 | 0.8 | 0 | 1 |
| 0 | 1 | 1 | 0 | 0.5 | 1 | 15 | 15 | 15 | 15 | 0.3 | 0.8 | 1 | −10 | −10 | −10 | −10 | −10 | −10 | 0 | 0.8 | 1 |
| 1 | 1 | 1 | 0.5 | 0.5 | 1 | 15 | 15 | 15 | 15 | 0.8 | 0.8 | 1 | 0 | 0 | 0 | 0 | 0 | 0 | 0.8 | 0.8 | 1 |

TABLE 7-5-continued

Basic Waveform Repeated Four Times (d)
Fourth Time

| Targetted Renewing Screen Display | | | Intermediate Transition I3-3b | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| | | | | | | | | | | Intermediate Transition I4-2a | | | | | | | | | Intermediate Transition I4-3a | | | Applied Voltage | | Intermediate Transition I4-1 | | |
| C | M | Y | C | M | Y | Applied Voltage | | | | C | M | Y | Applied Voltage | | | | | | C | M | Y | | | C | M | Y |
| 0 | 0 | 0 | 0 | 0 | 0.3 | 0 | 0 | 0 | 0 | 0 | 0 | 0.3 | 0 | 0 | 0 | 0 | 0 | 0 | 0 | 0 | 0.3 | −30 | −30 | 0 | 0 | 0 |
| 1 | 0 | 0 | 0.8 | 0 | 0.3 | 0 | 0 | 0 | 0 | 0.8 | 0 | 0.3 | 10 | 10 | 10 | 10 | 10 | 10 | 1 | 0 | 0.3 | −30 | −30 | 0.8 | 0 | 0 |
| 0 | 1 | 0 | 0 | 0.8 | 0.3 | 15 | 15 | 15 | 15 | 0.3 | 1 | 0.3 | −10 | −10 | −10 | −10 | −10 | −10 | 0 | 1 | 0.3 | −30 | −30 | 0 | 0.8 | 0 |
| 1 | 1 | 0 | 0.8 | 0.8 | 0.3 | 15 | 15 | 15 | 15 | 1 | 1 | 0.3 | 0 | 0 | 0 | 0 | 0 | 0 | 1 | 1 | 0.3 | −30 | −30 | 0.8 | 0.8 | 0 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 1 |
| 1 | 0 | 1 | 0.8 | 0 | 1 | 0 | 0 | 0 | 0 | 0.8 | 0 | 1 | 0 | 0 | 0 | 0 | 0 | 0 | 0.8 | 0 | 1 | 0 | 0 | 0.8 | 0 | 1 |
| 0 | 1 | 1 | 0 | 0.8 | 1 | 0 | 0 | 0 | 0 | 0 | 0.8 | 1 | 0 | 0 | 0 | 0 | 0 | 0 | 0 | 0.8 | 1 | 0 | 0 | 0 | 0.8 | 1 |
| 1 | 1 | 1 | 0.8 | 0.8 | 1 | 0 | 0 | 0 | 0 | 0.8 | 0.8 | 1 | 0 | 0 | 0 | 0 | 0 | 0 | 0.8 | 0.8 | 1 | 0 | 0 | 0.8 | 0.8 | 1 |

| Targetted Renewing Screen Display | | | Intermediate Transition I3-3b | | | Second Sub-frame Group | | | | | | | Third Sub-frame Group | | | | | | | | |
|---|---|---|---|---|---|---|---|---|---|---|---|---|---|---|---|---|---|---|---|---|---|
| | | | | | | | | | | Intermediate Transition I4-2b | | | | | | | | | Renewed Screen Display N | | |
| C | M | Y | C | M | Y | Applied Voltage | | | | C | M | Y | Applied Voltage | | | | | | C | M | Y |
| 0 | 0 | 0 | 0 | 0 | 0.3 | 0 | 0 | 0 | 0 | 0 | 0 | 0 | 0 | 0 | 0 | 0 | 0 | 0 | 0 | 0 | 0 |
| 1 | 0 | 0 | 0.8 | 0 | 0.3 | 0 | 0 | 0 | 0 | 0.8 | 0 | 0 | 10 | 10 | 10 | 10 | 10 | 10 | 1 | 0 | 0 |
| 0 | 1 | 0 | 0 | 0.8 | 0.3 | 15 | 15 | 15 | 15 | 0.3 | 1 | 0 | −10 | −10 | −10 | −10 | −10 | −10 | 0 | 1 | 0 |
| 1 | 1 | 0 | 0.8 | 0.8 | 0.3 | 15 | 15 | 15 | 15 | 1 | 1 | 0 | 0 | 0 | 0 | 0 | 0 | 0 | 1 | 1 | 0 |
| 0 | 0 | 1 | 0 | 0 | 1 | 0 | 0 | 0 | 0 | 0 | 0 | 1 | 0 | 0 | 0 | 0 | 0 | 0 | 0 | 0 | 1 |
| 1 | 0 | 1 | 0.8 | 0 | 1 | 0 | 0 | 0 | 0 | 0.8 | 0 | 1 | 10 | 10 | 10 | 10 | 10 | 10 | 1 | 0 | 1 |
| 0 | 1 | 1 | 0 | 0.8 | 1 | 15 | 15 | 15 | 15 | 0.3 | 1 | 1 | −10 | −10 | −10 | −10 | −10 | −10 | 0 | 1 | 1 |
| 1 | 1 | 1 | 0.8 | 0.8 | 1 | 15 | 15 | 15 | 15 | 1 | 1 | 1 | 0 | 0 | 0 | 0 | 0 | 0 | 1 | 1 | 1 |

TABLE 7-6

Basic Waveform Repeated Four Times (a)
First Time

| Targetted Renewing Screen Display | | | Current Screen Display CUR | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| | | | | | | | Intermediate Transition I1-2a | | | | Intermediate Transition I1-3a | | | Applied Voltage | | Intermediate Transition I1-1 | | |
| C | M | Y | C | M | Y | Applied Voltage | C | M | Y | Applied Voltage | C | M | Y | | | C | M | Y |
| 0 | 0 | 0 | 1 | 0 | 1 | | 1 | 0 | 1 | | 1 | 0 | 1 | −30 | −30 | 0.8 | 0 | 0.8 |
| 1 | 0 | 0 | 1 | 0 | 1 | | 1 | 0 | 1 | | 1 | 0 | 1 | −30 | −30 | 0.8 | 0 | 0.8 |
| 0 | 1 | 0 | 1 | 0 | 1 | | 1 | 0 | 1 | | 1 | 0 | 1 | −30 | −30 | 0.8 | 0 | 0.8 |
| 1 | 1 | 0 | 1 | 0 | 1 | | 1 | 0 | 1 | | 1 | 0 | 1 | −30 | −30 | 0.8 | 0 | 0.8 |
| 0 | 0 | 1 | 1 | 0 | 1 | | 1 | 0 | 1 | | 1 | 0 | 1 | 0 | 0 | 1 | 0 | 1 |
| 1 | 0 | 1 | 1 | 0 | 1 | | 1 | 0 | 1 | | 1 | 0 | 1 | 0 | 0 | 1 | 0 | 1 |
| 0 | 1 | 1 | 1 | 0 | 1 | | 1 | 0 | 1 | | 1 | 0 | 1 | 0 | 0 | 1 | 0 | 1 |
| 1 | 1 | 1 | 1 | 0 | 1 | | 1 | 0 | 1 | | 1 | 0 | 1 | 0 | 0 | 1 | 0 | 1 |

| Targetted Renewing Screen Display | | | Current Screen Display CUR | | | Second Sub-frame Group | | | | | | | Third Sub-frame Group | | | | | | | | |
|---|---|---|---|---|---|---|---|---|---|---|---|---|---|---|---|---|---|---|---|---|---|
| | | | | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 1 | 0 | 1 | 0 | 0 | 0 | 0 | 0.8 | 0 | 0.8 | 0 | 0 | 0 | 0 | 0 | 0 | 0.8 | 0 | 0.8 |
| 1 | 0 | 0 | 1 | 0 | 1 | 0 | 0 | 0 | 0 | 0.8 | 0 | 0.8 | 10 | 10 | 10 | 10 | 10 | 10 | 1 | 0 | 0.8 |
| 0 | 1 | 0 | 1 | 0 | 1 | 15 | 15 | 15 | 15 | 1 | 0.3 | 0.8 | −10 | −10 | −10 | −10 | −10 | −10 | 0.8 | 0.3 | 0.8 |
| 1 | 1 | 0 | 1 | 0 | 1 | 15 | 15 | 15 | 15 | 1 | 0.3 | 0.8 | 0 | 0 | 0 | 0 | 0 | 0 | 1 | 0.3 | 0.8 |
| 0 | 0 | 1 | 1 | 0 | 1 | 0 | 0 | 0 | 0 | 1 | 0 | 1 | −10 | −10 | −10 | −10 | −10 | −10 | 0.8 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 |

TABLE 7-6-continued

| Basic Waveform Repeated Four Times | | | | | | | | | | | | | | | | | | | | | |
|---|---|---|---|---|---|---|---|---|---|---|---|---|---|---|---|---|---|---|---|---|---|
| 0 | 1 | 1 | 1 | 0 | 1 | 15 | 15 | 15 | 15 | 1 | 0.3 | 1 | −10 | −10 | −10 | −10 | −10 | −10 | 0.8 | 0.3 | 1 |
| 1 | 1 | 1 | 1 | 0 | 1 | 15 | 15 | 15 | 15 | 1 | 0.3 | 1 | 0 | 0 | 0 | 0 | 0 | 0 | 1 | 0.3 | 1 |

(b)
Second Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2a | | | | | | | | | Intermediate Transition I2-3a | | | Applied | | Intermediate Transition I2-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.8 | 0 | 0.8 | 0 | 0 | 0 | 0 | 0.8 | 0 | 0.8 | 0 | 0 | 0 | 0 | 0 | 0 | 0.8 | 0 | 0.8 | −30 | −30 | 0.5 | 0 | 0.5 |
| 1 | 0 | 0 | 1 | 0 | 0.8 | 0 | 0 | 0 | 0 | 1 | 0 | 0.8 | 0 | 0 | 0 | 0 | 0 | 0 | 1 | 0 | 0.8 | −30 | −30 | 0.8 | 0 | 0.5 |
| 0 | 1 | 0 | 0.8 | 0.3 | 0.8 | 15 | 15 | 15 | 15 | 1 | 0.5 | 0.8 | −10 | −10 | −10 | −10 | −10 | −10 | 0.8 | 0.5 | 0.8 | −30 | −30 | 0.5 | 0.3 | 0.5 |
| 1 | 1 | 0 | 1 | 0.3 | 0.8 | 15 | 15 | 15 | 15 | 1 | 0.5 | 0.8 | 0 | 0 | 0 | 0 | 0 | 0 | 1 | 0.5 | 0.8 | −30 | −30 | 0.8 | 0.3 | 0.5 |
| 0 | 0 | 1 | 0.8 | 0 | 1 | 0 | 0 | 0 | 0 | 0.8 | 0 | 1 | 0 | 0 | 0 | 0 | 0 | 0 | 0.8 | 0 | 1 | 0 | 0 | 0.8 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 | 0 | 0 | 1 | 0 | 1 |
| 0 | 1 | 1 | 0.8 | 0.3 | 1 | 0 | 0 | 0 | 0 | 0.8 | 0.3 | 1 | −10 | −10 | −10 | −10 | −10 | −10 | 0.5 | 0.3 | 1 | 0 | 0 | 0.5 | 0.3 | 1 |
| 1 | 1 | 1 | 1 | 0.3 | 1 | 0 | 0 | 0 | 0 | 1 | 0.3 | 1 | 0 | 0 | 0 | 0 | 0 | 0 | 1 | 0.3 | 1 | 0 | 0 | 1 | 0.3 | 1 |

| | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Targeted Renewing Screen Display | | | Intermediate Transition I1-3b | | | | | | | Intermediate Transition I2-2b | | | | | | | | | Intermediate Transition I2-3b | | |
| C | M | Y | C | M | Y | Applied Voltage | | | | C | M | Y | Applied Voltage | | | | | | C | M | Y |
| 0 | 0 | 0 | 0.8 | 0 | 0.8 | 0 | 0 | 0 | 0 | 0.5 | 0 | 0.5 | 0 | 0 | 0 | 0 | 0 | 0 | 0.5 | 0 | 0.5 |
| 1 | 0 | 0 | 1 | 0 | 0.8 | 0 | 0 | 0 | 0 | 0.8 | 0 | 0.5 | 10 | 10 | 10 | 10 | 10 | 10 | 1 | 0 | 0.5 |
| 0 | 1 | 0 | 0.8 | 0.3 | 0.8 | 15 | 15 | 15 | 15 | 0.8 | 0.5 | 0.5 | −10 | −10 | −10 | −10 | −10 | −10 | 0.5 | 0.5 | 0.5 |
| 1 | 1 | 0 | 1 | 0.3 | 0.8 | 15 | 15 | 15 | 15 | 1 | 0.5 | 0.5 | 0 | 0 | 0 | 0 | 0 | 0 | 1 | 0.5 | 0.5 |
| 0 | 0 | 1 | 0.8 | 0 | 1 | 0 | 0 | 0 | 0 | 0.8 | 0 | 1 | −10 | −10 | −10 | −10 | −10 | −10 | 0.5 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 |
| 0 | 1 | 1 | 0.8 | 0.3 | 1 | 15 | 15 | 15 | 15 | 0.8 | 0.5 | 1 | −10 | −10 | −10 | −10 | −10 | −10 | 0.5 | 0.5 | 1 |
| 1 | 1 | 1 | 1 | 0.3 | 1 | 15 | 15 | 15 | 15 | 1 | 0.5 | 1 | 0 | 0 | 0 | 0 | 0 | 0 | 1 | 0.5 | 1 |

(c)
Third Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2a | | | | | | | | | Intermediate Transition I3-3a | | | Applied | | Intermediate Transition I3-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.5 | 0 | 0.5 | 0 | 0 | 0 | 0 | 0.5 | 0 | 0.5 | 0 | 0 | 0 | 0 | 0 | 0 | 0.5 | 0 | 0.5 | −30 | 31 30 | 0.3 | 0 | 0.3 |
| 1 | 0 | 0 | 1 | 0 | 0.5 | 0 | 0 | 0 | 0 | 1 | 0 | 0.5 | 0 | 0 | 0 | 0 | 0 | 0 | 1 | 0 | 0.5 | −30 | −30 | 0.8 | 0 | 0.3 |
| 0 | 1 | 0 | 0.5 | 0.5 | 0.5 | 15 | 15 | 15 | 15 | 0.8 | 0.8 | 0.5 | −10 | −10 | −10 | −10 | −10 | −10 | 0.5 | 0.8 | 0.5 | −30 | −30 | 0.3 | 0.5 | 0.3 |
| 1 | 1 | 0 | 1 | 0.5 | 0.5 | 15 | 15 | 15 | 15 | 1 | 0.8 | 0.5 | 0 | 0 | 0 | 0 | 0 | 0 | 1 | 0.8 | 0.5 | −30 | −30 | 0.8 | 0.5 | 0.3 |
| 0 | 0 | 1 | 0.5 | 0 | 1 | 0 | 0 | 0 | 0 | 0.5 | 0 | 1 | 0 | 0 | 0 | 0 | 0 | 0 | 0.5 | 0 | 1 | 0 | 0 | 0.5 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 | 0 | 0 | 1 | 0 | 1 |
| 0 | 1 | 1 | 0.5 | 0.5 | 1 | 0 | 0 | 0 | 0 | 0.5 | 0.5 | 1 | −10 | −10 | −10 | −10 | −10 | −10 | 0.3 | 0.5 | 1 | 0 | 0 | 0.3 | 0.5 | 1 |
| 1 | 1 | 1 | 1 | 0.5 | 1 | 0 | 0 | 0 | 0 | 1 | 0.5 | 1 | 0 | 0 | 0 | 0 | 0 | 0 | 1 | 0.5 | 1 | 0 | 0 | 1 | 0.5 | 1 |

| | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Targetted Renewing Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0.5 | 0 | 0.5 | 0 | 0 | 0 | 0 | 0.3 | 0 | 0.3 | 0 | 0 | 0 | 0 | 0 | 0 | 0.3 | 0 | 0.3 |
| 1 | 0 | 0 | 1 | 0 | 0.5 | 0 | 0 | 0 | 0 | 0.8 | 0 | 0.3 | 10 | 10 | 10 | 10 | 10 | 10 | 1 | 0 | 0.3 |
| 0 | 1 | 0 | 0.5 | 0.5 | 0.5 | 15 | 15 | 15 | 15 | 0.5 | 0.8 | 0.3 | −10 | −10 | −10 | −10 | −10 | −10 | 0.3 | 0.8 | 0.3 |
| 1 | 1 | 0 | 1 | 0.5 | 0.5 | 15 | 15 | 15 | 15 | 1 | 0.8 | 0.3 | 0 | 0 | 0 | 0 | 0 | 0 | 1 | 0.8 | 0.3 |
| 0 | 0 | 1 | 0.5 | 0 | 1 | 0 | 0 | 0 | 0 | 0.5 | 0 | 1 | −10 | −10 | −10 | −10 | −10 | −10 | 0.3 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 |
| 0 | 1 | 1 | 0.5 | 0.5 | 1 | 15 | 15 | 15 | 15 | 0.5 | 0.8 | 1 | −10 | −10 | −10 | −10 | −10 | −10 | 0.3 | 0.8 | 1 |
| 1 | 1 | 1 | 1 | 0.5 | 1 | 15 | 15 | 15 | 15 | 1 | 0.8 | 1 | 0 | 0 | 0 | 0 | 0 | 0 | 1 | 0.8 | 1 |

TABLE 7-6-continued

Basic Waveform Repeated Four Times (d)
Fourth Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2a | | | | | | | | | Intermediate Transition I4-3a | | | Applied | | Intermediate Transition I4-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.3 | 0 | 0.3 | 0 | 0 | 0 | 0 | 0.3 | 0 | 0.3 | 0 | 0 | 0 | 0 | 0 | 0 | 0.3 | 0 | 0.3 | −30 | −30 | 0 | 0 | 0 |
| 1 | 0 | 0 | 1 | 0 | 0.3 | 0 | 0 | 0 | 0 | 1 | 0 | 0.3 | 0 | 0 | 0 | 0 | 0 | 0 | 1 | 0 | 0.3 | −30 | −30 | 0.8 | 0 | 0 |
| 0 | 1 | 0 | 0.3 | 0.8 | 0.3 | 15 | 15 | 15 | 15 | 0.5 | 1 | 0.3 | −10 | −10 | −10 | −10 | −10 | −10 | 0.3 | 1 | 0.3 | −30 | −30 | 0 | 0.8 | 0 |
| 1 | 1 | 0 | 1 | 0.8 | 0.3 | 15 | 15 | 15 | 15 | 1 | 1 | 0.3 | 0 | 0 | 0 | 0 | 0 | 0 | 1 | 1 | 0.3 | −30 | −30 | 0.8 | 0.8 | 0 |
| 0 | 0 | 1 | 0.3 | 0 | 1 | 0 | 0 | 0 | 0 | 0.3 | 0 | 1 | 0 | 0 | 0 | 0 | 0 | 0 | 0.3 | 0 | 1 | 0 | 0 | 0.3 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 | 0 | 0 | 1 | 0 | 1 |
| 0 | 1 | 1 | 0.3 | 0.8 | 1 | 0 | 0 | 0 | 0 | 0.3 | 0.8 | 1 | −10 | −10 | −10 | −10 | −10 | −10 | 0 | 0.8 | 1 | 0 | 0 | 0 | 0.8 | 1 |
| 1 | 1 | 1 | 1 | 0.8 | 1 | 0 | 0 | 0 | 0 | 1 | 0.8 | 1 | 0 | 0 | 0 | 0 | 0 | 0 | 1 | 0.8 | 1 | 0 | 0 | 1 | 0.8 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2b | | | | | | | | | Renewed Screen Display N | | |
| C | M | Y | C | M | Y | Applied Voltage | | | | C | M | Y | Applied Voltage | | | | | | C | M | Y |
| 0 | 0 | 0 | 0.3 | 0 | 0.3 | 0 | 0 | 0 | 0 | 0 | 0 | 0 | 0 | 0 | 0 | 0 | 0 | 0 | 0 | 0 | 0 |
| 1 | 0 | 0 | 1 | 0 | 0.3 | 0 | 0 | 0 | 0 | 0.8 | 0 | 0 | 10 | 10 | 10 | 10 | 10 | 10 | 1 | 0 | 0 |
| 0 | 1 | 0 | 0.3 | 0.8 | 0.3 | 15 | 15 | 15 | 15 | 0.3 | 1 | 0 | −10 | −10 | −10 | −10 | −10 | −10 | 0 | 1 | 0 |
| 1 | 1 | 0 | 1 | 0.8 | 0.3 | 15 | 15 | 15 | 15 | 1 | 1 | 0 | 0 | 0 | 0 | 0 | 0 | 0 | 1 | 1 | 0 |
| 0 | 0 | 1 | 0.3 | 0 | 1 | 0 | 0 | 0 | 0 | 0.3 | 0 | 1 | −10 | −10 | −10 | −10 | −10 | −10 | 0 | 0 | 1 |
| 1 | 0 | 1 | 1 | 0 | 1 | 0 | 0 | 0 | 0 | 1 | 0 | 1 | 0 | 0 | 0 | 0 | 0 | 0 | 1 | 0 | 1 |
| 0 | 1 | 1 | 0.3 | 0.8 | 1 | 15 | 15 | 15 | 15 | 0.3 | 1 | 1 | −10 | −10 | −10 | −10 | −10 | −10 | 0 | 1 | 1 |
| 1 | 1 | 1 | 1 | 0.8 | 1 | 15 | 15 | 15 | 15 | 1 | 1 | 1 | 0 | 0 | 0 | 0 | 0 | 0 | 1 | 1 | 1 |

TABLE 7-7

Basic Waveform Repeated Four Times (a)
First Time

| Targetted | | | Current | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| Renewing Screen Display | | | Screen Display CUR | | | | Intermediate Transition I1-2a | | | | Intermediate Transition I1-3a | | | Applied | | Intermediate Transition I1-1 | | |
| C | M | Y | C | M | Y | Applied Voltage | C | M | Y | Applied Voltage | C | M | Y | Voltage | | C | M | Y |
| 0 | 0 | 0 | 0 | 1 | 1 | | 0 | 1 | 1 | | 0 | 1 | 1 | −30 | −30 | 0 | 0.8 | 0.8 |
| 1 | 0 | 0 | 0 | 1 | 1 | | 0 | 1 | 1 | | 0 | 1 | 1 | −30 | −30 | 0 | 0.8 | 0.8 |
| 0 | 1 | 0 | 0 | 1 | 1 | | 0 | 1 | 1 | | 0 | 1 | 1 | −30 | −30 | 0 | 0.8 | 0.8 |
| 1 | 1 | 0 | 0 | 1 | 1 | | 0 | 1 | 1 | | 0 | 1 | 1 | −30 | −30 | 0 | 0.8 | 0.8 |
| 0 | 0 | 1 | 0 | 1 | 1 | | 0 | 1 | 1 | | 0 | 1 | 1 | 0 | 0 | 0 | 1 | 1 |
| 1 | 0 | 1 | 0 | 1 | 1 | | 0 | 1 | 1 | | 0 | 1 | 1 | 0 | 0 | 0 | 1 | 1 |
| 0 | 1 | 1 | 0 | 1 | 1 | | 0 | 1 | 1 | | 0 | 1 | 1 | 0 | 0 | 0 | 1 | 1 |
| 1 | 1 | 1 | 0 | 1 | 1 | | 0 | 1 | 1 | | 0 | 1 | 1 | 0 | 0 | 0 | 1 | 1 |

| Targetted | | | Current | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Screen Display CUR | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 0 | 1 | 1 | 0 | 0 | 0 | 0 | 0 | 0.8 | 0.8 | 0 | 0 | 0 | 0 | 0 | 0 | 0 | 0.8 | 0.8 |
| 1 | 0 | 0 | 0 | 1 | 1 | 0 | 0 | 0 | 0 | 0 | 0.8 | 0.8 | 10 | 10 | 10 | 10 | 10 | 10 | 0.3 | 0.8 | 0.8 |
| 0 | 1 | 0 | 0 | 1 | 1 | 15 | 15 | 15 | 15 | 0.3 | 1 | 0.8 | −10 | −10 | −10 | −10 | −10 | −10 | 0 | 1 | 0.8 |
| 1 | 1 | 0 | 0 | 1 | 1 | 15 | 15 | 15 | 15 | 0.3 | 1 | 0.8 | 0 | 0 | 0 | 0 | 0 | 0 | 0.3 | 1 | 0.8 |

TABLE 7-7-continued

| Basic Waveform Repeated Four Times | | | | | | | | | | | | | | | | | | | | | |
|---|---|---|---|---|---|---|---|---|---|---|---|---|---|---|---|---|---|---|---|---|---|
| 0 | 0 | 1 | 0 | 1 | 1 | −15 | −15 | −15 | −15 | 0 | 0.8 | 1 | 0 | 0 | 0 | 0 | 0 | 0 | 0 | 0.8 | 1 |
| 1 | 0 | 1 | 0 | 1 | 1 | −15 | −15 | −15 | −15 | 0 | 0.8 | 1 | 10 | 10 | 10 | 10 | 10 | 10 | 0.3 | 0.8 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 |
| 1 | 1 | 1 | 0 | 1 | 1 | 0 | 0 | 0 | 0 | 0 | 1 | 1 | 10 | 10 | 10 | 10 | 10 | 10 | 0.3 | 1 | 1 |

(b)
Second Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2a | | | | | | | | | Intermediate Transition I2-3a | | | Applied | | Intermediate Transition I2-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0.8 | 0.8 | 0 | 0 | 0 | 0 | 0 | 0.8 | 0.8 | 0 | 0 | 0 | 0 | 0 | 0 | 0 | 0.8 | 0.8 | −30 | −30 | 0 | 0.5 | 0.5 |
| 1 | 0 | 0 | 0.3 | 0.8 | 0.8 | 0 | 0 | 0 | 0 | 0.3 | 0.8 | 0.8 | 10 | 10 | 10 | 10 | 10 | 10 | 0.5 | 0.8 | 0.8 | −30 | −30 | 0.3 | 0.5 | 0.5 |
| 0 | 1 | 0 | 0 | 1 | 0.8 | 0 | 0 | 0 | 0 | 0 | 1 | 0.8 | 0 | 0 | 0 | 0 | 0 | 0 | 0 | 1 | 0.8 | −30 | −30 | 0 | 0.8 | 0.5 |
| 1 | 1 | 0 | 0.3 | 1 | 0.8 | 0 | 0 | 0 | 0 | 0.3 | 1 | 0.8 | 10 | 10 | 10 | 10 | 10 | 10 | 0.5 | 1 | 0.8 | −30 | −30 | 0.3 | 0.8 | 0.5 |
| 0 | 0 | 1 | 0 | 0.8 | 1 | 0 | 0 | 0 | 0 | 0 | 0.8 | 1 | 0 | 0 | 0 | 0 | 0 | 0 | 0 | 0.8 | 1 | 0 | 0 | 0 | 0.8 | 1 |
| 1 | 0 | 1 | 0.3 | 0.8 | 1 | 0 | 0 | 0 | 0 | 0.3 | 0.8 | 1 | 10 | 10 | 10 | 10 | 10 | 10 | 0.5 | 0.8 | 1 | 0 | 0 | 0.5 | 0.8 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 | 1 | 1 |
| 1 | 1 | 1 | 0.3 | 1 | 1 | 0 | 0 | 0 | 0 | 0.3 | 1 | 1 | 0 | 0 | 0 | 0 | 0 | 0 | 0.3 | 1 | 1 | 0 | 0 | 0.3 | 1 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I1-3b | | | | | | | Intermediate Transition I2-2b | | | | | | | | | Intermediate Transition I2-3b | | |
| C | M | Y | C | M | Y | Applied Voltage | | | | C | M | Y | Applied Voltage | | | | | | C | M | Y |
| 0 | 0 | 0 | 0 | 0.8 | 0.8 | 0 | 0 | 0 | 0 | 0 | 0.5 | 0.5 | 0 | 0 | 0 | 0 | 0 | 0 | 0 | 0.5 | 0.5 |
| 1 | 0 | 0 | 0.3 | 0.8 | 0.8 | 0 | 0 | 0 | 0 | 0.3 | 0.5 | 0.5 | 10 | 10 | 10 | 10 | 10 | 10 | 0.5 | 0.5 | 0.5 |
| 0 | 1 | 0 | 0 | 1 | 0.8 | 15 | 15 | 15 | 15 | 0.3 | 1 | 0.5 | −10 | −10 | −10 | −10 | −10 | −10 | 0 | 1 | 0.5 |
| 1 | 1 | 0 | 0.3 | 1 | 0.8 | 15 | 15 | 15 | 15 | 0.5 | 1 | 0.5 | 0 | 0 | 0 | 0 | 0 | 0 | 0.5 | 1 | 0.5 |
| 0 | 0 | 1 | 0 | 0.8 | 1 | −15 | −15 | −15 | −15 | 0 | 0.5 | 1 | 0 | 0 | 0 | 0 | 0 | 0 | 0 | 0.5 | 1 |
| 1 | 0 | 1 | 0.3 | 0.8 | 1 | −15 | −15 | −15 | −15 | 0.3 | 0.5 | 1 | 10 | 10 | 10 | 10 | 10 | 10 | 0.5 | 0.5 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 |
| 1 | 1 | 1 | 0.3 | 1 | 1 | 0 | 0 | 0 | 0 | 0.3 | 1 | 1 | 10 | 10 | 10 | 10 | 10 | 10 | 0.5 | 1 | 1 |

(c)
Third Time

| Targetted | | | | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2a | | | | | | | | | Intermediate Transition I3-3a | | | Applied | | Intermediate Transition I3-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0.5 | 0.5 | 0 | 0 | 0 | 0 | 0 | 0.5 | 0.5 | 0 | 0 | 0 | 0 | 0 | 0 | 0 | 0.5 | 0.5 | −30 | −30 | 0 | 0.3 | 0.3 |
| 1 | 0 | 0 | 0.5 | 0.5 | 0.5 | 0 | 0 | 0 | 0 | 0.5 | 0.5 | 0.5 | 10 | 10 | 10 | 10 | 10 | 10 | 0.8 | 0.5 | 0.5 | −30 | −30 | 0.5 | 0.3 | 0.3 |
| 0 | 1 | 0 | 0 | 1 | 0.5 | 0 | 0 | 0 | 0 | 0 | 1 | 0.5 | 0 | 0 | 0 | 0 | 0 | 0 | 0 | 1 | 0.5 | −30 | −30 | 0 | 0.8 | 0.3 |
| 1 | 1 | 0 | 0.5 | 1 | 0.5 | 0 | 0 | 0 | 0 | 0.5 | 1 | 0.5 | 10 | 10 | 10 | 10 | 10 | 10 | 0.8 | 1 | 0.5 | −30 | −30 | 0.5 | 0.8 | 0.3 |
| 0 | 0 | 1 | 0 | 0.5 | 1 | 0 | 0 | 0 | 0 | 0 | 0.5 | 1 | 0 | 0 | 0 | 0 | 0 | 0 | 0 | 0.5 | 1 | 0 | 0 | 0 | 0.5 | 1 |
| 1 | 0 | 1 | 0.5 | 0.5 | 1 | 0 | 0 | 0 | 0 | 0.5 | 0.5 | 1 | 10 | 10 | 10 | 10 | 10 | 10 | 0.8 | 0.5 | 1 | 0 | 0 | 0.8 | 0.5 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 | 1 | 1 |
| 1 | 1 | 1 | 0.5 | 1 | 1 | 0 | 0 | 0 | 0 | 0.5 | 1 | 1 | 0 | 0 | 0 | 0 | 0 | 0 | 0.5 | 1 | 1 | 0 | 0 | 0.5 | 1 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0 | 0.5 | 0.5 | 0 | 0 | 0 | 0 | 0 | 0.3 | 0.3 | 0 | 0 | 0 | 0 | 0 | 0 | 0 | 0.3 | 0.3 |
| 1 | 0 | 0 | 0.5 | 0.5 | 0.5 | 0 | 0 | 0 | 0 | 0.5 | 0.3 | 0.3 | 10 | 10 | 10 | 10 | 10 | 10 | 0.8 | 0.3 | 0.3 |
| 0 | 1 | 0 | 0 | 1 | 0.5 | 15 | 15 | 15 | 15 | 0.3 | 1 | 0.3 | −10 | −10 | −10 | −10 | −10 | −10 | 0 | 1 | 0.3 |
| 1 | 1 | 0 | 0.5 | 1 | 0.5 | 15 | 15 | 15 | 15 | 0.8 | 1 | 0.3 | 0 | 0 | 0 | 0 | 0 | 0 | 0.8 | 1 | 0.3 |
| 0 | 0 | 1 | 0 | 0.5 | 1 | −15 | −15 | −15 | −15 | 0 | 0.3 | 1 | 0 | 0 | 0 | 0 | 0 | 0 | 0 | 0.3 | 1 |
| 1 | 0 | 1 | 0.5 | 0.5 | 1 | −15 | −15 | −15 | −15 | 0.5 | 0.3 | 1 | 10 | 10 | 10 | 10 | 10 | 10 | 0.8 | 0.3 | 1 |

TABLE 7-7-continued

Basic Waveform Repeated Four Times

| | | | | | | | | | | | | | | | | | | | | | |
|---|---|---|---|---|---|---|---|---|---|---|---|---|---|---|---|---|---|---|---|---|---|
| 0 | 1 | 1 | 0 | 1 | 1 | 0 | 0 | 0 | 0 | 0 | 1 | 1 | 0 | 0 | 0 | 0 | 0 | 0 | 0 | 1 | 1 |
| 1 | 1 | 1 | 0.5 | 1 | 1 | 0 | 0 | 0 | 0 | 0.5 | 1 | 1 | 10 | 10 | 10 | 10 | 10 | 10 | 0.8 | 1 | 1 |

(d)
Fourth Time

| Targetted | | | | | | Corrected Second Sub-frame Group | | | | | | Corrected Third Sub-frame Group | | | | | | | | | | First Sub-frame Group | | | | |
|---|---|---|---|---|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2a | | | | | | | | | Intermediate Transition I4-3a | | | Applied | | Intermediate Transition I4-1 | | |
| C | M | Y | C | M | Y | Applied Voltage | | | | C | M | Y | Applied Voltage | | | | | | C | M | Y | Voltage | | C | M | Y |
| 0 | 0 | 0 | 0 | 0.3 | 0.3 | 0 | 0 | 0 | 0 | 0 | 0.3 | 0.3 | 0 | 0 | 0 | 0 | 0 | 0 | 0 | 0.3 | 0.3 | −30 | −30 | 0 | 0 | 0 |
| 1 | 0 | 0 | 0.8 | 0.3 | 0.3 | 0 | 0 | 0 | 0 | 0.8 | 0.3 | 0.3 | 10 | 10 | 10 | 10 | 10 | 10 | 1 | 0.3 | 0.3 | −30 | −30 | 0.8 | 0 | 0 |
| 0 | 1 | 0 | 0 | 1 | 0.3 | 0 | 0 | 0 | 0 | 0 | 1 | 0.3 | 0 | 0 | 0 | 0 | 0 | 0 | 0 | 1 | 0.3 | −30 | −30 | 0 | 0.8 | 0 |
| 1 | 1 | 0 | 0.8 | 1 | 0.3 | 0 | 0 | 0 | 0 | 0.8 | 1 | 0.3 | 10 | 10 | 10 | 10 | 10 | 10 | 1 | 1 | 0.3 | −30 | −30 | 0.8 | 0.8 | 0 |
| 0 | 0 | 1 | 0 | 0.3 | 1 | 0 | 0 | 0 | 0 | 0 | 0.3 | 1 | 0 | 0 | 0 | 0 | 0 | 0 | 0 | 0.3 | 1 | 0 | 0 | 0 | 0.3 | 1 |
| 1 | 0 | 1 | 0.8 | 0.3 | 1 | 0 | 0 | 0 | 0 | 0.8 | 0.3 | 1 | 10 | 10 | 10 | 10 | 10 | 10 | 1 | 0.3 | 1 | 0 | 0 | 1 | 0.3 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 | 0 | 0 | 0 | 1 | 1 |
| 1 | 1 | 1 | 0.8 | 1 | 1 | 0 | 0 | 0 | 0 | 0.8 | 1 | 1 | 0 | 0 | 0 | 0 | 0 | 0 | 0.8 | 1 | 1 | 0 | 0 | 0.8 | 1 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Intermediate Transition I3-3b | | | | | | | Intermediate Transition I4-2b | | | | | | | | | Renewed Screen Display N | | |
| C | M | Y | C | M | Y | Applied Voltage | | | | C | M | Y | Applied Voltage | | | | | | C | M | Y |
| 0 | 0 | 0 | 0 | 0.3 | 0.3 | 0 | 0 | 0 | 0 | 0 | 0 | 0 | 0 | 0 | 0 | 0 | 0 | 0 | 0 | 0 | 0 |
| 1 | 0 | 0 | 0.8 | 0.3 | 0.3 | 0 | 0 | 0 | 0 | 0.8 | 0 | 0 | 10 | 10 | 10 | 10 | 10 | 10 | 1 | 0 | 0 |
| 0 | 1 | 0 | 0 | 1 | 0.3 | 15 | 15 | 15 | 15 | 0.3 | 1 | 0 | −10 | −10 | −10 | −10 | −10 | −10 | 0 | 1 | 0 |
| 1 | 1 | 0 | 0.8 | 1 | 0.3 | 15 | 15 | 15 | 15 | 1 | 1 | 0 | 0 | 0 | 0 | 0 | 0 | 0 | 1 | 1 | 0 |
| 0 | 0 | 1 | 0 | 0.3 | 1 | −15 | −15 | −15 | −15 | 0 | 0 | 1 | 0 | 0 | 0 | 0 | 0 | 0 | 0 | 0 | 1 |
| 1 | 0 | 1 | 0.8 | 0.3 | 1 | −15 | −15 | −15 | −15 | 0.8 | 0 | 1 | 10 | 10 | 10 | 10 | 10 | 10 | 1 | 0 | 1 |
| 0 | 1 | 1 | 0 | 1 | 1 | 0 | 0 | 0 | 0 | 0 | 1 | 1 | 0 | 0 | 0 | 0 | 0 | 0 | 0 | 1 | 1 |
| 1 | 1 | 1 | 0.8 | 1 | 1 | 0 | 0 | 0 | 0 | 0.8 | 1 | 1 | 10 | 10 | 10 | 10 | 10 | 10 | 1 | 1 | 1 |

TABLE 7-8

Basic Waveform Repeated Four Times (a)
First Time

| Targetted | | | | | | Corrected Second Sub-frame Group | | | | Corrected Third Sub-frame Group | | | | First Sub-frame Group | | | | |
|---|---|---|---|---|---|---|---|---|---|---|---|---|---|---|---|---|---|---|
| Renewing Screen Display | | | Current Screen Display CUR | | | | Intermediate Transition I1-2a | | | | Intermediate Transition I1-3a | | | Applied | | Intermediate Transition I1-1 | | |
| C | M | Y | C | M | Y | Applied Voltage | C | M | Y | Applied Voltage | C | M | Y | Voltage | | C | M | Y |
| 0 | 0 | 0 | 1 | 1 | 1 | | 1 | 1 | 1 | | 1 | 1 | 1 | −30 | −30 | 0.8 | 0.8 | 0.8 |
| 1 | 0 | 0 | 1 | 1 | 1 | | 1 | 1 | 1 | | 1 | 1 | 1 | −30 | −30 | 0.8 | 0.8 | 0.8 |
| 0 | 1 | 0 | 1 | 1 | 1 | | 1 | 1 | 1 | | 1 | 1 | 1 | −30 | −30 | 0.8 | 0.8 | 0.8 |
| 1 | 1 | 0 | 1 | 1 | 1 | | 1 | 1 | 1 | | 1 | 1 | 1 | −30 | −30 | 0.8 | 0.8 | 0.8 |
| 0 | 0 | 1 | 1 | 1 | 1 | | 1 | 1 | 1 | | 1 | 1 | 1 | 0 | 0 | 1 | 1 | 1 |
| 1 | 0 | 1 | 1 | 1 | 1 | | 1 | 1 | 1 | | 1 | 1 | 1 | 0 | 0 | 1 | 1 | 1 |
| 0 | 1 | 1 | 1 | 1 | 1 | | 1 | 1 | 1 | | 1 | 1 | 1 | 0 | 0 | 1 | 1 | 1 |
| 1 | 1 | 1 | 1 | 1 | 1 | | 1 | 1 | 1 | | 1 | 1 | 1 | 0 | 0 | 1 | 1 | 1 |

| Targetted | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Renewing Screen Display | | | Current Screen Display CUR | | | | | | | Intermediate Transition I1-2b | | | | | | | | | Intermediate Transition I1-3b | | |
| C | M | Y | C | M | Y | Applied Voltage | | | | C | M | Y | Applied Voltage | | | | | | C | M | Y |
| 0 | 0 | 0 | 1 | 1 | 1 | 0 | 0 | 0 | 0 | 0.8 | 0.8 | 0.8 | 0 | 0 | 0 | 0 | 0 | 0 | 0.8 | 0.8 | 0.8 |
| 1 | 0 | 0 | 1 | 1 | 1 | 0 | 0 | 0 | 0 | 0.8 | 0.8 | 0.8 | 10 | 10 | 10 | 10 | 10 | 10 | 1 | 0.8 | 0.8 |
| 0 | 1 | 0 | 1 | 1 | 1 | 15 | 15 | 15 | 15 | 1 | 1 | 0.8 | −10 | −10 | −10 | −10 | −10 | −10 | 0.8 | 1 | 0.8 |

TABLE 7-8-continued

| Basic Waveform Repeated Four Times | | | | | | | | | | | | | | | | | | | | | |
|---|---|---|---|---|---|---|---|---|---|---|---|---|---|---|---|---|---|---|---|---|---|
| 1 | 1 | 0 | 1 | 1 | 1 | 15 | 15 | 15 | 15 | 1 | 1 | 0.8 | 0 | 0 | 0 | 0 | 0 | 0 | 1 | 1 | 0.8 |
| 0 | 0 | 1 | 1 | 1 | 1 | −15 | −15 | −15 | −15 | 0.8 | 0.8 | 1 | 0 | 0 | 0 | 0 | 0 | 0 | 0.8 | 0.8 | 1 |
| 1 | 0 | 1 | 1 | 1 | 1 | −15 | −15 | −15 | −15 | 0.8 | 0.8 | 1 | 10 | 10 | 10 | 10 | 10 | 10 | 1 | 0.8 | 1 |
| 0 | 1 | 1 | 1 | 1 | 1 | 0 | 0 | 0 | 0 | 1 | 1 | 1 | −10 | −10 | −10 | −10 | −10 | −10 | 0.8 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 |

(b)
Second Time

| Targetted Renewing | | | Intermediate | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Screen Display | | | Transition I1-3b | | | | | | | Intermediate Transition I2-2a | | | | | | | | | Intermediate Transition I2-3a | | | Applied | | Intermediate Transition I2-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.8 | 0.8 | 0.8 | 0 | 0 | 0 | 0 | 0.8 | 0.8 | 0.8 | 0 | 0 | 0 | 0 | 0 | 0 | 0.8 | 0.8 | 0.8 | −30 | −30 | 0.5 | 0.5 | 0.5 |
| 1 | 0 | 0 | 1 | 0.8 | 0.8 | 0 | 0 | 0 | 0 | 1 | 0.8 | 0.8 | 0 | 0 | 0 | 0 | 0 | 0 | 1 | 0.8 | 0.8 | −30 | −30 | 0.8 | 0.5 | 0.5 |
| 0 | 1 | 0 | 0.8 | 1 | 0.8 | 0 | 0 | 0 | 0 | 0.8 | 1 | 0.8 | 0 | 0 | 0 | 0 | 0 | 0 | 0.8 | 1 | 0.8 | −30 | −30 | 0.5 | 0.8 | 0.5 |
| 1 | 1 | 0 | 1 | 1 | 0.8 | 0 | 0 | 0 | 0 | 1 | 1 | 0.8 | 0 | 0 | 0 | 0 | 0 | 0 | 1 | 1 | 0.8 | −30 | −30 | 0.8 | 0.8 | 0.5 |
| 0 | 0 | 1 | 0.8 | 0.8 | 1 | 0 | 0 | 0 | 0 | 0.8 | 0.8 | 1 | 0 | 0 | 0 | 0 | 0 | 0 | 0.8 | 0.8 | 1 | 0 | 0 | 0.8 | 0.8 | 1 |
| 1 | 0 | 1 | 1 | 0.8 | 1 | 0 | 0 | 0 | 0 | 1 | 0.8 | 1 | 0 | 0 | 0 | 0 | 0 | 0 | 1 | 0.8 | 1 | 0 | 0 | 1 | 0.8 | 1 |
| 0 | 1 | 1 | 0.8 | 1 | 1 | 0 | 0 | 0 | 0 | 0.8 | 1 | 1 | 0 | 0 | 0 | 0 | 0 | 0 | 0.8 | 1 | 1 | 0 | 0 | 0.8 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 | 0 | 0 | 1 | 1 | 1 |

| Targetted Renewing | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Screen Display | | | Intermediate Transition I1-3b | | | | | | | Intermediate Transition I2-2b | | | | | | | | | Intermediate Transition I2-3b | | |
| C | M | Y | C | M | Y | Applied Voltage | | | | C | M | Y | Applied Voltage | | | | | | C | M | Y |
| 0 | 0 | 0 | 0.8 | 0.8 | 0.8 | 0 | 0 | 0 | 0 | 0.5 | 0.5 | 0.5 | 0 | 0 | 0 | 0 | 0 | 0 | 0.5 | 0.5 | 0.5 |
| 1 | 0 | 0 | 1 | 0.8 | 0.8 | 0 | 0 | 0 | 0 | 0.8 | 0.5 | 0.5 | 10 | 10 | 10 | 10 | 10 | 10 | 1 | 0.5 | 0.5 |
| 0 | 1 | 0 | 0.8 | 1 | 0.8 | 15 | 15 | 15 | 15 | 0.8 | 1 | 0.5 | −10 | −10 | −10 | −10 | −10 | −10 | 0.5 | 1 | 0.5 |
| 1 | 1 | 0 | 1 | 1 | 0.8 | 15 | 15 | 15 | 15 | 1 | 1 | 0.5 | 0 | 0 | 0 | 0 | 0 | 0 | 1 | 1 | 0.5 |
| 0 | 0 | 1 | 0.8 | 0.8 | 1 | −15 | −15 | −15 | −15 | 0.5 | 0.5 | 1 | 0 | 0 | 0 | 0 | 0 | 0 | 0.5 | 0.5 | 1 |
| 1 | 0 | 1 | 1 | 0.8 | 1 | −15 | −15 | −15 | −15 | 0.8 | 0.5 | 1 | 10 | 10 | 10 | 10 | 10 | 10 | 1 | 0.5 | 1 |
| 0 | 1 | 1 | 0.8 | 1 | 1 | 0 | 0 | 0 | 0 | 0.8 | 1 | 1 | −10 | −10 | −10 | −10 | −10 | −10 | 0.5 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 |

(c)
Third Time

| Targetted Renewing | | | Intermediate | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| Screen Display | | | Transition I2-3b | | | | | | | Intermediate Transition I3-2a | | | | | | | | | Intermediate Transition I3-3a | | | Applied | | Intermediate Transition I3-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.5 | 0.5 | 0.5 | 0 | 0 | 0 | 0 | 0.5 | 0.5 | 0.5 | 0 | 0 | 0 | 0 | 0 | 0 | 0.5 | 0.5 | 0.5 | −30 | −30 | 0.3 | 0.3 | 0.3 |
| 1 | 0 | 0 | 1 | 0.5 | 0.5 | 0 | 0 | 0 | 0 | 1 | 0.5 | 0.5 | 0 | 0 | 0 | 0 | 0 | 0 | 1 | 0.5 | 0.5 | −30 | −30 | 0.8 | 0.3 | 0.3 |
| 0 | 1 | 0 | 0.5 | 1 | 0.5 | 0 | 0 | 0 | 0 | 0.5 | 1 | 0.5 | 0 | 0 | 0 | 0 | 0 | 0 | 0.5 | 1 | 0.5 | −30 | −30 | 0.3 | 0.8 | 0.3 |
| 1 | 1 | 0 | 1 | 1 | 0.5 | 0 | 0 | 0 | 0 | 1 | 1 | 0.5 | 0 | 0 | 0 | 0 | 0 | 0 | 1 | 1 | 0.5 | −30 | −30 | 0.8 | 0.8 | 0.3 |
| 0 | 0 | 1 | 0.5 | 0.5 | 1 | 0 | 0 | 0 | 0 | 0.5 | 0.5 | 1 | 0 | 0 | 0 | 0 | 0 | 0 | 0.5 | 0.5 | 1 | 0 | 0 | 0.5 | 0.5 | 1 |
| 1 | 0 | 1 | 1 | 0.5 | 1 | 0 | 0 | 0 | 0 | 1 | 0.5 | 1 | 0 | 0 | 0 | 0 | 0 | 0 | 1 | 0.5 | 1 | 0 | 0 | 1 | 0.5 | 1 |
| 0 | 1 | 1 | 0.5 | 1 | 1 | 0 | 0 | 0 | 0 | 0.5 | 1 | 1 | 0 | 0 | 0 | 0 | 0 | 0 | 0.5 | 1 | 1 | 0 | 0 | 0.5 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 | 0 | 0 | 1 | 1 | 1 |

| Targetted Renewing | | | | | | Second Sub-frame Group | | | | | | | Third Sub-frame Group | | | | | | | | |
|---|---|---|---|---|---|---|---|---|---|---|---|---|---|---|---|---|---|---|---|---|---|
| Screen Display | | | Intermediate Transition I2-3b | | | | | | | Intermediate Transition I3-2b | | | | | | | | | Intermediate Transition I3-3b | | |
| C | M | Y | C | M | Y | Applied Voltage | | | | C | M | Y | Applied Voltage | | | | | | C | M | Y |
| 0 | 0 | 0 | 0.5 | 0.5 | 0.5 | 0 | 0 | 0 | 0 | 0.3 | 0.3 | 0.3 | 0 | 0 | 0 | 0 | 0 | 0 | 0.3 | 0.3 | 0.3 |
| 1 | 0 | 0 | 1 | 0.5 | 0.5 | 0 | 0 | 0 | 0 | 0.8 | 0.3 | 0.3 | 10 | 10 | 10 | 10 | 10 | 10 | 1 | 0.3 | 0.3 |
| 0 | 1 | 0 | 0.5 | 1 | 0.5 | 15 | 15 | 15 | 15 | 0.5 | 1 | 0.3 | −10 | −10 | −10 | −10 | −10 | −10 | 0.3 | 1 | 0.3 |
| 1 | 1 | 0 | 1 | 1 | 0.5 | 15 | 15 | 15 | 15 | 1 | 1 | 0.3 | 0 | 0 | 0 | 0 | 0 | 0 | 1 | 1 | 0.3 |
| 0 | 0 | 1 | 0.5 | 0.5 | 1 | −15 | −15 | −15 | −15 | 0.3 | 0.3 | 1 | 0 | 0 | 0 | 0 | 0 | 0 | 0.3 | 0.3 | 1 |
| 1 | 0 | 1 | 1 | 0.5 | 1 | −15 | −15 | −15 | −15 | 0.8 | 0.3 | 1 | 10 | 10 | 10 | 10 | 10 | 10 | 1 | 0.3 | 1 |

TABLE 7-8-continued

| Basic Waveform Repeated Four Times | | | | | | | | | | | | | | | | | | | | | |
|---|---|---|---|---|---|---|---|---|---|---|---|---|---|---|---|---|---|---|---|---|---|
| 0 | 1 | 1 | 0.5 | 1 | 1 | 0 | 0 | 0 | 0 | 0.5 | 1 | 1 | −10 | −10 | −10 | −10 | −10 | −10 | 0.3 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 |

(d)
Fourth Time

| Targetted Renewing Screen Display | | | Intermediate Transition I3-3b | | | Corrected Second Sub-frame Group | | | | | | | Corrected Third Sub-frame Group | | | | | | | | | First Sub-frame Group | | | | |
|---|---|---|---|---|---|---|---|---|---|---|---|---|---|---|---|---|---|---|---|---|---|---|---|---|---|---|
| | | | | | | | | | | Intermediate Transition I4-2a | | | | | | | | | Intermediate Transition I4-3a | | | Applied Voltage | | Intermediate Transition I4-1 | | |
| C | M | Y | C | M | Y | Applied Voltage | | | | C | M | Y | Applied Voltage | | | | | | C | M | Y | Voltage | | C | M | Y |
| 0 | 0 | 0 | 0.3 | 0.3 | 0.3 | 0 | 0 | 0 | 0 | 0.3 | 0.3 | 0.3 | 0 | 0 | 0 | 0 | 0 | 0 | 0.3 | 0.3 | 0.3 | −30 | −30 | 0 | 0 | 0 |
| 1 | 0 | 0 | 1 | 0.3 | 0.3 | 0 | 0 | 0 | 0 | 1 | 0.3 | 0.3 | 0 | 0 | 0 | 0 | 0 | 0 | 1 | 0.3 | 0.3 | −30 | −30 | 0.8 | 0 | 0 |
| 0 | 1 | 0 | 0.3 | 1 | 0.3 | 0 | 0 | 0 | 0 | 0.3 | 1 | 0.3 | 0 | 0 | 0 | 0 | 0 | 0 | 0.3 | 1 | 0.3 | −30 | −30 | 0 | 0.8 | 0 |
| 1 | 1 | 0 | 1 | 1 | 0.3 | 0 | 0 | 0 | 0 | 1 | 1 | 0.3 | 0 | 0 | 0 | 0 | 0 | 0 | 1 | 1 | 0.3 | −30 | −30 | 0.8 | 0.8 | 0 |
| 0 | 0 | 1 | 0.3 | 0.3 | 1 | 0 | 0 | 0 | 0 | 0.3 | 0.3 | 1 | 0 | 0 | 0 | 0 | 0 | 0 | 0.3 | 0.3 | 1 | 0 | 0 | 0.3 | 0.3 | 1 |
| 1 | 0 | 1 | 1 | 0.3 | 1 | 0 | 0 | 0 | 0 | 1 | 0.3 | 1 | 0 | 0 | 0 | 0 | 0 | 0 | 1 | 0.3 | 1 | 0 | 0 | 1 | 0.3 | 1 |
| 0 | 1 | 1 | 0.3 | 1 | 1 | 0 | 0 | 0 | 0 | 0.3 | 1 | 1 | 0 | 0 | 0 | 0 | 0 | 0 | 0.3 | 1 | 1 | 0 | 0 | 0.3 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 | 0 | 0 | 1 | 1 | 1 |

| Targetted Renewing Screen Display | | | Intermediate Transition I3-3b | | | Second Sub-frame Group | | | | | | | Third Sub-frame Group | | | | | | | | |
|---|---|---|---|---|---|---|---|---|---|---|---|---|---|---|---|---|---|---|---|---|---|
| | | | | | | | | | | Intermediate Transition I4-2b | | | | | | | | | Renewed Screen Display N | | |
| C | M | Y | C | M | Y | Applied Voltage | | | | C | M | Y | Applied Voltage | | | | | | C | M | Y |
| 0 | 0 | 0 | 0.3 | 0.3 | 0.3 | 0 | 0 | 0 | 0 | 0 | 0 | 0 | 0 | 0 | 0 | 0 | 0 | 0 | 0 | 0 | 0 |
| 1 | 0 | 0 | 1 | 0.3 | 0.3 | 0 | 0 | 0 | 0 | 0.8 | 0 | 0 | 10 | 10 | 10 | 10 | 10 | 10 | 1 | 0 | 0 |
| 0 | 1 | 0 | 0.3 | 1 | 0.3 | 15 | 15 | 15 | 15 | 0.3 | 1 | 0 | −10 | −10 | −10 | −10 | −10 | −10 | 0 | 1 | 0 |
| 1 | 1 | 0 | 1 | 1 | 0.3 | 15 | 15 | 15 | 15 | 1 | 1 | 0 | 0 | 0 | 0 | 0 | 0 | 0 | 1 | 1 | 0 |
| 0 | 0 | 1 | 0.3 | 0.3 | 1 | −15 | −15 | −15 | −15 | 0 | 0 | 1 | 0 | 0 | 0 | 0 | 0 | 0 | 0 | 0 | 1 |
| 1 | 0 | 1 | 1 | 0.3 | 1 | −15 | −15 | −15 | −15 | 0.8 | 0 | 1 | 10 | 10 | 10 | 10 | 10 | 10 | 1 | 0 | 1 |
| 0 | 1 | 1 | 0.3 | 1 | 1 | 0 | 0 | 0 | 0 | 0.3 | 1 | 1 | −10 | −10 | −10 | −10 | −10 | −10 | 0 | 1 | 1 |
| 1 | 1 | 1 | 1 | 1 | 1 | 0 | 0 | 0 | 0 | 1 | 1 | 1 | 0 | 0 | 0 | 0 | 0 | 0 | 1 | 1 | 1 |

The transition from the CURRENT: (0, 0, 0) to NEXT: (Rc, Rm, Ry) shown in Table 7-1 is a transition from a ground state, as in the case of the first exemplary embodiment, and, therefore, no correction driving waveform is required and their descriptions are omitted accordingly. Next, by referring to Table 7-2, a specified driving method for the transition from CURRENT: (1, 0, 0) to the NEXT: (Rc, Rm, Ry) is described. First, the transition from CURRENT: (1, 0, 0) to NEXT: (Rc, Rm, 0) is described. In this case, no movement of Y particle and movements of C particle and M particle only are considered.

In the case of the transition from CURRENT: (1, 0, 0) to NEXT (0, 0, 0) and the transition from CURRENT: (1, 0, 0) to NEXT: (1, 0, 0), a relative color density of the M particles changes from "0" to "0" and, therefore, the M particle stays at a TFT substrate side and a relative color density of the C particle changes "1" to "0" or "1" and, as a result, the C particle moves to the TFT substrate side or moves to a display surface side and, thus, the moving direction of the C and M particles are the same and no application of a correction driving waveform is required and no application of the voltage is not required during the correction driving period and application of 0V is enough.

In the transition from CURRENT: (1, 0, 0) to NEXT: (1, 1, 0), the relative color density of the M particle changes from "0" to "1" and the M particle moves to the display surface. The relative color density of the C particle changes from "1" to "1" and the C particle stays on the display side and, therefore, the moving direction of the C and M particles are the same, and, as a result, the application of the correction driving waveform is not required and the application of 0V is enough during the correction during period.

Next, in the transition from CURRENT: (1, 0, 0) to NEXT: (0, 1, 0), the relative color density of the M particle changes from "0" to "1" and the M particle moves to a display surface side. The relative color density of the C particle changes from "1" to "0" and the C particle moves to TFT substrate side opposite to a display surface side. That is, the moving direction of the C particle is opposite to the moving direction of the M particle.

Therefore, for example, in the driving method for the transition to a renewal display state by one time application of the driving waveform, when the relative color density of the M particle by the application of +15V changes from "0" to "1", the relative color density of the C particle changes "1" to "1" and the movement of the C particle is not supposed, while in the driving method for the transition to the renewal display state by repeated application of the unit driving waveform, since the color density of the C particle changes from "1" after the first application of the unit driving waveform, the C particle moves by the application of +15V during the second sub-frame group period at time of the second time repeated application of the unit driving waveform.

As a result, the transition to the renewal display state by repeated application of the unit driving waveform is impossible. To prevent this, it is necessary that −10V is applied during the 6 sub-frames before the second time application of the unit driving waveform and that the amount of movement of the C particle for the application of −15V for 4 sub-frames during the second sub-frame group period.

Next, a transition from CURRENT: (1, 0, 0) to NEXT: (Rc, Rm, 1) is described. In this case, the Y particle, since its relative color density changes from "0" to "1", moves to a display surface side. The M particle, since its relative color density changes from "0" to "0" or "1", moves to the display surface side as in the case of the Y particle, or stays on the TFT substrate side, and since its moving direction is the same as for the Y particle, the application of a correction driving waveform is not required.

Therefore, the voltage to be applied during the correction second sub-frame group period is 0V. In the transition of C particle from CURRENT: (1, 0, 0) to NEXT: (1, Rm, 1), since the C particle does not move, no application of the correction driving waveform is required and the driving waveform to be applied during the correction third sub-frame may be 0V.

Meanwhile, in the transition from CURRENT: (1, 0, 0) to NEXT: (0, Rm, 1), the Y particle moves to the display surface side and C particle moves to the TFT substrate side, thus the movement directions are opposite to each other.

In the driving method for the transition to a renewal display state by the one time application of driving waveform, when the relative color density of the Y particle changes from "0" to "1" by application of +30V, the movement of the C particle is not supposed, while, in the repeated application of the unit driving waveform, since the C particle changes from "1" after the first application of the unit driving waveform, at time of the second unit driving waveform, by application of +30V during the first sub-frame period, the C particles move.

To solve this problem, before the second application of the unit driving waveform, −10V is applied for 6 sub-frames and during the first sub-frame group period, 30V is applied for 2 sub-frames, the movement amount of the C particle has to be corrected.

Moreover, when the transition to the final screen state without application of voltages during the correction sub-frame period is possible, the voltage to be applied is 0V. However, for example, in the transition from (0, 1, 1) to (0, 1, 0), even when −15V is applied during the correction third sub-frame group period for the correction driving waveform, the final screen state for the C particle is in the ground state of "0" and thus no problem arises.

Next, by referring to Table 7-3, a specified method for the transition from CURRENT: (1, 0, 0) to NEXT: (Rc, Rm, Ry) is described. The transition from CURRENT: (0, 1, 0) to NEXT: (Rc, Rm, 0) is as shown in Table 7-2. In the transitions from CURRENT: (0, 1, 0) to NEXT: (0, 0, 0), from CURRENT: (0, 1, 0) to NEXT: (0, 1, 0), and from CURRENT: (0, 1, 0) to NEXT: (1, 1, 0), there is no need to apply the correction driving waveform and, in the transition from CURRENT: (0, 1, 0) to NEXT: (1, 0, 0), a correction waveform for the application of −10V during 6 sub-frames must be inserted between the application of the unit driving waveform.

On the other hand, in the transition from CURRENT: (0, 1, 0) to NEXT: (Rc, Rm, 1), from CURRENT: (0, 1, 0) to NEXT: (0, 1, 1), and from CURRENT: (0, 1, 0) to NEXT: (1, 1, 1), the M particle does not move and the C particle moves to the same direction of the Y particle or does not move and, therefore, the application of the correction driving waveform is not required.

Moreover, in the transition from CURRENT: (0, 1, 0) to NEXT: (0, 0, 1), the C particle stays in the ground state, however, the M and Y particles must move to the direction opposite to each other. To correct the movement of the M particle, at time of application of the correction waveform, the application of −15V for 4 sub-frames in the correction second sub-frame group period is necessary, however, before and after the application, the C particle does not move from its ground state and, therefore, there is need for no application of an voltage during the correction third sub-frame group period.

In the transition from CURRENT: (0, 1, 0) to NEXT: (1, 0, 1), the C and Y particles must move in the same direction and the M and Y particles must move in a direction opposite to each other. First, to correct the movement of the M particle to move to the opposite direction, after the application of the correction waveform, the application of −15V for 4 sub-frames during the correction second sub-frame group period is required. After and before this, the C particle moves to the direction of M particle.

However, it is necessary that the C particle moves to the direction of the Y particle and the movement to the same direction as for the M particle has to be cancelled and in order to cancel the application of −15V for 4 sub-frames, during the correction third sub-frame group period, the additional application of 10V for 6 sub-frames is required.

Next, by referring to Table 7-4, a specified driving method for the transition from CURRENT: (1, 1, 0) to NEXT: (Rc, Rm, Ry) is described below. In the transition from CURRENT: (1, 1, 0) to NEXT: (Rc, Rm, 0), the Y particle does not move and either of the C and M particles do not move or both of them move in the same directions and, therefore, no application of the correction driving waveform is required.

In the transition from CURRENT: (1, 1, 0) to NEXT: (Rc, Rm, 1) out of the transition from CURRENT: (1, 1, 0) to NEXT: (1, 1, 0), only the Y particle moves and the application of the correction driving waveform is not necessary.

In the transition from CURRENT: (1, 1, 0) to NEXT: (0, 1, 1), the M particle does not move and the C and Y particles move in a direction opposite to each other and at time of the application of the correction driving waveform, the application of −10V for 6 sub-frames during the correction third sub-frame group period is required.

In the transition from CURRENT: (1, 1, 0) to NEXT: (0, 0, 1), the C and M particles move in the same direction, and on the other hand, the Y particle moves in a direction opposite to the C and M particles and, therefore, at time of application of the correction driving waveform, the application of −15V for 4 sub-frames is required during the correction second sub-frame group period.

Moreover, in the transition from CURRENT: (1, 1, 0) to NEXT: (0, 1, 1), the M and Y particles move in a direction opposite to each other, and on the other hand the C and Y particles move in the same direction and, therefore, at time of application of the correction driving waveform, a voltage of −15V is applied for 4 sub-frames during the correction second sub-frame group period.

To cancel the influence on the C particle to which a voltage is applied during the correction second sub-frame group period, the application of 10V for 6 sub-frames is performed in the correction third sub-frame group period. The cases in Table 7-5 and 7-8 are the same as described above and their descriptions are omitted.

Figure 30A:
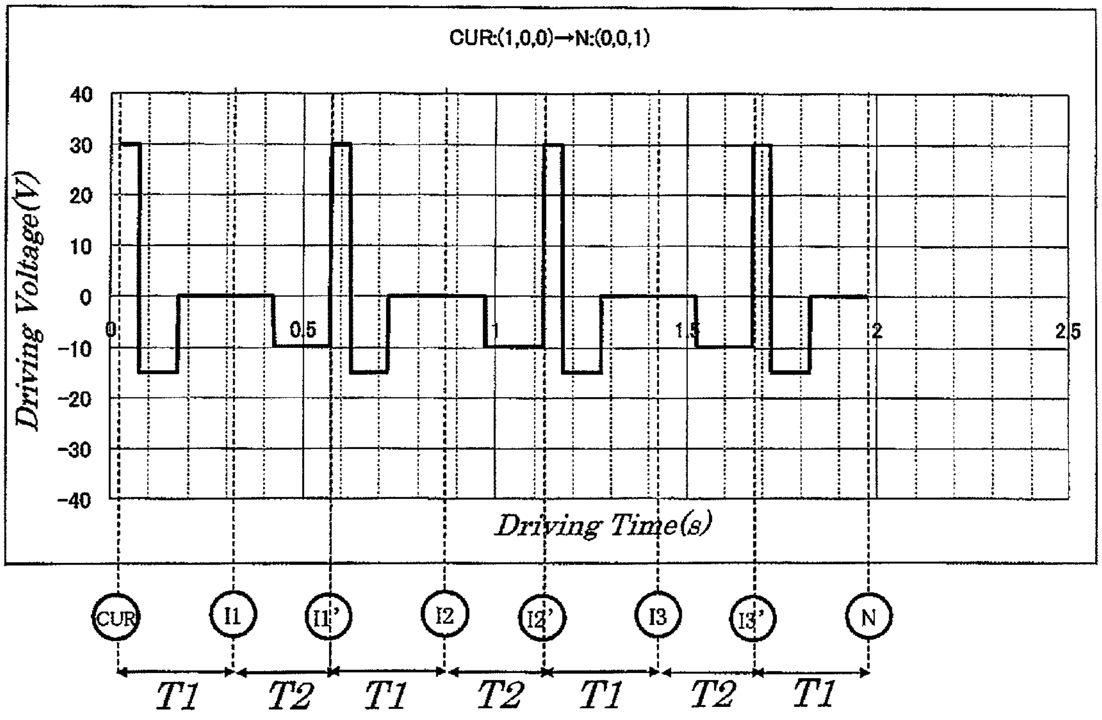
FIG. 30A is a diagram showing a driving waveform.
Figure 30B:
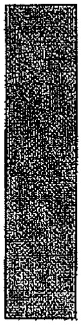
FIG. 30B is a table showing an intermediate transition state to be used at time of screen renewal which are respectively used in a fourth exemplary embodiment of the present invention.
Figure 31:
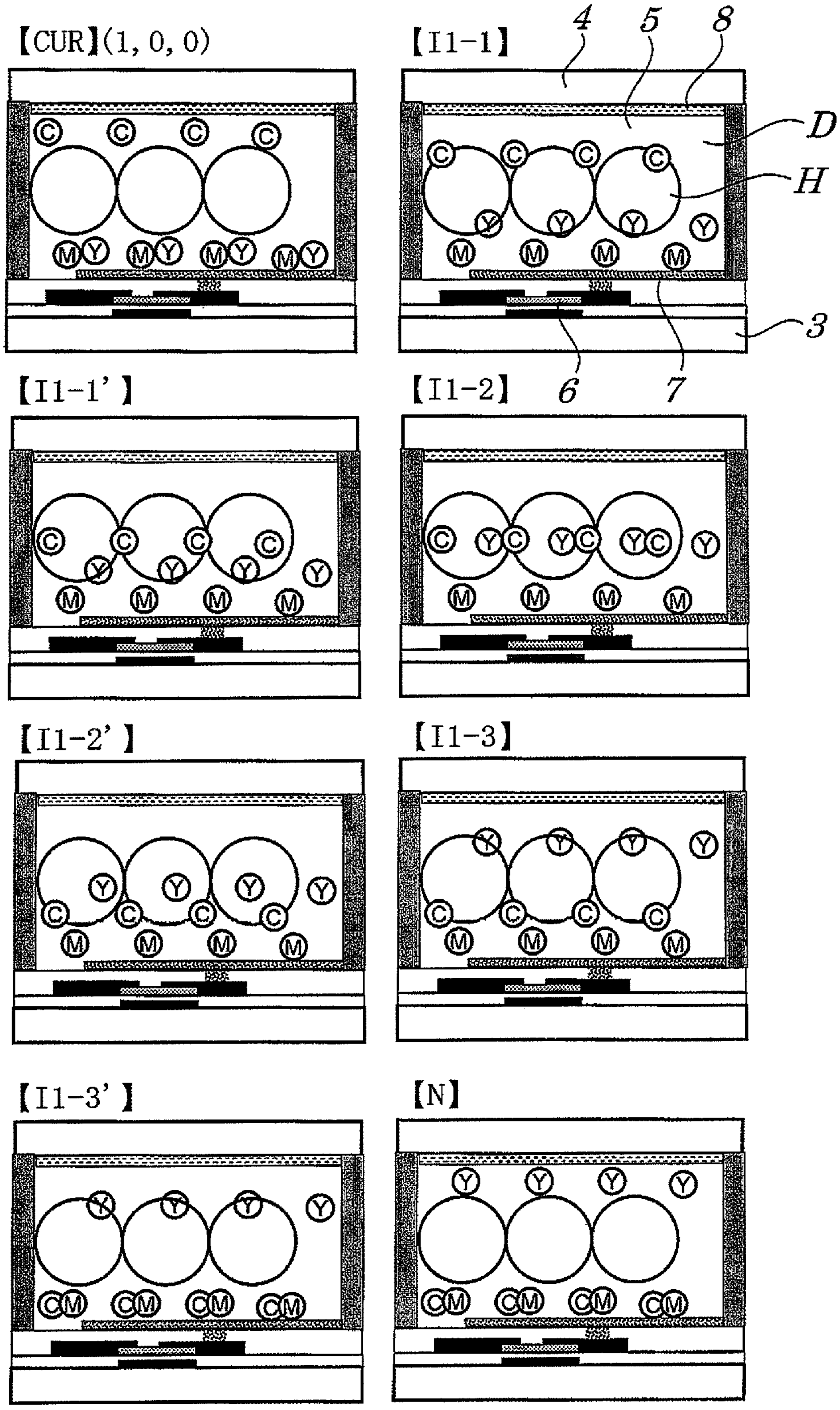
FIG. 31 is an intermediate transition state diagram representing behavior of electrophoretic particles at time of screen renewal in the fourth exemplary embodiment.
Figure 32:
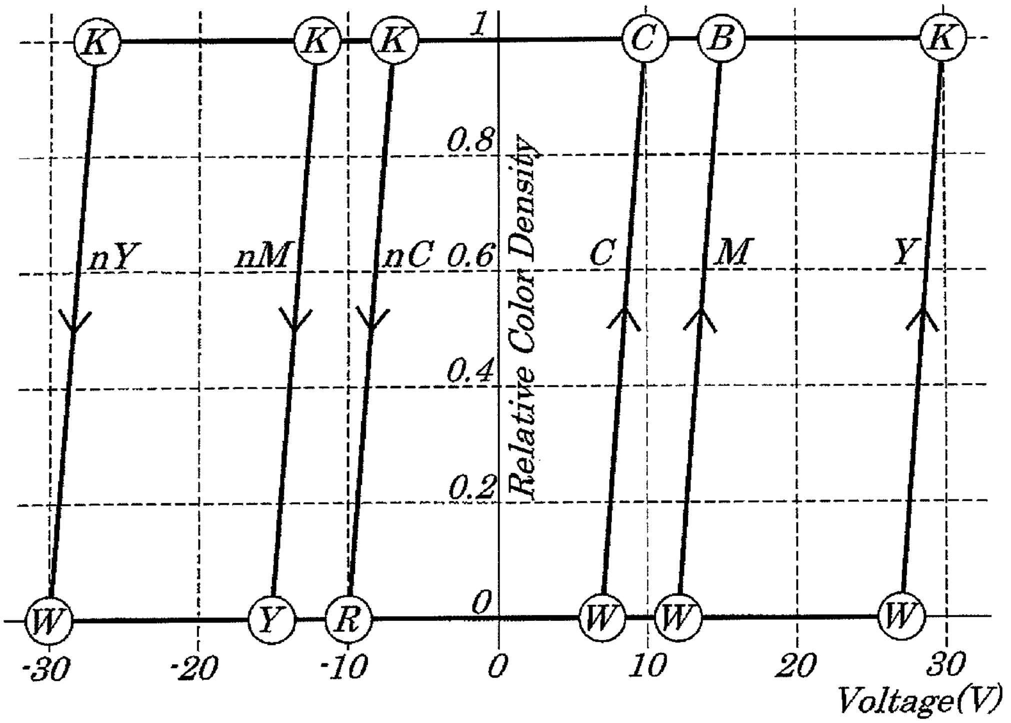
FIG. 32 (RELATED ART)
FIG. 32 is a diagram explaining problems in related arts.
Figure 33:
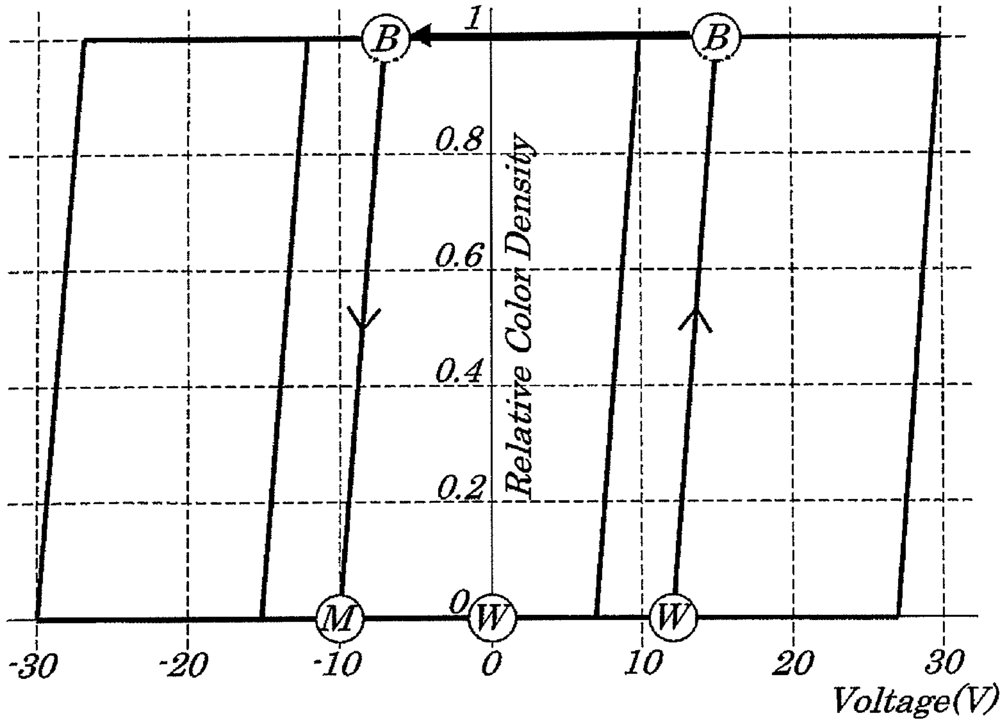
FIG. 33 (RELATED ART)
FIG. 33 is a diagram explaining problems in related arts.

FIG. 30A is a diagram showing driving waveforms, and FIG. 30B is a table showing intermediate transition state for the transition from CURRENT: (1, 0, 0) to NEXT: (0, 0, 1) at time of screen renewal according to the fourth exemplary embodiment. FIG. 31 is an intermediate transition state diagram for representing behavior of the electrophoretic particles.

By referring to FIGS. 30A, 30B and 31, it is understood that the transition occurs from CURRENT: (1, 0, 0)→the state I1: (0.75, 0, 0.25)→the state I1': (0.5, 0, 0.25)→the state I2: (0.5, 0, 0.5)→I2': (0.25, 0, 0.5)→the state I3: (0.25, 0, 0.75) →the state I3': (0, 0, 0.75)→NEXT: (0, 0, 1).

Thus, at time of the transition from a current screen to a next screen, in order to realize a direct transition without resetting a previous screen, according to the fourth exemplary embodiment, during the application of unit driving waveforms for a plurality of times, a correction driving waveform being different from the unit driving waveform is to be applied.

The correction driving waveform is applied during a sub-frame group period during which a second voltage V2 (or V2) is applied for a specified number of sub-frames and then a third voltage V3 (or V3) is applied for a specified number of sub-frames.

During the correction sub-frame group period for application of a second voltage, when the Y particle to be moved by a first voltage and M particle to be moved by first and second voltages move in a direction opposite to each other at time of the transition, an applying voltage is required and during the correction sub-frame group period for application of a third voltage, when the Y particle to be moved by the first voltage and the M particle to be moved by the first and second voltages, and the C particles to be moved by the first, second, and third voltages move in directions opposite to one another, the voltage application is required.

Thus, the fourth exemplary embodiment, also as in the case of the first exemplary embodiment, is configured to repeat the application of the unit driving waveform four times, and by increasing further a sub-frame frequency and by repeating the application of the unit driving waveform four times and more, changes in color (for example, ΔC, ΔM, and ΔY) in the intermediate transition can be reduced and the "flicker" can be suppressed.

Moreover, after the end of the driving period of each of the unit driving waveform, by applying 0V for several sub-frames, since hues of (0, 0.25, 0), (0, 0.5, 0), and (0, 0.75, 0) . . . can emphasize an intermediate transition state near to a final display state, the flicker on the screen can be reduced.

Moreover, for a targeted renewal state, by omitting frame group periods not required, driving may be performed only by first to third sub-frame group periods requiring application of voltages.

There exists a unit driving waveform having the same intermediate transition state and it is needless to say that driving waveform is included in the fourth exemplary embodiment. For example, during the sub-frame group period for making a relative color density of CMY particles in an intermediate transition becomes "0" or "1", if excessive application of an applying voltage causes a relative color density to be saturated to be "0" and "1", the voltage may be applied excessively.

Further, by reducing a period for the application of 0V, the driving period can be shortened. By making constant the number of sub-frames for each period, the unit sub-frame time for each period is made different for each period. In the above embodiments, C, M and Y are displayed at 3 gray levels, however, it is needless to say that multiple gray levels including 2 and 3 gray levels and more enables the driving as above.

Moreover, it is possible that a previous screen is once displayed at 2 gray levels and then a next screen can be displayed by using driving waveforms in Tables 6-1 to 6-9. In the above description, the driving method is applied to three particles of C, M, and Y, however, can be also applied to three colors RGB, and four colors of CMYK and six colors of CMYRGB as well.

Thus, according to the fourth exemplary embodiment, since the resetting period in the first exemplary embodiment is omitted and therefore a renewing period for renewal of a screen can be shortened. Additionally, since the display of the ground state can be omitted and, as a result, changes in luminance and colors can be further reduced and a natural screen transition free of an uncomfortable feeling of the eye can be realized.

Fifth Exemplary Embodiment

The fifth exemplary embodiment of the present invention differs from those of the first to fourth exemplary embodiments in that electrophoretic particles each having one of two colors are used instead of the electrophoretic particles each having one of three colors.

That is, in the fifth exemplary embodiment, an electrophoretic particle having a cyan (C) color, an electrophoretic particle having a red (R) color, cyan (C) and red (R) being complementary to each other, and a white holding body are used to display red (R), cyan (C), black (K) and white (W), and their intermediate colors and their gray level.

Driving Operation

<Case of Existence of Reset Period and One Time Application of Driving Waveform>

In the fifth exemplary embodiment, a renewal from a previous screen to a next screen is performed in a way by which, after a screen is reset to a ground state WK displaying a white (W) or a black (K), a driving waveform for a targeted screen is applied one time.

The period during which a driving waveform is applied according to the fifth exemplary embodiment includes a reset period for a transition to a ground state WK to display a white (W) or a black (K), a first sub-frame group period (first voltage applying period) for the application of V1, 0, −V1[V] and a second sub-frame group period (second voltage applying period) for the application of V2, 0, −V2[V].

More specifically, when a relative color density (CR) of charged particles C and R being display information for every pixel for a next screen to be renewed is represented as (Rc, Rr), the first sub-frame group period is a period during which a transition occurs from a ground state to display a white (W) or a black (K) to an intermediate transition state I-1 where the relative color density of the charged particle R becomes Rr and the second sub-frame group period is a period during which a transition occurs from an intermediate transition state I-1 to a final display state (screen to be renewed).

Here, the relative color density Rx (x=c, R) takes 0 to 1 and Rx=0 represents a state where no X particle (charged particles C and R) exists on a surface and Rx=1 represents a state where all X particles have moved to a surface.

Table 8 is specified voltage data obtained when each gray levels for two colors C and R is 3 gray levels (0, 0.5, 1). Moreover, for simplification, by setting a charged amount Q for each of charged particles C and R is set to be |Q(c)|>|Qr|, a threshold voltage to initiate movement of the charged particle is |Vth(c)|<|Vth(r)|.

As shown in Table 8, the driving waveform is set to be |V1|=30V or 0V in the first sub-frame group period and the driving waveform is set to be |V2|=15V or 0V.

Moreover, as in the first exemplary embodiment, the time Δt required for each of the charged particles C and R to move from a rear surface to a display surface, according to a simple model, in the case of a threshold voltage or more, is in reverse proportion to an applied voltage V and a relation of V×Δt=constant.

In the fifth exemplary embodiment, one sub-frame period is set to be 100 msec and the screen renewing period is made up of 8 sub-frames (2 sub-frames for the reset voltage applying period), 2 sub-frames for the first sub-frame group period, and 4 sub-frames for the second sub-frame period).

TABLE 8

Two Particles, with Reset Period, One Time Application of Driving Waveform

| Targetted Renewing Screen Display | | Reset Period: Applied Voltage | | Reset Period: Ground State WK | | Driving Waveform Applying Period: First Sub-frame Group: Applied Voltage | | First Sub-frame Group: Intermediate Transition I1-1 | | Second Sub-frame Group: Applied Voltage | | | | Final Display State N | |
|---|---|---|---|---|---|---|---|---|---|---|---|---|---|---|---|
| C | R | Ra | Rb | C | R | W1-1a | W1-1b | C | R | W1-2a | W1-2b | W1-2c | W1-2d | C | R |
| 0 | 0 | −30 | −30 | 0 | 0 | 0 | 0 | 0 | 0 | 0 | 0 | 0 | 0 | 0 | 0 |
| 0.5 | 0 | −30 | −30 | 0 | 0 | 0 | 0 | 0 | 0 | 15 | 15 | 0 | 0 | 0.5 | 0 |
| 1 | 0 | −30 | −30 | 0 | 0 | 0 | 0 | 0 | 0 | 15 | 15 | 15 | 15 | 1 | 0 |
| 0 | 0.5 | −30 | −30 | 0 | 0 | 30 | 0 | 0.5 | 0.5 | −15 | −15 | 0 | 0 | 0 | 0.5 |
| 0.5 | 0.5 | −30 | −30 | 0 | 0 | 30 | 0 | 0.5 | 0.5 | 0 | 0 | 0 | 0 | 0.5 | 0.5 |
| 1 | 0.5 | −30 | −30 | 0 | 0 | 30 | 0 | 0.5 | 0.5 | 15 | 15 | 0 | 0 | 1 | 0.5 |
| 0 | 1 | −30 | −30 | 0 | 0 | 30 | 30 | 1 | 1 | −15 | −15 | −15 | −15 | 0 | 1 |
| 0.5 | 1 | −30 | −30 | 0 | 0 | 30 | 30 | 1 | 1 | −15 | −15 | 0 | 0 | 0.5 | 1 |
| 1 | 1 | −30 | −30 | 0 | 0 | 30 | 30 | 1 | 1 | 0 | 0 | 0 | 0 | 1 | 1 |

Next, by referring to Table 8, the specified driving operation (driving method) of the fifth exemplary embodiment is described. In Table 8, a first column represents a relative color density (CR) in a targeted renewal display state.

The second column represents voltages applied during the reset period and relative color density in a ground state after the end of the reset period. The reset period, in the fifth exemplary embodiment, is made up of 2 sub-frames Ra and Rb and an applying voltage that can be taken is −30V. The third column represents voltages applied during the first sub-frame group periods and relative color densities during the intermediate transition state I-1 after the end of the period.

The first sub-frame group period are made up of two sub-frames 1$a$ and 1$b$ and an applying voltage that can be taken is +30V and 0V. The reason why the first sub-frame group period is made up of the two sub-frames is that a response time of a charged particle at 30V is 0.2 sec and 1 sub-frame period is 0.1 sec. The fourth column represents voltages applied during the second sub-frame group period and relative color densities in a final display state NEXT after the end of the period.

The second sub-frame group period is made up of 4 sub-frames 2$a$, 2$b$, 2$c$, and 2$d$ and an applying voltage that can be taken is +15V, 0V, −15V. The reason why the second sub-frame group period is made up of the 4 sub-frames is that a response time of a charged particle at 15V is 0.4 sec and 1 sub-frame period is 0.1 sec.

During the reset period, V1 (=−30V) is applied for 2 sub-frames and the charged particles C and R are moved and gathered to a rear face side being opposite to a display surface to display a white (W). Next, during the first sub-frame group period, in a manner to correspond to a relative color density of the charged particle R, when the relative color density (R) is 0, the applying voltage 0V is applied for 2 sub-frames and, when the relative color density (R) is 0, the applying voltage 30V is applied for 1 sub-frame and the applying voltage 0V is applied for 1 sub-frame and, when the relative color density (R) is 1, the applying voltage 30V is applied for 2 sub-frames. This causes a transition from the ground state W to the intermediate transition state I-1: (CR)=(Rr, Rr) (Rr is 3 gray levels and Ry=0, 0.5, 1).

Next, during the second sub-frame group period, similarly, by applying −15V or 15V a specified number of times, a transition occurs from the intermediate transition state I-1: (CR)=(Rr, Rr) to a final display state NEXT: (CR)=(Rc, Rr). For example, a difference between the relative color density Rr in the intermediate transition state I-1 and the relative color density Rc in the final display state NEXT is (Rr−Rc)=−0.5, −15V is applied for 2 sub-frames.

When (Rr−Rc)=1, 0.5, 0, −1, similarly, −15V/15V is applied a specified number of times. By this driving operation, a transition occurs from the intermediate transition state I-1: (CR)=(Rr, Rr) to a final display state NEXT (CR)=(Rc, Rr) (Rc, and Rr are any one of 3 gray levels of 0, 0.5, 1).

Sixth Exemplary Embodiment

Driving Operations

<Case of Existence of Reset Period and Four Time Repeated Applications of Unit Driving Waveforms>

In the sixth exemplary embodiment, a renewal from a previous screen to a next screen is realized, after resetting a screen to a ground state WK to display a white (W) and a black (K) and by repeated application of a corresponding unit driving waveform.

Table 9 shows specified driving voltage data used to realize a renewed screen providing 2 colors (C, R) and 3 gray level display according to the sixth exemplary embodiment. Specifically, in the sixth exemplary embodiment, driving voltage data to be used when the unit driving waveform is applied repeatedly four times is shown in Table 9.

A part (a) in Table 9 shows driving voltages applied during the reset period and ground state WK after the application of the voltages, a part (b) of Table 9 shows driving voltages applied for a first driving voltage applying period and the intermediate transition state I1-2 after the application of the voltages, a part (c) in Table 9 shows driving voltages applied for a second driving voltage applying period and the intermediate transition state I2-2, a part in Table 9 shows driving voltages applied for a third driving voltage applying period and the intermediate transition state I3-2, and a part (e) in Table 9 shows driving voltages applied for a fourth driving voltage applying period and the final display state NEXT after the application of the voltages.

TABLE 9

Two Particles, with Reset Period, Four-time Application of Driving Waveform (a)

| Targetted Renewing Screen Display | | Reset Period Applied Voltage | | Applied Voltage | | Applied Voltage | | Applied Voltage | | Ground State WK | |
|---|---|---|---|---|---|---|---|---|---|---|---|
| C | R | Ra | Rb | Ra | Rb | Ra | Rb | Ra | Rb | C | R |
| 0 | 0 | −30 | −30 | −30 | −30 | −30 | −30 | −30 | −30 | 0 | 0 |
| 0.5 | 0 | −30 | −30 | −30 | −30 | −30 | −30 | −30 | −30 | 0 | 0 |
| 1 | 0 | −30 | −30 | −30 | −30 | −30 | −30 | −30 | −30 | 0 | 0 |
| 0 | 0.5 | −30 | −30 | −30 | −30 | −30 | −30 | −30 | −30 | 0 | 0 |
| 0.5 | 0.5 | −30 | −30 | −30 | −30 | −30 | −30 | −30 | −30 | 0 | 0 |
| 1 | 0.5 | −30 | −30 | −30 | −30 | −30 | −30 | −30 | −30 | 0 | 0 |
| 0 | 1 | −30 | −30 | −30 | −30 | −30 | −30 | −30 | −30 | 0 | 0 |
| 0.5 | 1 | −30 | −30 | −30 | −30 | −30 | −30 | −30 | −30 | 0 | 0 |
| 1 | 1 | −30 | −30 | −30 | −30 | −30 | −30 | −30 | −30 | 0 | 0 |

(b)

| Ground State WK | | First Sub-frame Group Applied Voltage | | Intermediate Transition I1-1 | | Second Sub-frame Group Applied Voltage | | | | Intermediate Transition I1-2 | |
|---|---|---|---|---|---|---|---|---|---|---|---|
| C | R | W1-1a | W1-1b | C | R | W1-2a | W1-2b | W1-2c | W1-2d | C | R |
| 0 | 0 | 0 | 0 | 0 | 0 | 0 | 0 | 0 | 0 | 0 | 0 |
| 0 | 0 | 0 | 0 | 0 | 0 | 15 | 15 | 0 | 0 | 0.125 | 0 |
| 0 | 0 | 0 | 0 | 0 | 0 | 15 | 15 | 15 | 15 | 0.25 | 0 |
| 0 | 0 | 30 | 0 | 0.125 | 0.125 | −15 | −15 | 0 | 0 | 0 | 0.125 |
| 0 | 0 | 30 | 0 | 0.125 | 0.125 | 0 | 0 | 0 | 0 | 0.125 | 0.125 |
| 0 | 0 | 30 | 0 | 0.125 | 0.125 | 15 | 15 | 0 | 0 | 0.25 | 0.125 |
| 0 | 0 | 30 | 30 | 0.25 | 0.25 | −15 | −15 | −15 | −15 | 0 | 0.25 |
| 0 | 0 | 30 | 30 | 0.25 | 0.25 | −15 | −15 | 0 | 0 | 0.125 | 0.25 |
| 0 | 0 | 30 | 30 | 0.25 | 0.25 | 0 | 0 | 0 | 0 | 0.25 | 0.25 |

(c)

| Intermediate Transition I1-2 | | First Sub-frame Group Applied Voltage | | Intermediate Transition I2-1 | | Second Sub-frame Group Applied Voltage | | | | Intermediate Transition I2-2 | |
|---|---|---|---|---|---|---|---|---|---|---|---|
| C | R | W2-1a | W2-1b | C | R | W2-2a | W2-2b | W2-2c | W2-2d | C | R |
| 0 | 0 | 0 | 0 | 0 | 0 | 0 | 0 | 0 | 0 | 0 | 0 |
| 0.125 | 0 | 0 | 0 | 0.125 | 0 | 15 | 15 | 0 | 0 | 0.25 | 0 |
| 0.25 | 0 | 0 | 0 | 0.25 | 0 | 15 | 15 | 15 | 15 | 0.5 | 0 |
| 0 | 0.125 | 30 | 0 | 0.125 | 0.25 | −15 | −15 | 0 | 0 | 0 | 0.25 |
| 0.125 | 0.125 | 30 | 0 | 0.25 | 0.25 | 0 | 0 | 0 | 0 | 0.25 | 0.25 |
| 0.25 | 0.125 | 30 | 0 | 0.375 | 0.25 | 15 | 15 | 0 | 0 | 0.5 | 0.25 |
| 0 | 0.25 | 30 | 30 | 0.25 | 0.5 | −15 | −15 | −15 | −15 | 0 | 0.5 |
| 0.125 | 0.25 | 30 | 30 | 0.375 | 0.5 | −15 | −15 | 0 | 0 | 0.25 | 0.5 |
| 0.25 | 0.25 | 30 | 30 | 0.5 | 0.5 | 0 | 0 | 0 | 0 | 0.5 | 0.5 |

(d)

| Intermediate Transition I2-2 | | First Sub-frame Group Applied Voltage | | Intermediate Transition I3-1 | | Second Sub-frame Group Applied Voltage | | | | Intermediate Transition I3-2 | |
|---|---|---|---|---|---|---|---|---|---|---|---|
| C | R | W3-1a | W3-1b | C | R | W3-2a | W3-2b | W3-2c | W3-2d | C | R |
| 0 | 0 | 0 | 0 | 0 | 0 | 0 | 0 | 0 | 0 | 0 | 0 |
| 0.25 | 0 | 0 | 0 | 0.25 | 0 | 15 | 15 | 0 | 0 | 0.375 | 0 |
| 0.5 | 0 | 0 | 0 | 0.5 | 0 | 15 | 15 | 15 | 15 | 0.75 | 0 |
| 0 | 0.25 | 30 | 0 | 0.125 | 0.375 | −15 | −15 | 0 | 0 | 0 | 0.375 |
| 0.25 | 0.25 | 30 | 0 | 0.375 | 0.375 | 0 | 0 | 0 | 0 | 0.375 | 0.375 |
| 0.5 | 0.25 | 30 | 0 | 0.625 | 0.375 | 15 | 15 | 0 | 0 | 0.75 | 0.375 |

TABLE 9-continued

| Two Particles, with Reset Period, Four-time Application of Driving Waveform | | | | | | | | | | | |
|---|---|---|---|---|---|---|---|---|---|---|---|
| 0 | 0.5 | 30 | 30 | 0.25 | 0.75 | −15 | −15 | −15 | −15 | 0 | 0.75 |
| 0.25 | 0.5 | 30 | 30 | 0.5 | 0.75 | −15 | −15 | 0 | 0 | 0.375 | 0.75 |
| 0.5 | 0.5 | 30 | 30 | 0.75 | 0.75 | 0 | 0 | 0 | 0 | 0.75 | 0.75 |

(e)

| | | First Sub-frame Group | | | | Second Sub-frame Group | | | | | |
|---|---|---|---|---|---|---|---|---|---|---|---|
| Intermediate Transition I3-2 | | Applied Voltage | | Intermediate Transition I4-1 | | Applied Voltage | | | | Final Display State N | |
| C | R | W4-1a | W4-1b | C | R | W4-2a | W4-2b | W4-2c | W4-2d | C | R |
| 0 | 0 | 0 | 0 | 0 | 0 | 0 | 0 | 0 | 0 | 0 | 0 |
| 0.375 | 0 | 0 | 0 | 0.375 | 0 | 15 | 15 | 0 | 0 | 0.5 | 0 |
| 0.75 | 0 | 0 | 0 | 0.75 | 0 | 15 | 15 | 15 | 15 | 1 | 0 |
| 0 | 0.375 | 30 | 0 | 0.125 | 0.5 | −15 | −15 | 0 | 0 | 0 | 0.5 |
| 0.375 | 0.375 | 30 | 0 | 0.5 | 0.5 | 0 | 0 | 0 | 0 | 0.5 | 0.5 |
| 0.75 | 0.375 | 30 | 0 | 0.875 | 0.5 | 15 | 15 | 0 | 0 | 1 | 0.5 |
| 0 | 0.75 | 30 | 30 | 0.25 | 1 | −15 | −15 | −15 | −15 | 0 | 1 |
| 0.375 | 0.75 | 30 | 30 | 0.625 | 1 | −15 | −15 | 0 | 0 | 0.5 | 1 |
| 0.75 | 0.75 | 30 | 30 | 1 | 1 | 0 | 0 | 0 | 0 | 1 | 1 |

Seventh Exemplary Embodiment

Driving Operations

<Case of Non-Existence of Reset Period and One Time Repeated Applications of Unit Driving Waveforms>

Next, a seventh exemplary embodiment of the present invention is described. According to the seventh exemplary embodiment, renewal from a previous screen to a next screen is realized, as shown in Tables 10-1 and 10-2, by one time application of a driving waveform without providing a reset period.

TABLE 10-1

| Two Particles, without Reset Period, One Time Application of Driving Waveform | | | | | | | | | | | | | |
|---|---|---|---|---|---|---|---|---|---|---|---|---|---|
| | | | | Driving Waveform Applying Period | | | | | | | | | |
| Targetted Renewing Screen Display | | Current Screen Display CUR | | First Sub-frame Group | | | | Second Sub-frame Group | | | | | |
| | | | | Applied Voltage | | Intermediate Transition I1-1 | | Applied Voltage | | | | Final Display State N | |
| C | R | C | R | W1-1a | W1-1b | C | R | W1-2a | W1-2b | W1-2c | W1-2d | C | R |
| (a) | | | | | | | | | | | | | |
| 0 | 0 | 0 | 0 | 0 | 0 | 0 | 0 | 0 | 0 | 0 | 0 | 0 | 0 |
| 0.5 | 0 | 0 | 0 | 0 | 0 | 0 | 0 | 15 | 15 | 0 | 0 | 0.5 | 0 |
| 1 | 0 | 0 | 0 | 0 | 0 | 0 | 0 | 15 | 15 | 15 | 15 | 1 | 0 |
| 0 | 0.5 | 0 | 0 | 30 | 0 | 0.5 | 0.5 | −15 | −15 | 0 | 0 | 0 | 0.5 |
| 0.5 | 0.5 | 0 | 0 | 30 | 0 | 0.5 | 0.5 | 0 | 0 | 0 | 0 | 0.5 | 0.5 |
| 1 | 0.5 | 0 | 0 | 30 | 0 | 0.5 | 0.5 | 15 | 15 | 0 | 0 | 1 | 0.5 |
| 0 | 1 | 0 | 0 | 30 | 30 | 1 | 1 | −15 | −15 | −15 | −15 | 0 | 1 |
| 0.5 | 1 | 0 | 0 | 30 | 30 | 1 | 1 | −15 | −15 | 0 | 0 | 0.5 | 1 |
| 1 | 1 | 0 | 0 | 30 | 30 | 1 | 1 | 0 | 0 | 0 | 0 | 1 | 1 |
| (b) | | | | | | | | | | | | | |
| 0 | 0 | 0.5 | 0 | 0 | 0 | 0.5 | 0 | −15 | −15 | 0 | 0 | 0 | 0 |
| 0.5 | 0 | 0.5 | 0 | 0 | 0 | 0.5 | 0 | 0 | 0 | 0 | 0 | 0.5 | 0 |
| 1 | 0 | 0.5 | 0 | 0 | 0 | 0.5 | 0 | 15 | 15 | 0 | 0 | 1 | 0 |
| 0 | 0.5 | 0.5 | 0 | 30 | 0 | 1 | 0.5 | −15 | −15 | −15 | −15 | 0 | 0.5 |
| 0.5 | 0.5 | 0.5 | 0 | 30 | 0 | 1 | 0.5 | −15 | −15 | 0 | 0 | 0.5 | 0.5 |
| 1 | 0.5 | 0.5 | 0 | 30 | 0 | 1 | 0.5 | 0 | 0 | 0 | 0 | 1 | 0.5 |
| 0 | 1 | 0.5 | 0 | 30 | 30 | 1 | 1 | −15 | −15 | −15 | −15 | 0 | 1 |
| 0.5 | 1 | 0.5 | 0 | 30 | 30 | 1 | 1 | −15 | −15 | 0 | 0 | 0.5 | 1 |
| 1 | 1 | 0.5 | 0 | 30 | 30 | 1 | 1 | 0 | 0 | 0 | 0 | 1 | 1 |
| (c) | | | | | | | | | | | | | |
| 0 | 0 | 1 | 0 | 0 | 0 | 1 | 0 | −15 | −15 | −15 | −15 | 0 | 0 |
| 0.5 | 0 | 1 | 0 | 0 | 0 | 1 | 0 | −15 | −15 | 0 | 0 | 0.5 | 0 |
| 1 | 0 | 1 | 0 | 0 | 0 | 1 | 0 | 0 | 0 | 0 | 0 | 1 | 0 |
| 0 | 0.5 | 1 | 0 | 30 | 0 | 1 | 0.5 | −15 | −15 | −15 | −15 | 0 | 0.5 |
| 0.5 | 0.5 | 1 | 0 | 30 | 0 | 1 | 0.5 | −15 | −15 | 0 | 0 | 0.5 | 0.5 |

TABLE 10-1-continued

Two Particles, without Reset Period, One Time Application of Driving Waveform

| Targetted Renewing Screen Display | | Current Screen Display CUR | | Driving Waveform Applying Period: First Sub-frame Group: Applied Voltage | | Intermediate Transition I1-1 | | Second Sub-frame Group: Applied Voltage | | | | Final Display State N | |
|---|---|---|---|---|---|---|---|---|---|---|---|---|---|
| C | R | C | R | W1-1a | W1-1b | C | R | W1-2a | W1-2b | W1-2c | W1-2d | C | R |
| 1 | 0.5 | 1 | 0 | 30 | 0 | 1 | 0.5 | 0 | 0 | 0 | 0 | 1 | 0.5 |
| 0 | 1 | 1 | 0 | 30 | 30 | 1 | 1 | −15 | −15 | −15 | −15 | 0 | 1 |
| 0.5 | 1 | 1 | 0 | 30 | 30 | 1 | 1 | −15 | −15 | 0 | 0 | 0.5 | 1 |
| 1 | 1 | 1 | 0 | 30 | 30 | 1 | 1 | 0 | 0 | 0 | 0 | 1 | 1 |
| (d) | | | | | | | | | | | | | |
| 0 | 0 | 0 | 0.5 | −30 | 0 | 0 | 0 | 0 | 0 | 0 | 0 | 0 | 0 |
| 0.5 | 0 | 0 | 0.5 | −30 | 0 | 0 | 0 | 15 | 15 | 0 | 0 | 0.5 | 0 |
| 1 | 0 | 0 | 0.5 | −30 | 0 | 0 | 0 | 15 | 15 | 15 | 15 | 1 | 0 |
| 0 | 0.5 | 0 | 0.5 | 0 | 0 | 0 | 0.5 | 0 | 0 | 0 | 0 | 0 | 0.5 |
| 0.5 | 0.5 | 0 | 0.5 | 0 | 0 | 0 | 0.5 | 15 | 15 | 0 | 0 | 0.5 | 0.5 |
| 1 | 0.5 | 0 | 0.5 | 0 | 0 | 0 | 0.5 | 15 | 15 | 15 | 15 | 1 | 0.5 |
| 0 | 1 | 0 | 0.5 | 30 | 0 | 0.5 | 1 | −15 | −15 | 0 | 0 | 0 | 1 |
| 0.5 | 1 | 0 | 0.5 | 30 | 0 | 0.5 | 1 | 0 | 0 | 0 | 0 | 0.5 | 1 |
| 1 | 1 | 0 | 0.5 | 30 | 0 | 0.5 | 1 | 15 | 15 | 0 | 0 | 1 | 1 |
| (e) | | | | | | | | | | | | | |
| 0 | 0 | 0.5 | 0.5 | −30 | 0 | 0 | 0 | 0 | 0 | 0 | 0 | 0 | 0 |
| 0.5 | 0 | 0.5 | 0.5 | −30 | 0 | 0 | 0 | 15 | 15 | 0 | 0 | 0.5 | 0 |
| 1 | 0 | 0.5 | 0.5 | −30 | 0 | 0 | 0 | 15 | 15 | 15 | 15 | 1 | 0 |
| 0 | 0.5 | 0.5 | 0.5 | 0 | 0 | 0.5 | 0.5 | −15 | −15 | 0 | 0 | 0 | 0.5 |
| 0.5 | 0.5 | 0.5 | 0.5 | 0 | 0 | 0.5 | 0.5 | 0 | 0 | 0 | 0 | 0.5 | 0.5 |
| 1 | 0.5 | 0.5 | 0.5 | 0 | 0 | 0.5 | 0.5 | 15 | 15 | 0 | 0 | 1 | 0.5 |
| 0 | 1 | 0.5 | 0.5 | 30 | 0 | 1 | 1 | −15 | −15 | −15 | −15 | 0 | 1 |
| 0.5 | 1 | 0.5 | 0.5 | 30 | 0 | 1 | 1 | −15 | −15 | 0 | 0 | 0.5 | 1 |
| 1 | 1 | 0.5 | 0.5 | 30 | 0 | 1 | 1 | 0 | 0 | 0 | 0 | 1 | 1 |

TABLE 10-2

| Targetted Renewing Screen Display | | Current Screen Display CUR | | Driving Waveform Applying Period: First Sub-frame Group: Applied Voltage | | Intermediate Transition I1-1 | | Second Sub-frame Group: Applied Voltage | | | | Final Display State N | |
|---|---|---|---|---|---|---|---|---|---|---|---|---|---|
| C | R | C | R | W1-1a | W1-1b | C | R | W1-2a | W1-2b | W1-2c | W1-2d | C | R |
| (a) | | | | | | | | | | | | | |
| 0 | 0 | 1 | 0.5 | −30 | 0 | 0.5 | 0 | −15 | −15 | 0 | 0 | 0 | 0 |
| 0.5 | 0 | 1 | 0.5 | −30 | 0 | 0.5 | 0 | 0 | 0 | 0 | 0 | 0.5 | 0 |
| 1 | 0 | 1 | 0.5 | −30 | 0 | 0.5 | 0 | 15 | 15 | 0 | 0 | 1 | 0 |
| 0 | 0.5 | 1 | 0.5 | 0 | 0 | 1 | 0.5 | −15 | −15 | −15 | −15 | 0 | 0.5 |
| 0.5 | 0.5 | 1 | 0.5 | 0 | 0 | 1 | 0.5 | −15 | −15 | 0 | 0 | 0.5 | 0.5 |
| 1 | 0.5 | 1 | 0.5 | 0 | 0 | 1 | 0.5 | 0 | 0 | 0 | 0 | 1 | 0.5 |
| 0 | 1 | 1 | 0.5 | 30 | 0 | 1 | 1 | −15 | −15 | −15 | −15 | 0 | 1 |
| 0.5 | 1 | 1 | 0.5 | 30 | 0 | 1 | 1 | −15 | −15 | 0 | 0 | 0.5 | 1 |
| 1 | 1 | 1 | 0.5 | 30 | 0 | 1 | 1 | 0 | 0 | 0 | 0 | 1 | 1 |
| (b) | | | | | | | | | | | | | |
| 0 | 0 | 0 | 1 | −30 | −30 | 0 | 0 | 0 | 0 | 0 | 0 | 0 | 0 |
| 0.5 | 0 | 0 | 1 | −30 | −30 | 0 | 0 | 15 | 15 | 0 | 0 | 0.5 | 0 |
| 1 | 0 | 0 | 1 | −30 | −30 | 0 | 0 | 15 | 15 | 15 | 15 | 1 | 0 |
| 0 | 0.5 | 0 | 1 | −30 | 0 | 0 | 0.5 | 0 | 0 | 0 | 0 | 0 | 0.5 |
| 0.5 | 0.5 | 0 | 1 | −30 | 0 | 0 | 0.5 | 15 | 15 | 0 | 0 | 0.5 | 0.5 |
| 1 | 0.5 | 0 | 1 | −30 | 0 | 0 | 0.5 | 15 | 15 | 15 | 15 | 1 | 0.5 |
| 0 | 1 | 0 | 1 | 0 | 0 | 0 | 1 | 0 | 0 | 0 | 0 | 0 | 1 |
| 0.5 | 1 | 0 | 1 | 0 | 0 | 0 | 1 | 15 | 15 | 0 | 0 | 0.5 | 1 |
| 1 | 1 | 0 | 1 | 0 | 0 | 0 | 1 | 15 | 15 | 15 | 15 | 1 | 1 |
| (c) | | | | | | | | | | | | | |
| 0 | 0 | 0.5 | 1 | −30 | −30 | 0 | 0 | 0 | 0 | 0 | 0 | 0 | 0 |
| 0.5 | 0 | 0.5 | 1 | −30 | −30 | 0 | 0 | 15 | 15 | 0 | 0 | 0.5 | 0 |

TABLE 10-2-continued

| Driving Waveform Applying Period | | | | | | | | | | | | | |
|---|---|---|---|---|---|---|---|---|---|---|---|---|---|
| Targetted | | Current | | First Sub-frame Group | | | | Second Sub-frame Group | | | | | |
| Renewing Screen Display | | Screen Display CUR | | Applied Voltage | | Intermediate Transition I1-1 | | Applied Voltage | | | | Final Display State N | |
| C | R | C | R | W1-1a | W1-1b | C | R | W1-2a | W1-2b | W1-2c | W1-2d | C | R |
| 1 | 0 | 0.5 | 1 | −30 | −30 | 0 | 0 | 15 | 15 | 15 | 15 | 1 | 0 |
| 0 | 0.5 | 0.5 | 1 | −30 | 0 | 0 | 0.5 | 0 | 0 | 0 | 0 | 0 | 0.5 |
| 0.5 | 0.5 | 0.5 | 1 | −30 | 0 | 0 | 0.5 | 15 | 15 | 0 | 0 | 0.5 | 0.5 |
| 1 | 0.5 | 0.5 | 1 | −30 | 0 | 0 | 0.5 | 15 | 15 | 15 | 15 | 1 | 0.5 |
| 0 | 1 | 0.5 | 1 | 0 | 0 | 0.5 | 1 | −15 | −15 | 0 | 0 | 0 | 1 |
| 0.5 | 1 | 0.5 | 1 | 0 | 0 | 0.5 | 1 | 0 | 0 | 0 | 0 | 0.5 | 1 |
| 1 | 1 | 0.5 | 1 | 0 | 0 | 0.5 | 1 | 15 | 15 | 0 | 0 | 1 | 1 |
| (d) | | | | | | | | | | | | | |
| 0 | 0 | 1 | 1 | −30 | −30 | 0 | 0 | 0 | 0 | 0 | 0 | 0 | 0 |
| 0.5 | 0 | 1 | 1 | −30 | −30 | 0 | 0 | 15 | 15 | 0 | 0 | 0.5 | 0 |
| 1 | 0 | 1 | 1 | −30 | −30 | 0 | 0 | 15 | 15 | 15 | 15 | 1 | 0 |
| 0 | 0.5 | 1 | 1 | −30 | 0 | 0.5 | 0.5 | −15 | −15 | 0 | 0 | 0 | 0.5 |
| 0.5 | 0.5 | 1 | 1 | −30 | 0 | 0.5 | 0.5 | 0 | 0 | 0 | 0 | 0.5 | 0.5 |
| 1 | 0.5 | 1 | 1 | −30 | 0 | 0.5 | 0.5 | 15 | 15 | 0 | 0 | 1 | 0.5 |
| 0 | 1 | 1 | 1 | 0 | 0 | 1 | 1 | −15 | −15 | −15 | −15 | 0 | 1 |
| 0.5 | 1 | 1 | 1 | 0 | 0 | 1 | 1 | −15 | −15 | 0 | | 0.5 | 1 |
| 1 | 1 | 1 | 1 | 0 | 0 | 1 | 1 | 0 | 0 | 0 | 0 | 1 | 1 |

Eighth Exemplary Embodiment

Driving Operation

<Case of No-Existence of Reset Period, Plurality of Time Application of Unit Driving Waveform Next, an eighth exemplary embodiment of the present invention is described. According to the eighth exemplary embodiment, renewal from a previous screen to a next screen is realized, as shown in Table 11, without providing a reset period, by a plurality of times application of unit driving waveforms. As an example of the driving method by four time repeated application of the unit driving waveform, Table 11 shows the driving waveform to be used when the display state of the previous screen (CR)=(0, 1), to display a given (CR)=(Rc, Rr) (Rc, and Rr are any one of 3 gray levels of 0, 0.5, 1).

TABLE 11

Two Particles, without Reset Period, Four-time Application of Driving Waveform (a)

| Reset Period | | | | First Sub-frame Group | | | | Second Sub-frame Group | | | | | |
|---|---|---|---|---|---|---|---|---|---|---|---|---|---|
| Targetted Renewing Screen Display | | Current Screen Display CUR | | Applied Voltage | | Intermediate Transition I1-1 | | Applied Voltage | | | | Intermediate Transition I1-2b | |
| C | R | C | R | W1-1a | W1-1b | C | R | W1-2a | W1-2b | W1-2c | W1-2d | C | R |
| 0 | 0 | 0 | 1 | −30 | −30 | 0 | 0.75 | 0 | 0 | 0 | 0 | 0 | 0.75 |
| 0.5 | 0 | 0 | 1 | −30 | −30 | 0 | 0.75 | 15 | 15 | 0 | 0 | 0.125 | 0.75 |
| 1 | 0 | 0 | 1 | −30 | −30 | 0 | 0.75 | 15 | 15 | 15 | 15 | 0.25 | 0.75 |
| 0 | 0.5 | 0 | 1 | −30 | 0 | 0 | 0.875 | 0 | 0 | 0 | 0 | 0 | 0.875 |
| 0.5 | 0.5 | 0 | 1 | −30 | 0 | 0 | 0.875 | 15 | 15 | 0 | 0 | 0.125 | 0.875 |
| 1 | 0.5 | 0 | 1 | −30 | 0 | 0 | 0.875 | 15 | 15 | 15 | 15 | 0.25 | 0.875 |
| 0 | 1 | 0 | 1 | 0 | 0 | 0 | 1 | 0 | 0 | 0 | 0 | 0 | 1 |
| 0.5 | 1 | 0 | 1 | 0 | 0 | 0 | 1 | 15 | 15 | 0 | 0 | 0.125 | 1 |
| 1 | 1 | 0 | 1 | 0 | 0 | 0 | 1 | 15 | 15 | 15 | 15 | 0.25 | 1 |

(b)

| | | Corrected Second Sub-frame Group | | | | | | First Sub-frame Group | | | | Second Sub-frame Group | | | | | |
|---|---|---|---|---|---|---|---|---|---|---|---|---|---|---|---|---|---|
| Intermediate Transition I1-2b | | Applied Voltage | | | | Intermediate Transition I2-2a | | Applied Voltage | | Inter-mediate Transition I2-1 | | Applied Voltage | | | | Intermediate Transition I2-2b | |
| C | R | W2-2a | W2-2b | W2-2c | W2-2d | C | R | W2-1a | W2-1b | C | R | W2-2a | W2-2b | W2-2c | W2-2d | C | R |
| 0 | 0.75 | 0 | 0 | 0 | 0 | 0 | 0 | −30 | −30 | 0 | 0 | 0 | 0 | 0 | 0 | 0 | 0 |
| 0.125 | 0.75 | 15 | 15 | 15 | 15 | 0.375 | 0 | −30 | −30 | 0.125 | 0 | 15 | 15 | 0 | 0 | 0.25 | 0 |

TABLE 11-continued

| Two Particles, without Reset Period, Four-time Application of Driving Waveform | | | | | | | | | | | | | | | | | |
|---|---|---|---|---|---|---|---|---|---|---|---|---|---|---|---|---|---|
| 0.25 | 0.75 | 15 | 15 | 15 | 15 | 0.5 | 0 | −30 | −30 | 0.25 | 0 | 15 | 15 | 15 | 15 | 0.5 | 0 |
| 0 | 0.875 | 0 | 0 | 0 | 0 | 0 | 0 | −30 | 0 | 0 | 0 | 0 | 0 | 0 | 0 | 0 | 0 |
| 0.125 | 0.875 | 15 | 15 | 0 | 0 | 0.25 | 0 | −30 | 0 | 0.125 | 0 | 15 | 15 | 0 | 0 | 0.25 | 0 |
| 0.25 | 0.875 | 15 | 15 | 0 | 0 | 0.375 | 0 | −30 | 0 | 0.25 | 0 | 15 | 15 | 15 | 15 | 0.5 | 0 |
| 0 | 1 | 0 | 0 | 0 | 0 | 0 | 0 | 0 | 0 | 0 | 0 | 0 | 0 | 0 | 0 | 0 | 0 |
| 0.125 | 1 | 0 | 0 | 0 | 0 | 0.125 | 0 | 0 | 0 | 0.125 | 0 | 15 | 15 | 0 | 0 | 0.25 | 0 |
| 0.25 | 1 | 0 | 0 | 0 | 0 | 0.25 | 0 | 0 | 0 | 0.25 | 0 | 15 | 15 | 15 | 15 | 0.5 | 0 |

(c)

| | | | | | | | | First Sub-frame Group | | | | | | | | | |
|---|---|---|---|---|---|---|---|---|---|---|---|---|---|---|---|---|---|
| | | Corrected Second Sub-frame Group | | | | | | | | Inter-mediate Transition I3-1 | | Second Sub-frame Group | | | | | |
| Intermediate Transition I2-2b | | Applied Voltage | | | | Intermediate Transition I3-2a | | Applied Voltage | | | | Applied Voltage | | | | Intermediate Transition I3-2b | |
| C | R | W2-2a | W2-2b | W2-2c | W2-2d | C | R | W2-1a | W2-1b | C | R | W2-2a | W2-2b | W2-2c | W2-2d | C | R |
| 0 | 0 | 0 | 0 | 0 | 0 | 0 | 0 | −30 | −30 | 0 | 0 | 0 | 0 | 0 | 0 | 0 | 0 |
| 0.25 | 0 | 15 | 15 | 15 | 15 | 0.5 | 0 | −30 | −30 | 0.25 | 0 | 15 | 15 | 0 | 0 | 0.375 | 0 |
| 0.5 | 0 | 15 | 15 | 15 | 15 | 0.75 | 0 | −30 | −30 | 0.5 | 0 | 15 | 15 | 15 | 15 | 0.75 | 0 |
| 0 | 0 | 0 | 0 | 0 | 0 | 0 | 0 | −30 | 0 | 0 | 0 | 0 | 0 | 0 | 0 | 0 | 0 |
| 0.25 | 0 | 15 | 15 | 0 | 0 | 0.375 | 0 | −30 | 0 | 0.25 | 0 | 15 | 15 | 0 | 0 | 0.375 | 0 |
| 0.5 | 0 | 15 | 15 | 0 | 0 | 0.625 | 0 | −30 | 0 | 0.5 | 0 | 15 | 15 | 15 | 15 | 0.75 | 0 |
| 0 | 0 | 0 | 0 | 0 | 0 | 0 | 0 | 0 | 0 | 0 | 0 | 0 | 0 | 0 | 0 | 0 | 0 |
| 0.25 | 0 | 0 | 0 | 0 | 0 | 0.25 | 0 | 0 | 0 | 0.25 | 0 | 15 | 15 | 0 | 0 | 0.375 | 0 |
| 0.5 | 0 | 0 | 0 | 0 | 0 | 0.5 | 0 | 0 | 0 | 0.5 | 0 | 15 | 15 | 15 | 15 | 0.75 | 0 |

(d)

| | | | | | | | | First Sub-frame Group | | | | | | | | | |
|---|---|---|---|---|---|---|---|---|---|---|---|---|---|---|---|---|---|
| | | Corrected Second Sub-frame Group | | | | | | | | Inter-mediate Transition I3-1 | | Second Sub-frame Group | | | | | |
| Intermediate Transition I3-2b | | Applied Voltage | | | | Intermediate Transition I3-2a | | Applied Voltage | | | | Applied Voltage | | | | Renewed Screen Diplay N | |
| C | R | W2-2a | W2-2b | W2-2c | W2-2d | C | R | W2-1a | W2-1b | C | R | W2-2a | W2-2b | W2-2c | W2-2d | C | R |
| 0 | 0 | 0 | 0 | 0 | 0 | 0 | 0 | −30 | −30 | 0 | 0 | 0 | 0 | 0 | 0 | 0 | 0 |
| 0.375 | 0 | 15 | 15 | 15 | 15 | 0.625 | 0 | −30 | −30 | 0.375 | 0 | 15 | 15 | 0 | 0 | 0.5 | 0 |
| 0.75 | 0 | 15 | 15 | 15 | 15 | 1 | 0 | −30 | −30 | 0.75 | 0 | 15 | 15 | 15 | 26 | 1 | 0 |
| 0 | 0 | 0 | 0 | 0 | 0 | 0 | 0 | −30 | 0 | 0 | 0 | 0 | 0 | 0 | 0 | 0 | 0 |
| 0.375 | 0 | 15 | 15 | 0 | 0 | 0.5 | 0 | −30 | 0 | 0.375 | 0 | 15 | 15 | 0 | 0 | 0.5 | 0 |
| 0.75 | 0 | 15 | 15 | 0 | 0 | 0.875 | 0 | −30 | 0 | 0.75 | 0 | 15 | 15 | 15 | 15 | 1 | 0 |
| 0 | 0 | 0 | 0 | 0 | 0 | 0 | 0 | 0 | 0 | 0 | 0 | 0 | 0 | 0 | 0 | 0 | 0 |
| 0.375 | 0 | 0 | 0 | 0 | 0 | 0.375 | 0 | 0 | 0 | 0.375 | 0 | 15 | 15 | 0 | 0 | 0.5 | 0 |
| 0.75 | 0 | 0 | 0 | 0 | 0 | 0.75 | 0 | 0 | 0 | 0.75 | 0 | 15 | 15 | 15 | 15 | 1 | 0 |

It is apparent that the present invention is not limited to the above embodiments but may be changed and modified without departing from the scope and spirit of the invention.

For example, in the above embodiments, the electrophoretic display device uses charged particles having three colors of a cyan (C), magenta (M) and yellow (Y) and a white holding body, however, instead of the cyan (C), magenta (M), and yellow (Y) charged particles, red (R), green (G), and blue (B) charged particles may be employed.

Moreover, in order to hold the charged particle, instead of a holding body, a microcapsule housing a charged particle may be used. In other words, by applying the present invention to an electrophoretic display device including three kinds or more particles having a different color and a different threshold value voltage (for example, 4 color particles C, M, Y and K, color particles R, G, B, and W or 8 color particles C, M, Y, R, G and B), not only each single color display but also any given color (La*b*) including intermediate colors can be simply realized.

The configurations of the present invention including n-kinds ("n" is a natural number being 2 or more) of electrophoretic particles can be generalized as below.

According to the generalized configurations, the electrophoretic image display device having a memory property is made up of a display section including a first substrate in which switching elements, pixel electrodes are arranged in a matrix manner and of a second substrate in which a facing electrode is formed and of electrophoretic layers interposed between the first and second substrates containing an electrophoretic particle, and a voltage applying unit to apply a specified voltage for a predetermined period to the electrophoretic particle between the pixel electrode and facing electrode at time of renewal of a screen and to renew a display state of the display section from a current screen to a next screen having a predetermined color density.

The electrophoretic particle including n-kinds ("n" is a natural number being 3 or more) of charged particles Cn, . . . , Ck, . . . , C1 (k=2 to n−1) each having colors different from one another and different threshold voltage to initiate an electrophoresis.

Electrophoretic particles Cn, . . . , Ck, . . . , C1 have a characteristic relationship of |Vth(cn)|, . . . , <|Vth(ck)|, . . . , <|Vth(c1)|, where |Vth(cn)| is a threshold value voltage of a charged particle Cn, |Vth(ck)| is a threshold value voltage of a charged particle Ck, and |Vth(c1)| is a threshold value voltage of a charged particle C1.

The predetermined voltage applying period during which a voltage is applied is made up of a basic waveform applying period during which one or more basic driving waveforms for the application of a first voltage V1 (or −V1) and/or a second voltage V2 (or −V2) and/or n-th voltage Vn (or −Vn), and/or 0V for a specified number of frames are applied a plurality of times.

The voltages V1, . . . , Vk, . . . , Vn satisfy the relationship of $$|Vth(cn)|<|Vn|<|Vth(c(n-1))|,<\ldots,<|Vth(ck)|<|Vk|<|Vth(c(k-1))|,<\ldots,<|Vth(c1)|<|V1|.$$

The basic waveform is characterized by being divided into sub-frame group periods during which the first voltage (or V1) is applied for a specified number of sub-frames, . . . , k-th voltage Vk (or Vk) is applied for a predetermined number of sub-frames, . . . , and n-th voltage Vn (or Vn) is finally applied for a predetermined number of sub-frames.

According to the generalized first and second exemplary embodiments, the voltage applying period includes a reset period to reset the current screen to be in aground state. The information on a relative color density of each charged particle in each intermediate transition state after the application of each of the basic waveforms is interposed between the relative color density information in the ground state and the relative color density information in a renewal display state.

The generalized third exemplary embodiment (driving method for one time application of driving waveform without the reset period is as follows.

That is, the electrophoretic display device is made up of a display section including a first substrate in which switching elements and pixel electrodes are arranged in a matrix manner, a second substrate in which a facing electrode is formed, and an electrophoretic layer interposed between the first substrate and second substrate and having electrophoretic particles, of a voltage applying means, at time of renewing a screen, by which a specified voltage is applied for a predetermined period to the electrophoretic particles between the pixel electrode and facing electrode to renew a display state of the display section from a current screen to a next screen providing a specified color density.

The electrophoretic particles are made up of n-kinds (n is a natural number being 2 or more) of charged particles Cn, . . . , Ck, . . . , C1 (k=2 to n−1) being different in colors and threshold value voltages to initiate an electrophoresis.

Each of the charged particles Cn, . . . , Ck, . . . , C1 have characteristics of a relationship of $$|Vth(cn)|,\ldots,<|Vth(ck)|,\ldots,<|Vth(c1)|,$$

where |Vth(cn)| is a threshold value voltage of the charged particle Cn, |Vth(ck)| is a threshold value voltage of the charged particle Ck, and |Vth(c1)| is a threshold value voltage of the charged particle C1.

The relative color density of the charged particle Cn in each pixel making up a next screen to be renewed is Rn, when the relative color density of the charged particle Ck in each pixel making up a next screen to be renewed is Rk and when the relative color density of the charged particle C1 in each pixel making up a next screen is R1, the predetermined period during which a voltage is applied includes a first voltage applying period during which a first voltage V1 (or −V1) and/or V is applied and a transition is allowed to occur, by referring to a relative color density for the current screen, to a first intermediate transition state in which a relative color density of the charged particle C1 becomes R1, a second to n-th−1 voltage applying period to cause a transition from the k-th−1 intermediate transition state, by applying the k-th voltage Vk, and/or 0V, while the relative color density of the charged particle C1 is maintained to be R1, . . . , and the relative color density of the charged particle Ck−1 is maintained to be Rk−1, sequentially to k-th intermediate transition state in which the relative color densities of the charged particles Ck, . . . Cn each become Rk, and n-th voltage applying period to cause a transition from the n-th−1 intermediate transition state, by applying the n-th voltage Vn (or −Vn) and/or 0V, while the relative color density of the charged particle C1 is maintained to be R1, . . . and the relative color density of the charged particle Cn−1 is maintained to be Rn−1 and the relative color density of the charged particle C1 is maintained to be R1 and the relative color density of the charged particle Cn becomes Rn, to a final display state in which the relative color density of the charged Cn becomes Rn.

The threshold value voltage of each charged particle and the voltage to be applied during each voltage applying period satisfy the following relationship formula:

$$|Vth(cn)|<|Vn|<|Vth(c(n-1))|,<\ldots,<|Vth(ck)|<|Vk|<|Vth(c(k-1))|,<\ldots,<|Vth(c1)|<|V1|.$$

According to the generalized fourth exemplary embodiment (driving method of a plurality of times of applications of the driving waveform without a reset period), while the basic driving waveforms are applied a plurality of times, by applying a correction driving waveform being different from the basic driving waveform, a transition is allowed to occur from the current screen to the next screen without resetting the previous screen.

Moreover, the correction driving waveform can be divided so as to be applied during a predetermined number of sub-frame group periods and during one period the second voltage V2 (or V2) is applied for a predetermined times of the sub-frames, during the other period, k-th(Vk) (k=3 to n−1) voltage is applied for a predetermined times of sub-frames, and during the another period, n-th voltage (Vn) is finally applied for a predetermined times of frames.

According to the generalized fifth exemplary embodiment in which two kinds of charged particles are used, the image display device has a display section made up of a first substrate in which switching elements and pixel elements are arranged in a matrix manner, a second substrate in which a facing electrode is formed and an electrophoretic layer interposed between the first substrate and the second substrate and having electrophoretic particles and a voltage applying means to apply, at time of screen renewal, a predetermined voltage to the electrophoretic particles existing between the pixel electrode and facing electrode for a predetermined period of time to renew the display state of the display section from a current screen to a next screen having a specified color density.

The electrophoretic particle made up of 2 kinds of charged particles C and R having colors being different from each other and threshold value voltages to initiate the electrophoresis being different from each other and each having characteristic of relationship of |Vth(c)|<|Vth(r)|, where the |Vth(c)| is a threshold value of the charged particle C and threshold value voltage of the charged particle R, and when the relative color density of the charged particle is Rc and the relative color density of the charged particle R is Ry.

The predetermined period for application voltages includes a first sub-frame group during which a first voltage V1 (or −V1) and/or 0V are applied to change the color density of the charged particle R is Rr, and a second sub-frame groups during which a second voltage V2 (or −V2) and/or 0V are applied, while the color density of the charged particle R is maintained to be Rr, to cause a transition to a final display state NEXT during which the relative color density of the charged particle C becomes Rc and the V1 and V2 satisfy the relationship of $|Vth(c)|<|V2|<|Vth(r)|<|V1|$.

Moreover, a voltage to be applied during each of the sub-frames may be determined from a display state on a previous screen and a display state on a screen to be renewed and a reset period to erase the previous state may be provided.

Further, the predetermined period during which a voltage is applied may be made up of a driving waveform applying period during which one or more unit driving waveforms are applied a plurality of times in which the predetermined period during which a first voltage V1 (or −V1) and/or voltage V2 (or −V2) and/or a third voltage V3 (−V3) and/or 0V are applied for a predetermined number of sub-frames.

Further, for a targeted renewal display state, sub-frame groups not required may be omitted and the driving may be performed by using only the first to third sub-frame group period during which the voltage application of a voltage is required.

It is needless to say that there are driving waveforms being different from Tables 8 to 11 containing the same intermediate state and the driving waveforms are contained in the embodiment. Also, the applying period of 0V can be deleted to shorten the driving period.

Moreover, by making constant the number of sub-frames for each period, a unit sub-frame time for each period may be made different in each period.

The first to eighth exemplary embodiments can be summarized based on a transition state of charged particles as follows:

<In the Case of Having Reset Period>

According to the first to eighth exemplary embodiment, an image display device is provided which is made up of a display section having a first substrate in which switching elements and piexe electrodes are arranged in a matrix manner, a second substrate in which a facing electrode is formed, and an electrophoretic layer interposed between the first substrate and second substrate and containing electrophoretic particles and a voltage applying means, at time of renewing a screen, to apply a predetermined voltage to the electrophoretic particles between the pixel electrode and facing electrode for a predetermined period to renew a screen to a next screen having a specified color density and having a memory property.

The electrophoretic particles are made up of 2 kinds or more charged particles having colors different from each other and a threshold value voltage to initiate an electrophoresis different from each other and wherein the renewal period of a screen includes a reset period to set a previous screen to a ground state and a set period to set a next screen and, during the set period, the relative color density of each electrophoretic particle does not take an intermediate transition state of a primary color.

<In the Case of Having No Reset Period>

According to the first to eighth exemplary embodiments, an image display device is provided which is made up of a display section having a first substrate in which switching electrode and pixel electrode are arranged in a matrix manner, a second substrate in which a facing electrode is formed, and an electrophoretic layer interposed between the first and second substrates and containing electrophoretic particles and a voltage applying mean, at time of renewing a screen, to apply a predetermined voltage to be electrophoretic particles between the pixel electrode and facing electrode for a predetermined period to renew a screen to a next screen having a specified color density and have a memory property.

The electrophoretic particle are made up of 2 kinds or more charge particles having color different an from each other and a threshold value voltage to initiate electrophoresis different from each other. During a renewal period of a screen, the relative color density of each electrophoretic particle does not take an intermediate state of a primary color.

In the above embodiments, by configuring so that $\int vdt=0$ for all over the renewal period and by adding a DC cancel compensation sub-frame group and by avoiding the application of unrequired DC voltage to charged particles, degradation of reliability can be prevented. In this case, the absolute voltage to be applied during DC cancel compensation sub-frame group period should be set to be less than the absolute value of the minimum threshold of charged particles not to move all the charged particles C, M, Y (or C and R).

Moreover, in the first to eighth exemplary embodiments, as a voltage signal to be applied to a data driver of the electronic paper section, three values of −Vdd, 0, Vdd may be selected and a driver reference voltage Vdd may be variable for every sub-frame. By configuring above, even when the data driver cannot output voltages required for driving at the same time, the electrophoretic display device can be driven and, therefore, the driver can be configured simply, which achieves cost-down.

When the withstand voltage of the data driver is less than the driving voltage for a device, by making COM voltage variable, an expected driving voltage for a device can be realized. Additionally, in the first exemplary embodiment described above, a unit voltage driving waveform obtained by combining the first and second unit voltage driving waveforms can be used as a first voltage driving waveform and, even if the third and fourth unit voltage driving waveforms are kept unchanged, almost the same effects as described above can be realized.

The present invention can be widely used for a color electronic display device such as electronic books, electronic newspaper, and digital signage, and a like.

What is claimed is:

1. An image display device having a memory property comprising:

a display section having a first substrate in which pixel electrodes are formed, a second substrate in which a facing electrode is formed, and an electrophoretic layer having a thickness “L” and being interposed between said first substrate and second substrate and containing electrophoretic particles in a manner to enable an electrophoresis in said electrophoretic layer; and a voltage applying unit to sequentially apply, at a time of screen renewal, a plurality of specified voltage driving waveforms to said electrophoretic particles existing between said pixel electrodes and said facing electrode, during a predetermined period of time, to renew a display state of said display section from a previous screen, through a single or a plurality of intermediate transitions, to a next screen, wherein said electrophoretic particles comprise a plurality of kinds of charged particles having colors being different from each other and threshold voltages to initiate the electrophoresis being different from each other, wherein said voltage applying unit, by changing, at the time of screen renewal, a relative color density of each kind of charged particle to a relative color density for renewal, in order of a decreasing threshold voltage of the charged particles, finally renews a screen to a next screen having a desired density, wherein the predetermined period of time, during which said specified voltage driving waveforms are sequentially applied, comprises a plurality of voltage applying periods associated with the plurality of kinds of charged particles in a one-to-one correspondence, and wherein, in each voltage applying period, said voltage applying unit applies a specified voltage driving waveform including |driving voltage| and/or 0V to cause an electrophoresis of a corresponding kind of charged particle to move at a predetermined location at a distance "L1" (0≤L1≤L) from a rear surface of said electrophoretic layer, in response to a relative color density of the corresponding kind of charged particle for renewal, where a threshold value voltage of a kind of charged particle associated with a previous voltage applying period >said |driving voltage|> a threshold value voltage of the corresponding kind of charged particle, wherein said plurality of voltage applying periods is made up of a plurality of sub-frame group periods, and wherein, in each sub-frame group period, said voltage applying unit applies 'driving voltage' and/or 0V for a predetermined number of sub-frames to cause an electrophoresis of a corresponding kind of charged particle to move at a predetermined location at distance "L1" (0=L1=L) from the rear surface of said electrophoretic layer, in response to said relative color density of the corresponding kind of charged particle for renewal, where a threshold value voltage of a kind of charged particles associated with a previous voltage applying period>said |driving voltage|> threshold value voltage of the corresponding kind of charged particles).

2. The image display device having a memory property according to claim 1, wherein said specified voltage driving waveforms each comprise one or more unit waveforms each having a same waveform pattern.

3. The image display device having a memory property according to claim 1, wherein said voltage applying unit, at the time of renewing said screen, after resetting said previous screen and, after completion of a transition from an electrophoretic state to a ground state, applies sequentially said specified voltage driving waveforms.

4. The image display device having a memory property according to claim 1, wherein, in a process of applying said plurality of specified voltage driving waveforms, when a given intermediate state coincides with a display state of a next screen being a final display state, application of subsequent voltage driving waveforms beyond can be omitted.

5. The image display device having a memory property according to claim 1, wherein said voltage applying unit, at the time of renewing said screen, instead of reset processing of said previous screen, applies a correction voltage driving waveform to correct an electrophoresis deviation of given charged particles caused by an electrophoresis of given charged particles in an opposite direction between a voltage driving waveform to be applied and a voltage driving waveform to be applied next.

6. The image display device having a memory property according to claim 1, wherein said voltage applying unit, at the time of renewing said screen, instead of reset processing of said previous screen, applies a correction voltage driving waveform to correct an electrophoresis deviation of given charged particles caused by an electrophoresis of given charged particles in an opposite direction between a voltage driving waveform to be applied and a voltage driving waveform to be applied next and wherein a period for applying said correction driving waveform period is made up of a sub-frame group period during which a predetermined correction driving voltage is applied for a predetermined number of sub-frames.

7. The image display device having a memory property according to claim 1, wherein said electrophoretic layer is sandwiched between said first substrate in which switching elements and said pixel electrodes are arranged in a matrix manner and said second substrate in which said facing electrode is formed and wherein said voltage applying unit, at the time of renewal of a screen, drives each of said switching elements to apply said voltage driving waveform, in a pixel unit, between said pixel signal and said facing electrode.

8. The image display device having a memory property according to claim 1, wherein holding particles to hold said plurality of kinds of charged particles are contained in said electrophoretic layer.

9. The image display device having a memory property according to claim 1, wherein said plurality of kinds of charged particles include three color particles of cyan, magenta, and yellow or three colors of red, green, and blue.

10. The image display device having a memory property according to claim 1, wherein three kinds of charged particles each having cyan, magenta, or yellow and a white holding particle to hold said three kinds of charged particles are included in said electrophoretic layer.

11. The image display device having a memory property according to claim 1, wherein three kinds of charged particles each having red, green, or blue and black holding particles to hold said three kinds of charged particles are included in said electrophoretic layer.

12. The image display device having a memory property according to claim 1, wherein said electrophoretic particle comprises two kinds of charged particles having a relation of colors being complementary to one another.

13. The image display device having a memory property according to claim 1, wherein two kinds of charged particles having a relation of colors being complementary to one another and white or black holding particles to hold said two kinds of charged particles are included in said electrophoretic layer.

14. The image display device having a memory property according to claim 1, wherein a formula $\int vdt=0$ is satisfied all over renewed periods and DC cancel compensation sub-frame group is added and a voltage to be added in a DC cancel compensation sub-frame group is set to be less than |threshold value voltage| being a minimum value out of charged particles.

15. The image display device having a memory property according to claim 1, wherein a voltage signal to be applied to said voltage applying unit takes three values −Vdd, 0, and Vdd and a driving reference voltage is variable in every sub-frame period.

16. The image display device having a memory property according to claim 1, wherein a COM voltage to determine a reference potential of said electrophoretic particles to be applied to said facing electrode in every sub-frame period is changed.

* * * * *